(12) United States Patent
Ninomiya

(10) Patent No.: US 7,454,259 B2
(45) Date of Patent: Nov. 18, 2008

(54) ARTICLE DESIGN SUPPORT SYSTEM AND METHOD AND MEDIUM STORING PROGRAM FOR ARTICLE DESIGN SUPPORT

(76) Inventor: Kenichi Ninomiya, 6-14, Seijo 2-chome, Setagaya-ku, Tokyo 157-0066 (JP)

( * ) Notice: Subject to any disclaimer, the term of this patent is extended or adjusted under 35 U.S.C. 154(b) by 35 days.

(21) Appl. No.: 11/331,040

(22) Filed: Jan. 13, 2006

(65) Prior Publication Data

US 2006/0122720 A1 Jun. 8, 2006

Related U.S. Application Data

(62) Division of application No. 10/048,429, filed on Feb. 1, 2002, now Pat. No. 7,016,747.

(30) Foreign Application Priority Data

Aug. 3, 1999 (JP) ................................. 11-220293

(51) Int. Cl.
*G06F 19/00* (2006.01)
(52) U.S. Cl. ................................ 700/98; 700/97; 703/1; 715/964
(58) Field of Classification Search ............. 700/97–99, 700/182; 703/1; 715/964
See application file for complete search history.

(56) References Cited

U.S. PATENT DOCUMENTS

| 5,111,392 | A | | 5/1992 | Malin |
| 5,255,207 | A | * | 10/1993 | Cornwell ........................ 703/1 |
| 5,293,479 | A | | 3/1994 | Quintero et al. |
| 5,299,307 | A | * | 3/1994 | Young ......................... 715/861 |
| 5,485,560 | A | * | 1/1996 | Ishida et al. ................. 345/619 |
| 5,490,097 | A | | 2/1996 | Swenson et al. |

(Continued)

FOREIGN PATENT DOCUMENTS

JP 8-137939 5/1996

(Continued)

OTHER PUBLICATIONS

European Search Report dated Feb. 4, 2005.

(Continued)

*Primary Examiner*—Alexander J Kosowski
(74) *Attorney, Agent, or Firm*—McGinn IP Law Group, PLLC

(57) ABSTRACT

A furniture design support system comprises a computer system. The computer system comprises an HD unit, which stores a furniture design support program and data representing the basic forms of units and parts. An operator defines a size, a finishing color, a material (the kind of wood), etc. with respect to the unit to be used for furniture to be designed on the basis of the desires of a customer, and also defines a finishing color, a material, etc. with respect to the part (a drawer, a door leaf, etc.) (step 33). Completed furniture is displayed on a display screen by assembling the unit and the part on the display screen. An HD stores design data related to the completed furniture (step 34). The appearance of the completed furniture is displayed on the display screen on the basis of the design data, and a design drawing is outputted from a printer (step 35).

7 Claims, 115 Drawing Sheets

U.S. PATENT DOCUMENTS

| | | | |
|---|---|---|---|
| 5,515,524 | A | 5/1996 | Lynch et al. |
| 5,729,750 | A * | 3/1998 | Ishida .................. 715/502 |
| 5,822,210 | A | 10/1998 | Kobayashi et al. |
| 5,923,573 | A * | 7/1999 | Hatanaka .................. 703/2 |
| 5,991,528 | A | 11/1999 | Taylor et al. |
| 6,052,669 | A | 4/2000 | Smith et al. |
| 6,064,386 | A | 5/2000 | Felser et al. |
| 6,219,055 | B1 * | 4/2001 | Bhargava et al. ............ 715/850 |
| 6,240,328 | B1 | 5/2001 | LaLonde et al. |
| 6,363,291 | B2 | 3/2002 | Nagaoka et al. |
| 6,389,322 | B1 | 5/2002 | Park et al. |
| 6,397,117 | B1 | 5/2002 | Burrows et al. |
| 6,434,438 | B1 | 8/2002 | Jin et al. |

FOREIGN PATENT DOCUMENTS

| | | |
|---|---|---|
| JP | 8-147351 | 6/1996 |
| JP | 9-6834 | 1/1997 |
| WO | WO98/15908 | 4/1998 |
| WO | WO 98/55949 | 12/1998 |

OTHER PUBLICATIONS

Meguro Hideaki, et al., "A Proposal of CAD System and Its Model Data Formats for the frame Core Flush Panel Furniture Considering Real-Time Collaboration", Buletin of JSSD vol. 45, No. 5, Jan. 1999, pp. 13-22.

International Search Report dated Aug. 18, 2000 with English translation.

International Preliminary Examination Report dated Mar. 27, 2001.

* cited by examiner

*Fig. 5*
(A) 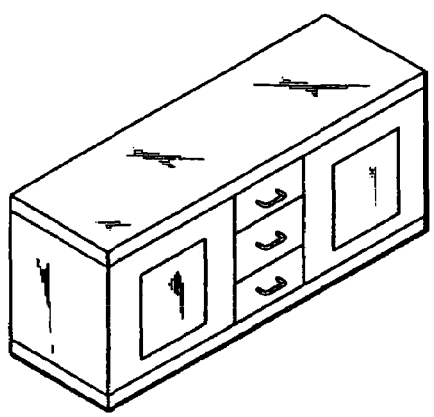
(B) 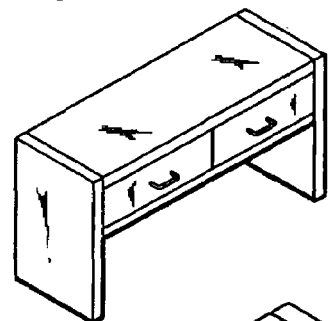
(C) 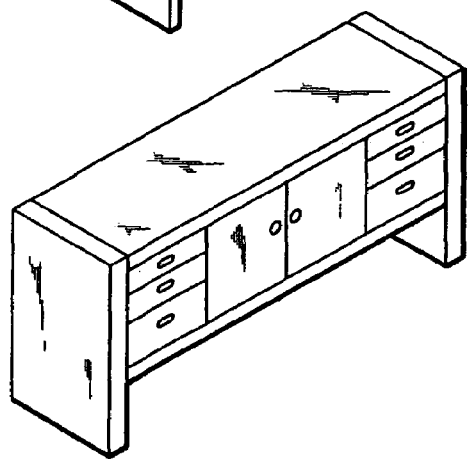
(D) 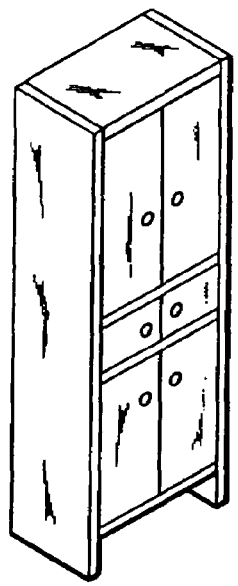

Fig. 6
(A) 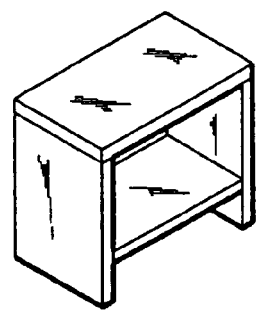
(B) 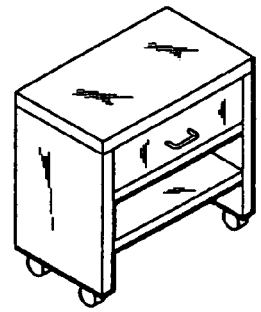
(C) 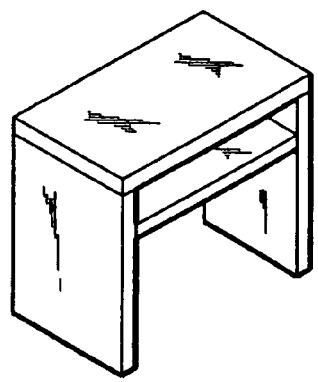
(D) 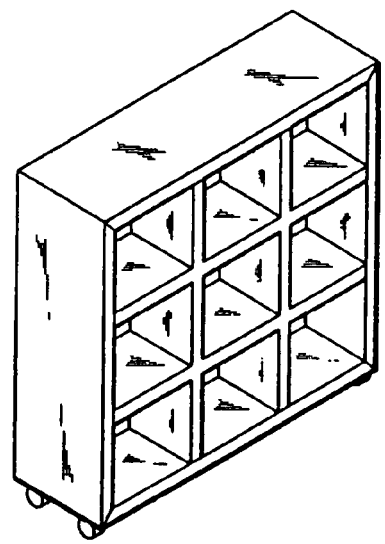

Fig. 7
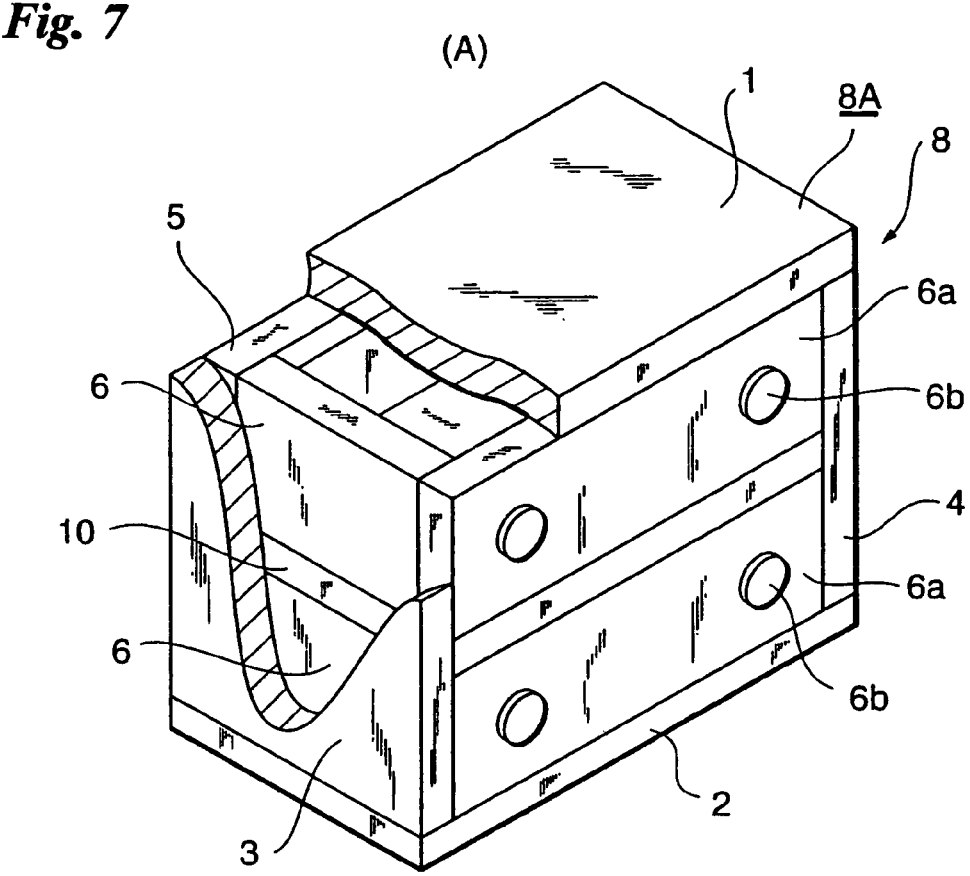
(A)
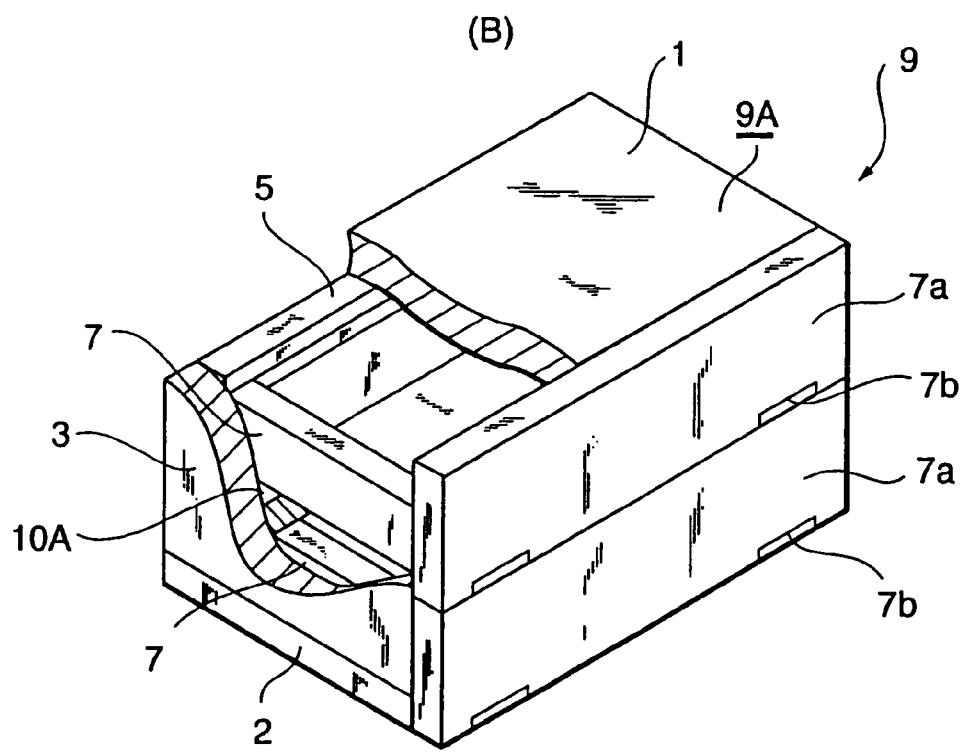
(B)

*Fig. 13*
(A)
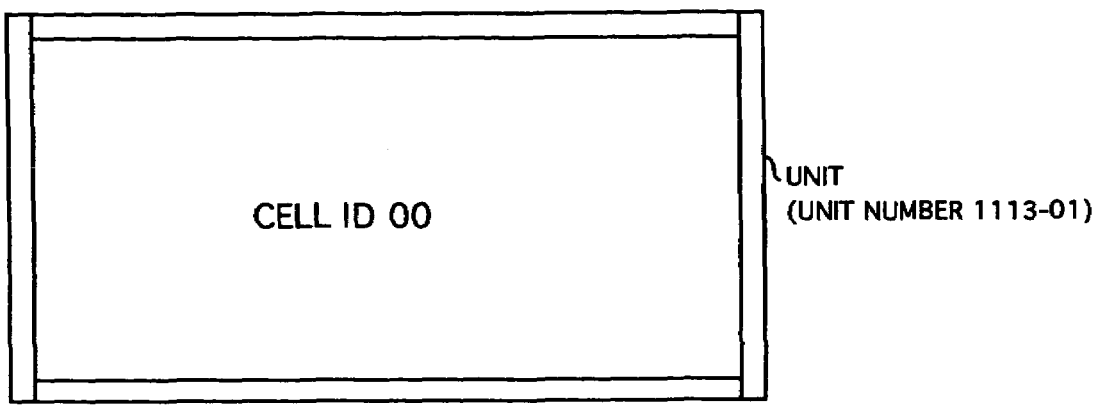
(B)
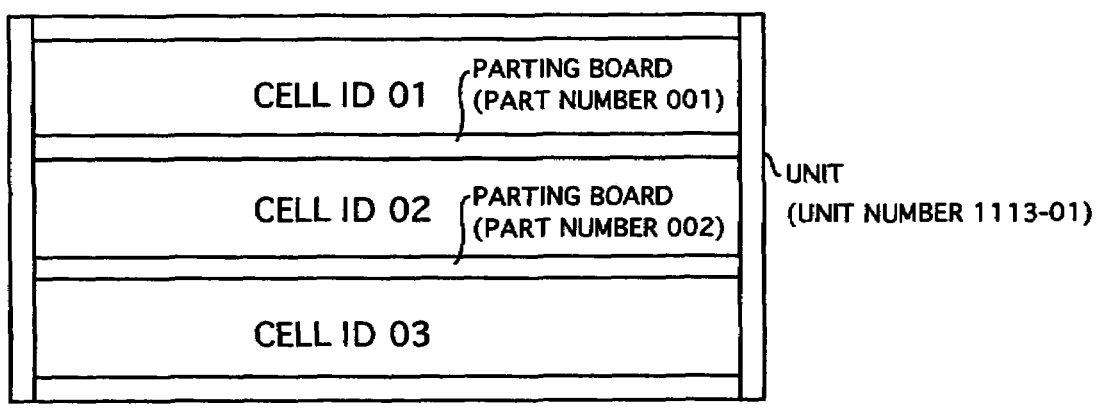
(C)
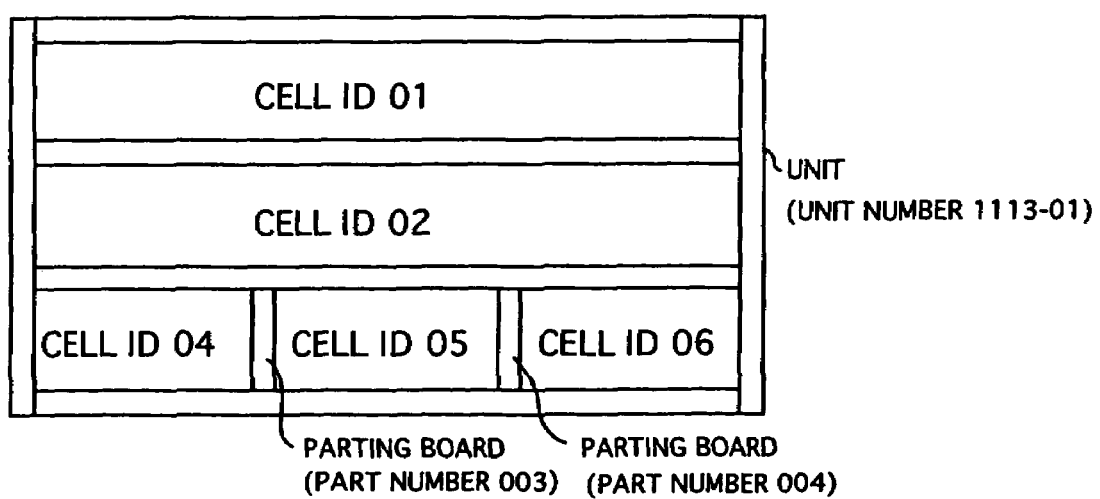

*Fig. 14*

COMPLEATED FURNITURE TABLE

| FURNITURE NUMBER | FURNITURE TYPE | FURNITURE NAME | DATE OF MANUFACTURE | NUMBER OF UNITS |
|---|---|---|---|---|
| 1 1 1 3 | WITH NO LEGS (BOX) | CHEST 3 | 1999/7/19 | 2 |
| 1 1 1 2 | WITH NO LEGS (BOX) | CHEST 2 | 1999/7/10 | 3 |
| 1 1 1 1 | WITH NO LEGS (BOX) | CHEST 1 | 1999/7/5 | 1 |
| ⋮ | ⋮ | ⋮ | ⋮ | ⋮ |
| 0 3 8 3 | WITH NO LEGS (BOX) | CUPBOARD 2 | 1998/11/26 | 1 |
| 0 3 8 2 | WITH NO LEGS (BOX) | CUPBOARD 3 | 1998/11/20 | 2 |
| ⋮ | ⋮ | ⋮ | ⋮ | ⋮ |

Fig. 15

UNIT NUMBER TABLE

| FURNITURE NUMBER | UNIT NUMBER | UNIT/PART DEFINITION NUMBER | UNIT/PART DEFINITION NAME | NUMBER OF CELLS |
|---|---|---|---|---|
| 1113 | 1113-01 | 001 | UNIT 1 | 7 |
| 1113 | 1113-02 | 001 | UNIT 1 | 5 |
| 1112 | 1112-01 | 005 | UNIT 5 | 2 |
| 1112 | 1112-02 | 001 | UNIT 1 | 3 |
| 1112 | 1112-03 | 005 | UNIT 5 | 6 |
| 1111 | 1111-01 | 001 | UNIT 1 | 2 |
| ⋮ | ⋮ | ⋮ | ⋮ | ⋮ |

Fig. 16

UNIT ARRANGEMENT TABLE

| FURNITURE NUMBER | UNIT NUMBER | CELL ID | ARRANGEMENT INFORMATION | REFERENCE POINT (x,y,z) |
|---|---|---|---|---|
| 1113 | 1113-01 | 00 | 1113-02 IS INTEGRALLY JOINED TO BOTTOM SURFACE | (0, 0, 0) |
| 1113 | 1113-02 | 00 | 1113-01 IS INTEGRALLY JOINED TO TOP SURFACE | (0, 0, -950) |
| 1112 | 1112-01 | 00 | 1112-02 IS INTEGRALLY JOINED TO BOTTOM SURFACE | (0, 0, 0) |
| .... | .... | .... | .... | .... |

| OVERALL SIZE (uW,uD,uH) | SIZE OF PORTION 1 (TOP BOARD) | FINISHING COLOR OF PORTION 1 (TOP BOARD) | MATERIAL OF PORTION 1 (TOP BOARD) | NUMBER OF PARTS | PRESENCE OR ABSENCE OF LEG |
|---|---|---|---|---|---|
| (1000, 670, 450) | (940, 640, 30) | NO COLOR (MATERIAL COLOR) | MAHOGANY | 14 | PRESENCE |
| (1000, 670, 950) | — | — | — | 15 | ABSENCE |
| (700, 700, 900) | (640, 670, 20) | BLACK | PINE | 6 | PRESENCE |
| .... | .... | .... | .... | .... | .... |

*Fig. 17*

PARTING (CELL) INFORMATION TABLE

| FURNITURE NUMBER | UNIT NUMBER | CELL ID | NUMBER OF TRANSVERSE PARTING | NUMBER OF LONGITUDINAL PARTING | PARENT CELL ID | LATERAL POSITION IN PARENT CELL |
|---|---|---|---|---|---|---|
| 1113 | 1113-01 | 00 | 2 | 0 | — | — |
| 1113 | 1113-01 | 01 | 0 | 0 | 00 | — |
| 1113 | 1113-01 | 02 | 0 | 2 | 00 | — |
| 1113 | 1113-01 | 03 | 0 | 0 | 00 | — |
| 1113 | 1113-01 | 04 | 0 | 0 | 03 | 1 |
| 1113 | 1113-01 | 05 | 0 | 0 | 03 | 2 |
| 1113 | 1113-01 | 06 | 0 | 0 | 03 | 3 |
| ... | ... | ... | ... | ... | ... | ... |

| LONGITUDINAL POSITION IN PARENT CELL | REFERENCE POINT (x,y,z) | SIZE (cW,cD,cH) | ARRANGEMENT PART DEFINITION NAME | DIVISION LEVEL |
|---|---|---|---|---|
| — | (30, 0, 30) | (940, 610, 390) | — | 0 |
| 3 | (30, 0, 310) | (940, 610, 110) | DRAWER 1 | 1 |
| 2 | (30, 0, 170) | (940, 610, 110) | DRAWER 1 | 1 |
| 1 | (30, 0, 30) | (940, 610, 110) | — | 1 |
| — | (30, 0, 30) | (240, 610, 110) | DRAWER 1 | 2 |
| — | (353, 0, 30) | (240, 610, 110) | DRAWER 1 | 2 |
| — | (676, 0, 30) | (240, 610, 110) | DRAWER 1 | 2 |
| ... | ... | ... | ... | ... |

Fig. 18

UNIT/PART DEFINITION TABLE

| UNIT/PART TYPE | UNIT/PART DIFINITION NUMBER | UNIT/PART DIFINITION NAME | TYPE CLASSIFICATION 1 | TYPE CLASSIFICATION 2 | TYPE CLASSIFICATION 3 | OVERALL SIZE | SIZE OF PORTION 1 | FINISHING COLOR OF PORTION 1 | MATERIAL OF PORTION 1 | SIZE OF PORTION 2 |
|---|---|---|---|---|---|---|---|---|---|---|
| UNIT | 001 | UNIT 1 | SIDE BOARD COVERING | SIDE BOARD COVERING 1 | — | (1000, 670, 450) | (940, 640, 30) | NO COLOR (MATERIAL COLOR) | MAHOGANY | (940, 640, 30) |
| DRAWER | 002 | DRAWER 1 | FRONT PANEL 1 (STANDARD) | — | — | — | — | NO COLOR (MATERIAL COLOR) | TEAK | — |
| DOOR LEAF | 003 | DOOR LEAF 1 | DOOR LEAF 1 (DOUBLE SWINGING) | — | — | — | — | BROWN | TEAK | — |
| DOOR PULL | 004 | DOOR PULL 1 | DOOR PULL 2 (BAR SHAPE) | — | — | — | — | NO COLOR (MATERIAL COLOR) | ALUMINUM | — |
| ... | ... | ... | ... | ... | ... | ... | ... | ... | ... | ... |
| UNIT | 007 | UNIT 2 | SIDE BOARD COVERING | SIDE BOARD COVERING 1 | — | (1000, 670, 950) | (940, 640, 30) | NO COLOR (MATERIAL COLOR) | MAHOGANY | (940, 640, 30) |
| ... | ... | ... | ... | ... | ... | ... | ... | ... | ... | ... |

Fig. 19

DRAWER ARRANGEMENT TABLE

| FURNITURE NUMBER | UNIT NUMBER | CELL ID | PART NUMBER | UNIT/PART DEFINITION NUMBER | UNIT/PART DEFINITION NAME | REFERENCE POINT (x, y, z) |
|---|---|---|---|---|---|---|
| 1113 | 1113-01 | 01 | 005 | 002 | DRAWER 1 | (0, 0, 280) |
| 1113 | 1113-01 | 02 | 006 | 002 | DRAWER 1 | (0, 0, 140) |
| 1113 | 1113-01 | 04 | 007 | 002 | DRAWER 1 | (0, 0, 0) |
| 1113 | 1113-01 | 05 | 008 | 002 | DRAWER 1 | (338, 0, 0) |
| .... | .... | .... | .... | .... | .... | .... |

| SIZE | FINISHING COLOR (FRONT PANEL) | MATERIAL (FRONT PANEL) | FINISHING COLOR (OTHER THAN FRONT PANEL) | MATERIAL (OTHER THAN FRONT PANEL) | SETTING METHOD | NUMBER OF PARTS |
|---|---|---|---|---|---|---|
| (1000, 640, 170) | NO COLOR (MATERIAL COLOR) | TEAK | NO COLOR (MATERIAL COLOR) | TEAK | OVERSET | 1 |
| (1000, 640, 140) | NO COLOR (MATERIAL COLOR) | TEAK | NO COLOR (MATERIAL COLOR) | TEAK | OVERSET | 1 |
| (338, 640, 140) | NO COLOR (MATERIAL COLOR) | TEAK | NO COLOR (MATERIAL COLOR) | TEAK | OVERSET | 1 |
| (323, 640, 140) | NO COLOR (MATERIAL COLOR) | TEAK | NO COLOR (MATERIAL COLOR) | TEAK | OVERSET | 1 |
| .... | .... | .... | .... | .... | .... | .... |

Fig. 20

DOOR LEAF ARRANGEMENT TABLE

| FURNITURE NUMBER | UNIT NUMBER | CELL ID | PART NUMBER | UNIT/PART DEFINITION NUMBER | UNIT/PART DEFINITION NAME |
|---|---|---|---|---|---|
| 1113 | 1113-02 | 00 | 012 | 003 | DOOR LEAF 1 |
| .... | .... | .... | .... | .... | .... |

| REFERENCE POINT (x, y, z) | SIZE | FINISHING COLOR | MATERIAL | SETTING METHOD | NUMBER OF PARTS |
|---|---|---|---|---|---|
| (0, 0, -950) | (1000, 950, 30) | BROWN | TEAK | INSET | 1 |
| .... | .... | .... | .... | .... | .... |

Fig. 21

DOOR PULL ARRANGEMENT TABLE

| FURNITURE NUMBER | UNIT NUMBER | PARENT PART NUMBER | CELL ID | PART NUMBER | UNIT/PART DIFINITION NUMBER | UNIT/PART DIFINITION NAME |
|---|---|---|---|---|---|---|
| 1113 | 1113-01 | 005 | 01 | 010 | 004 | DOOR PULL 1 |
| 1113 | 1113-01 | 006 | 02 | 011 | 004 | DOOR PULL 1 |
| .... | .... | .... | .... | .... | .... | .... |

| ARRANGEMENT INFORMATION | REFERENCE POINT (x, y, z) | SIZE | FINISHING COLOR | MATERIAL |
|---|---|---|---|---|
| CENTER | (410, -90, 400) | (160, 60, 20) | NO COLOR (MATERIAL_COLOR) | ALUMINUM |
| CENTER | (410, -90, 230) | (160, 60, 20) | NO COLOR (MATERIAL_COLOR) | ALUMINUM |
| .... | .... | .... | .... | .... |

Fig. 22

LEG ARRANGEMENT TABLE

| FURNITURE NUMBER | UNIT NUMBER | PART NUMBER | UNIT/PART DEFINITION NUMBER | UNIT/PART DEFINITION NAME |
|---|---|---|---|---|
| 1113 | 1113-02 | 015 | 005 | CASTER 1 |
| .... | .... | .... | .... | .... |

| REFERENCE POINT (x, y, z) | SIZE | FINISHING COLOR | MATERIAL |
|---|---|---|---|
| (130, 0, -950) | (60, 60, 60) | BLACK | — |
| .... | .... | .... | .... |

*Fig. 23*

PARTING BOARD ARRANGEMENT TABLE

| FURNITURE NUMBER | UNIT NUMBER | CELL ID | PART NUMBER | UNIT/PART DIFINITION NUMBER | UNIT/PART DIFINITION NAME |
|---|---|---|---|---|---|
| 1113 | 1113-01 | 00 | 001 | 006 | PARTING BOARD 1 |
| 1113 | 1113-01 | 00 | 002 | 006 | PARTING BOARD 1 |
| .... | .... | .... | .... | .... | .... |

| REFERENCE POINT (x, y, z) | SIZE | FINISHING COLOR | MATERIAL | FIXING/ MOVABLE |
|---|---|---|---|---|
| (30, 0, 280) | (940, 610, 30) | NO COLOR (MATERIAL COLOR) | MOHOGANY | FIXING |
| (30, 0, 140) | (940, 610, 30) | NO COLOR (MATERIAL COLOR) | MOHOGANY | FIXING |
| .... | .... | .... | .... | .... |

*Fig. 24*

COMPLEATED FURNITURE TABLE (FIG. 14)
    (FURNITURE NUMBER 1113)

UNIT NUMBER TABLE (FIG. 15)
    (UNIT NUMBER 1113-01)
    (UNIT NUMBER 1113-02) — UNIT ARRANGEMENT TABLE (FIG. 16)
                                  PARTING (CELL)
                                  INFORMATION TABLE (FIG. 17)

UNIT/PART DEFINITION TABLE (FIG. 18)
    (UNIT/PART DEFINITION NUMBER)
    (UNIT/PART DEFINITION NAME)

— DRAWER ARRANGEMENT TABLE (FIG. 19)

— DOOR LEAF ARRANGEMENT TABLE (FIG. 20)

— DOOR PULL ARRANGEMENT TABLE (FIG. 21)

— LEG ARRANGEMENT TABLE (FIG. 22)

— PARTING BOARD ARRANGEMENT TABLE (FIG. 23)

Fig. 47

ATTACHMENT SURFACE DESIGNATION

SELECTED UNIT ○ LEFT SURFACE ○ RIGHT SURFACE ○ TOP SURFACE ○ BOTTOM SURFACE

DISPLAYED UNIT ○ LEFT SURFACE ○ RIGHT SURFACE ○ TOP SURFACE ○ BOTTOM SURFACE ~W7

ALIGNMENT

HEIGHT ○ UPPER END ○ LOWER END ○ CENTER ○ NOT ALIGNED

RIGHT OR LEFT ○ LEFT END ○ RIGHT END ○ CENTER ○ NOT ALIGNED

☐ INTEGRALLY JOIN

OFFSET SIZE

| HORIZONTAL DIRECTION | |
|---|---|
| VERTICAL DIRECTION | |
| DEPTH DIRECTION | |

[ OK ]   [ CANCEL ]

Fig. 49

ATTACHING METHOD
      ○ INSET     ○     OVERSET

ATTACHMENT POSITION

HEIGHT        ○ STANDARD   ○ UPPER END   ○ LOWER END   ○ CENTER

RIGHT OR LEFT   ○ STANDARD   ○ LEFT END   ○ RIGHT END   ○ CENTER

OFFSET SIZE

| | |
|---|---|
| HORIZONTAL DIRECTION | |
| VERTICAL DIRECTION | |
| DEPTH DIRECTION | |

[ OK ]     [ CANCEL ]

~W8

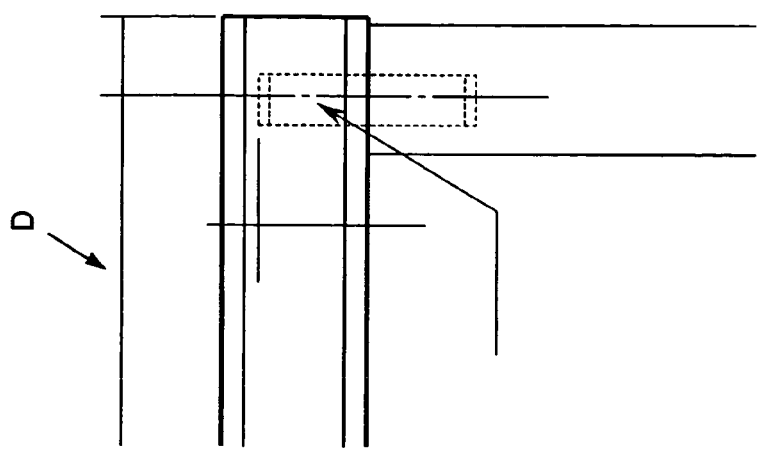
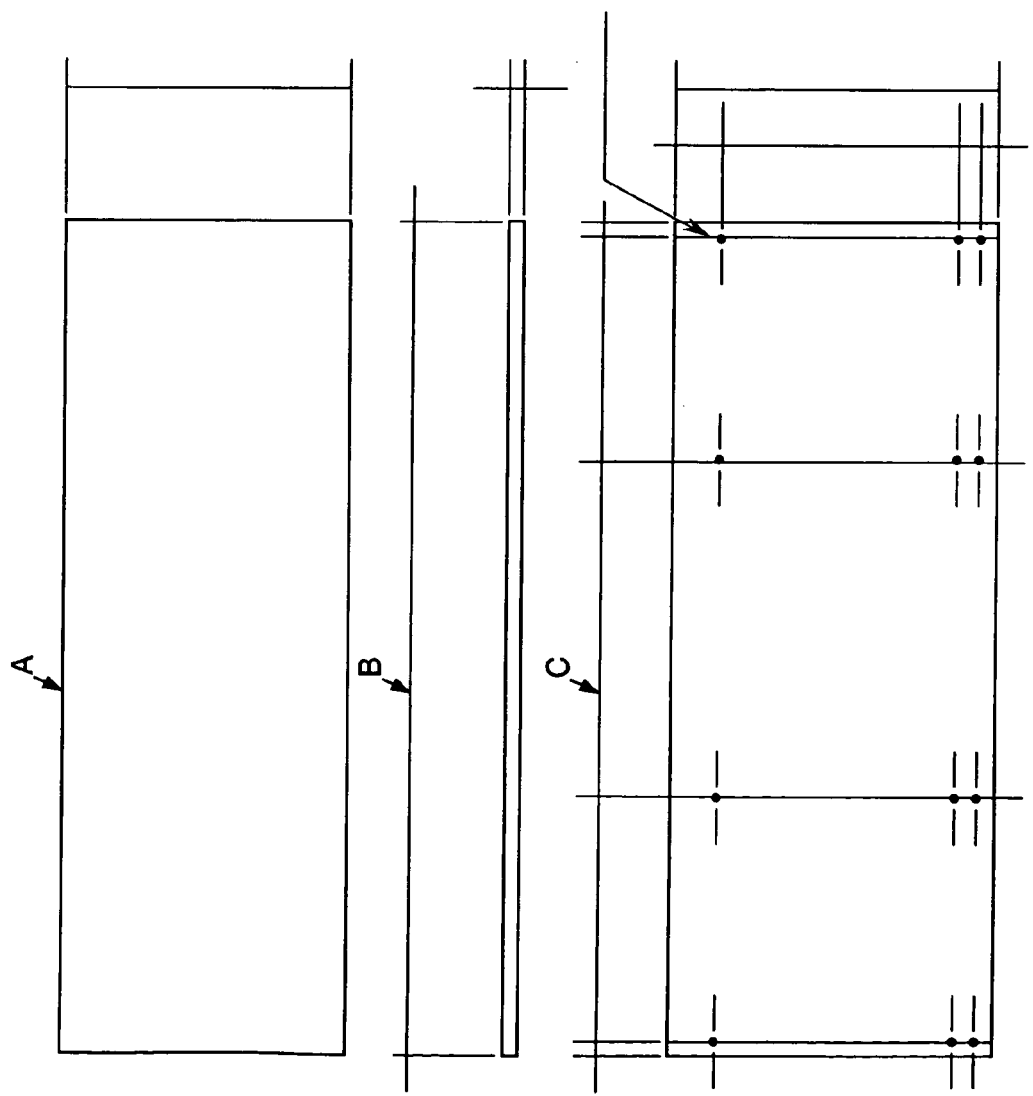
Fig.85

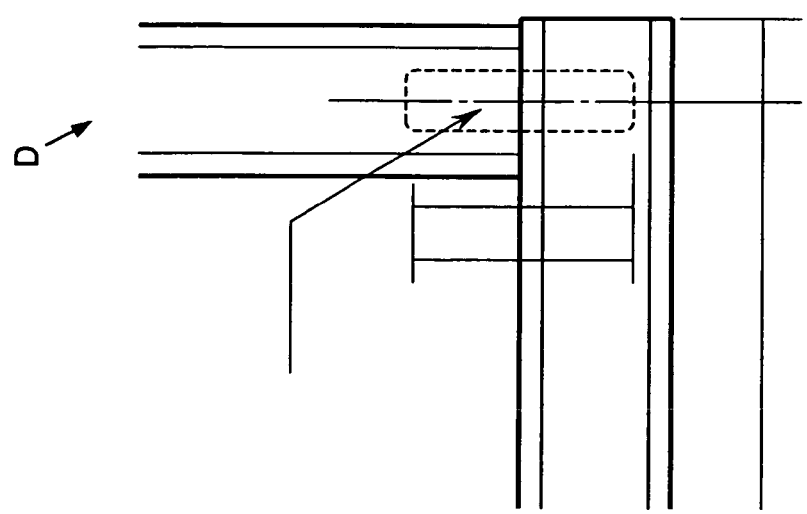
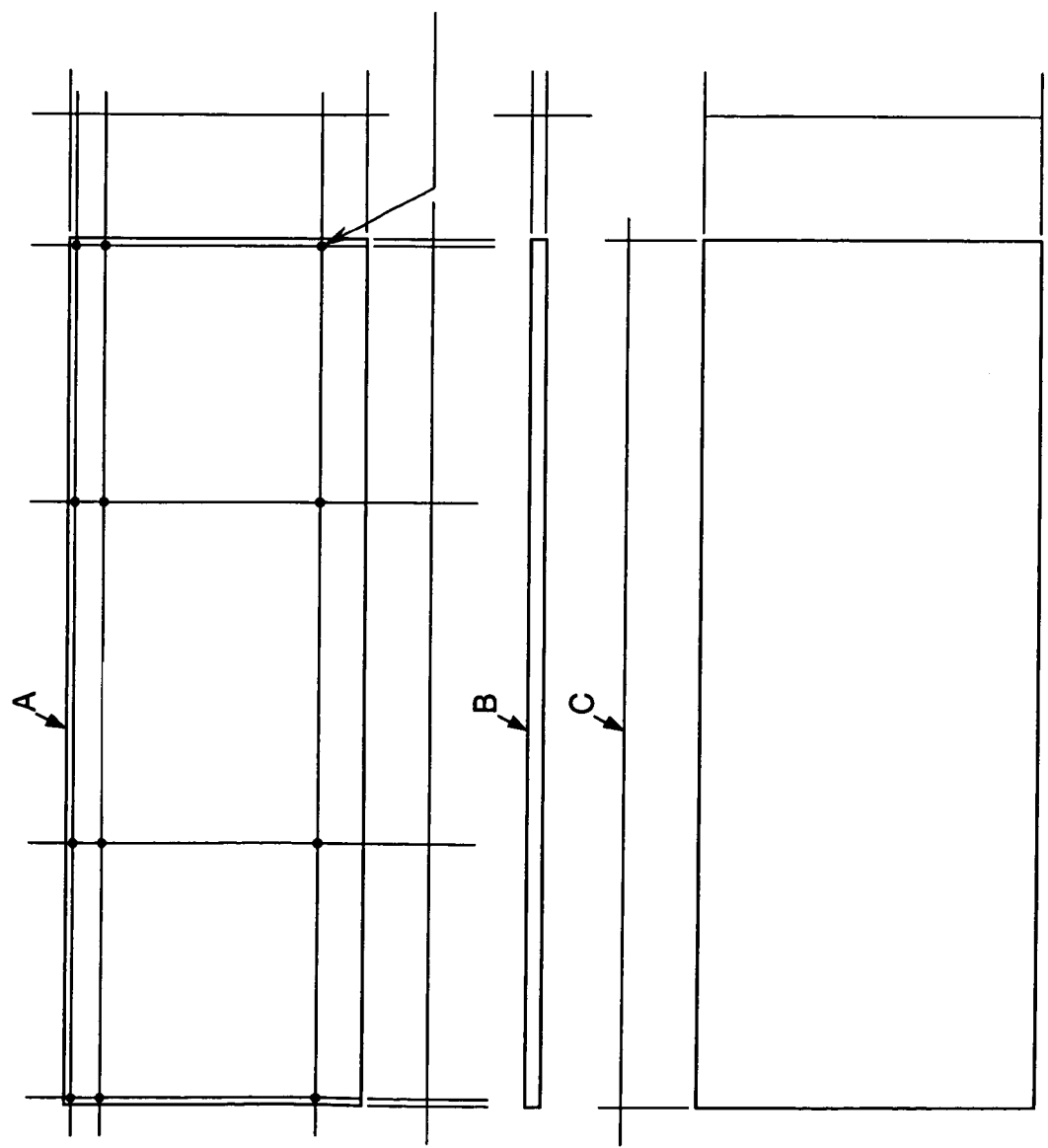
Fig. 86

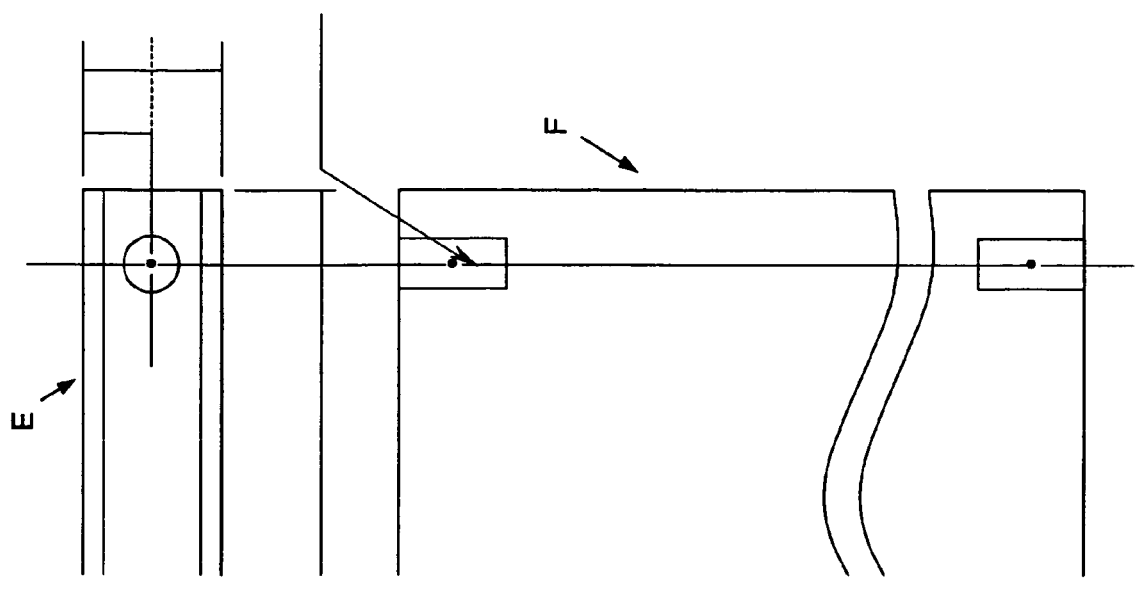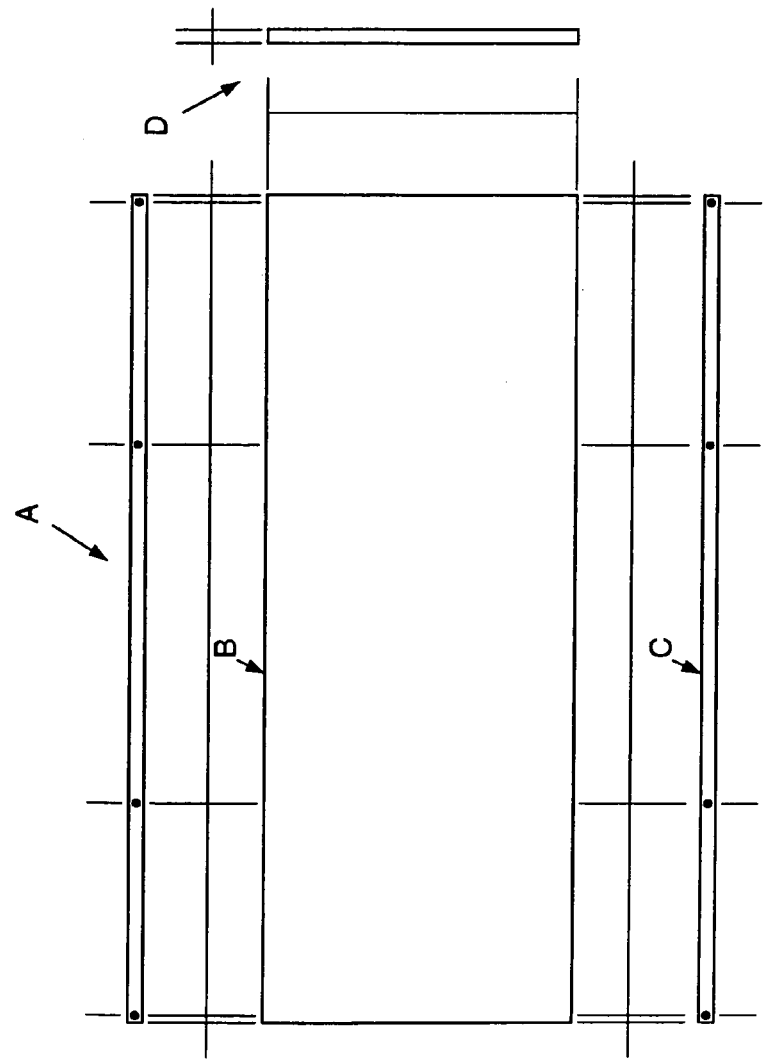
Fig. 87

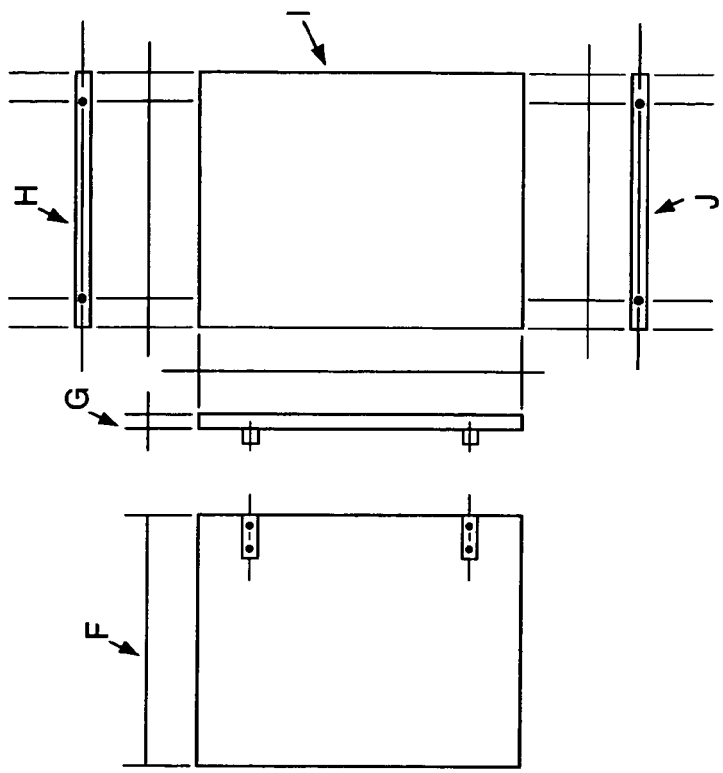
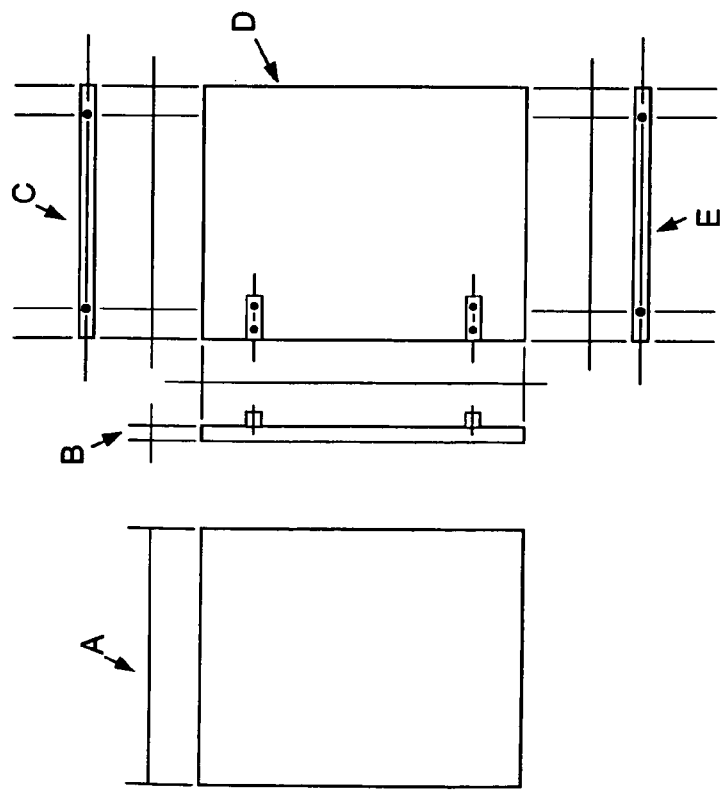
Fig. 88

*Fig. 95*

MANUFACTURING PROCESS INFORMATION TABLE

| PROCESS DIVISION | UNIT / PART | LINE NUMBER | ORDER OF PROCESSES | WORK CONTENTS | COUPLING LINE | COUPLING DESTINATION WORK CONTENTS |
|---|---|---|---|---|---|---|
| .... | .... | .... | .... | .... | .... | .... |
| SEVEN DAYS | DOOR LEAF (SOLID BOARD) | LINE 1 | FIRST PROCESS ON SECOND DAY | CUTTING | — | — |
| SEVEN DAYS | DOOR LEAF (SOLID BOARD) | LINE 1 | SECOND PROCESS ON SECOND DAY | BUTT END AFFIXATION | — | — |
| .... | .... | .... | .... | .... | .... | .... |
| SEVEN DAYS | DOOR LEAF (SOLID BOARD) | LINE 1 | THIRD PROCESS ON THIRD DAY | HINGE DOOR PULL ATTACHMENT | — | — |
| SEVEN DAYS | DOOR LEAF (SOLID BOARD) | LINE 1 | FIFTH DAY | COUPLING | 4 | ATTACHMENT OF DOOR LEAF |
| .... | .... | .... | .... | .... | .... | .... |

Fig. 97

| NAME OF FURNITURE | CABINET WITH DRAWER | CODE | 10019 | | | | |
|---|---|---|---|---|---|---|---|
| NAME OF PART | | DOOR LEAF (SOLID BOARD) | DRAWER (FRONT PANEL) | DRAWER (BOX) | UNIT | PARTING BOARD/ SHELF BOARD | PLINTH |
| PART CODE | | 250010 | 240010-1 | 240010-2 | 220012 | 380010 | 280110 |
| LINE NUMBER | | 1 | 2 | 3 | 4 | 5 | 6 |
| PROCESS ORDER CODE | | | | | | | |
| 230201 | | CUTTING 240001 | CUTTING 240001 | CUTTING 240001 | CUTTING 240001 | CUTTING 240001 | CUTTING 240001 |
| 230202 | | BUTT END AFFIXATION 240002 | BUTT END AFFIXATION 240002 | | BUTT END AFFIXATION 240098 | (TERMINATION OF WORK) 240098 | |
| 230301 | | HINGE PUNCHING 240011 | (DESTINATION OF COUPLING) | V CUT 240021 | BORING 240003 | (DESTINATION OF COUPLING) 4 | MITER CUTTING 240041 |
| 230302 | | DOOR PULL PUNCHING 240012 | (TERMINATION OF WORK) | VENEER CUT 240022 | DOWEL DRIVING 240031 | (DESTINATION OF COUPLING) 240003 | ASSEMBLING 240004 |
| 230303 | | HINGE AND DOOR PULL ATTACHMENT 24013 | (COUPLING WORK) 240004 | | | | (TERMINATION OF WORK) 240098 |
| 230401 | | (TERMINATION OF WORK) 240098 | | ASSEMBLING 240001 | ASSEMBLING 240004 | | (DESTINATION OF COUPLING) 4 |
| 230501 | | (DESTINATION OF COUPLING) 4 | | DOOR PULL ATTACHMENT 240061 | DRAWER RAIL 240071 | | (COUPLING WORK) 240004 |
| 230502 | | (COUPLING WORK) 240006 | | RAIL ATTACHMENT 240062 | | | |
| 230503 | | | | (TERMINATION OF WORK) 240098 | DRAWER SETTING 240005 | | |
| 230504 | | | | (DESTINATION OF COUPLING) 4 | DOOR LEAF ATTACHMENT 240006 | | |
| 230505 | | | | (COUPLING WORK) 240005 | COMPLETION 240052 | | |
| 230601 | | | | | DETECTION OF PRODUCT 240052 | | |
| 230701 | | | | | PACKING/ SHIPMENT 240053 | | |
| 230702 | | | | | DELIVER 240099 | | |

Fig. 99

170a — SPACE-SAVING CLOSET INSTRUCTION MANUAL 170b, 170c

Thank you very much for purchasing our product.
Please use the product after confirming this instruction manual and appended papers.
Be sure to store the instruction manual and the appended papers.
If the product is defective or parts are short, please contact us about the information, together with the following production lot number.
MANUFACTURE ○△□ CORPORATION
WHERE TO CALL 0120-11111
TIME FOR ACCEPTANCE EXCLUDING SATURDAY, SUNDAY AND HOLIDAY 9:00a.m.~5:00p.m.

170d

SPECIFICATIONS OF PRODUCT

| | |
|---|---|
| NAME OF PRODUCT | SPACE-SAVING CLOSET 170e |
| COUNTRY OF PRODUCTION | JAPAN 170f |
| SIZE | HEIGHT 2000 170g  WIDTH 1140 170h  DEPTH 431 170i |
| LOAD CAPACITY OF SLIDE HANGER | 30 kg 170j |
| MATERIAL | MELAMINE SURFACED DECORATIVE LAMINATE 170k |
| PART HOLDING PERIOD | 3 YEARS 170l |

PRODUCTION LOT NUMBER  1 2 3 4 5  170m

Fig. 100

CAUTIONS

Be sure to carefully read the "cautions" before properly using the product.
Be sure to follow the cautions because important contents on safety are described in the cautions appearing here. Particularly be careful in families with children.

| ! WARNING | The possibility that a user is killed or is seriously injured is assumed if the product is mishandled. |

| ⚠ CAUTION | The danger that a user is seriously injured or the occurrence of a material damage is assumed if the product is mishandled. ＊The material damage means an enlarged damage related to houses and domestic animals or pets. |

CAUTIONS IN SET-UP

| ⚠ CAUTION | Make sure that two or more persons set up and move this product. In the case, remove all things accommodated. |

| ⚠ CAUTION | When setting up and moving this product, do not push its front surface and door leaf. Move the product from the side of its side board. Further, when moving the product, slide it with a cardboard or the like put thereunder. |

| ⚠ CAUTION | When setting up the main body of the product, keep it horizontal. Inconvenience may arise in opening or closing the door leaf. |

| ⚠ CAUTION | Do not set up the main body in the place where it is wet with water. Do not wet the main body with water. |

| ! WARNING | Attach the packing for preventing upsetting in preparation for earthquakes, etc. In the case, take sufficient care not to catch your hand, leg, etc. therein. Make sure that two or more persons attach the packing. |

CAUTIONS IN USE

| ⚠ CAUTION | Do not apply a load exceeding the load capacity of the hanger rail. The sliding function may be destroyed, or the main body may be damaged. (The load capacity of the hunger rail is 30 kg) |

| ⚠ CAUTION | Do not put heavy things on the top board of the main body. Inconvenience arises in opening or closing the door leaf. Further, the main body may be damaged. (The load capacity of the top board is 60kg) |

Fig. 101

| | |
|---|---|
| 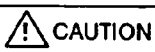 | Avoid loading on the front surface of the door leaf. Inconvenience arises in opening or closing the door leaf. Further, the door rail may be damaged. |
|  | Do not handle the product for purposes other than a purpose of use, for example, hanging from the slide hanger rail. An accident resulting in injury and death may occur in upsetting of the main body or damage to the rail. |

REQUESTS TO CUSTOMERS

| | |
|---|---|
|  | When accommodating clothes, do not push them into the product. This causes the shape of the clothes to be lost. Further, inconvenience arises in opening or closing the door leaf. |
|  | Do not open or close the door leaf roughly. Further, do not push the product at the front surface of the door leaf. Inconvenience arises in opening or closing the door leaf. |
|  | Do not use the product for purposes other than a purpose of a closet. |
|  | Do not disassemble or convert this product. |

Fig. 102

BE SURE TO READ BEFORE USE

We deliver our product to customers as a completed product. Please remove all curing materials after unpacking and confirm whether there is a visible damage and a damaged portion.

Then confirm whether each part is missing. Please confirm whether the product is at a correct position after the confirmation. Please confirm whether the door leaf opens or closes and whether the slide hanger is movable after the confirmation.

Then make sure that two or more persons set up the product at a desired place. Then attach the packing for preventing upsetting.

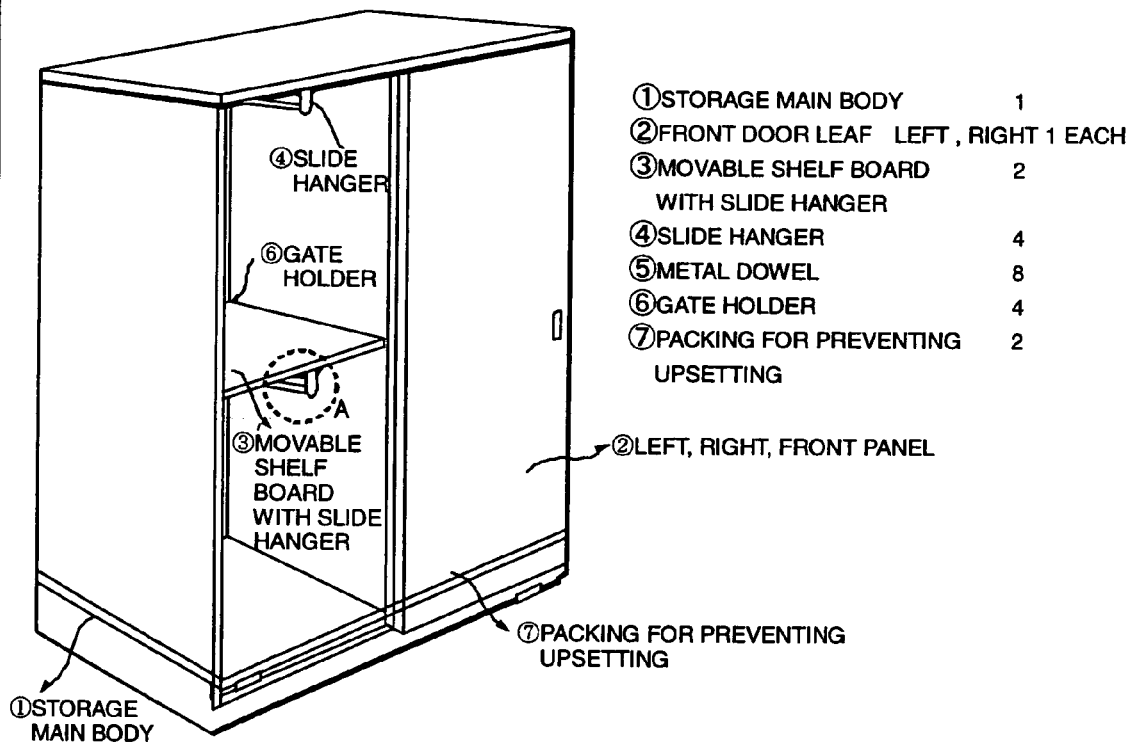

① STORAGE MAIN BODY 1
② FRONT DOOR LEAF  LEFT, RIGHT 1 EACH
③ MOVABLE SHELF BOARD 2
   WITH SLIDE HANGER
④ SLIDE HANGER 4
⑤ METAL DOWEL 8
⑥ GATE HOLDER 4
⑦ PACKING FOR PREVENTING 2
   UPSETTING

Pull out the slide rail in an arrow direction.
Pull it out from the front of the shelf board by about 170mm.

Do not hang down from the slide rail, and hang only clothes on it.

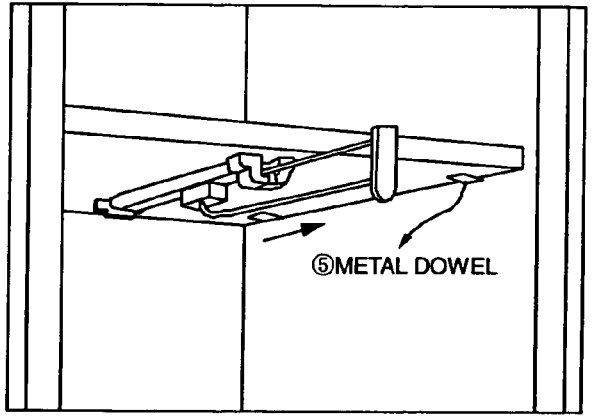

DATAILS OF A PORTION

*Fig. 103*

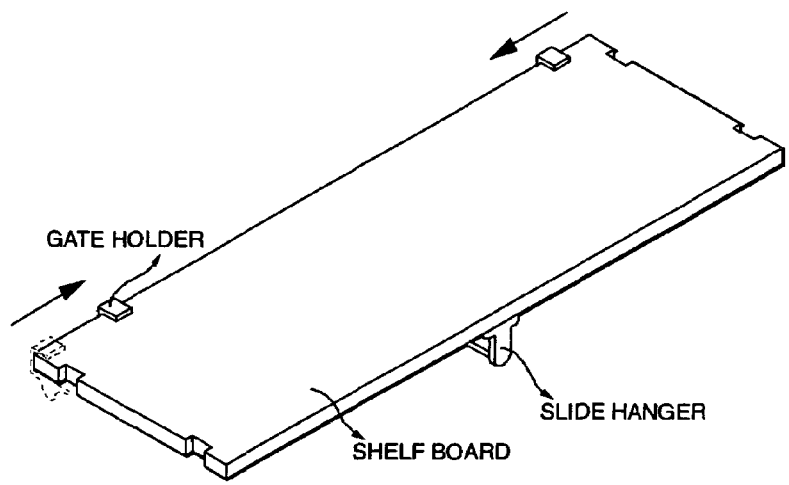

SHELF BOARD MOVING METHOD

GATE HOLDER
SLIDE HANGER
SHELF BOARD

① Displace both right and left gate holders at predetermined positions toward the center of the shelf board.
② Detach the shelf board and move metal dowels at four positions to desired positions.
③ Simultaneously move dowels for gate holders toward predetermined positions.
④ Move the shelf board and return the gate holders toward the original predetermined positions.
⑤ Please use the shelf board after confirming whether it is shaky.

\* The same method is used with respect to optional shelf boards.

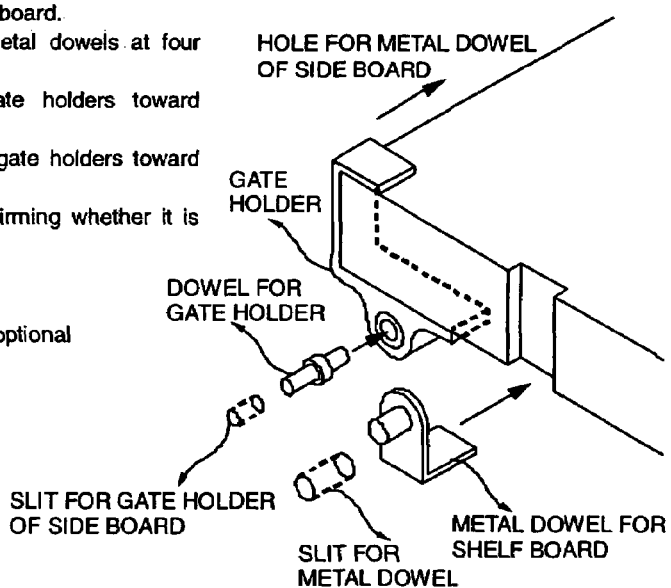

HOLE FOR METAL DOWEL OF SIDE BOARD
GATE HOLDER
DOWEL FOR GATE HOLDER
SLIT FOR GATE HOLDER OF SIDE BOARD
SLIT FOR METAL DOWEL
METAL DOWEL FOR SHELF BOARD

ATTACHMENT OF PACKING FOR PREVENTING UPSETTING

① Make sure that two or more persons work.
② Be careful not to damage the floor.
③ Please keep the packing horizontal when moving it.

PACKING FOR PREVENTING UPSETTING

WHILE LIFTING FRONT

INSERT STOPPER

*Fig. 105*

| OUTPUT ITEM | OUTPUT CONDITIONS | PART | FORMAT MING TYPE 1 | FORMAT MING TYPE 2 | OUTPUT DATA TYPE | EXPLANATION CONTENT CODE |
|---|---|---|---|---|---|---|
| .... | .... | .... | .... | .... | .... | .... |
| CAUSION | NO CONDITIONS | — | PAGE EJECT, THREE LINES | MING TYPE, 11P | TEXT DATA | 0013 |
| CAUSION | NO CONDITIONS | — | PAGE EJECT, FOUR LINES | MING TYPE, 11P | TEXT DATA | 0014 |
| .... | .... | .... | .... | .... | .... | .... |
| BEFORE-USE CAUSION | CONDITIONS | SLIDE RAIL | LOWER RIGHT | 15×15 | IMAGE DATA | 1012 |
| .... | .... | .... | .... | .... | .... | .... |

Fig. 106

| CODE | INSTRUCTION MANUAL TEXT DATA |
|---|---|
| .... | .... |
| 0013 | 0013.txt |
| 0014 | 0014.txt |
| .... | .... |

Fig. 107

| CODE | INSTRUCTION MANUAL IMAGE DATA |
|---|---|
| .... | .... |
| 1012 | 1012.jpg |
| 1013 | 1013.jpg |
| .... | .... |

ARTICLE DESIGN SUPPORT SYSTEM AND METHOD AND MEDIUM STORING PROGRAM FOR ARTICLE DESIGN SUPPORT

The present Application is a Divisional Application of U.S. patent application Ser. No. 10/048,429, filed on Feb. 1, 2002 now U.S. Pat. No. 7,016,747.

TECHNICAL FIELD

The present invention relates to a system for and a method of supporting the design of an article, for example, furniture, and a medium having a program for supporting the design of an article stored thereon.

BACKGROUND OF THE INVENTION

When furniture such as a bookcase, a shoecase, or a cupboard is purchased, a customer generally selects, out of pieces of ready-made furniture, one having a shape, a structure, a size, a color, a material, a material quality, etc. which he or she desires.

In order to meet a variety of desires of the customer, furniture has been made to order. However, the made-to-order furniture takes more time and labor to manufacture, as compared with the ready-made furniture. Accordingly, the made-to-order furniture is generally high in cost. Further, furniture on which all the desires of the customer are reflected is not necessarily manufactured even if it is made to order. The reason for this is that the design is not made while incorporating the desires of the customer one by one, and the texture, the hue, or the like of the material is not generally expressed in a design drawing.

DISCLOSURE OF INVENTION

An object of the present invention is to provide a support tool for designing an article (for example, furniture) having some of elements such as a shape, a structure, a size, a color, a material, and a material quality which are as close to the desires of a user as possible, that is, an article design support system.

Another object of the present invention is to provide a support tool that makes it easy to design an article, that is, an article design support system.

Still another object of the present invention is to provide a support tool that makes it easy to manufacture an article, that is, an article manufacture support system.

A further object of the present invention is to provide a recording medium storing a program for realizing a design support method, a design support system, a manufacture support method, and a manufacture support system of an article using a general purpose computer. The medium storing the program (having the program recorded thereon) includes not only a portable recording medium such as an FD (Floppy Disk) or a CD-ROM (Compact Disc Read-Only Memory) but also a hard disk, a magnetic tape, a semiconductor memory, and so forth.

An article design support system according to a first invention comprises constituent member selection means for accepting, out of a plurality of types of constituent members, the selection of the plurality of types of constituent members used for designing an article; first input means for accepting the input of data related to a combination of the selected plurality of types of constituent members; second input means for accepting the input of size data related to at least one of the selected plurality of types of constituent members; first storage means for storing data respectively representing the selected plurality of types of constituent members, the inputted data related to the combination, and the inputted size data; and display means for displaying an image representing an article constructed by combining the plurality of types of constituent members on the basis of the data representing the selected plurality of types of constituent members, the inputted data related to the combination, and the inputted size data.

An article design support method according to the first invention is particularly for supporting design using a computer, which comprises the steps of causing to select, out of a plurality of types of constituent members, the plurality of types of constituent members used for designing an article; causing to input data related to a combination of the selected plurality of types of constituent members; causing to input size data related to at least one of the selected plurality of types of constituent members; displaying an image representing an article constructed by combining the plurality of types of constituent members on the basis of the data representing the selected plurality of types of constituent members, the inputted data related to the combination, and the inputted size data; and storing the data representing the selected plurality of types of constituent members, the inputted data related to the combination, and the inputted size data.

A program recording medium according to the first invention stores the following program. That is, the program is for controlling a computer so as to cause the computer to perform constituent member selection processing for accepting, out of a plurality of types of constituent members, the selection of the plurality of types of constituent members used for designing an article; combination input processing for accepting the input of data related to a combination of the selected plurality of types of constituent members; size input processing for accepting the input of size data related to at least one of the selected plurality of types of constituent members; storage processing for storing data representing the selected plurality of types of constituent members, the inputted data related to the combination, and the inputted size data; and display processing for displaying an image representing an article constructed by combining the plurality of types of constituent members on the basis of the data representing the selected plurality of types of constituent members, the inputted data related to the combination, and the inputted size data.

In the first invention, it is presupposed that a desired article can be designed by selection and combination (including arrangement) of the plurality of types of constituent members previously determined. An example of the article is furniture.

An operator selects the constituent members, and enters the sizes of at least some of the constituent members, and further enters their combination, so that an image representing an article constructed by the combination of the selected constituent members is produced and is displayed. Further, data for the display or data forming the basis thereof are stored in a memory.

It is possible to confirm whether or not the article has a desired shape, structure, and size by seeing the displayed image (a design drawing) representing the article. It is also possible to designate a material (a material quality) or a color. The article is represented by the designated material (material quality) or color. The size, the combination, the material, the material quality, the color, etc. can be also changed, if required. An image (a design drawing) after the change is displayed.

The selection, the combination, and the sizes of the constituent members can be thus determined depending on the desires of the user. Accordingly, the design drawing of the article having the shape, the structure, and the size which meet the desires of the user is completed. Further, the completed design drawing can be confirmed or checked by being displayed. The selection and the combination of the constituent members and the input of the sizes are basically sufficient for an operator to perform operations. Accordingly, the operations are easy.

It is preferable that images (drawings) representing the selected constituent members and an image (a design drawing) representing the article constructed by combining the constituent members during or after completion of the combination are simultaneously displayed on separate areas of a display screen.

Data representing the plurality of types of constituent members which are used for designing the article may be displayed. The data representing the constituent members include images, characters, icons, etc. The constituent members used for designing the article are selected out of the plurality of types of constituent members which are represented by the images, the characters, the icons, etc.

As for a certain type of article, for example, furniture, the furniture has one or a plurality of basic structures (shapes). The basic structure (shape) can be represented by basic constituent members which are of one type or are classified into a plurality of types (basic constituent members of at least one type). The other constituent members are represented as a plurality of types of parts. Each of the parts includes at least one type.

It is possible to cause the operator to select the basic constituent members of at least one type and one type of at least one of the parts and construct an article having a desired shape, structure, and size by their combination. If the sizes are inputted with respect to the basic constituent members, the size of the part to be combined therewith can be automatically calculated on the basis of the sizes of the basic constituent members and data representing the combination.

Preferably, the operator is caused to enter data related to formation of cells by dividing a space (this may be also called a cell) defined by the basic constituent members selected and displayed. By introducing the concept "cell", the selected part can be associated (combined) with the cells formed by the division. This makes it easy to handle data representing an article having a complicated structure.

In this case, at least one of the size of a board member for defining the cells and the size of the cell can be easily calculated automatically on the basis of the sizes of the basic constituent members and the number of divisions. The input of the size of the cell, the size of the board member, and the sizes of the other parts can be omitted.

All the data representing the selected constituent members used for designing the article, the inputted data related to the combination of the constituent members, the inputted size data, the data related to the material (material quality) and the color of the inputted constituent member, the inputted data related to the formation of the cells, etc. are entered (selected) by the user (operator) of the article design support system. Consequently, data for representing an image (a design drawing) representing the article is constructed in the storage means. Data to be the basis of the input and selection may be previously stored in another storage means. The user can design an article having a desired shape, structure, and size by freely changing the combination of the constituent members and determining the sizes thereof in the data to be the basis.

The design support system according to the first invention can be also defined from another point of view (particularly of display) (this is referred to as a second invention). A design support system according to the second invention comprises constituent member display means for displaying, out of a plurality of types of constituent members, images representing the selected plurality of types of constituent members; article display means for displaying an image representing an article constructed by combining the plurality of types of constituent members on the basis of data representing the combination of the plurality of types of constituent members and data representing at least the sizes thereof which are given with respect to the displayed plurality of types of constituent members; and storage means for storing data representing the selected plurality of types of constituent members, the given data representing the sizes of the plurality of types of constituent members, and the given data representing the combination.

According to the second invention, the images representing the selected plurality of types of constituent members and the image representing the article constructed by combining the plurality of types of constituent members are displayed. The displayed image representing the article is based on the data representing the selected plurality of types of constituent members, the given data representing the sizes of the constituent members, and the given data representing the combination of the constituent members stored in the storage means.

The constituent members are selected, so that the images representing the constituent members are displayed. A constituent member newly selected is combined with the displayed constituent members, so that an image representing an article (a completed article or an article during completion) is displayed. The contents of the data stored in the storage means are changed depending on the combination of the constituent members (the assembling of the article) on the display screen. It is indicated on the display screen how the article is being assembled. Accordingly, the article to be designed is easy to grasp and is easy to understand.

The present invention further provides the following article design support tool.

A design support system according to a third invention comprises first display means for displaying images respectively representing a plurality of types of articles; article selection means for accepting the selection of any one of the displayed plurality of types of articles; input means for accepting the input of size data related to the selected article; and second display means for displaying an image representing the selected article of a size based on the inputted size data.

A design support system according to a fourth invention comprises first display means for displaying images respectively representing combinations of one or a plurality of types of basic constituent members and parts; combination selection means for accepting the selection of any one of the displayed combinations of the one or plurality of types of basic constituent members and parts; first input means for accepting, with respect to the selected combination, the input of size data related to at least one of the basic constituent member and the part; and second display means for displaying an image representing the combination of the basic constituent member and the part, one of which is of a size based on the inputted size data.

A design support system according to a fifth invention comprises first display means for displaying images respectively representing a plurality of types of basic constituent members; basic constituent member selection means for accepting the selection of any one of the displayed plurality of types of basic constituent members; second display means for displaying images respectively representing a plurality of types of parts; first input means for accepting the input of data related to a combination of the selected basic constituent member and at least one of the displayed plurality of types of parts; second input means for accepting the input of size data related to at least one of the selected basic constituent member and the part combined with the basic constituent member; and third display means for displaying an image representing a combination of the basic constituent member and the part, one of which is of a size based on the inputted size data.

A design support system according to a sixth invention comprises first display means for displaying images respectively representing a plurality of types of basic constituent members; basic constituent member selection means for accepting the selection of any one of the displayed plurality of types of basic constituent members; first input means for accepting the input of data for dividing a cell defined by the selected basic constituent member into a plurality of cells; second display means for displaying images respectively representing a plurality of types of parts; part selection means for accepting the selection of any one of the displayed plurality of types of parts; second input means for accepting the input of data for associating the selected part with the one or plurality of cells; third input means for accepting the input of size data related to at least one of the selected basic constituent member and the one or plurality of cells; and third display means for displaying an image representing the basic constituent member and the part associated with the cells formed by the division on the basis of the inputted size data.

In the third invention, the size of the article selected depending on the desires of the user is determined. In the fourth invention, the sizes of the basic constituent member and the part which constitute the article are determined depending on the desires of the user. In the fifth invention, the user can select the basic constituent member and the part which should be used for the article, and can determine the sizes thereof. In the sixth invention, the user can determine the cells in the selected basic constituent member.

Furthermore, the present invention provides a tool capable of easily designing an article meeting the taste of the user by previously preparing article design data which can be changed, and particularly a server computer used in an article design support system operated through a network.

A server computer comprises storage means storing article design data including data respectively representing a plurality of types of articles and size data related to each of the articles. The server computer comprises main page transmission means for transmitting to a client computer a main page for displaying on the client computer images representing the plurality of types of articles based on the article design data and accepting the designation of the article in response to a main page transmission request from the client computer; article design data change page transmission means for transmitting to the client computer an article design data change page for accepting the change in the size of the article designated in the client computer; appearance data production means for producing data representing the appearance of the article on the basis of the size data inputted in the client computer; and appearance image page transmission means for transmitting to the client computer an appearance image page for displaying an image representing the appearance of the article which is represented by the produced appearance data.

The article design data is previously prepared for the server computer. On the client computer, the images representing the plurality of articles represented by the article design data (which may be an image representing a picture or the like of an article (an actual object) having approximately the same shape as the article represented by the article design data) is displayed (this is a main page). A user of the client computer can select any (liked) article, and can request to change the size of the selected article (an article design data change page). On the client computer, the image representing the appearance of the article having the size which has been changed is displayed (an appearance image page). The user of the client computer can easily read the article having the liked size.

The article design data may include the data representing, the plurality of types of constituent members constituting the article and data related to the combination of the constituent members constituting the article. In the article design data change page, the change in the constituent members constituting the designated article may be further accepted. The server computer transmits, when it receives change data related to the constituent member constituting the article, the image representing the appearance of the article comprising the changed constituent member to the client computer.

Furthermore, if the article design data includes color data representing the color of the article, and the article design data change page is for further accepting the change in the color of the designated article, the article is represented in the color liked by the user.

According to the present invention, the size of the article represented by the article design data previously prepared can be thus easily changed into a liked size or the like. Since the article design data is changed, the user can obtain an article having a liked size, members, or color if the article is manufactured on the basis of the changed article design data.

The present invention further provides various article manufacture support tools used for manufacturing an article.

A first manufacture support tool is an article processing drawing production system.

An article processing drawing production system according to the present invention comprises first storage means storing data representing minimum constituent elements composing a plurality of types of constituent members, data related to the constituent member represented by a combination of the minimum constituent elements, data related to an article represented by a combination of the constituent members, and size data related to each of the minimum constituent elements; and processing drawing production means for producing, on the basis of the data representing the minimum constituent elements composing the plurality of types of constituent members, the data related to the constituent member represented by the combination of the minimum constituent elements, the data related to the article represented by the combination of the constituent members, and the size data related to each of the minimum constituent elements, processing drawings having a drawing and the size of the minimum constituent element, a drawing and the size of the constituent member, and a drawing and the size of the article separately drawn thereon, and outputting the processing drawings as a set.

The minimum constituent element means an element which cannot be further divided. A combination of elements constitutes a constituent member. A combination of constituent members constitutes an article.

It is possible to express on a drawing, on the basis of the data representing the minimum constituent elements, the data related to the constituent member represented by the combination of the minimum constituent elements, the data related to the article represented by the combination of the constituent members, and the data related to the size of the minimum constituent element, the shape and the structure of the elements required to process (manufacture) the article (the constituent members), the shape and the structure of the constituent member, and the shape and the structure of the article, together with the sizes. The elements displayed on the drawing (processing drawing) are manufactured and are assembled, thereby making it possible to manufacture the constituent members. The constituent members are combined on the basis of the data related to the combination of the constituent members, thereby making it possible to manufacture the article.

The data representing joint portions among the minimum constituent elements for assembling the constituent members and assembling the article may be stored. The joint portions among the elements are illustrated, thereby making it easy to assemble the article. A hole, a hinge, or the like may be indicated in the joint portion.

It is preferable that the joint portion between the minimum constituent elements is one corresponding to the size of the elements. In one embodiment, the article processing drawing production system comprises means for changing at least one of the positions and the number of joint portions among the minimum constituent elements on the basis of the size data related to the minimum constituent elements. It is possible to make such change that the number of joint portions is increased when the size of the minimum constituent element further constituting the constituent member constituting the article is larger than a set value, while being reduced when it is smaller than the set value.

A second manufacture support tool is an article manufacturing process drawing production system.

An article manufacturing process drawing production system according to the present invention comprises a database storing data representing work processes related to each of constituent members, data representing the work processes related to the constituent member including data related to the order of processes for each of contents of work included in the work processes; work process data extraction means for extracting, on the basis of data related to a combination of one or a plurality of types of constituent members constituting a given article, the data representing the work processes related to each of the constituent members constituting the article from the database; and article manufacturing process drawing production means for arranging the extracted data representing the work processes related to the constituent member, to produce and output a manufacturing process drawing of the article constructed by the combination of the one or plurality of types of constituent members.

The data related to the combination of the constituent members shows which constituent members are combined and how the constituent members are combined to constitute the article. Further, the data representing the work processes is stored with respect to each of the constituent members in the database. The data includes data representing the order of processes for each of the contents of work included in the work processes. Therefore, the contents of work for processing can be arranged and illustrated for each of the constituent members constituting the article. If the constituent members are processed (manufactured) along the flow of the illustrated contents of work for each of the constituent members, the article is finally completed.

The data representing the flow of processing (data representing work processes) is thus previously prepared for each of the constituent members, thereby making it possible to produce a drawing (which may be a process table) for causing the manufacturing work of the article to smoothly progress.

A third manufacture support tool is an article instruction manual production system.

An article instruction manual production system according to the present invention comprises a first database storing data representing the basic structure of an instruction manual formed with a blank field; a second database storing, with respect to one or a plurality of types of constituent members, at least one of data respectively representing a descriptive text and a descriptive image which constitute the instruction manual; extraction means for extracting, on the basis of data related to a combination of the one or plurality of types of constituent members constituting a given article, at least one of data representing a descriptive text and a descriptive image related to the constituent members constituting the article from the second database; and instruction manual production means for incorporating at least one of the data representing the descriptive text and the data representing the descriptive image, which has been extracted, into the position in the predetermined blank field of the data, representing the basic structure of the instruction manual, stored in the first database, to produce and output the instruction manual for the article.

The data related to the combination of the constituent members constituting the article is given, thereby making it possible to produce an instruction manual to be appended to an article in a completed state or an article assembly kit by being adapted to the structure, the shape, etc. of the article. The descriptive text and the descriptive image related to the constituent members used for the article are inserted into the instruction manual in accordance with the data representing the basic structure of the instruction manual. The burden on the production of the instruction manual to be produced with respect to various articles (articles including various constituent members) can be significantly reduced.

In one embodiment, the data representing the descriptive image includes data representing a rendering drawing produced on the basis of the data representing the plurality of types of constituent members to be given and the data related to the combination of the constituent members. A drawing that almost accurately expresses the shape and the structure of the article constituted by the combination of the constituent members and the arrangement (positions) of the constituent members can be inserted into the instruction manual.

The present invention further provides a server computer control method for an article design support system, a medium having a program for controlling a server computer recorded thereon, and a medium having a program recorded thereon for controlling a processing drawing production system, a manufacturing process drawing production system, and an instruction manual production system.

BRIEF DESCRIPTION OF DRAWINGS

FIGS. 5(A), 5(B), 5(C), and 5(D) are perspective views showing examples of furniture.

FIGS. 6(A), 6(B), 6(C), and 6(D) are perspective views respectively showing examples of furniture.

FIG. 7(A) is a partially broken perspective view showing an example of furniture provided with an inset type drawer, and FIG. 7(B) is a partially broken perspective view showing an example of furniture provided with an overset type drawer.

FIGS. 13(A), 13(B), and 13(C) illustrate the relationship among a cell in a unit, a cell number, and a part number assigned to a parting board.

FIG. 14 illustrates an example of a completed furniture table.

FIG. 15 illustrates an example of a unit number table.

FIG. 16 illustrates an example of a unit arrangement table.

FIG. 17 illustrates an example of a parting (cell) information table.

FIG. 18 illustrates an example of a unit/part definition table.

FIG. 19 illustrates an example of a drawer arrangement table.

FIG. 20 illustrates an example of a door leaf arrangement table.

FIG. 21 illustrates an example of a door pull arrangement table.

FIG. 22 illustrates an example of a leg arrangement table.

FIG. 23 illustrates an example of a parting board arrangement table.

FIG. 24 illustrates the relationship among data tables stored in an HD.

FIG. 47 illustrates an example of display of an arrangement change window.

FIG. 49 illustrates an example of display of an arrangement change window.

FIG. 85 illustrates a processing drawing of a top board.

FIG. 86 illustrates a processing drawing of a baseplate.

FIG. 87 illustrates a processing drawing of a back board.

FIG. 88 illustrates a processing drawing of a side board.

FIG. 95 illustrates an example of a manufacturing process information table.

FIG. 97 illustrates an example of a temporary file.

FIG. 99 illustrates an example of an instruction manual.

FIG. 100 illustrates an example of an instruction manual.

FIG. 101 illustrates an example of an instruction manual.

FIG. 102 illustrates an example of an instruction manual.

FIG. 103 illustrates an example of an instruction manual.

FIG. 105 illustrates an example of an instruction manual table.

FIG. 106 illustrates an example of a text data table.

FIG. 107 illustrates an example of an image data table.

BEST MODE FOR CARRYING OUT THE INVENTION

Figure 1:
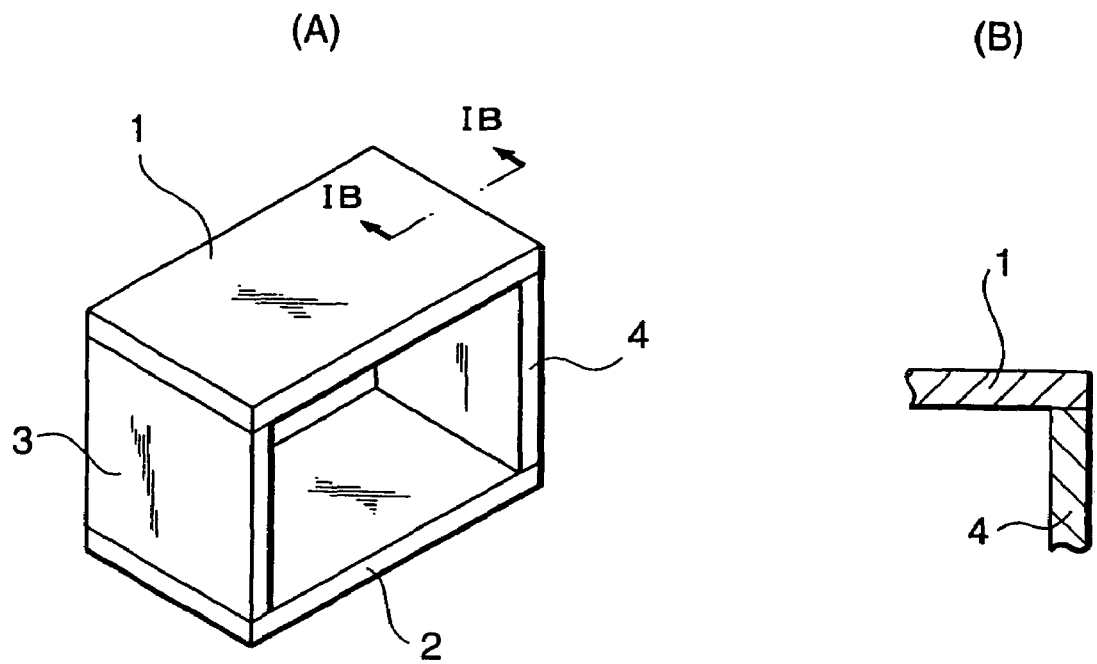
FIG. 1(A) is a perspective view of a top board and base board covering type unit.
FIG. 1(B) is a partially sectional view taken along a line IB-IB shown in FIG. 1(A).
Figure 2:
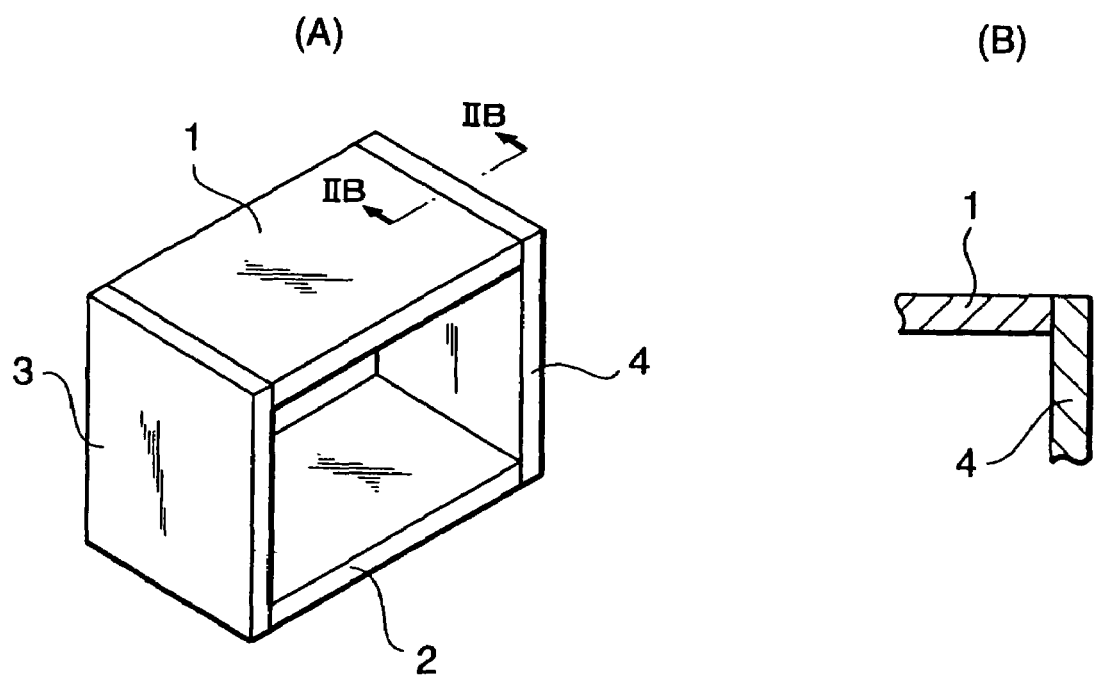
FIG. 2(A) is a perspective view of a side board covering type unit I.
FIGS. 2(B) is a partially sectional view taken along a line IIB-IIB shown in FIG. 2(B).
Figure 3:
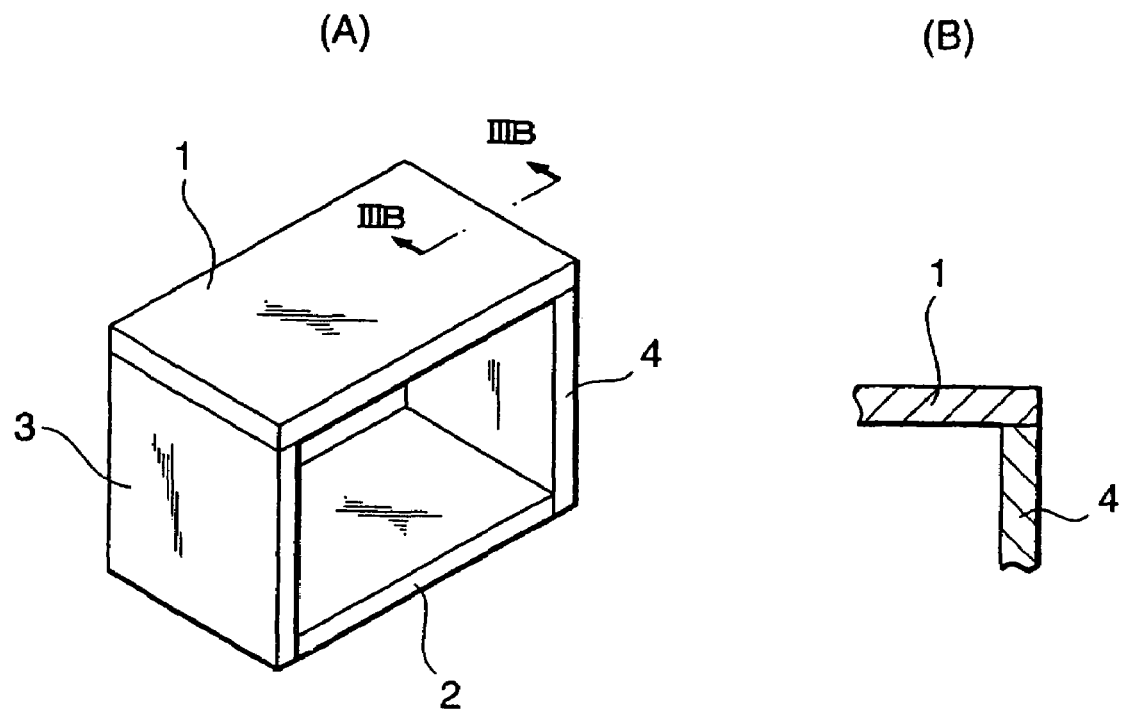
FIG. 3(A) is a perspective view of a side board covering type unit II.
FIGS. 3(B) is a partially sectional view taken along a line IIIB-IIIB shown in FIG. 3(A).
Figure 4:
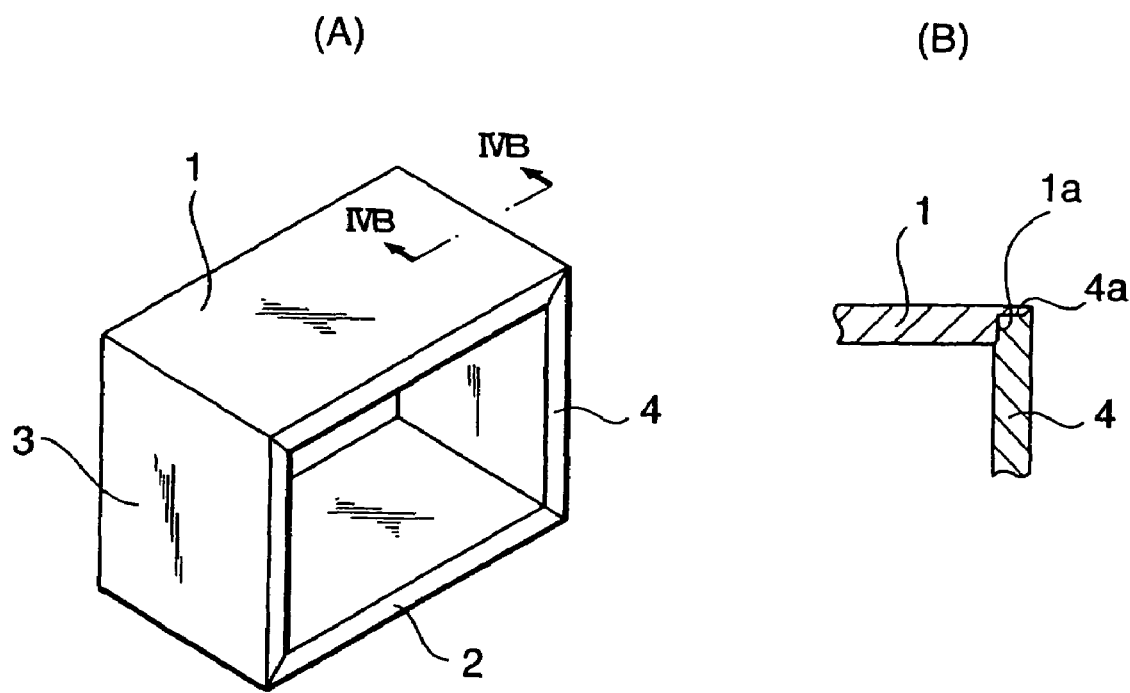
FIG. 4(A) is a perspective view of a miter joining type unit.
FIGS. 4(B) is a partially sectional view taken along a line IVB-IVB shown in FIG. 4(A).

Contents
1 Furniture Design Support System
1.1 Outline of furniture design support system
1.2 Basic structures of units and parts
1.3 Configuration of furniture design support system
1.4 Basic information table (master file) and design drawing
2 Furniture Design Data
2.1 Completed furniture table
2.2 Unit number table
2.3 Unit arrangement table
2.4 Parting (cell) information table
2.5 Unit/part definition table
2.6 Drawer arrangement table
2.7 Door leaf arrangement table
2.8 Door pull arrangement table
2.9 Leg arrangement table
2.10 Parting board arrangement table
3 Processing I in Furniture Design Support System
3.1 Overall outline
3.2 Unit/part definition processing
3.3 Assembling processing
3.4 Drawing display/printing processing
4 Processing II in Furniture Design Support System (centered on Display Screen)
5 Processing Drawing Production Processing
6 Manufacturing Process Drawing Production Processing
7 Instruction Manual Production Processing
8 Furniture Design Support System Utilizing Network 1 Furniture Design Support System 1.1 Outline of Furniture Design Support System A furniture design support system is basically installed in a furniture shop, a housing exhibit place, and other places for receiving a customer who will purchase furniture. In the shop and other places, an operator uses the furniture design support system, to design, with respect to furniture of a type desired by the customer, the furniture while hearing or considering the desires of the customer for its shape, structure, size, material (wood, glass, etc.), members (including a metal fitting or part), color, etc. (produce furniture design data), and display on a display screen or print an image (a drawing) or the like representing the appearance of the designed furniture to provide it to the customer. That is, the furniture design support system designs (simulates) the furniture in a made-to-order manner in accordance with the desires of the customer.

Furthermore, the furniture design support system may, in some cases, be installed in a furniture manufacturing workshop, a design office (room), etc. In the furniture manufacturing workshop or the like, furniture design data is received from the furniture shop, the housing exhibit place, or the like through a FD (Floppy Disk), a communication line, or the like. The furniture design data is inputted into the furniture design support system installed in the furniture manufacturing workshop or the like. A furniture design drawing represented by the furniture design data inputted into the furniture design support system is outputted (outputted on a screen, or printed out) from the furniture design support system. In the furniture manufacturing workshop or the like, the furniture is manufactured on the basis of the outputted design drawing. Furniture on which the desires of the customer are reflected is manufactured. Of course, in the furniture manufacturing workshop or the like, the furniture can be also designed using the furniture support system.

There are a large number of types of furniture, for example, a chest, a wardrobe, a closet, a cupboard, a bookcase, a sideboard, a cabinet, a chest, a shelf, a wagon, a rack, and a desk. The furniture design support system pays attention to the idea that all of the large number of types of furniture can be manufactured by combining members (an outer frame, a parting board, a drawer, a door leaf, a top board, a leg, a door pull, a hinge, a castor, etc.) (units, parts, etc. described later) constituting the furniture, and has the idea as a basis.

A storage device in the furniture design support system previously stores basic data (type, etc.) for each of the members constituting the furniture (basic constituent members or components=units, components or parts=parts, and other members). The furniture design support system, in response to operator's entry, combines the data respectively representing the members constituting the furniture which are previously prepared to design a lot of types of furniture. Moreover, it is possible to design furniture having various shapes, structures, sizes, materials, material qualities, parts, colors, etc. by a variety of combinations of the data respectively representing the constituent members.

Furniture can be broadly classified into "with no legs (box)", "with legs", "joinery", etc. from the point of view of its structure.

In the present embodiment, description is made by focusing on the design (simulation) of furniture "with no legs (box)" and particularly, such furniture design that a basic structure (basic constituent members) constituting the furniture "with no legs (box)" is taken as a basis, and various members (parts), etc. are combined with the basic structure, to finally design complete furniture.

The furniture "with no legs (box)" has one space whose boundary is determined by a plurality of walls. A frame is formed by the plurality of walls. The inside of the frame is the above-mentioned space. The most basic frame of the structure of the furniture "with no legs (box)" is referred to as a "unit" in the specification. The above-mentioned space in the unit is referred to as a "cell" in the specification.

Generally, the space (cell) in the unit of the furniture "with no legs (box)" is further divided by one or a plurality of parting (partitioning) boards (plates) or other members, parts, etc. (e.g., guides of a drawer). A smaller space formed by the division is also referred to as a "cell" in the specification.

1.2 Basic Structures of Units and Parts

FIGS. 1 to 4 respectively illustrate examples of the structure of a unit (unit types).

A unit constituting furniture can be typically classified into three types, i.e., ① a top board and base board covering type, ② a side (end) board covering type, and ③ a miter joining type.

① Top Board and Base Board Covering Type (FIGS. 1(A) and 1(B))

FIG. 1(A) is a perspective view of a top board and base board covering type unit, and FIG. 1(B) is a cross-sectional view taken along a line IB-IB shown in FIG. 1(A). The top board and base board covering type unit is so adapted that a top board (plate) 1 is joined (at both ends thereof) to upper end surfaces (upper edges) of two side (end) boards (plates) 3 and 4 in the same shape which are raised parallel to each other with spacing provided therebetween on the right and left sides such that the upper end surfaces are covered from above, and a baseplate (base board or bottom plate) 2 is joined (at both ends thereof) to lower end surfaces (lower edges) of the side (end) boards (plates) 3 and 4 such that the lower end surfaces are covered from below. The upper end surfaces of the side boards 3 and 4 and the top board 1 are joined to each other, and the lower end surfaces of the side boards 3 and 4 and the baseplate 2 are joined to each other, respectively, using adhesives, nails, screws, etc. or their combinations (the illustration of the nails, the screws, etc. is omitted) (the same is true for the side board covering type unit, described later). A space in a rectangular parallelepiped shape formed by inner surfaces of the top board 1, the baseplate 2, and the side boards 3 and 4 is a "cell". A front surface of the cell (on the front side) is opened. A back surface of the cell (on the back side) is opened, or is closed by a back board (plate) (not shown). The same is true for the side board covering type unit and the miter joining type unit, described below. One end or both ends on either one of the right and the left sides of the top board 1 may project sideward from the side boards 3 and 4. Similarly, one end or both ends on either one of the right and the left sides of the baseplate 2 may project sideward from the side board 3 or 4.

② Side Board Covering Type (FIGS. 2(A) and 2(B) and FIGS. 3(A) and 3(B))

There are three side board covering types, which are taken as side board covering types I, II, and III.

FIG. 2(A) is a perspective view of the side board covering type I unit, and FIG. 2(B) is a cross-sectional view taken along a line IIB-IIB shown in FIG. 2(A). The side board covering type I unit is so adapted that side boards (plates) 3 and 4 are respectively joined to right and left end surfaces (edges) of each of a top board 1 and a baseplate 2 which are arranged parallel to each other with spacing provided therebetween such that they are respectively covered from the sides. Respective upper ends of the side boards 3 and 4 may project upward from the top board 1, and respective lower ends of the side boards 3 and 4 may project downward from the baseplate 2.

FIG. 3(A) is a perspective view of the side board covering type II unit, and FIG. 3(B) is a cross-sectional view taken along a line IIIB-IIIB shown in FIG. 3(A). The side board covering type II unit is so adapted that side boards 3 and 4 are respectively joined to right and left end surfaces (edges) of a baseplate 2 such that they are respectively covered from the sides. Further, a top board 1 is joined to respective upper end surfaces (edges) of the side boards 3 and 4. One end or both ends on either one of the right and left sides of the top board 1 may project sideward from the side board 3 or 4, and respective lower ends of the side boards 3 and 4 may project downward from the baseplate 2.

The side board covering type III unit is so adapted that two side boards are respectively joined to right and left end surfaces (edges) of a top board, and a baseplate is joined to lower end surfaces (edges) of the two side boards, whose illustration is omitted. Respective upper ends of the side boards may project upward from the top board, and one end or both ends on either one of the right and left sides of the baseplate may project sideward from the side board.

③ Miter Joining Type (FIGS. 4(A) and 4(B))

FIG. 4(A) is a perspective view of a miter joining type unit, and FIG. 4(B) is a cross-sectional view taken along a line IVB-IVB shown in FIG. 4(A). Right and left end surfaces (edges) of each of a top board 1 and a baseplate 2 and upper and lower end surfaces (edges) of each of side boards 3 and 4 are diagonally (obliquely) cut. The right and left cut surfaces of the top board 1 and the cut surface at the upper end of each of the side boards 3 and 4 are joined to each other, and the right and left cut surfaces of the baseplate 2 and the cut surface at the lower end of each of the side boards 3 and 4 are joined to each other. A projection (a tenon) (which is denoted by reference character 4a in FIG. 4(B)) and a recess (a mortise) (which is denoted by reference character 1a) in which the projection 4a is fitted are respectively formed on one and the other of the cut surfaces which are joined to each other. The cut surfaces are fixed (coupled) to each other by fitting the projection and the recess to each other or using adhesives in addition to the fitting. The tenons and the mortises may be alternately provided over a plurality of portions. In the miter joining type unit, the top board 1, the baseplate 2, and the side boards 3 and 4 need not necessarily be fixed to each other using nails or screws. The top board or the baseplate and the side board may be joined to each other by fitting the projection and the recess which are respectively formed at their ends to each other.

FIG. 5(A) illustrates an example of furniture including the top board and base board covering type unit. FIGS. 5(B), 5(C) and 5(D) respectively illustrate examples of furniture including the side board covering type I unit. FIGS. 6(A), 6(B) and 6(C) respectively illustrate examples of furniture including the side board covering type II unit. FIG. 6(D) illustrates an example of furniture including the miter joining type unit. A lot of pieces of furniture include units of any one or more of the above-mentioned three unit types.

In a cell in the unit, smaller cells are formed by parting boards, guides, or the like, as described above. The cell accommodates a drawer depending on cases. A door leaf may, in some cases, be attached to an opened front surface of the unit. A door pull, a handle, or a knob may, in some cases, be attached to a front surface of the drawer, the door leaf, or the like. Further, a caster may, in some cases, be attached to a bottom surface of the unit. A parting board, a guide, a drawer, a door leaf, a door pull, a caster, etc. which are thus provided in the unit or the cell are generically referred to as "parts" in the present specification.

FIGS. 7(A) and 7(B) respectively illustrate examples of furniture having parts.

In furniture 8 shown in FIG. 7(A), a cell within a unit 8A is divided into upper and lower two small cells by a parting board 10, and a drawer 6 is accommodated in each of the small cells such that it can be freely drawn out. The parting board 10 is fixed to both side boards 3 and 4 and a back board 5 in the unit 8A. Door pulls 6b are attached to a front panel 6a of the drawer 6.

In furniture 9 shown in FIG. 7(B), a cell within a unit 9A is divided into upper and lower two small cells by right and left two guides (supporting members) 10A. The right and left two guides 10A are respectively fixed to side boards 3 and 4. The right and left two guides 10A are positioned at a height approximately intermediate between a top board 1 and a baseplate 2, and are spaced apart from the top board 1 and the baseplate 2. A drawer 7 is accommodated in each of the small cells devided by the guides 10A such that it can be freely drawn out. Both sides of the upper drawer 7 are respectively received by the guides 10A. Recesses 7b serving as handles are formed in a lower part of a front panel 7a of the drawer 7.

A drawer can be generally classified into two types, i.e., "an inset type" and "an overset type". FIGS. 7(A) and 7(B) respectively illustrate an inset type drawer and an overset type drawer.

An inset type drawer means a drawer of such a size that in a state where it is accommodated in a cell, its front panel enters the cell. Generally, respective front end surfaces of the top board 1, the baseplate 2, the side boards 3 and 4, and a front surface of the inset type drawer 6 (a front surface of the front panel 6a) enter an approximately flush state.

An overset type drawer means a drawer of such a size that in a state where it is accommodated in a cell, its front panel does not enter the cell. Generally when the overset type drawer 7 is accommodated in the cell, a reverse (back) surface of the front panel 7a enters a state where it is brought into contact with respective front end surfaces of the top board 1, the baseplate 2, and the side boards 3 and 4.

1.3 Configuration of Furniture Design Support System

Figure 8:
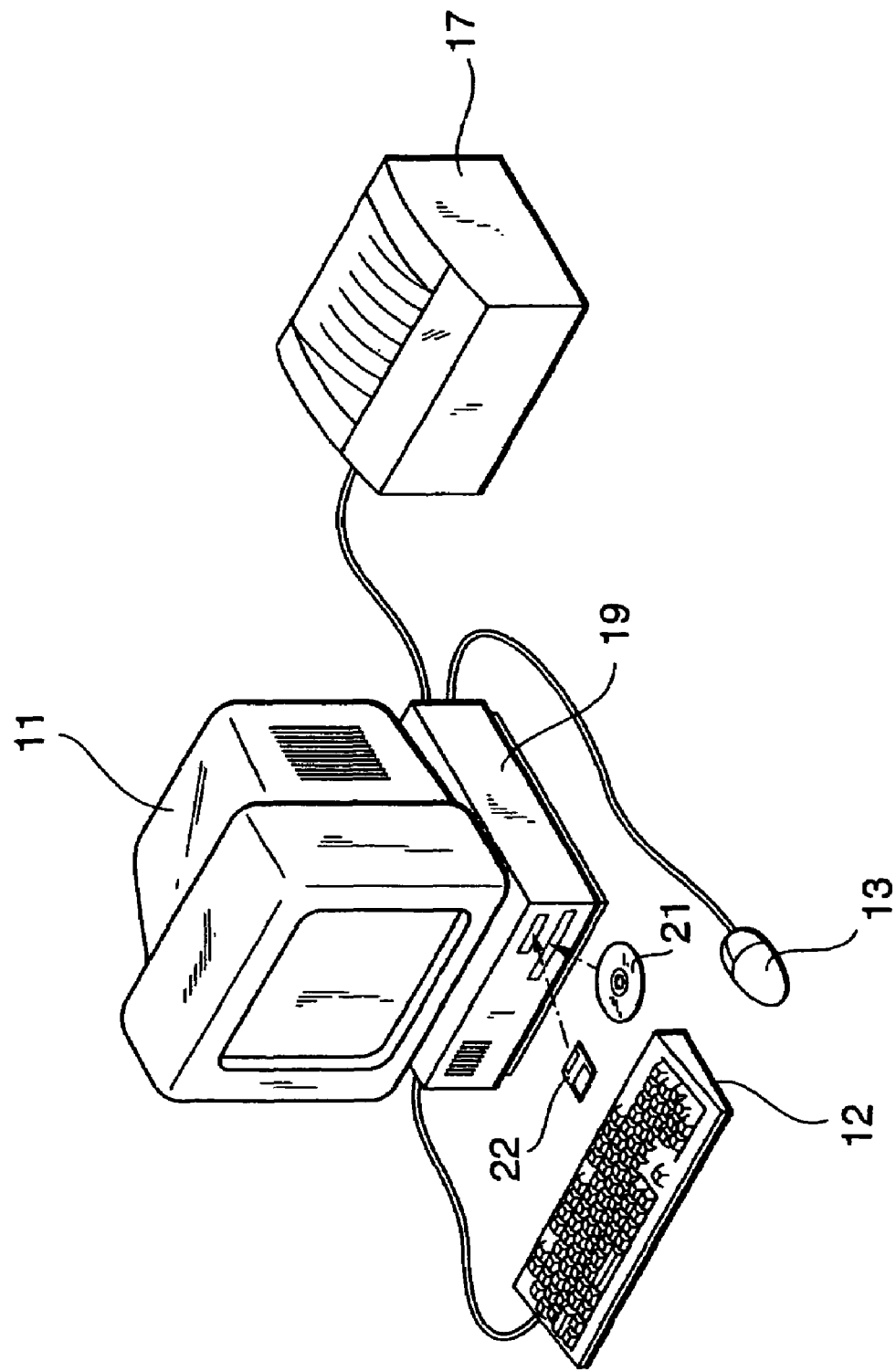
FIG. 8 is a perspective view showing the appearance of a furniture design support system.
Figure 9:
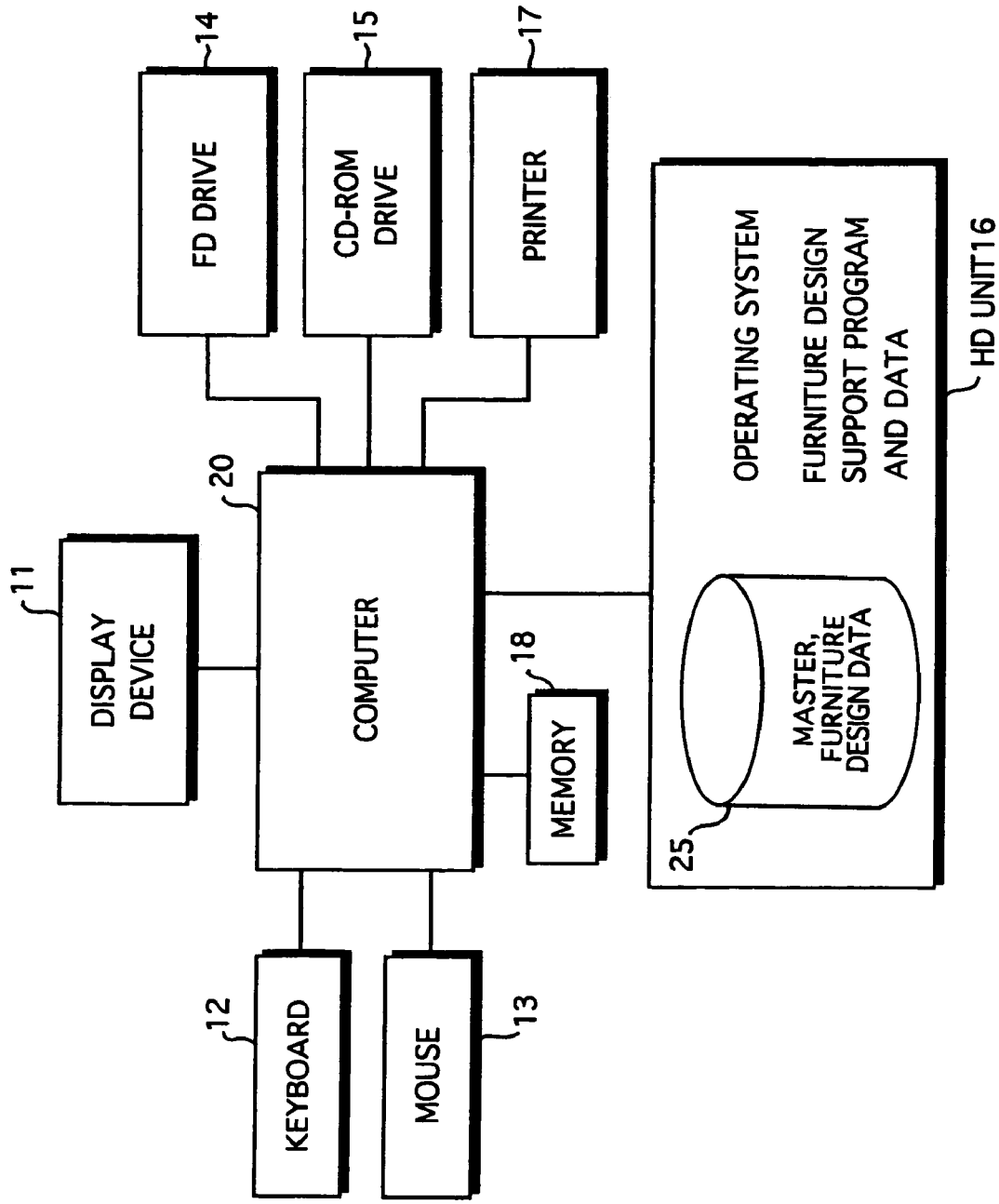
FIG. 9 is a block diagram showing the electrical configuration of a furniture design support system.

FIGS. 8 and 9 respectively illustrate the appearance of a furniture design support system and the electrical configuration thereof.

The furniture design support system comprises a computer system (e.g., a personal computer) including a computer 20. An FD drive 14, a CD-ROM (Compact Disc Read-Only Memory) drive 15, an HD (Hard Disk) unit 16, and a memory 18 are connected to the computer 20. They are contained inside a computer main body case 19. A CRT (Cathode-Ray Tube) display device 11, a keyboard 12, a mouse 13, and a printer 17 are connected to the computer 20. The FD drive 14 writes data into an FD 22, and reads out the data from the FD 22. The CD-ROM drive 15 reads out a furniture design support program and data (a master file) from a CD-ROM 21. The HD unit 16 writes the furniture design support program and various types of data into a hard disk (HD), and reads out the program and the data from the HD. The HD for the computer system previously stores an operating system (OS) for synthetically controlling the computer system.

Various screens (windows) are displayed on a display screen of the display device 11, as described later, on the basis of display data fed from the computer 20. An operator (or a customer) overlaps a pointer which moves on the display screen in synchronization with the movement of the mouse 13 with various types of buttons (icons) displayed on the display screen to click or positions the pointer on desired one of various listed items to click, thereby entering a request, an intension, and a selection. Further, the operator uses the keyboard 12, to enter necessary data (numeric values, characters, etc.). The data entered using the mouse 13 or the keyboard 12 is accepted in the computer 20, and is used for the subsequent processing. The hard copy of a display screen displayed on the display screen of the display device 11 and the printing of the results of the processing are made by the printer 17.

The furniture design support program and the data (including the master file) required to operate the computer system as the furniture design support system are recorded on the CD-ROM 21. The furniture design support program and the data which are stored in the CD-ROM 21 are read by the CD-ROM drive 15, and are installed in the HD in the HD unit 16. The screens (windows) which are displayed on the display screen of the display device 11 are based on both the furniture design support program and the data which are installed in the HD, and the OS.

Furniture design data 25 is stored in the HD (furniture design data 25 includes the contents of the master file). An image, a design drawing, etc. of furniture are represented by the furniture design data 25, as described later.

1.4 Basic Information Table (Master File) and Design Drawing

Figure 10:
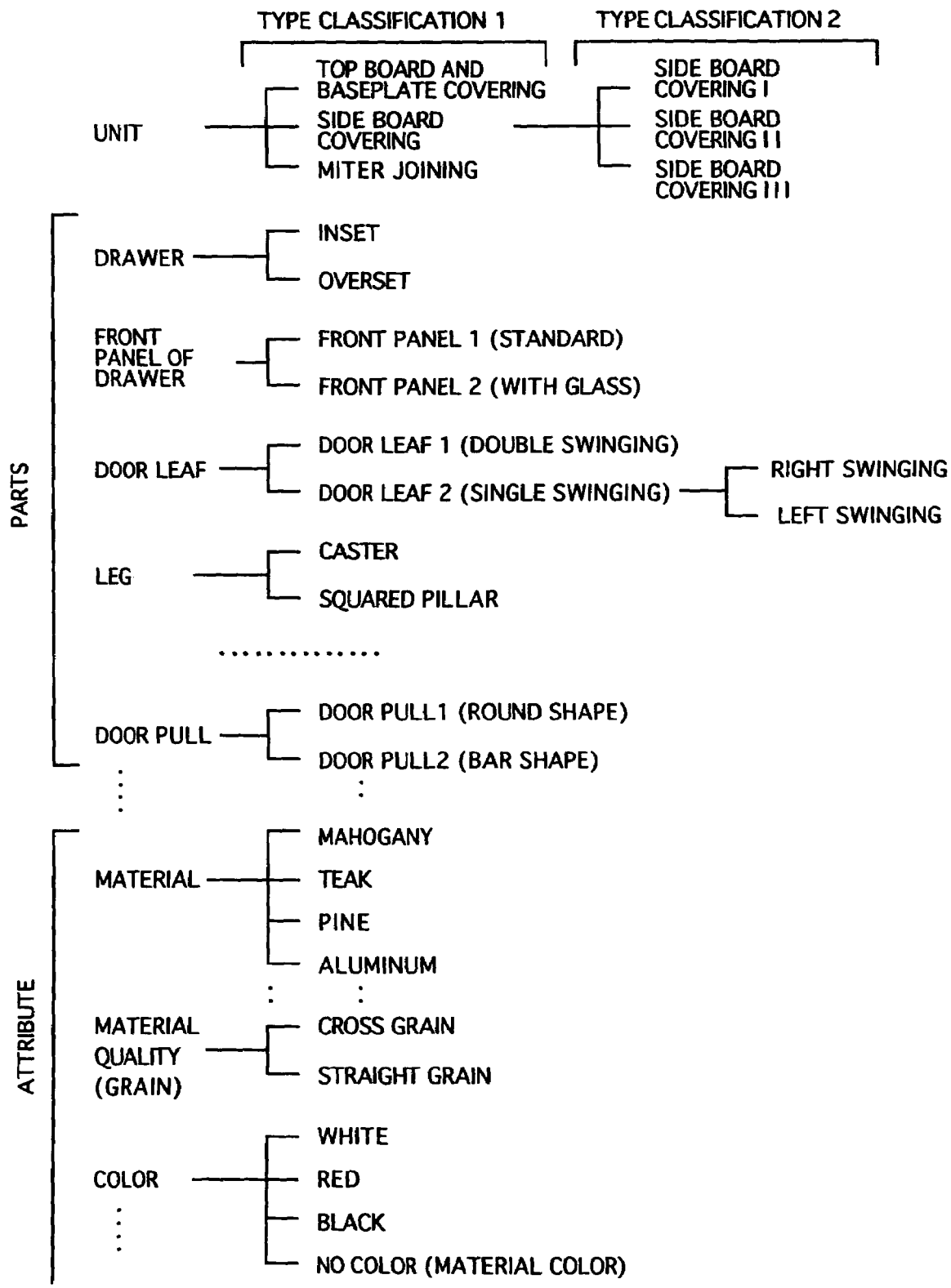
FIG. 10 illustrates a part of the contents of a basic information table (a master).

The master file installed in the HD includes a basic information table. Master data used for designing furniture is stored in a hierarchical structure, as shown in FIG. 10, in the basic information table.

Described with respect to units is: a top board and base board covering type, a side board covering type, and a miter joining type (they are referred to as a type classification 1), and the side board covering type is classified into side board covering types I, II and III (they are referred to as a type classification 2).

Subsequently, a classification (a type classification 1) related to parts is described in the basic information table. Examples of the type of drawer include an inset type and an overset type. Particularly as for the drawer, its front panel is classified into a front panel 1 (standard: wood) and a front panel 2 (with glass). A door leaf is classified into a door leaf 1 (double swinging) and a door leaf 2 (single swinging). The door leaf 2 (single swinging) is further classified into a right swinging door leaf and a left swinging door leaf (a type classification 2). As for the parts, a classification for each of a leg, a door pull, a parting board, a hinge, a key, etc. is further defined.

Attributes for each of the units and the parts (a material, a material quality (grain), a color, a board thickness, the thickness of a door leaf, the thickness of a front panel of a drawer, etc.) are further defined in the basic information table.

The basic information table also stores other data depending on processing which the furniture design support system is caused to perform. For example, the basic information table stores data representing unit cost (price) per unit area for each type of wood, data representing unit cost for each part, data representing a furniture picture image obtained by photographing furniture, etc. in addition to data related to the units, the parts, the attributes, described above.

The basic information table, together with the furniture design support program, is stored in the CD-ROM 21, and is installed in the HD in the HD unit 16 for the furniture design support system.

Figure 11:
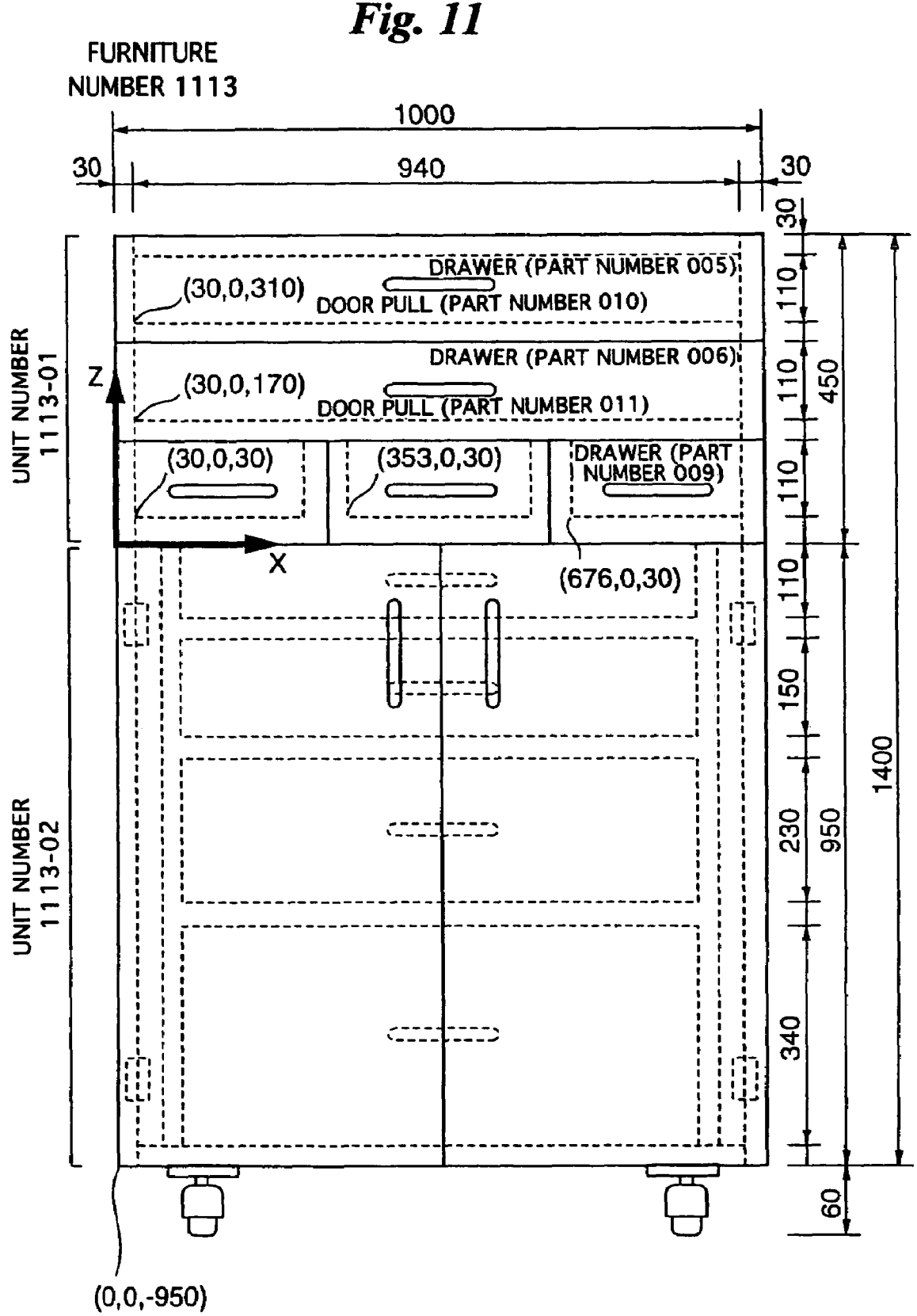
FIG. 11 illustrates an example of a design drawing (front)
Figure 12:
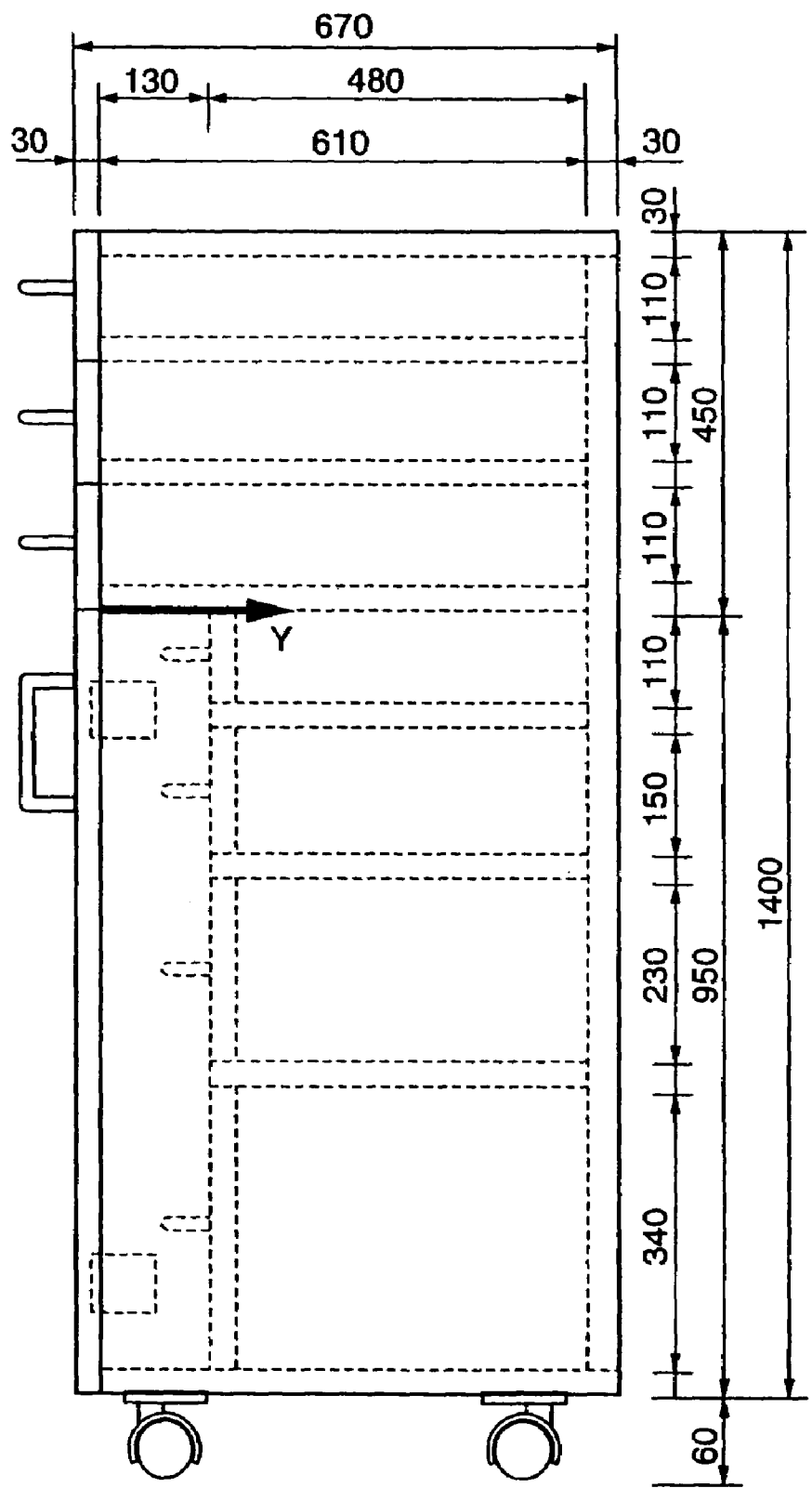
FIG. 12 illustrates an example of a design drawing (side).

FIGS. 11 and 12 illustrate an example of a design drawing of furniture which is outputted from the printer 17. FIGS. 11 and 12 respectively illustrate a front view of the design drawing of the designed furniture and a side view of the design drawing of the designed furniture.

The shape, the structure, and the size (the width, the depth, and the height) of the furniture are indicted in the design drawing of the furniture which is produced by the furniture design support system and is outputted. Description for designating the material, the material quality (grain), the color (painting color), etc. of each of constituent members constituting the furniture may, in some cases, be further added to the design drawing.

FIGS. 11 and 12 illustrate the X-coordinates, the Y-coordinates, the Z-coordinates, and the coordinates of each of reference points and further illustrate unit numbers, the names of typical parts, and part numbers for convenience of explanation.

The furniture has a furniture number (described later) of "1113", and is constituted by two units (unit numbers "1113-01" and "1113-02").

Description is made of the unit in the upper stage (unit number "1113-01"). The unit comprises as parts four parting boards (part numbers "001" to "004") (see FIG. 13), five drawers (part numbers "005" to "009"), and five door pulls (part numbers "010" to "014").

A cell formed in the unit in the upper stage and a cell ID assigned thereto will be described with reference to FIGS. 13(A) to 13(C).

Referring to FIG. 13(A), the unit includes one cell. A cell ID for specifying a cell formed by a top board (plate), a baseplate (board), a left side board (plate), and a right side board (plate) of the unit is "00" (hereinafter referred to as a cell ID "00").

The cell in the unit is divided by parting boards (plates) (shelf boards). A plurality of cells which are smaller than the original cell are formed.

As shown in FIG. 13(B), the cell having the cell ID "00" is divided by two parting boards extending in the transverse direction (part numbers "001" and "002"), to form three smaller cells. Cell IDs are respectively assigned to the three cells (cell IDs "01", "02", and "03")

As shown in FIG. 13(C), the cell having the cell ID "03" is divided by two parting boards extending in the longitudinal direction (part numbers "003" and "004"), to form three smaller cells. Cell IDs are respectively assigned to the three cells (cell IDs "04", "05", and "06").

In the furniture design support system, the unit in the upper stage of the furniture shown in FIGS. 11 and 12 is handled as one including seven cells (cell IDs "00" to "06").

The unit in the lower stage (unit number "1113-02") of the furniture shown in FIGS. 11 and 12 also comprises as parts three parting boards, four drawers, four door pulls to be attached to front panels of the drawers, one double swinging door leaf, one door pull (a pair of door pulls) to be attached to the door leaf, a set of (four) hinges for attaching the double swinging door leaf to the unit, and a set of (four) legs (casters). The number of cells included in the unit is a total of five.

2 Furniture Design Data

FIGS. 14 to 23 illustrate the furniture design data 25 stored in the HD for the furniture design support system. The furniture design data 25 is stored in various types of tables which are linked to one another. Specific data in the tables are utilized for expressing the design drawing of the furniture shown in FIGS. 11 and 12 and displaying the appearance of the furniture, for example.

2.1 Completed Furniture Table

A completed furniture table stores (memorizes, registers) data related to a furniture number, a furniture type, a furniture name, the date of manufacture, and the number of units, as shown in FIG. 14.

"Furniture number" is a unique number assigned for each furniture designed using the furniture design support system (hereinafter referred to as "completed furniture").

"Furniture type" stores any one of "with no legs (box)", "with legs", and "joinery" depending on the type of the completed furniture.

"Furniture name" is data representing the name of the completed furniture (a character string for display).

"Date of manufacture" represents a date (year, month, and day) on which the data related to the furniture number, the furniture type, the furniture name, and the number of units (the data in a row direction) are stored in the complete furniture table.

"The number of units" represents the number of units included in completed furniture. "2" and "3" are stored when the completed furniture respectively include two units and three units.

As for the completed furniture shown in FIGS. 11 and 12, the furniture number is "1113", and the furniture name is "chest 3". The chest 3 is constituted by two units.

2.2 Unit Number Table

A unit number table stores data related to a furniture number, a unit number, a unit/part definition number, a unit/part definition name, and the number of cells, as shown in FIG. 15.

"Furniture number" is the same as that in the above-mentioned completed furniture table. The unit number table and the completed furniture table are linked to each other by "furniture number".

"Unit number" is a number assigned for each unit included in completed furniture. For example, it indicates that two units respectively specified by unit numbers "1113-01" and "1113-02" are included in the completed furniture having the furniture number 1113 (illustrated in FIGS. 11 and 12). All tables, described later, are linked to the unit number table by "furniture number" and "unit number".

"Unit/part definition number" and "unit/part definition name" will be described later.

"The number of cells" represents the number of cells included in a unit. The above-mentioned two units respectively include seven cells and five cells, as described above.

2.3 Unit Arrangement Table

A unit arrangement table stores data related to a furniture number; a unit number; a cell ID; arrangement information; a reference point (x, y, z); the overall size (uW, uD, uH); the size, the finishing color, and the material of a portion 1 (a top board); the size, the finishing color and the material of a portion 2 (a baseplate); the size, the finishing color and the material of a portion 3 (a left side board); the size, the finishing color and the material of a portion 4 (a right side board) (not shown with respect to the portions 2 to 4); the number of parts; and the presence or absence of a leg, as shown in FIG. 16.

"Furniture number" and "unit number" are as described above.

"Cell ID" represents a cell ID for specifying a cell formed by a unit.

"Arrangement information" represents the positional relationship among units. When completed furniture includes a plurality of units, it is indicated what positional relationship exists among the units.

Data indicating that "1113-02 is integrally joined to bottom surface" is stored in "arrangement information" related to a unit number "1113-01", and data indicating that "1113-01 is integrally joined to top surface" is stored in "arrangement information" related to a unit number "1113-02". Therefore, it is indicated that in the completed furniture ("furniture number 1113") a unit having the unit number "1113-01" and a unit having the unit number "1113-02" are respectively arranged in the upper stage and the lower stage, and a baseplate in the unit in the upper stage and a top board in the unit in the lower stage are composed of one board (are integrally joined to each other).

"Reference point (x, y, z)" indicates a point in the lower left front corner of a unit in a case where the unit is viewed from the front as three-dimensional coordinates (x, y, z). When completed furniture is constituted by a plurality of units, the point in the lower left front corner of the unit first designed is determined as the origin of the three-dimensional coordinates.

"Overall size (uW, uD, uH)" expresses the size, i.e., the width (uW), the depth (uD), and the height (uH) of a unit, respectively, in millimeters.

A unit is basically formed by a top board, a baseplate, a left side board, and a right side board, which are respectively taken as portions 1, 2, 3, and 4. "Size of portion 1 (top board)", "finishing color of portion 1 (top board)", and "material of portion 1 (top board)" respectively represent the size, the finishing color (painting color), and the material (the kind and the material quality (grain) of wood may, in some cases, be stored). With respect to the top board, the left side board, and the right side board, data representing the size, the finishing color, and the material are also respectively stored. The data in the basic information table (FIG. 10) are used as the data representing the finishing color and the material.

"The number of parts" represents the number of parts included in a unit.

"Presence or absence of leg" indicates whether or not a leg (a caster, etc.) is attached to a unit.

2.4 Parting (Cell) Information Table

A parting (partitioning) (cell) information table stores data related to a furniture number, a unit number, a cell ID, the number of transverse parting, the number of longitudinal parting, a parent cell ID, a lateral (transverse) position in the parent cell, a longitudinal position in the parent cell, a reference point (x, y, z), a size (cW, cD, cH), an arranged part definition name, a division level, etc.

"Cell ID" represents a number for identifying each of cells included in a unit specified by a unit number. As described above, the unit having the unit number "1113-01" includes seven cells, and cell IDs (""00", "01", "02", "03", "04, "05", and "06") are respectively assigned to the seven cells.

"The number of transverse parting" represents the number of parting boards arranged in the transverse direction (the horizontal direction). "The number of longitudinal parting" represents the number of parting boards arranged in the longitudinal direction (the vertical direction). For example, the cell (unit) having the cell ID "00" is provided with two horizontal parting boards (transverse parting boards), so that "2" is stored in the section of "the number of transverse parting".

"Parent cell ID" represents, in a case where a cell is divided by parting boards so that a plurality of cells are included, a cell ID assigned to the original cell (the cell which has not been divided). For example, "00" is stored in "parent cell ID" in each of the cells respectively having the cell IDs "01", "02", and "03". The cells respectively having the cell IDs "01", "02", and "03" indicate that they are cells formed by dividing the cell having the cell ID "00" by parting boards. A cell such as the cell having the cell ID "00" is referred to as a "parent cell", and cells such as the cells having the cell IDs "01", "02, and "03" are referred to as "child cells" of the cell having the cell ID "00".

"Lateral position in parent cell" indicates how many child cells are there from the left in a parent cell in a case where a unit is viewed from the front. For example, with respect to the cell having the cell ID "06", "3" is stored in "lateral position in parent cell". A parent cell including the cell having the cell ID "06" is the cell having the cell ID "03". The cell having the cell ID "06" is the third child cell from the left in the parent cell (the cell having the cell ID "03").

"Longitudinal position in parent cell" indicates how many child cells are there from the bottom in a parent cell in a case where a unit is viewed from the front. For example, with respect to the cell having the cell ID "02", "2" is stored in "lateral position in parent cell". A parent cell including the cell having the cell ID "02" is the cell having the cell ID "00". The cell having the cell ID "02" is the second child cell from the bottom in the parent cell (the cell having the cell ID "00").

"Reference point (x, y, z)" represents the three-dimensional coordinates (x, y, z) of a point in the lower left front corner of a cell in a case where a unit is viewed from the front.

"Size (cW, cD, cH)" represents the size, i.e., the width (cW), the depth (cD), and the height (cH) of a cell.

"Arranged part definition name" represents a unit/part definition name (described later) of a part attached to (stored in) a cell.

"Division level" indicates how many divisions are made to form a cell. For example, the cells respectively having the cell IDs "01", "02", and "03" are formed by dividing the cell having the cell ID "00", so that "1" is stored in "division level". The cells respectively having the cell IDs "04", "05", and "06" are formed by dividing the cell having the cell ID "00" and further dividing the cell having the cell ID "03" which is a child cell of the cell having the cell ID "00", so that "division level" is "2". The parting (cell) information table further stores data related to the presence or absence of a parting board, the priority relationship of longitudinal parting boards or transverse parting boards, the presence or absence of a back board, and an offset value (described later)

2.5 Unit/Part Definition Table

A unit/part definition table stores data related to a unit/part type, a unit/part definition number, a unit/part definition name, a type classification 1, a type classification 2, a type classification 3, the overall size, the size, the finishing color, the material, etc. of each of portions 1 to 4 (not shown with respect to the finishing color and the material of the portion 2 and with respect to the portions 3 and 4), as shown in FIG. 18. The data stored in the unit/part definition table are generically referred to as "definition data". That is, the data described in the unit/part definition table are data inputted (defined) by an operator (or a customer) with respect to units and parts when furniture is designed using the furniture design support system. The definition data stored in the unit/part definition table can be utilized for a plurality of pieces of completed furniture (or a portion of them), and can be utilized even many times.

"Unit/part type" represents a unit itself or represents, in the case of a part, the type of the part.

"Unit/part definition number" is a unique number assigned to each of the units and the parts to which the definition data is given.

"Unit/part definition name" represents a name (a character code for displaying the name) given by the operator (or the customer) to each of the units and the parts to which the definition data is given.

"Type classification 1", "type classification 2", and "type classification 3" represent definitions given by the operator (or the customer) using the master data stored in the basic information table (FIG. 10) with respect to the unit or the part (the type classification 3 is not illustrated in FIG. 10).

For example, "type classification 1" related to a unit indicates which of a top board and base board covering type, a side board covering type and a miter joining type is the type of the unit. When "type classification 1" is the end board covering type, data indicating which of a side board covering type I, a side board covering type II, and a side board covering type III is the type is further described in "type classification 2". "Type classification 1" related to a drawer indicates which of a standard type and a type with glass is the type of a front panel of the drawer.

"Overall size" represents the size, i.e., the width (W), the depth (D) and the height (H) of a unit or the width, the depth and the height of a part (which may, in some cases, represent the lateral length, the longitudinal length, and the thickness of the part). With respect to the part, the overall size may not, in some cases, be defined.

The size, the finishing color and the material of each of the portions 1 to 4 respectively represent, in a case where a unit or a part is constituted by a plurality of members, the size, the finishing color (painting color) and the material of each of the members.

The portions 1 to 4 are previously determined depending on the type of the unit or the part. As described above, with respect to the unit, a top board, a baseplate, a left side board, and a right side board are respectively the portions 1, 2, 3, and 4, as described above. With respect to the drawer, a front panel is the portion 1, and the other board is the portion 2. With respect to the part, the sizes of the portions may not, in some cases, be defined.

Various types of tables, described below, are linked to the unit/part definition table by the unit/part definition number and the unit/part definition name.

2.6 Drawer Arrangement Table

Data related to a drawer which is one of parts is stored in a drawer arrangement table. The drawer arrangement table stores data related to a furniture number, a unit number, a cell ID, a part number, a unit/part definition number, a unit/part definition name, a reference point (x, y, z), a size, a finishing color (a front panel), a material (a front panel), a finishing color (other than the front panel), a material (other than the front panel), a setting method, and the number of parts, as shown in FIG. 19.

"Furniture number", "unit number", and "cell ID" respectively represent the furniture number of completed furniture accommodating the drawer, the unit number of a unit accommodating the drawer, and the cell ID assigned to a cell accommodating the drawer.

"Part number" represents an identification number assigned to each drawer. The part number is unique irrespective of the type of part in one unit. "Reference point (x, y, z)" represents the three-dimensional coordinates of a point in the lower left front corner of a front panel composing the drawer. "Size" represents the size, i.e., the width, the depth, and the height of the whole drawer. "Finishing color (front panel)" and "material (front panel)" respectively represent the color of the front panel and the material (the type or the like of wood) of the front panel. "Finishing color (other than the front panel)" and "material (other than the front panel)" respectively represent the color of a box portion other than the front panel of the drawer and the material of the box portion other than the front panel of the drawer.

"Setting method" indicates which of an overset type and an inset type is the type of the drawer. "The number of parts" represents the number of parts (e.g., door pulls) attached to the front panel of the drawer.

2.7 Door Leaf Arrangement Table

A door leaf arrangement table stores data related to a door leaf which is one of parts. The door leaf arrangement table stores data related to a furniture number, a unit number, a cell ID, a part number, a unit/part definition number, a unit/part definition name, a reference point (x, y, z), a size, a finishing color, a material, a setting method, and the number of parts, as shown in FIG. 20.

"Furniture number", "unit number", and "cell ID" respectively represent the furniture number of completed furniture to which a door leaf is attached, the unit number of a unit to which the door leaf is attached, and the cell ID of a cell to which the door leaf is attached.

"Part number" represents an identification number assigned to each door leaf. "Reference point (x, y, z)" represents the three-dimensional coordinates of a point in the lower left front corner of the door leaf. "Size" represents the size, i.e., the lateral length, the longitudinal length and the board thickness of the door leaf. "Finishing color" represents the color of the door leaf, and "material" represents the type of wood or the like used for the door leaf.

"Setting method" indicates which of an overset type and an inset type is the type of a door leaf (a door leaf attached so as to be brought into contact with front end surfaces of right and left side boards of a unit is an overset type door leaf, and a door leaf arranged inside the side boards is an inset type door leaf). "The number of parts" represents the number of parts (e.g., door pulls) attached to the door leaf.

2.8 Door Pull Arrangement Table

A door pull arrangement table stores data related to a door pull which is one of parts. The door pull arrangement table stores data related to a furniture number, a unit number, a parent part number, a cell ID, a part number, a unit/part definition number, a unit/part definition name, arrangement information, a reference point (x, y, z), a size, a finishing color, and a material, as shown in FIG. 21.

"Furniture number", "unit number", "parent part number", and "cell ID" respectively represent the furniture number of completed furniture to which the door pull is attached, the unit number of a unit to which the door pull is attached, the part number of a part (a parent part, for example, a drawer) to which the door pull is attached, and the cell ID of a cell to which the door pull is attached.

"Part number" represents an identification number assigned to each door pull. "Arrangement information" represents the arrangement relationship (center, upper portion, lower portion, left end, right end, etc.) of a front panel of the drawer or a door leaf to which the door pull is attached. "Reference point (x, y, z)" represents the coordinates of a point in the lower left front corner of the door pull. "Size" represents the size, i.e., the width, the depth and the height of the door pull. "Finishing color" represents the color of the door pull, and "material" represents the type of material (aluminum, etc.) used for the door pull.

2.9 Leg Arrangement Table

A leg arrangement table stores data related to a leg which is one of parts. The leg arrangement table stores data related to a furniture number, a unit number, a part number, a unit/part definition number, a unit/part definition name, a reference point (x, y, z), a size, a finishing color, and a material, as shown in FIG. 22.

When a unit is provided with a leg, one leg (stand) is provided on the whole of a bottom surface of the unit, or respective one legs are provided in the four corners of the bottom surface of the unit. In this case, the data in a row direction which are stored in the leg arrangement table are data related to four-in-a-set legs.

"Furniture number" and "unit number" respectively represent the furniture number of completed furniture to which a leg (e.g., a caster) is attached and the unit number of a unit to which the leg is attached. "Part number" represents an identification number assigned to one set of legs.

"Reference point (x, y, z)" represents the three-dimensional coordinates of the center of a joint portion between the leg positioned on the left front side of the unit out of the legs attached to the bottom surface of the unit and the bottom surface of the unit, for example. "Size" represents the size, i.e., the width, the depth, and the height of the leg. "Finishing color" and "material" respectively represent the color of the leg and the type of wood or the like used for the leg (when the type of the leg is "caster", data representing the material is omitted).

2.10 Parting Board Arrangement Table

A parting board arrangement table stores data related to a parting board which is one of parts. The parting board arrangement table stores data respectively related to a furniture number, a unit number, a cell ID, a part number, a unit/part definition number, a unit/part definition name, a reference point (x, y, z), a size, a finishing color, a material, and fixing/movable, as shown in FIG. 23.

"Furniture number", "unit number", and "cell ID" respectively represent the furniture number of completed furniture to which a parting board is attached, the unit number of a unit to which the parting board is attached, and the cell ID of a cell to which the parting board is attached.

"Part number" represents an identification number assigned to each parting board attached to completed furniture.

"Reference point (x, y, z)" represents the three-dimensional coordinates of a point in the lower left front corner of the parting board in a case where the completed furniture is viewed from the front. "Size" represents the size of the parting board (the length in the lateral direction (the width direction), the length in the longitudinal direction (the depth direction), and the thickness (the board thickness of the parting board). "Finishing color" represents the color of the parting board, and "material" represents the type of wood or the like used for the parting board.

"Fixing/movable" indicates whether the parting board is fixed to the unit or is detachable (movable).

FIG. 24 illustrates the relationship among various types of data tables (FIGS. 14 to FIG. 23), described above.

3 Processing I in Furniture Design Support System 3.1 Overall outline

Figure 25:
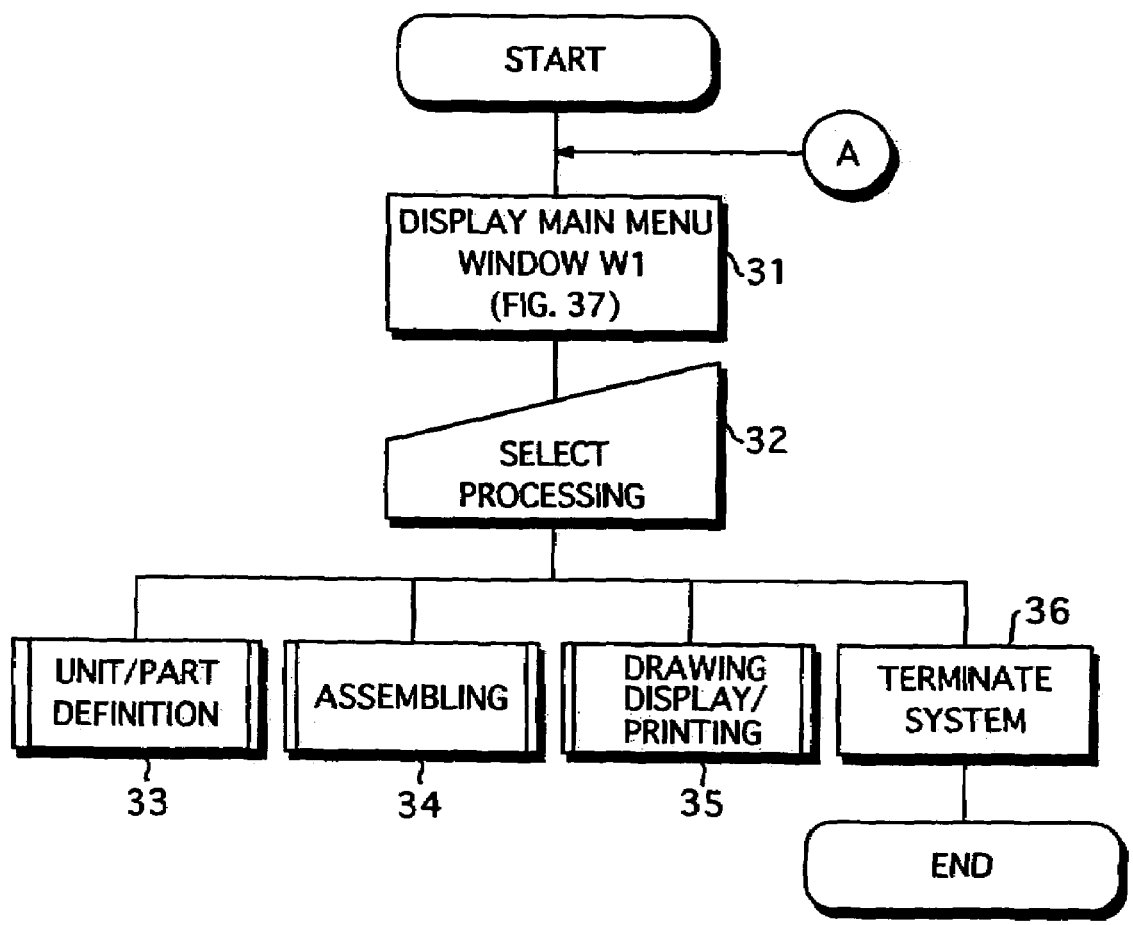
FIG. 25 is a flow chart showing the flow of processing of a furniture design support system.

FIG. 25 is a flow chart showing the procedure for processing in the furniture design support system.

The processing operation of the furniture design support system conforms to the furniture design support program stored in the HD in the HD unit 6. When an operator of the furniture design support system uses the mouse 13 to start the furniture design support program stored in the HD, the furniture design support program is read out of the HD, and is executed by the computer 20. FIGS. 37 to 39, FIGS. 41 to 43, FIGS. 47 to 49, and FIGS. 51 to 59 illustrate examples of a window displayed on the display screen of the display device 11 in accordance with the furniture design support program.

Figure 37:
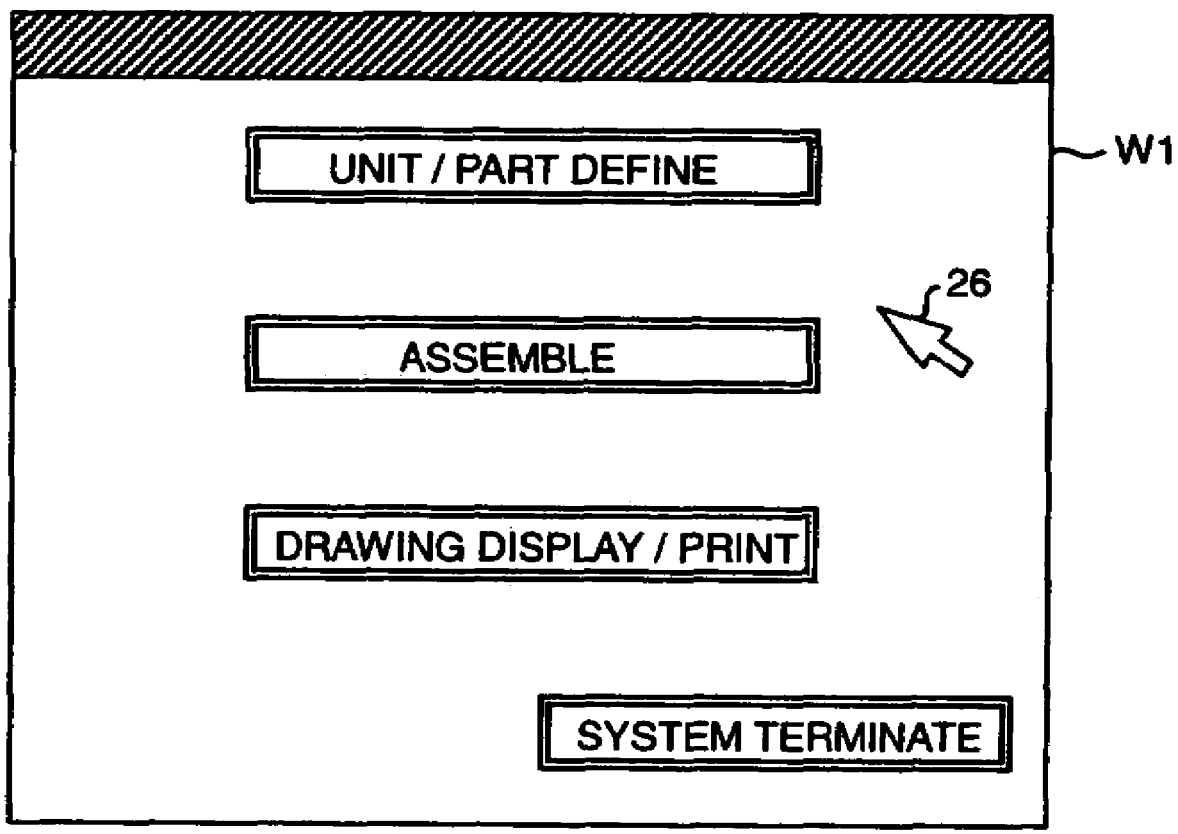
FIG. 37 illustrates an example of display of a main menu window.

When the furniture design support program is started, a main menu window W1 is displayed on the display screen of the display device 11 as an initial screen, as shown in FIG. 37 (step 31). "A window is displayed on a display screen of a display device 11" is hereinafter merely referred to as "A window is displayed".

The main menu window W1 is provided with buttons "unit/part define", "assemble", "drawing display/print", and "system terminate". When the operator moves (overlaps) the cursor 26 using the mouse 13 to the position of the button and clicks, processing corresponding to the clicked button is selected (step 32), and the selected processing is performed (steps 33 to 36). "An operator moves a cursor 26 using a mouse 13 to the position of a desired button (or an area) on a window and clicks" is hereinafter merely referred to as "An operator clicks a button (or an area)".

When the "unit/part define" button is clicked, unit/part definition processing is started (step 33).

The unit/part definition processing is processing for selecting (designating or specifying) a unit used for furniture to be designed and parts (a drawer, a door leaf, etc.) provided in the unit, defining (designating or specifying) the size, the finishing color, the material, the material quality, etc. of the selected unit, and defining (designating or specifying) the finishing color, the material, etc. of each of the parts. Data defined in the unit/part definition processing are stored in the unit/part definition table (see FIG. 18). The unit/part definition processing is performed prior to "assembling processing" and "drawing display/printing processing" next described. The details of the unit/part definition processing will be described later.

When the "assemble" button is clicked, assembling processing is started (step 34).

The assembling processing is processing for combining (assembling) on the screen the unit and the parts which are defined in the above-mentioned unit/part definition processing. By passing through the assembling processing, a front view of assembled furniture (completed furniture) or a portion thereof is displayed in the window displayed on the display screen. When the furniture is assembled on the display screen, the furniture design data is stored in the HD. The details of the assembling processing will be described later.

When the "drawing display/print" button is clicked, drawing display/printing processing is started (step 35).

In the drawing display/printing processing, processing for displaying on the display screen of the display device 11 the appearance of the completed furniture designed in the assembling processing (step 34) depending on the selection of the type of drawing (a front view, a side view, a rear view, etc.) and processing for displaying on the display screen a design drawing (generally, all kinds of drawings) of the completed furniture, printing the design drawing by the printer 17 to output are performed. Further, in the drawing display/printing processing, processing for changing the size (width, depth, and height) of the completed furniture, the finishing color (painting color), etc., for example, is also performed if required. The details of the drawing display/printing processing will be described later.

When the "system terminate" button is clicked, all processing of the furniture design support program is terminated (step 36).

3.2 Unit/Part Definition Processing

Figure 26:
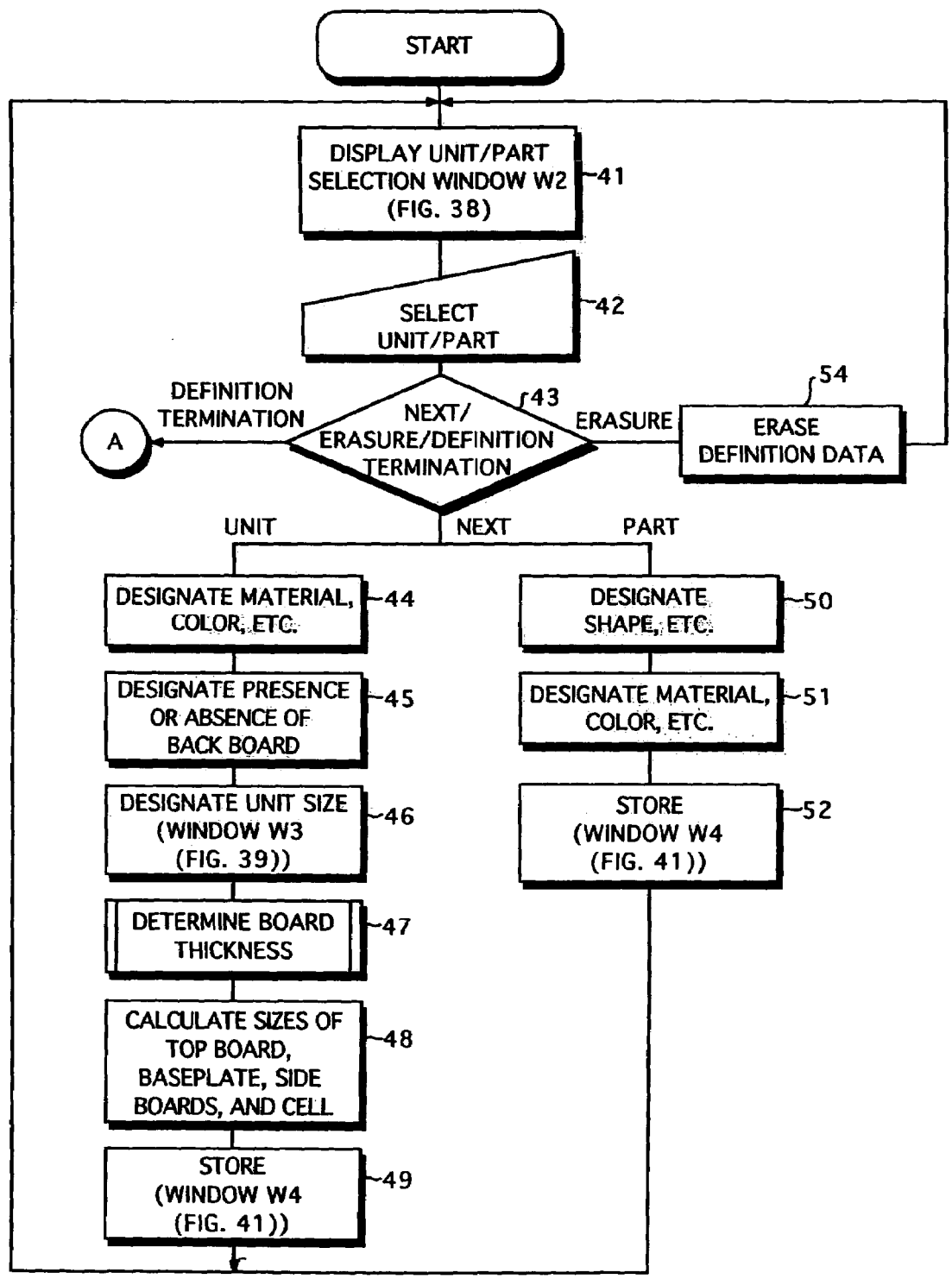
FIG. 26 is a flow chart showing the flow of unit/part definition processing.

FIG. 26 is a flow chart showing the procedure for the unit/part definition processing.

Figure 38:
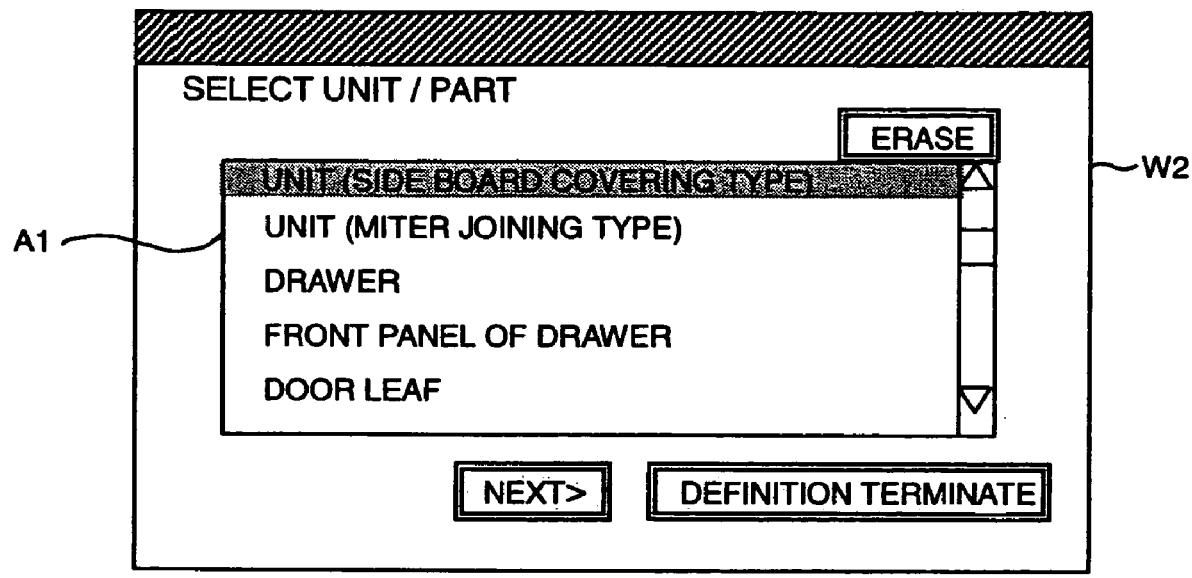
FIG. 38 illustrates an example of display of a unit/part selection window.

When the "unit/part define" button is clicked in the main menu window W1 (FIG. 37), a unit/part selection window W2 is displayed in place of or on the main menu window W1, as shown in FIG. 38 (step 41).

A unit/part display area A1 is displayed in the unit/part selection window W2. Further, "erase", "next" and "definition terminate" buttons are provided therein.

In the unit/part display area A1, the names of the types of units and parts (a type classification 1 for the units, and a drawer, a front panel of the drawer, a door leaf, a leg, etc. for the parts) in the basic information table (FIG. 10) are displayed by a list. When a scroll bar on the right side of the unit/part display area A1 is moved upward or downward using the mouse 13, the list of the names displayed in the unit/part display area A1 is scrolled upward or downward. An operator selects the names of the unit and the part which a customer desires to employ for furniture out of the names of the units and the parts which are displayed on the unit/part display area A1.

Referring to FIG. 26, when the unit is selected, the operator clicks any one of the names of three unit types (a top board and base board covering type, a side board covering type, and a miter joining type) which are displayed in the unit/part display area A1 (step 42). The color of a portion including the name of the selected unit type is changed in the unit/part display area A1. When the "next" button is clicked ("Next" in step 43), processing for providing more detailed data input is started with respect to the selected unit type (steps 44 to 49).

In the detailed data input processing related to the unit (steps 44 to 49), the designation of a material, a color, etc. used for the unit (step 44), the designation of the presence or absence of a back board (step 45), and the designation of a unit size (step 46) are performed by a wizard format (such a format that data input is successively advanced in response to a question from the furniture design support program). Of course, one window for the data input may be displayed on the display screen. In this case, the wizard format need not be employed.

In the designation of a material, a color, etc. (step 44), a list of the types of materials (the types of wood or the like) is first displayed by characters or a combination of characters and images. The displayed types of materials are based on the data stored in the basic information table (FIG. 10). The operator selects a desired material for each of a top board, a baseplate, a left side board, and a right side board from the list. Similarly, even with respect to each of a color (finishing color), a material quality (grain), a pattern, etc., a list of the types thereof is displayed on the display screen by characters or a combination of characters and images (not shown). The display of the list is based on the data stored in the basic information table (FIG. 10). The operator selects, from the displayed lists of colors, material qualities (grains), patterns, etc., desired ones for each of the top board, the baseplate, the left side board, and the right side board of the unit. The inputted (selected) data are temporarily stored in the memory 18.

In the designation of the presence or absence of a back board (step 45), data indicating whether or not the back board is attached to the unit is inputted. The inputted data is temporarily stored in the memory 18.

Figure 39:
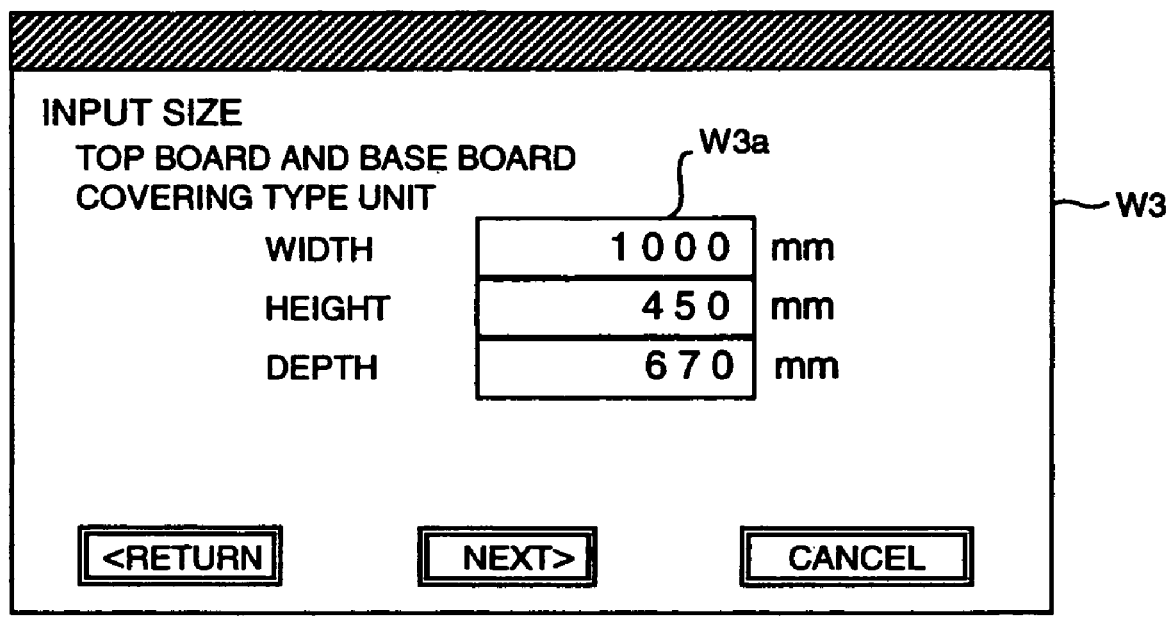
FIG. 39 illustrates an example of display of a unit size input window.

In the designation of the size of the unit (step 46), data representing the size of the unit is inputted. An example of a window (a size input window W3) displayed on the display screen in the size designation (step 46) is shown in FIG. 39. The size input window W3 includes a numeric value input box W3a for inputting the size, i.e., the width, the height, and the depth of the unit. The operator enters values desired by the customer in the numeric value input box W3a for the width, the height, and the depth of the unit using the keyboard 12. The entered data are temporarily stored in the memory 18.

When the size (width, depth, and height) of the unit is inputted, the thickness of each of the top board, the baseplate, and the right and left side boards which constitute the unit, the size of each of the top board, the baseplate, and the right and left side boards, and the width, the depth and the height of a cell formed by the unit are calculated by the furniture design support program in consideration of the type classification 1 of the unit selected in the step 42 and the material selected in the step 44 (steps 47 and 48).

Figure 27:
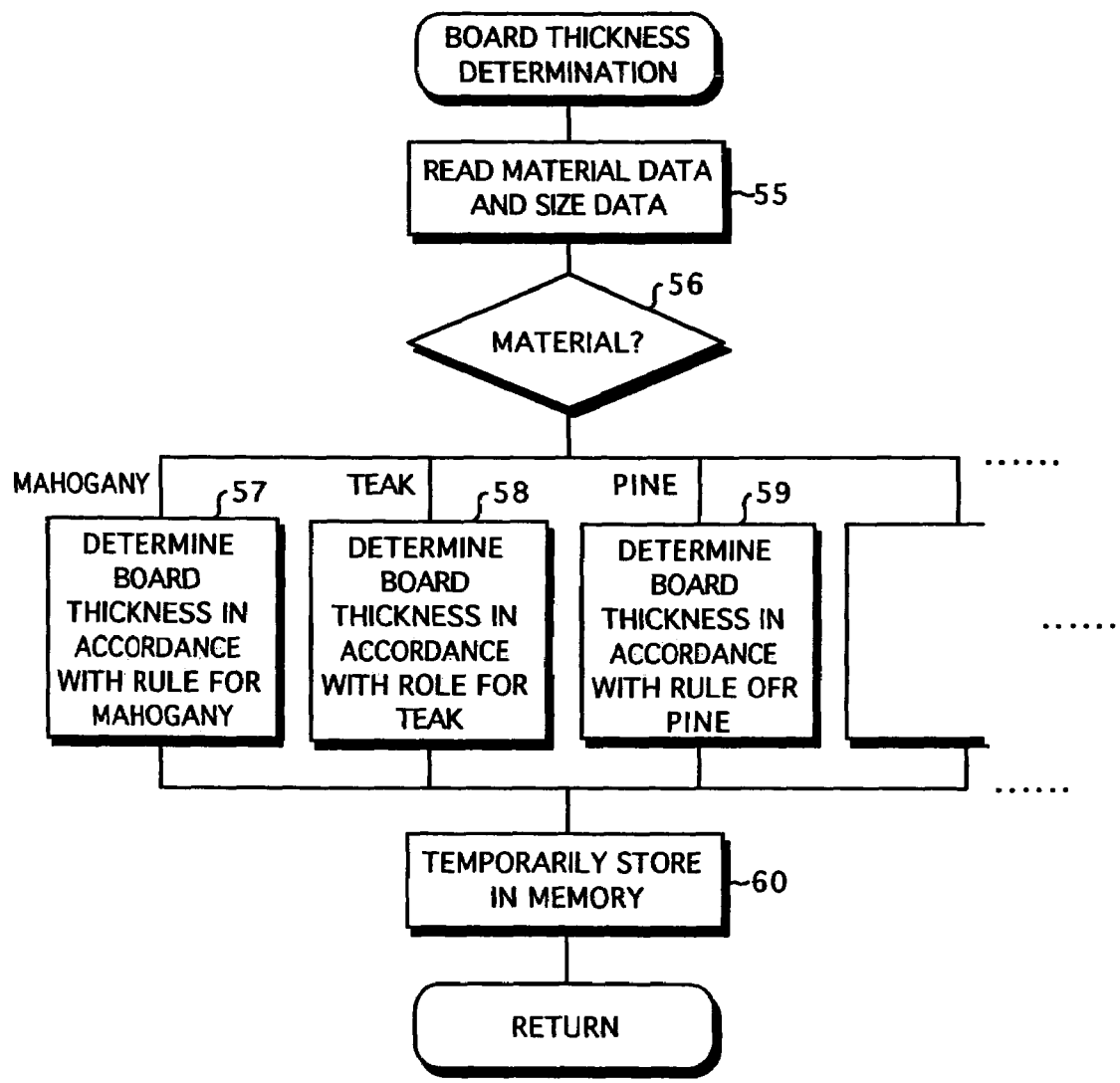
FIG. 27 is a flow chart showing the flow of board thickness definition processing.

FIG. 27 is a flow chart showing an example of the board thickness determination processing (step 47) by the furniture design support program in detail.

Data related to a material such as wood composing a unit which is entered by the operator and is temporarily stored in the memory 18 and data related to the size (width, depth, and height) of the unit are transferred to a work area of the memory 18 (step 55).

Woods such as "mahogany", "teak", and "pine" differ in hardness (strength) for each kind (type). Mahogany is harder than teak, and teak is harder than pine. When units which are the same in size and strength are manufactured, the board thickness of the wood in a case where teak is used must be made larger than that in a case where mahogany is used. The board thickness of the wood in a case where pine is used must be made larger than that in a case where teak is used. Further, the board thickness of the wood used for the unit of a large size must be larger than the board thickness used for the unit of a small size. In the furniture design support program, a calculation rule for calculating a board thickness on the basis of data representing the type classification 1 of the unit, the kind of the wood, and the size of the unit is described.

The calculation rule is such a rule that a board thickness is set to 30 mm when the inputted height (uH) of the unit is smaller than a reference value previously determined, while being set to 50 mm when the height is the same as or larger than the reference value, for example. The reference values and the numeric values of the board thickness determined in accordance with the reference values respectively differ depending on the kind of the wood. Such a board thickness that a unit to be manufactured has predetermined strength is determined on the basis of the characteristics (strength, etc.) and the size of a wood material used for the unit (step 56 and steps 57, 58, and 59).

The determined board thickness is temporarily stored in the memory 18 (step 60).

Of course, the operator (or the customer) may be requested to enter a proper size again without performing board thickness determination processing when any one of the inputted width, depth, and height of the unit is smaller than the minimum value previously determined or is larger than the maximum value previously determined.

Furthermore, a board thickness used in the horizontal direction (the transverse direction) for the unit and a board thickness used in the vertical direction (the longitudinal direction) for the unit may have different values depending on the inputted size (width, depth, and height) of the unit. Further, the operator may be caused to enter the board thickness. In this case, the board thickness calculation processing (step 47 in FIG. 26) is skipped.

Figure 40:
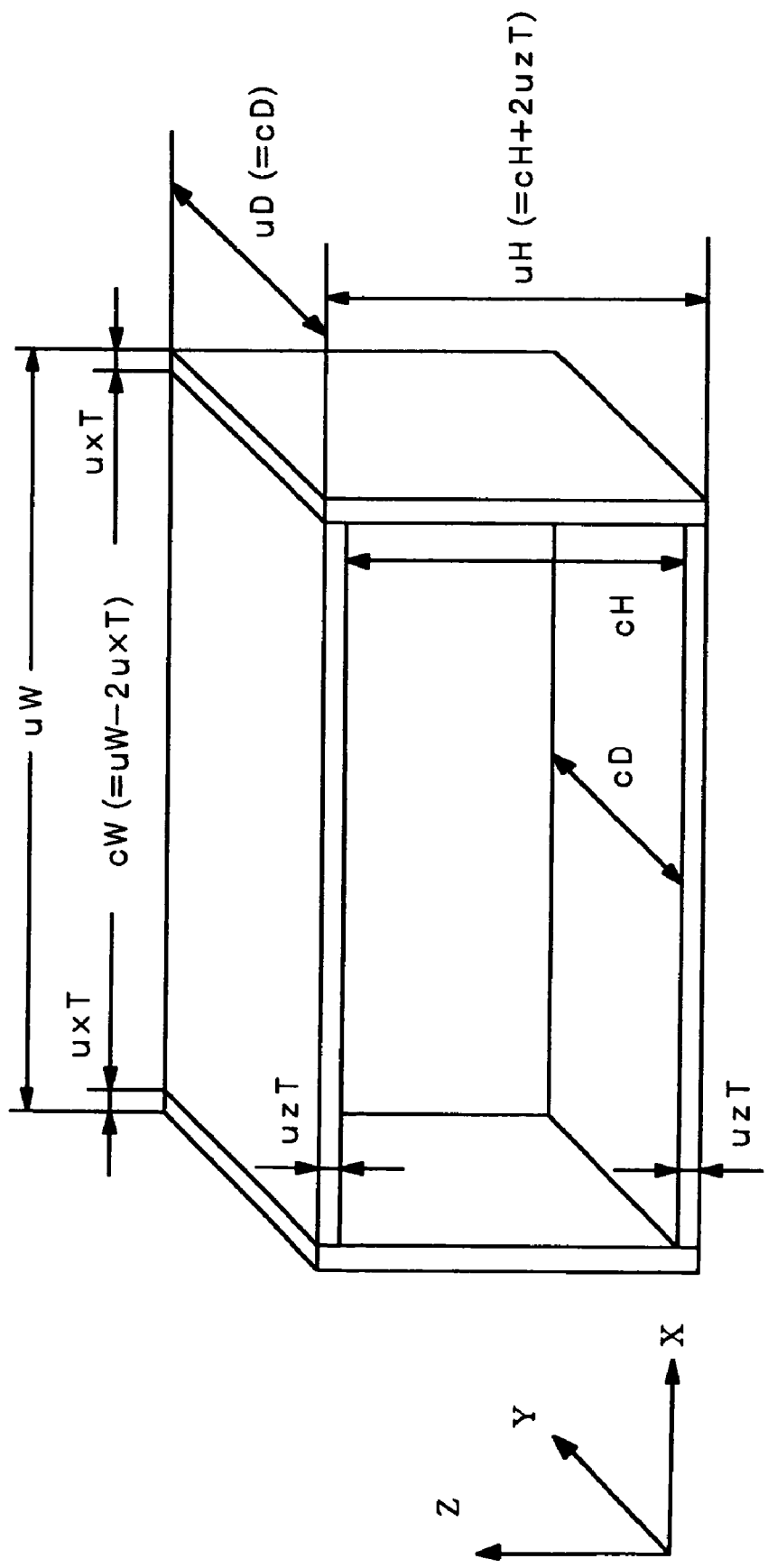
FIG. 40 illustrates the relationship among the sizes of a top board, a baseplate, a left side board, and a right side board which constitute a unit, the size of a cell, and a board thickness.

Data representing the type classification 1 (top board and base board covering, side board covering, or miter joining) of the unit is then read into the work area of the memory 18. The sizes of the top board, the baseplate, and the side boards which constitute the unit and the size of the cell are calculated from the data representing the type classification 1 of the unit (which has already been specified in the step 42) and data representing the board thickness determined in the step 47 (step 48). FIG. 40 illustrates the relationship among the size (width, depth, and height) of the unit which are entered by the operator, the board thickness determined by the furniture design support program, the sizes of the top board, the baseplate, and the side boards which are calculated by the furniture design support program, and the size of the cell. This is a case of a side board covering type I unit (there is no back board).

Let uW, uD, and uH be respectively the width, the depth, and the height of the unit which are inputted by the operator. Let uxT be the thickness of the longitudinal board (the side board) determined in the board thickness determination processing (step 47), and uzT be the thickness of the lateral board (the top board and the baseplate). In the case of the side board covering type I unit, the size (width and length) of the top board and the baseplate, the size (width and length) of the side board, and the size (width, depth, and height) of the cell are calculated.

The size in the transverse (lateral) (width) direction of the top board and the size in the transverse direction (width) of the baseplate:

$$uW-2uxT$$

The size in the depth direction (width) of the top board and the baseplate
uD

The size in the transverse direction (width) of the side board
UD

The size in the height direction (length) of the side board
uH

The size in the width direction (cW) of the cell $$cW = uW - 2uxT$$

The size in the depth direction (cD) of the cell
cD=uD

The size in the height direction (cH) of the cell $$cH = uH - 2uzT$$

In the furniture design support program, with respect to a side board covering type unit II, a side board covering type unit III, a top board and base board covering type unit, and a miter joining type unit in addition to the side board covering type unit I, an equation for calculating the sizes of a top board, a baseplate, and side boards and the size of a cell formed by the unit is described. The size (width, depth, and height) of the unit which is entered by the operator and the board thickness determined by the furniture design support program are substituted in an equation corresponding to the selected unit type, so that the sizes of the top board, the baseplate, and the side boards and the size of the cell are calculated by the furniture design support program. Data representing the calculated size is temporarily stored in the memory 18.

When data indicating that a unit is provided with a back board is inputted, the foregoing equation also includes a parameter representing the thickness of the back board. The thickness of the back board may be a fixed value, or may be determined depending on the size of the unit. The size of the back board is also calculated.

Figure 41:
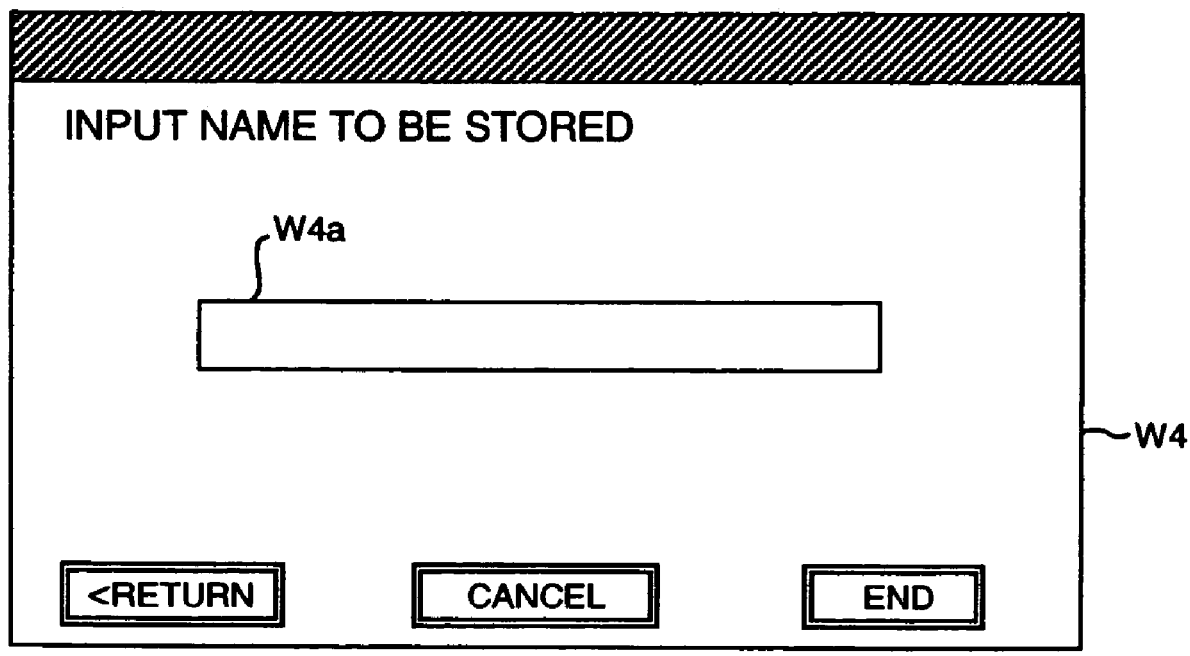
FIG. 41 illustrates an example of display of a storage name input window.

After the calculation of the size of each of the boards is terminated, a data storage name input window W4 shown in FIG. 41 is displayed. The data storage name input window W4 includes an input box W4a for inputting a data storage name, and is provided with "return", "cancel" and "end" buttons.

The keyboard 12 is used by the operator so that a storage name is inputted into the input box W4a, and the "end" button is clicked. Consequently, the storage name inputted into the input box W4a, together with a type classification and data temporarily stored in the memory 18 (data representing a size, a material, a color, etc.), is stored and retained as a unit/part definition name in the unit/part definition table (FIG. 18) (step 49). The display on the display screen is returned to the unit/part selection window W2 again (step 41).

When there are a plurality of unit types to be employed for furniture to be designed, the above-mentioned operations are repeated. Every time the above-mentioned operations are repeated, data (a record) related to the inputted unit is added to the unit/part definition table (FIG. 18).

In a case where the "cancel" button is clicked in the data storage name input window W4, when characters are inputted into the input box, the characters are erased. When the "return" button is clicked, the size input window W3 is displayed again in place of the data storage name input window W4.

When a part is subjected to data definition, a portion including any one of the names of the parts displayed in the unit/part display area A1 in the unit/part selection window W2 is clicked by the operator (step 42). The color of the portion including the name of the selected part is changed. When the "next" button is clicked ("Next" in step 43), processing for requesting to input detailed data is started with respect to the selected part (steps 50 to 52).

In the processing for inputting the detailed data respectively related to the part, the designation of a shape, etc. (step 50) and the designation of a material, a color, etc. (step 51) are successively performed.

For example, it is assumed that "door leaf" is selected as a part. Either a door leaf 1 (double swinging) or a door leaf 2 (single swinging) is selected (step 50; selection of a type classification 1). Here, when the door leaf 2 (single swinging) is selected, either right swinging or left swinging is selected. A material, a finishing color, a material quality (grain), a pattern, etc. are then designated (step 51). Finally, the data storage name input window W4 (FIG. 41) is displayed, and a data storage name is inputted into the input box W4a. Definition data related to the selected part is stored in the unit/part definition table (FIG. 18) (step 52).

When a plurality of parts are used for furniture to be designed, processing (operations) in the steps 41 to 52 is repeated. Every time the above-mentioned operations are repeated, data (a record) inputted with respect to the parts is added to the unit/part definition table (FIG. 18). At this time, a unit/part definition number is automatically adopted (a serial number is assigned) with respect to each of the defined unit and parts, and is stored in correspondence with a unit/part definition name.

When the unit/part definition processing is terminated, the operator clicks the "definition terminate" button in the unit/part selection window W2 (FIG. 38) ("definition termination" in step 43). The main menu window W1 (FIG. 37) is displayed again on the display screen of the display device 11 (step 31).

The "erase" button in the unit/part selection window W2 is used in a case where data related to a particular unit or part in the unit/part definition table (FIG. 18) is to be erased. When "door pull" displayed in the unit/part display area A1 is selected by being clicked, for example, and the "erase" button is then clicked ("Erasure" in step 43), the data stored with respect to "door pull" in the unit/part definition table are all cleared (erased) (step 54).

3.3 Assembling Processing

Figure 28:
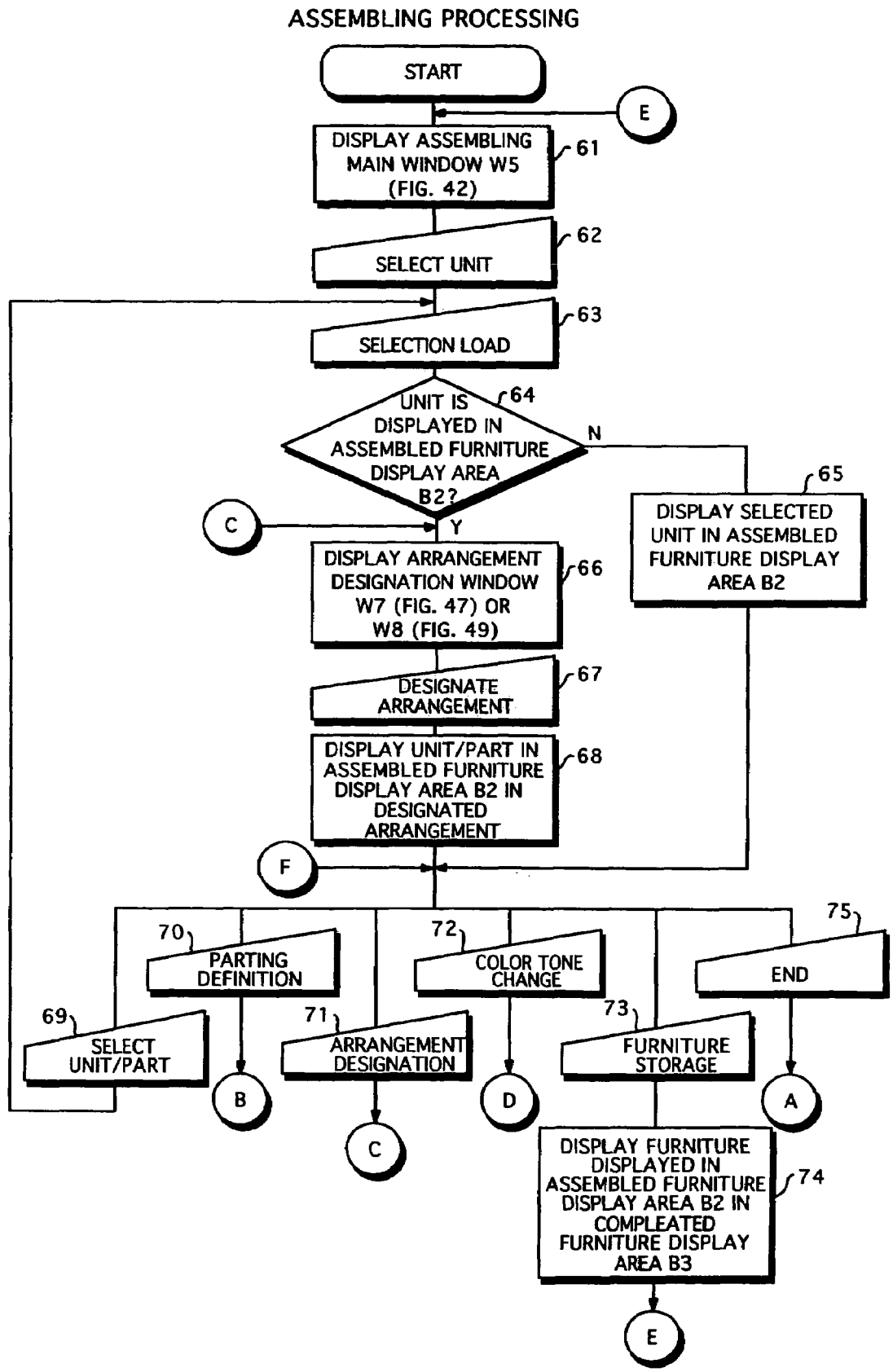
FIG. 28 is a flow chart showing the flow of assembling processing.
Figure 29:
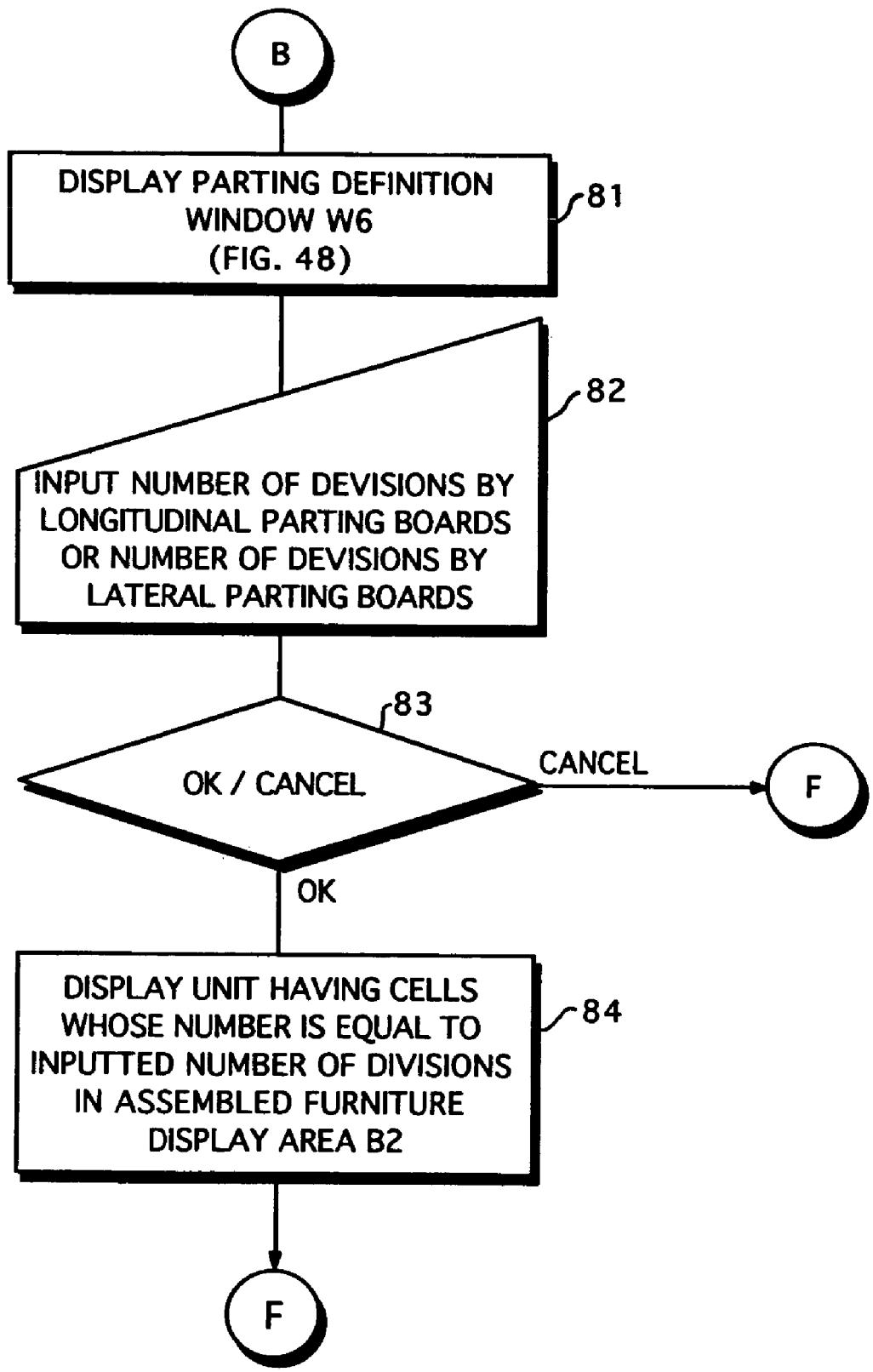
FIG. 29 is a flow chart showing the flow of parting definition processing.
Figure 30:
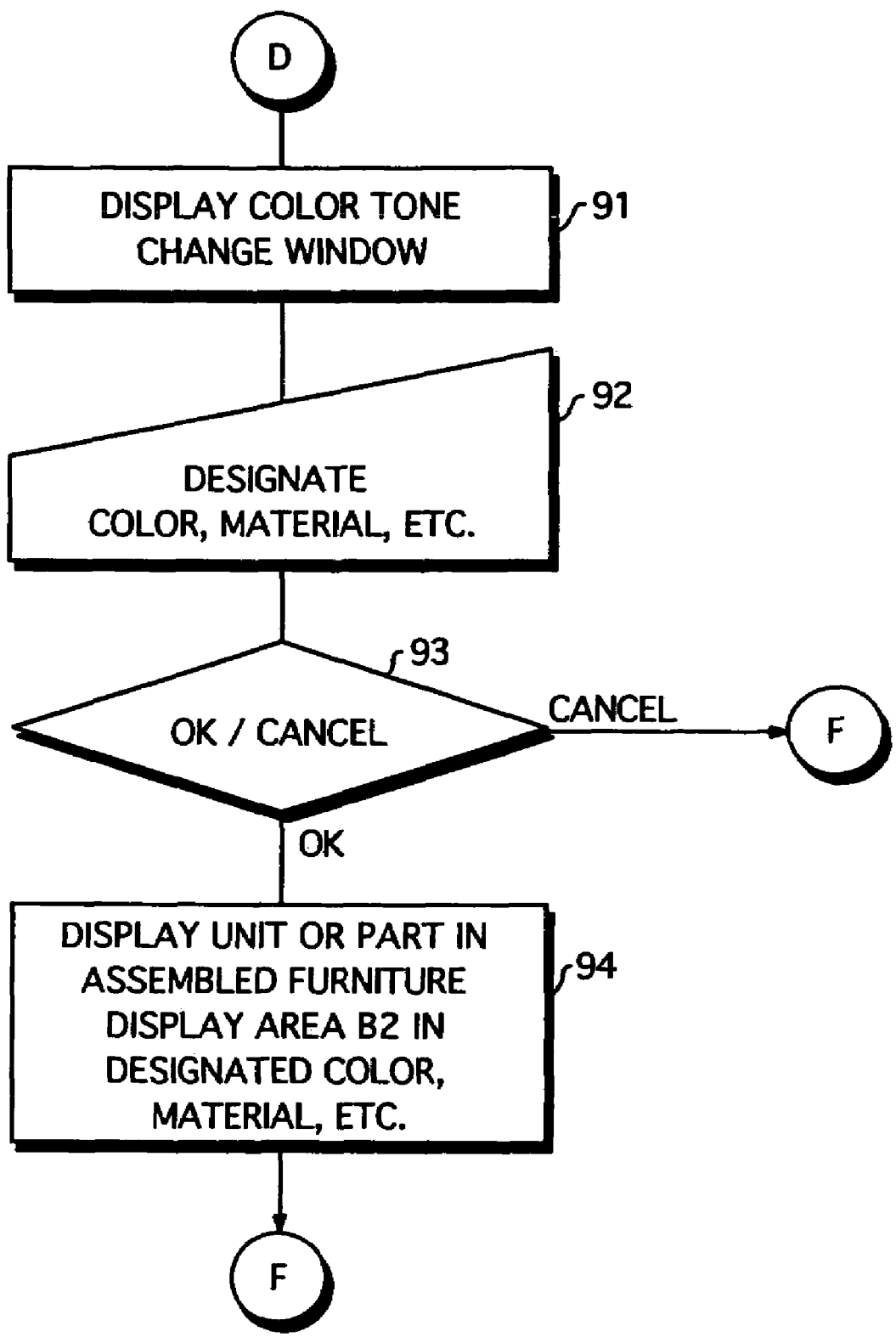
FIG. 30 is a flow chart showing the flow of color tone change processing.

FIGS. 28 to 30 are flow charts showing the procedure for assembling processing.

The assembling processing is processing for combining units and parts which have been subjected to data definition in the above-mentioned unit/part definition processing, to design furniture in a completed state (completed furniture) or a portion thereof.

Figure 42:
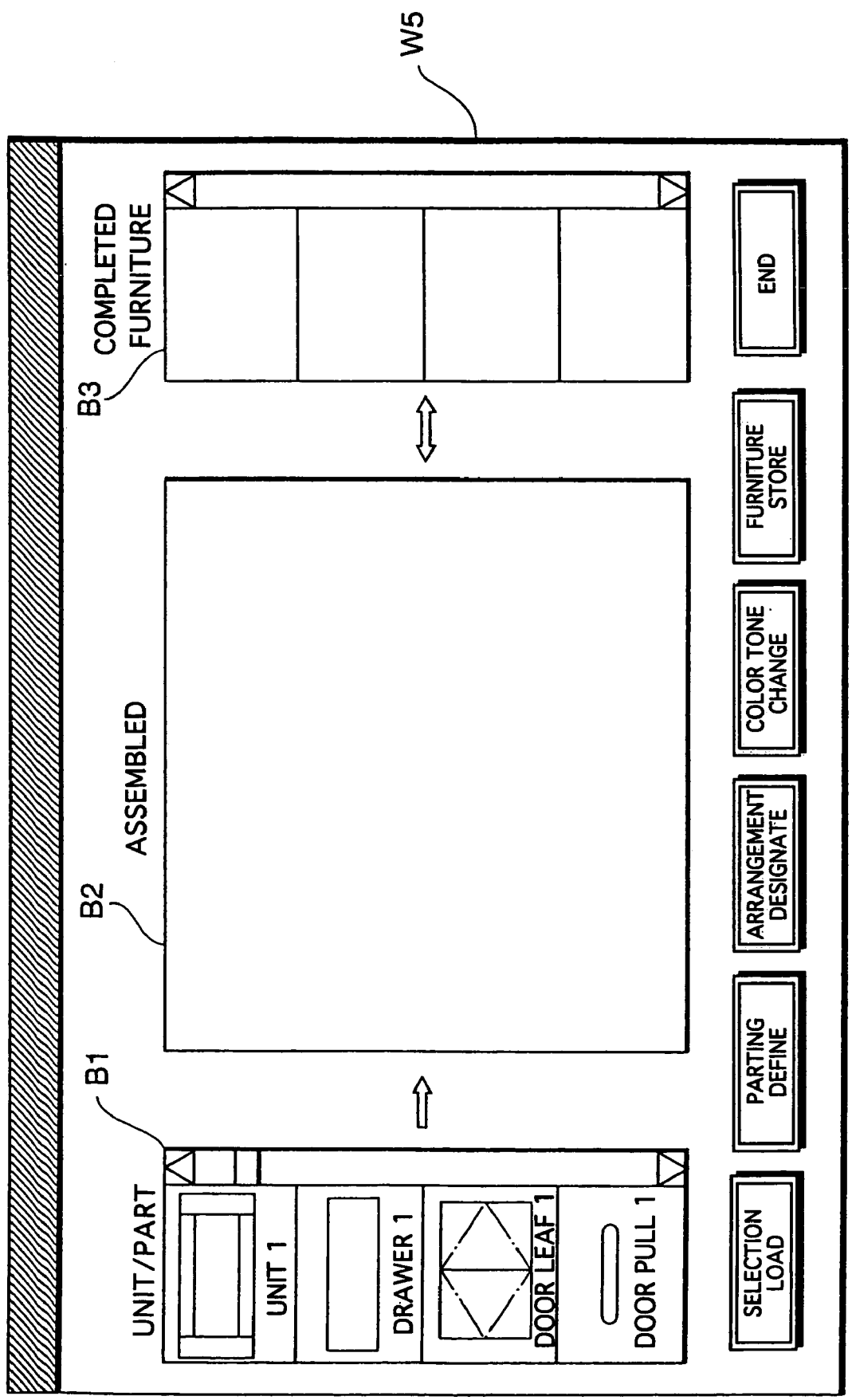
FIG. 42 illustrates an example of display of an assembling main window.

When the "assemble" button is clicked in the main menu window W1 (FIG. 37), the program proceeds to the assembling processing (step 34). As shown in FIG. 42, an assembling main window W5 is displayed in place of or on the main menu window W1 (step 61).

In the assembling main window W5 (FIG. 42), a unit/part display area B1, an assembled furniture display area B2, and a completed furniture display area B3 are displayed. Further, the assembling main window W5 is provided with "selection load", "parting define", "arrangement designate", "color tone change", "furniture store", and "end" buttons.

An image representing a front view of each of the units and the parts which have been subjected to data definition in the above-mentioned unit/part definition processing is displayed in the unit/part display area B1. Under the image representing each of the units and the parts, a unit/part definition name assigned for the unit or the part is displayed. The image representing the unit or the part may not reflect the data representing a size, a color, etc. described in the unit/part definition table (FIG. 18) but may merely represent the type of the unit or the part. In the example of the furniture shown in FIGS. 11 and 12, two units are used. Both the units are of the same type (unit 1) (see the unit/part definition number "001" in the unit/part definition table (FIG. 18)). Accordingly, only an image related to the one unit (unit 1) is displayed in the unit/part display area B1. The same is true for the part.

The assembled furniture display area B2 is used for combining (assembling) the units and the parts which are displayed in the unit/part display area B1. An image representing the results of the combination is displayed.

In the completed furniture display area B3, an image representing completed furniture (or a portion thereof) including the units and the parts is displayed.

In an initial state, the images respectively representing all the units and the parts which have been subjected to data definition in the above-mentioned unit/part definition processing are displayed in the unit/part display area B1 in the assembling main window W5. Nothing is displayed in the assembled furniture display area B2 and the completed furniture display area B3.

Figure 43:
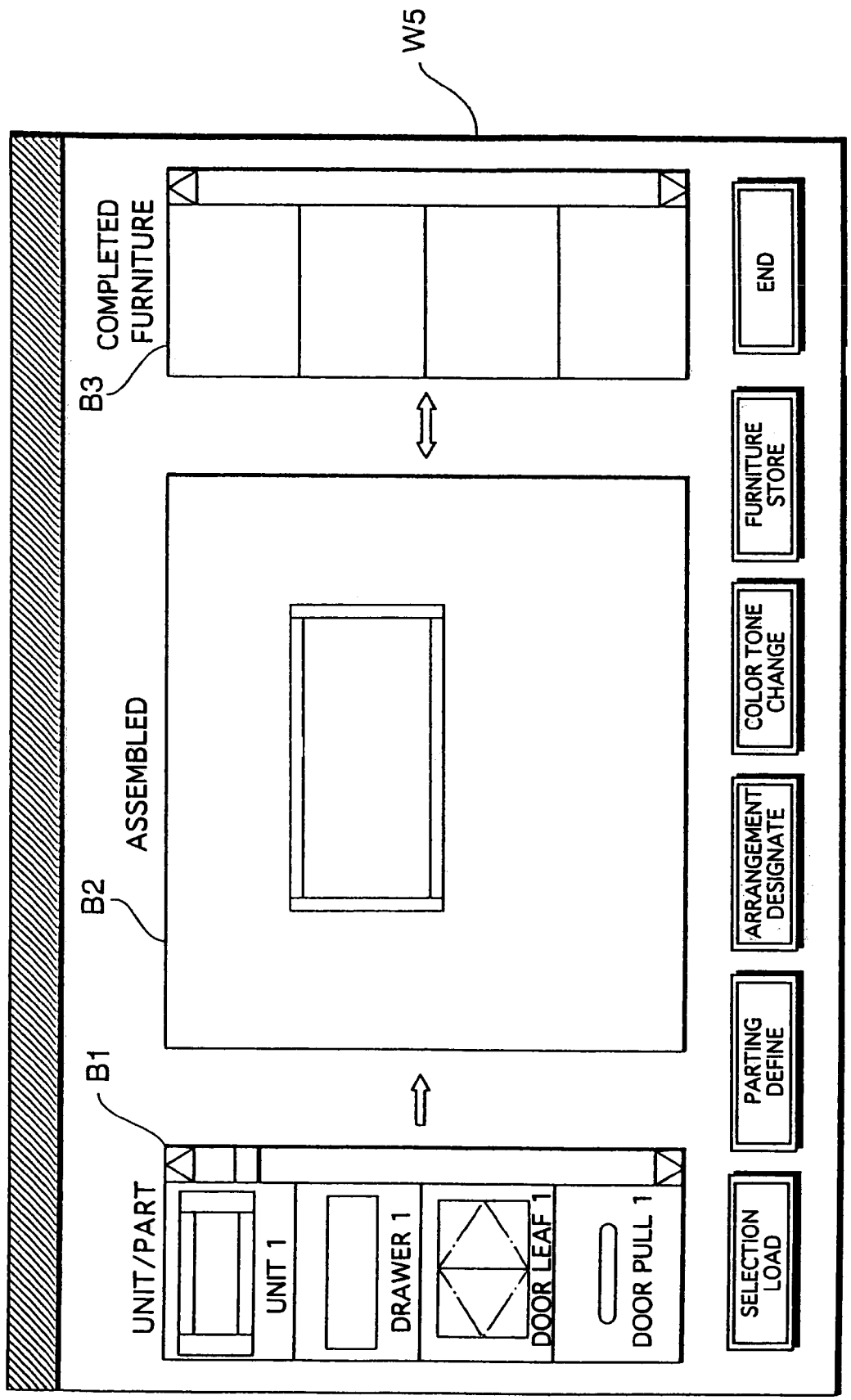
FIG. 43 illustrates an example of display of an assembling main window.

The unit (unit 1) displayed in the unit/part display area B1 is first selected by being clicked using the mouse 13 (step 62), and the "selection load" button is then clicked (step 63) As shown in FIG. 43, the selected unit is displayed in the Assembled furniture display area B2 (steps 64 and 65) (No in the step 64 because the unit is first designated).

The completed furniture is assembled (furniture design data is produced) by clicking using the mouse 13 and selecting the unit or the part, which should be employed for the completed furniture, out of the units and the parts which are displayed in the unit/part display area B1 and designating a manner of combination of the selected unit or part and the unit or part displayed in the furniture display area B2 (for example, which part should be attached, to which cell the part should be attached, etc.).

An example of the flow of assembling of the completed furniture will be specifically described using FIGS. 44(A) to 44(D), 45(A) to 45(D) and FIG. 46.

As described above, the image representing the unit to be used for the completed furniture is first selected by being clicked out of the images respectively representing the units which are displayed in the unit/part display area B1 by the operator (step 62). Thereafter, when the "selection load" button is clicked (step 63), the image representing the selected unit displayed in the unit/part display area B1 is displayed in the assembled furniture display area B2 (No in step 64, step 65, FIG. 44(A), which is the same as the image in the assembled furniture display area B2 shown in FIG. 43). The unit is denoted by reference numeral 210, and a cell in the unit 210 is denoted by reference numeral 200.

The data (size, finishing color, material quality, etc.) stored in the unit/part definition table (FIG. 18) are reflected on the images respectively representing the units and the parts (finally, the image representing the completed furniture) which are displayed in the assembled furniture display area B2. When the definition that the color of a top board (portion 1) of the unit 1 is "no color (a material color)", for example, is stored in the unit/part definition table, an image representing a unit having a top board in the color of the material (a mahogany color) of the top board which is stored in the column "material of portion 1 (top board)" of the unit/part definition table is displayed in the assembled furniture display area B2 on the basis of data representing the material of the top board. Of course, only the shape may be displayed on a screen by omitting the color or the like. In any case, there are data representing the type of unit and data representing the size, the color, the material, etc, of the unit. Therefore, the image representing the unit can be displayed in the assembled furniture display area B2. The image representing the furniture may be displayed in the assembled furniture display area B2 by a program (e.g., CAD software) other than the furniture design support program.

When the unit is displayed in the assembled furniture display area B2, a branch number (-01) in the unit number is adopted and is stored in the column "unit number" of the unit number table (FIG. 15), the unit arrangement table (FIG. 16), and the parting (cell) information table (FIG. 17).

The column "unit/part definition number" and the column "unit/part definition name" related to the unit number "-01" of the unit number table (FIG. 15) respectively store "unit/part definition number" (001) and "unit/part definition name" (unit 1) (which are stored in the unit/part definition table (FIG. 18)) related to the unit displayed in the assembled furniture display area B2. The column "the number of cells" of the unit number table (FIG. 15) stores "1" as an initial value.

The column "overall size", the column "size of portion 1 (top board)", etc. related to the unit number "-01" of the unit arrangement table (FIG. 16) also respectively store the same data as those in the unit/part definition table (FIG. 18). The cell ID "00" of the cell 200 is determined and is stored in the column "cell ID".

A point in the lower left front corner of the unit 210 first displayed in the assembled furniture display area B2 is taken as the origin "(x, y, z)=(0, 0, 0). Three-dimensional coordinates (0, 0, 0) are stored in the column "reference point" related to the unit number "-01" of the unit arrangement table (FIG. 16).

In the parting (cell) information table (FIG. 17), the cell ID "00" for the cell 200 is stored in the column "cell ID". The column "reference point" stores the three-dimensional coordinates (30, 0, 30) of a point in the lower left front corner of the cell 200 which are calculated on the basis of the board thicknesses of a top board and a left side board of the unit 201 on the basis of the point in the lower left front corner (the origin) of the unit 210. The column "size (cW, cD, cH)" stores the width, the depth, and the height (cW, cD, cH)=(940, 610, 390) of the cell 200 (the cell ID "00") which are previously calculated and are temporarily stored in the memory 18 (the size of the cell may be calculated again).

When the completed furniture is caused to include a plurality of units, the image representing the unit is clicked again out of the images respectively representing the units which are displayed in the unit/part display area B1 by the operator (step 69). For example, the image representing the unit 1 which is displayed in the unit/part display area B1 is clicked again, and the "selection load" button is then clicked (step 63). The answer is in the affirmative in the step 64 because one unit has already been displayed in the assembled furniture display area B2. An arrangement designation window W7 is displayed on the display screen, as shown in FIG. 47 (step 66).

The arrangement designation window W7 is a window for designating the positional (arrangement) relationship between two units.

In the arrangement designation window W7, "attachment surface designation" and "alignment" can be inputted with respect to the arrangement relationship between the unit (unit 1) which has already been displayed in the assembled furniture display area B2 (referred to as "displayed unit") and the unit (unit 1) newly selected (referred to as "selected unit") (step 67).

In "attachment surface designation", as shown in FIG. 47, when a top surface of the selected unit and a bottom surface of the displayed unit are joined to each other, "top surface" and "bottom surface" are respectively checked with respect to the selected unit and the displayed unit, and an OK button is clicked. Consequently, the two units (the displayed unit and the selected unit) in a state where the bottom surface of the displayed unit is joined to the top surface of the selected unit are displayed in the assembled furniture display area B2 in the assembling main window W5 (step 68). Generally when the two units are arranged on the upper and lower sides, a top surface and a bottom surface are used for attachment surface designation. When the two units are arranged on the right and left sides, a left surface and a right surface are used for attachment surface designation.

In "alignment", the position where the selected unit is attached to the displayed unit is designated. For example, in a case where the two units are arranged on the upper and lower sides, and the two units are viewed from the front, a left end of the displayed unit and a left end of the selected unit are aligned with each other (are at the same position), "left end" is checked, and the OK button is pressed. The two units (the displayed unit and the selected unit) which are aligned with each other such that their left surfaces are flush with each other are displayed in the assembled furniture display area B2. Generally when the two units are arranged on the upper and lower sides, they are aligned with each other on the right and left sides. When the two units are arranged on the right and left sides, they are aligned with each other with respect to their heights.

When "integrally join" is checked, and the OK button is clicked, there occurs a state where the attachment surfaces are composed of one board (one of the attachment surfaces is erased, and a board perpendicular to the attachment surface is a continuous board). For example, the bottom surface of the displayed unit and the top surface of the selected unit are designated as attachment surfaces, "integrally join" is checked, and the OK button is clicked. In the assembled furniture display area B2, a board on the top surface (a top board) of the selected unit is erased, and respective side boards of the displayed unit and the selected unit are displayed as continuous side boards, and are displayed like one unit (step 68).

"Offset size" is inputted when there is a drawer inside a unit, and a door leaf is attached to a front surface of the unit, for example. When the door leaf is attached to the front surface of the unit using a hinge (when the hinge is provided inside the unit), a predetermined space (a space provided to prevent the drawer accommodated in the door leaf from not being drawn out toward its front surface by getting caught on the hinge) is required in order to make it possible to draw out the drawer toward the front surface. Data representing the space is an offset size.

Figure 50:
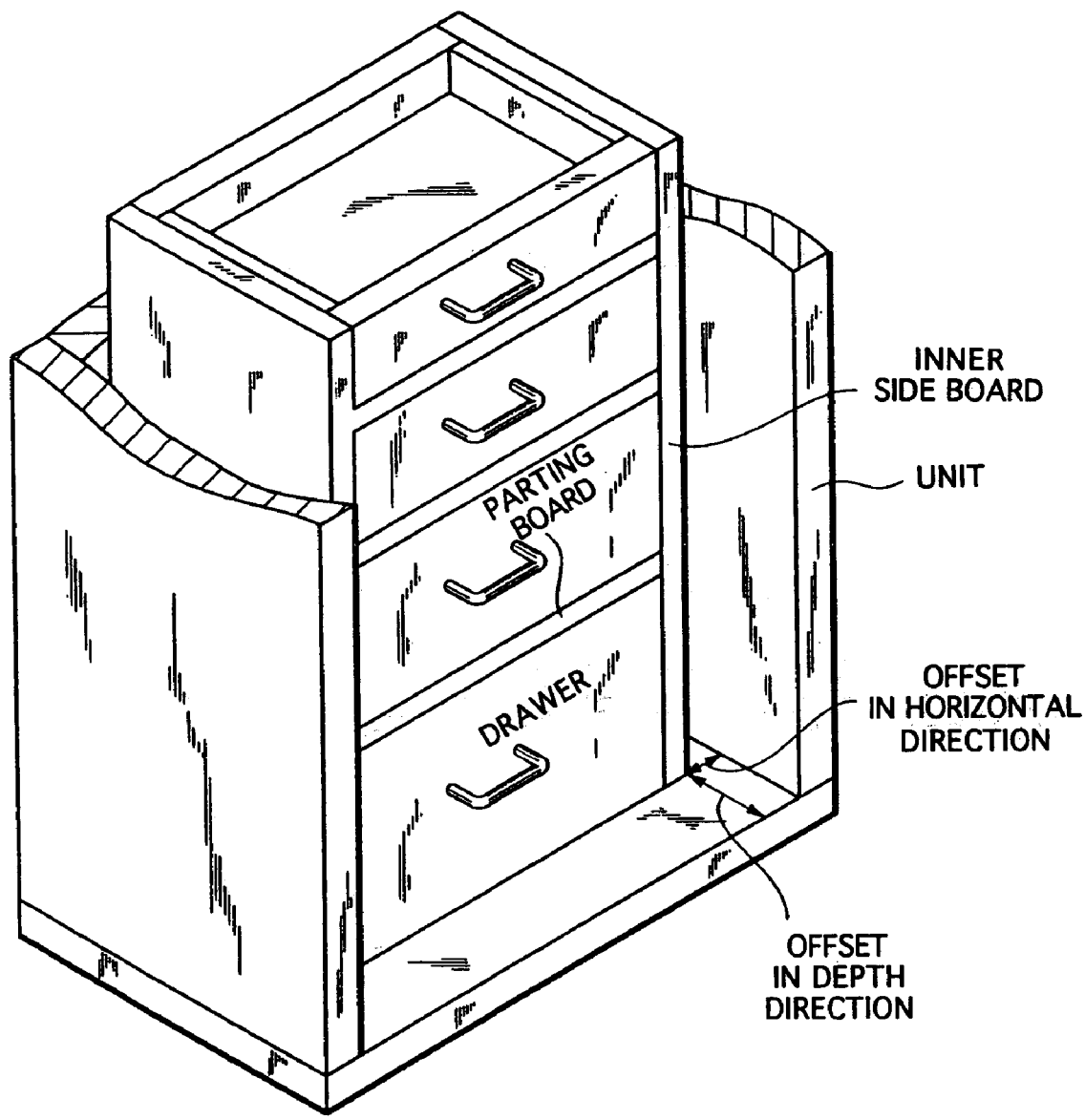
FIG. 50 is a partially broken perspective view showing completed furniture whose offset size is ensured.

FIG. 50 is a broken perspective view showing a part of an example of furniture having an offset size.

In order to ensure an offset and provide drawers in a unit, inner side boards are provided for attaching a parting board receiving each of the drawers (the inner side board need not be positioned as a part, but may appear on a design drawing finally obtained). Examples of the offset include an offset in the horizontal direction representing a gap between an outer surface of the inner side board and an inner surface of a side board of the unit, an offset in the depth direction representing a gap between a front end surface of the inner side board (or a front surface of the drawer) and a front surface of the unit, and an offset in the vertical direction representing a gap between an upper end surface of the top drawer and a bottom surface of a top board of the unit.

Although in the above-mentioned example, the OK button is pressed for each item, the OK button may be clicked after "attachment surface designation", "alignment", "integrally join", and "offset size" are inputted. When the OK button is clicked, the arrangement designation window W7 disappears. In a state where two or more units are displayed in the assembled furniture display area B2 in the assembling main window W5 shown in FIG. 42, even if any of the units is then selected by being clicked, and the "arrangement designate" button is then clicked, the arrangement designation window W7 appears on the display screen.

Figure 44:
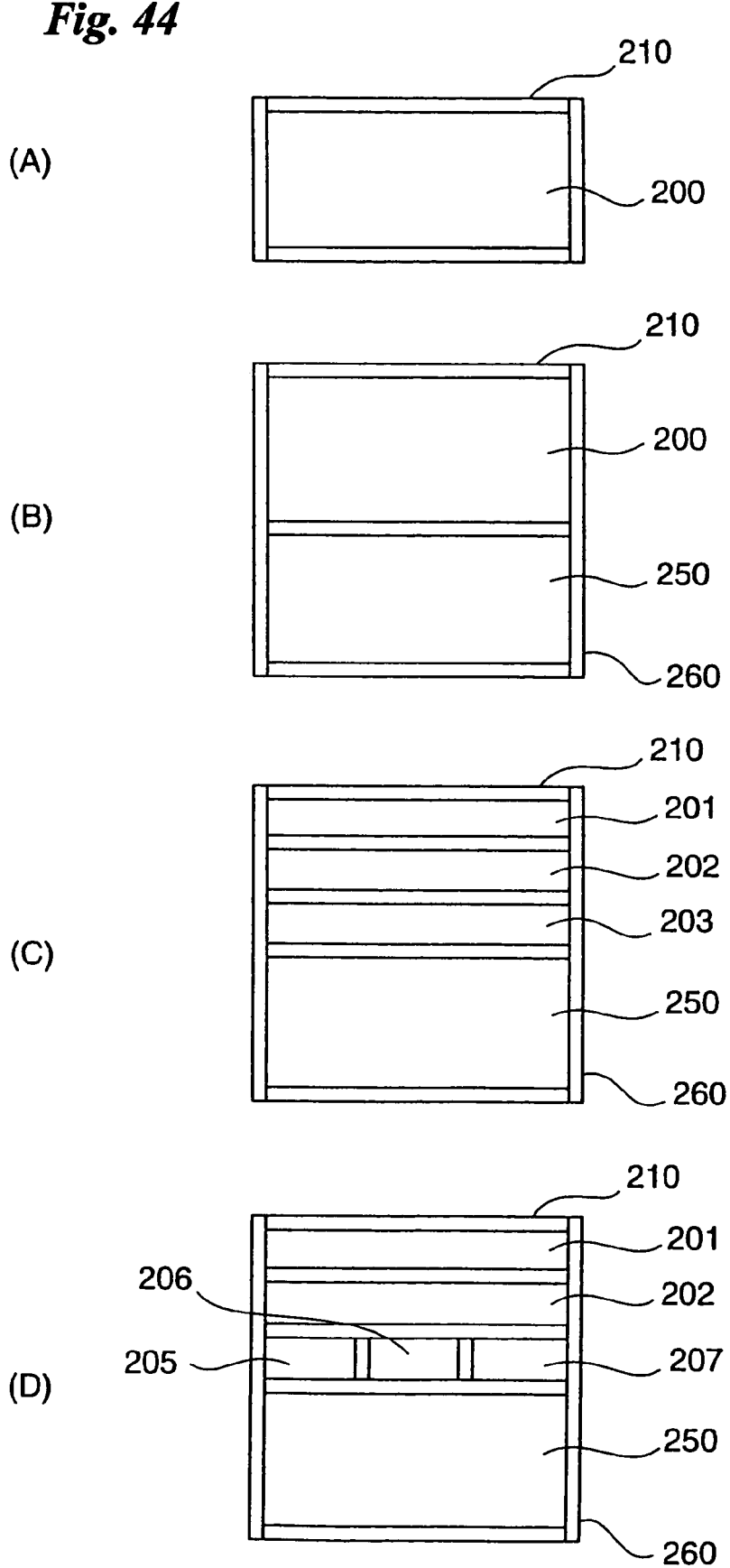
FIGS. 44(A), 44(B), 44(C), and 44(D) illustrate the flow of furniture assembling processing.
Figure 45:
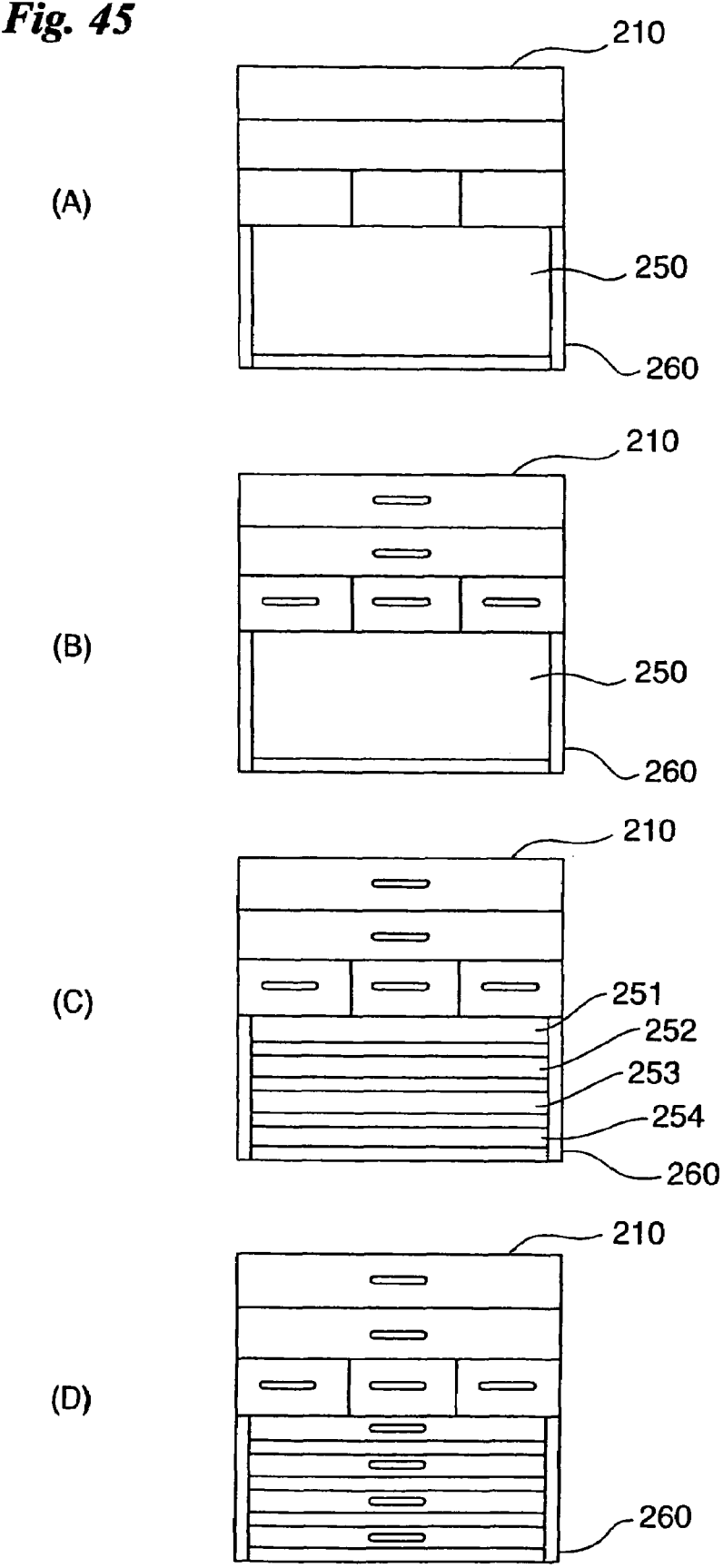
FIGS. 45(A), 45(B), 45(C), and 45(D) illustrate the flow of furniture assembling processing.

FIG. 44 (B) illustrates one unit obtained by integrally joining a top board of a unit 210 and a top board of a unit 260. A cell in the unit 260 is denoted by reference numeral 250.

In the unit number table (FIG. 15), the unit arrangement table (FIG. 16), and the parting (cell) information table (FIG. 17), a branch number (-02) in the unit number is adopted and is stored in the column "unit number".

"001" and "unit 1" are respectively stored in the column "unit/part definition number" and the column "unit/part definition name" related to the unit number "-02" of the unit number table (FIG. 15) by referring to the unit/part definition table (FIG. 18). Further, "1" is set as an initial value in the column "the number of cells" related to the unit number "-02" of the unit number table (FIG. 15).

Data are also respectively stored in the columns such as the column "overall size" and the column "size of portion 1 (top board)" related to the unit number "-02" of the unit arrangement table (FIG. 16) by referring to the unit/part definition table (FIG. 18). A cell ID "00" of the cell 250 is determined and is stored in the column "cell ID".

The three-dimensional coordinates of a point in the lower left front corner of the unit 260 are calculated on the basis of the point in the lower left front corner (the origin) of the unit 210. The calculated three-dimensional coordinates are stored in the column "reference point" related to the unit number "-02" of the unit arrangement table (FIG. 16). Further, in the unit arrangement table (FIG. 16), data indicating "a unit having a branch number -02 is integrally joined to a bottom surface" is stored in the column "arrangement information" related to the unit 210 on the upper side (a branch number "-01"), and data indicating "a unit having a branch number -01 is integrally joined to a top surface" is stored in the column "arrangement information" related to the unit 260 (a branch number "-02").

In the parting (cell) information table (FIG. 17), the cell ID "00" of the cell 250 is stored in the column "cell ID". The coordinates of a point in the lower left front corner of the cell 250 are stored in the column "reference point". The width, the depth, and the height (cW, cD, and cH) of the cell which are previously calculated with respect to the cell 250 and are temporarily stored in the memory 18 are stored in the column "size.

By providing a parting board in a cell formed by a unit, the cell can be divided into a plurality of smaller cells.

Figure 48:
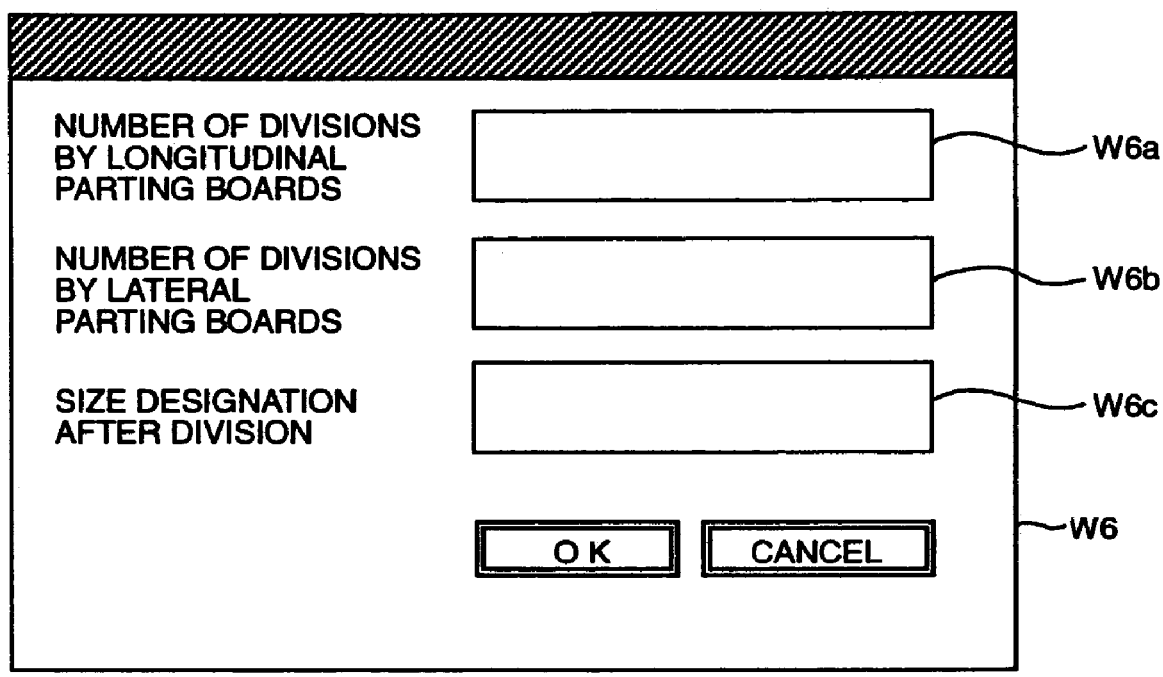
FIG. 48 illustrates an example of display of a parting definition window.

In a state where the unit shown in FIG. 44(B) is displayed in the assembled furniture display area B2, the cell 200 is selected by being clicked using the mouse 13, an image (not shown) representing a parting board is then selected by being clicked in the unit/part display area B1, and the "parting define" button is pressed (step 70 in FIG. 28). As shown in FIG. 48, a parting board definition window W6 is displayed on the display screen (step 81 in FIG. 29) (here, a fixed type parting board shall be selected).

The parting board definition window W6 (FIG. 48) includes three numeric value input boxes W6a, W6b, and W6c for inputting "the number of divisions by longitudinal parting boards", "the number of divisions by lateral parting boards", and "size designation after division".

To the numeric value input box W6a for inputting "the number of divisions by longitudinal parting boards", a number indicating how many spaces (cells) should be formed in a selected cell by parting boards provided in the longitudinal direction is inputted.

To the numeric value input box W6b for inputting "the number of divisions by lateral parting boards", a number indicating how many spaces (cells) should be formed in a selected cell by parting boards provided in the lateral direction is inputted.

When a numeric value is inputted into "the number of divisions by longitudinal parting boards" or "the number of divisions by lateral parting boards" (step 82), and an "OK" button is clicked (OK in step 83), a unit having parting boards provided therein so as to include cells whose number is equal to the inputted number is displayed in the assembled furniture display area B2 (step 84). When the OK button is pressed, the parting board definition window W6 disappears.

In the parting board definition window W6 which appears when the cell 200 is selected, and the "parting define" button is then clicked, a screen displayed in the assembled furniture display area B2 when "3" is inputted into "the number of divisions by lateral parting boards" is illustrated in FIG. 44 (C). Three cells 201, 202, and 203 are formed. The cell 200 is a "parent cell", and the cells 201, 202, and 203 are child cells in the parent cell 200. Since "size designation after division" is not inputted, the parent cell is divided into three cells of an equal height (the size designation after division will be described later).

"1" stored as an initial value in the column "the number of cells" related to the unit number "-01" of the unit number table (FIG. 15) is updated to "4".

"2" representing the number of parts (here, parting boards) attached to the unit having the unit number "-01" is stored in the column "the number of parts" related to the unit number "-01" of the unit arrangement table (FIG. 16).

In the parting board (cell) information table (FIG. 17), numbers "01", "02", and "03" for specifying the cells 201, 202, and 203 are adopted and are respectively stored in the column "cell ID". The three-dimensional coordinates of a point in the lower left front corner of each of the cells 201, 202, and 203 are calculated and are stored in the column "reference point" on the basis of the point in the lower left front corner (the origin) of the unit 210. The width, the depth, and the height of each of the cells 201, 202, and 203 are calculated and are stored in the column "size". "2" indicating that two parting boards are attached in the transverse direction to the cell 200 is stored in the column "the number of lateral parting boards" related to the cell 200 (the cell ID "00"). "00" is stored in the column "parent cell ID" related to each of the cell IDs "01, "02, and "03". A number representing the arrangement order in the longitudinal direction of the cell IDs "01", "02", and "03" in the parent cell (the cell ID "00" (how many cells are there from the bottom) is stored in the column "longitudinal position in parent cell". "1" indicating that the division is the first division is stored in the column "division level" related to each of the cell IDs "01", "02, and "03".

Data related to each of two parting boards newly provided is added to the parting board arrangement table (FIG. 23). Part numbers are respectively adopted with respect to the two parting boards and are stored in the column "part number". Further, a branch number "-01" in a unit number for specifying a unit to which the parting board is attached, a cell ID "00" for specifying a cell to which the parting board is attached, and data related to the parting board attached in the cell 200 are respectively stored in the column "unit number", the column "cell ID", and the columns "unit/part definition number", "unit/part definition name", "finishing color", "material", and "fixed/movable" by referring to the unit/part definition table (FIG. 18). The three-dimensional coordinates of a point in the lower left front corner of the parting board are stored in the column "reference point". The length in the width direction and the length in the depth direction of the parting board are calculated and are stored in the column "size", and the thickness of the parting board is stored therein. The thickness of the parting board is determined by the furniture design support program on the basis of the size of the unit. Of course, it may be a fixed value (a thickness previously defined) or a designated value.

With respect to any one or two of the cells 201, 202, and 203, it is also possible to further provide a lateral parting board or a longitudinal parting board. FIG. 44(D) illustrates, in the parting board definition window W6 (FIG. 48) which appears when the cell 203 is selected, and the "parting define" button is then clicked, an image displayed in the assembled furniture display area B2 when "3" is inputted into "the number of divisions by longitudinal parting boards". The cell 203 is divided by being partitioned by two longitudinal parting boards, so that cells 205, 206, and 207 are formed. The cells 205, 206, and 207 are child cells in the parent cell 203. The respective widths of the cells 205, 206, and 207 are equal.

"4" stored in the column "the number of cells" related to the unit number "-01" of the unit number table (FIG. 15) is updated to "7".

A number representing the number of parts attached to a unit having the unit number "-01" is updated to "4" in the column "the number of parts" related to the unit number "-01" of the unit arrangement table (FIG. 16).

Cell IDs "04", "05", and "06" for respectively specifying the cells 205, 206, and 207 are adopted and are respectively stored in the column "cell ID" of the parting (cell) information table (FIG. 17). The three-dimensional coordinates of a point in the lower left front corner of each of the cells 205, 206, and 207 are calculated and are stored in the column "reference point". The width, the depth, and the height of each of the cells 205, 206, and 207 are calculated and are stored in the column "size". In the column "the number of longitudinal parting boards" related to the cell 203 (the cell ID "03"), "2" indicating that two parting boards are attached in the longitudinal direction to the cell 203. "03" is stored in "parent cell ID" related to the cell IDs "04", "05", and "06". Numbers representing the arrangement orders in the lateral direction of the cell IDs "04", "05", and "06" in the parent cell (the cell ID "03") (how many cells are there from the left) are stored in the column "longitudinal position in parent cell". "2" indicating that the second division is made is stored in the column "division level" related to each of the cell IDs "04", "05", and "06".

Data related to each of two parting boards newly provided is stored in the parting board arrangement table (FIG. 23). Part numbers are respectively adopted with respect to the two parting boards and are stored in the column "part number". A branch number "-01" in a unit number for specifying a unit to which the parting board is attached, a cell ID "00" for specifying a cell to which the parting board is attached, and data related to the parting board attached in the cell 203 are respectively stored in the column "unit number", the column "cell ID", and the columns "unit/part definition number", "unit/part definition name", "finishing color", "material", and "fixed/movable" by referring to the unit/part definition table (FIG. 18). The three-dimensional coordinates of a point in the lower left front corner of the parting board are stored in the column "reference point". The length in the depth direction and the length in the height direction of the parting board are calculated and are stored in the column "size", and the thickness of the parting board is stored therein.

In the parting board definition window W6 (FIG. 48) which appears when any one of cells (child cells) formed by inputting a numeric value to the number of divisions by longitudinal parting boards or the number of divisions by lateral parting boards is selected, and the "parting define" button is then clicked, the width or the height (which may be both the width and the height) of the cell is inputted into the numeric value input box W6c for inputting "size designation after division". Consequently, the width and the height of the selected cell are changed into the width and the height inputted into the numeric value input box W6b for inputting "size designation after division", and are displayed in the assembled furniture display area B2 (the illustration of display after the size change is omitted).

When the width or the height of a cell is changed, data in the column "reference point" related to the cell the width or the height of which has been changed is updated to a reference point (the three-dimensional coordinates of a point in the lower left front corner) of the cell after the size change which is displayed in the assembled furniture display area B2, and data in the column "size" is changed into data representing the changed width, depth, and height of the cell in the parting (cell) information table (FIG. 17).

Furthermore, the width or the height of a cell adjacent to the cell the width or the height of which has been changed is automatically changed. For example, when size change is made such that the height of the cell 201 is increased, the height of the cell 202 adjacent to the cell 201 is reduced by an increased amount of the height of the cell 201. When size change is made such that the height of the cell 202 is increased, each of the height of the cell 201 adjacent to the cell 202 and the heights of the cells 205, 206, and 207 is reduced by a height (a length in the vertical direction) obtained by dividing the increased amount into two equal parts. Data in the column "reference point" related to the adjacent cell and the data in the column "size" are also changed into data respectively representing the reference point of the cell whose size has been changed and the size. Further, when the width or the height of the cell is changed, the arrangement position of a parting board is also changed. Accordingly, data in the column "reference point" of the parting board arrangement table (FIG. 23) is also updated to data representing the arrangement position of the parting board after the change.

FIG. 45(A) illustrates a state where an overset type drawer is accommodated in each of the cells 201, 202, 205, 206, and 207. The drawer is assembled in the following manner.

An image representing "drawer 1" in the unit/part display area B1 in the assembling main window W5 (FIGS. 42 and 43) is selected (step 69 in FIG. 28), the range of a rectangular area including the cells 201, 202, 205, 206, and 207 in the assembled furniture display area B2 is designated using the mouse 13, and the "selection load" button is clicked (step 63). Consequently, an arrangement designation window W8 is displayed, as shown in FIG. 49 (step 66).

The arrangement designation window W8 is for specifying, in a case where the selected part is a part which is identified as an inset type or an overset type, for example, "drawer" or a case where it is a part whose attachment position can be determined, which of "inset" and "overset" should be selected.

When "overset" is selected, and an OK button is clicked (step 67), an image representing an overset type drawer accommodated in each of the cells 201, 202, 205, 206, and 207 is displayed in the assembled furniture display area B2 (step 68, FIG. 45(A)).

In the column "the number of parts" related to the unit number "-01" of the unit arrangement table (FIG. 16), a number representing the number of parts which are attached to the unit having the unit number "-01" is updated to "9".

In the parting board (cell) information table (FIG. 17), "drawer 1" is stored in the column "arranged part definition name" related to each of the cell 201 (the cell ID "01"), the cell 202 (the cell ID "02"), the cell 205 (the cell ID "04"), the cell 206 (the cell ID "05"), and the cell 207 (the cell ID "06").

In the drawer arrangement table (FIG. 19), data related to each of five drawers newly provided is added. Part numbers are respectively adopted with respect to the five drawers, and are stored in the column "part number". Further, a branch number "-01" in a unit number for specifying a unit to which the drawers are attached, a cell ID for specifying a cell to which the drawer is attached, and data related to the drawer (drawer 1) are respectively stored in the column "unit number", the column "cell ID", and the columns "unit/part definition number", "unit/part definition name", "finishing color (front panel)", "material (front panel)", "finishing color (other than front panel)", and "material (other than front panel)" by referring to the unit/part definition table (FIG. 18). The three-dimensional coordinates of a point in the lower left front corner of the drawer are stored in the column "reference point". The width, the depth, and the height of the drawer are respectively stored in the column "size". The respective sizes of the two drawers provided in the cells 201 and 202 are approximately equal to each other, and the respective sizes of the three drawers provided in the cells 205, 206, and 207 are approximately equal to each other. Data indicating that a designated setting method is an overset type is stored in the column "setting method".

Of course, one of the cells can be also selected one by one, to provide the drawer for the cell.

In the assembled furniture display window W5, the door pull 1 is selected from the unit/part display area B1 (step 69 in FIG. 28), and the range of a rectangular area (a range in which the drawers are accommodated) including the cells 201, 202, 205, 206, and 207 is designated using the mouse 13 in the assembled furniture display area B2. Thereafter, even when the "selection load" button is clicked (step 63), the arrangement designation window W8 (FIG. 49) is also displayed (step 66). The displayed arrangement designation window W8 is for designating the arrangement position with respect to the door pull. In which position the selected part is arranged in a portion selected by the designation of the range (any of "standard", "upper end", "lower end", or "center" in each of the height direction and the horizontal direction) is determined, and the position is inputted.

When the OK button is clicked, assuming that the attachment position is "center" with respect to "height" and "center" with respect to "right or left" (step 67), an image in a case where a door pull is attached near the center of each of the five drawers is displayed in the assembled furniture display area B2, as shown in FIG. 45(B) (step 68).

A number representing the number of parts attached to the unit having the unit number "-01" is updated to "14" in the column "the number of parts" related to the unit number "-01" of the unit arrangement table (FIG. 16).

"1" representing the number of parts (door pulls) respectively attached to the drawers is stored in the column "the number of parts" of the drawer arrangement table (FIG. 19).

Data related to each of the five door pulls newly provided is added to the door pull arrangement table (FIG. 21). A part number is adopted for each of the five door pulls, and is stored in the column "part number". A branch number "-01" in a unit number for specifying a unit to which the door pulls are attached, the part number of the part (the drawer) to which the door pull is attached, a cell ID for specifying a cell to which the door pull is attached, and data related to the door pull (door pull 1) are respectively stored in the column "unit number", the column "parent part number", the column "cell ID", and the columns "unit/part definition number", "unit/part definition name", "finishing color", and "material" by referring to the unit/part definition table (FIG. 18). Data indicating that the door pull is arranged at the center of the drawer and the three-dimensional coordinates of a point in the lower left front corner of the door pull are respectively stored in the column "arrangement information" and the column "reference point". The width, the depth, and the height of the door pull are respectively stored in the column "size".

FIG. 45(C) illustrates a state where three lateral parting boards are provided in the cell 250 in the lower unit 260, and the cell 250 is divided into four cells 251, 252, 253, and 254. FIG. 45(D) illustrates a state where inset type drawers are respectively accommodated in the four cells 251, 252, 253, and 254, and a door pull is attached to each of the drawers. Processing for displaying an image illustrated in FIG. 45(C) in the assembled furniture display area B2 is the same as the above-mentioned processing for displaying the image illustrated in FIG. 44(C) in the assembled furniture display area B2. Processing for assembling an image illustrated in FIG. 45(D) in the assembled furniture display area B2 is the same as the processing for displaying the images illustrated in FIGS. 45(A) and 45(B) in the assembled furniture display area B2. When the inset type drawer is assembled, an attaching method may be set to "inset" in an arrangement designation window W8 (FIG. 49).

Figure 46:
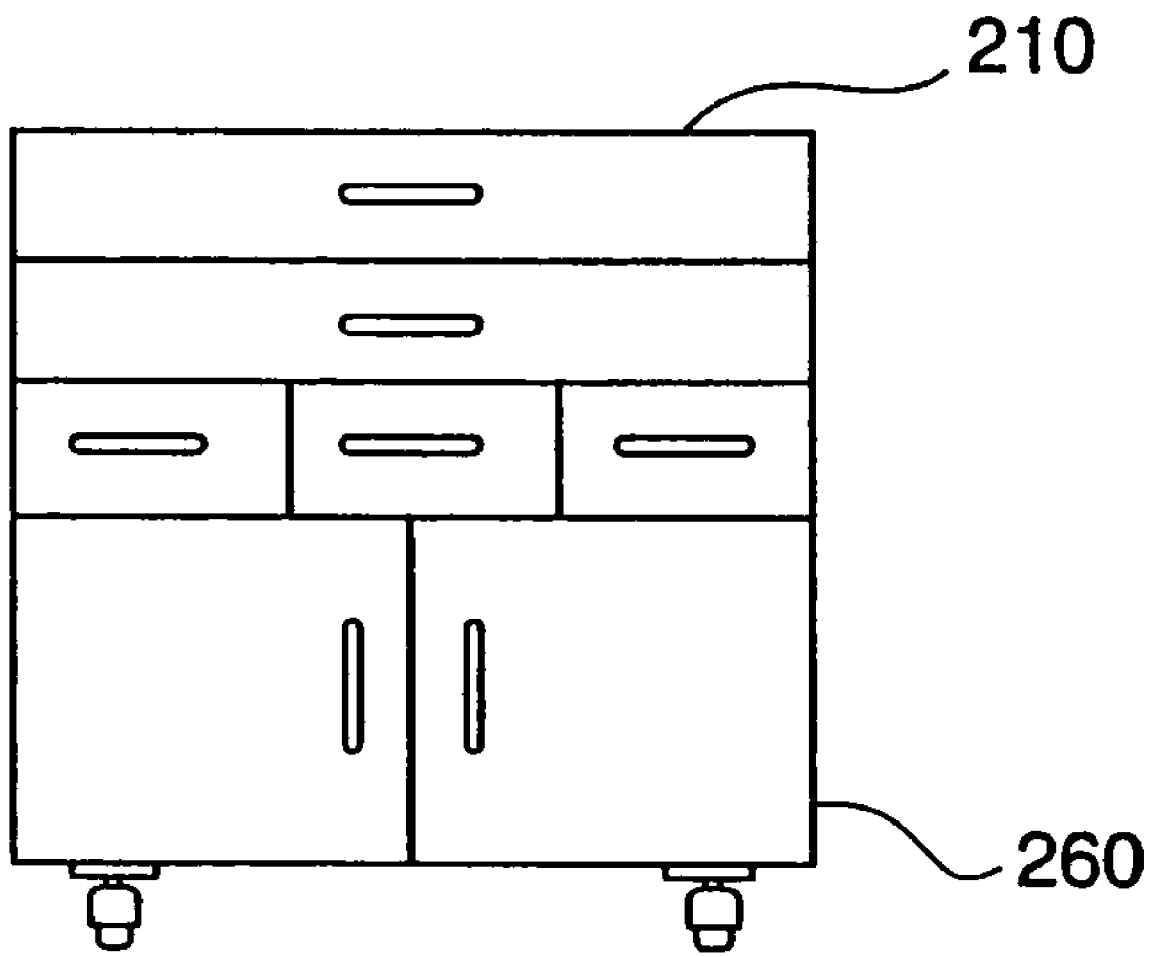
FIG. 46 illustrates the flow of furniture assembling processing.

An image in a state where a door leaf is attached to a portion of the cell 250 in the lower unit 260, door pulls are attached to the door leaf, and casters are attached to a bottom surface of the unit 260 is shown in FIG. 46. An image representing "door leaf 1" in the unit/part display area B1 in the assembling main window W5 is selected (step 69), the range of a rectangular area including the cell 250 is then designated in the assembled furniture display area B2, and the "selection load" button is clicked (step 63). When "overset" is selected in the arrangement designation window W8 (step 67), an image in a state where a door leaf is attached by an overset attaching method is displayed in the assembled furniture display area B2 (step 68). Further, "door pull 1" is selected from the unit/part display area B1 (step 69), and the range of a rectangular area including the cell 250 (a range in which the door leaf is attached) is designated in the assembled furniture display area B2. Thereafter, the attachment position is set to "standard" with respect to "height" and is set to "standard" with respect to "right or left" in the arrangement designation window W8 displayed when the "selection load" button is clicked (step 67). An image in a state where a door pull is attached to a portion in the vicinity of an opening or closing portion of a door leaf and near the center in the height direction of the door leaf is displayed in the assembled furniture display area B2 (step 68). An image (not shown) representing "caster" in the unit/part display area B1 in the assembling main window W5 is selected (step 69), the unit 260 is then selected in the assembled furniture display area B2, and the "selection load" button is clicked (step 63). In the arrangement designation window W8, when "standard" and "standard" are respectively selected with respect to "height" and "right or left" (step 67), an image in a state where casters are respectively attached to the four corners of a bottom surface of the unit 260 is displayed in the assembled furniture display area B2 (step 68).

Data are successively stored in the unit number table (FIG. 15), the unit arrangement table (FIG. 16), the parting (cell) information table (FIG. 17), the drawer arrangement table (FIG. 19), and the door pull arrangement table (FIG. 21) as the parting board, the drawer, and the door pull are provided in the unit 260 (the cell 250), as in the above-mentioned case where the parting board, the drawer, and the door pull are attached to the unit 210 (the cell 200).

In the door leaf arrangement table (FIG. 20), data related to a door leaf attached to the cell 250 in the unit 260 is stored. A part number for the door leaf is adopted and is stored in the column "part number". A branch number "-02" in a unit number for specifying a unit to which the door leaf is attached, a cell ID "00" for specifying the cell 250 to which the door leaf is attached, and data related to the door leaf (door leaf 1) are respectively stored in the column "unit number", the column "cell ID", and the columns "unit/part definition number", "unit/part definition name", "finishing color", and "material" by referring to the unit/part definition table (FIG. 18). The three-dimensional coordinates of a point in the lower left front corner of the door leaf are stored in the column "reference point". The width, the depth, and the height of the door leaf are stored in the column "size". Data indicating that an inset type door leaf is attached and the number of parts (door pulls) attached to the door leaf are respectively stored in the column "setting method" and the column "the number of parts".

In the leg arrangement table (FIG. 22), data related to a leg (a caster) attached to a bottom surface of the unit 260 is stored. A part number for the caster is adopted and is stored in the column "part number". A branch number "-02" in a unit number for specifying a unit to which the caster is attached, and data related to the caster are respectively stored in the column "unit number" and the columns "unit/part definition number", "unit/part definition name", and "finishing color" by referring to the unit/part definition table (FIG. 18). The three-dimensional coordinates of the center of a joint portion between the leg positioned at the left front of the unit and the bottom surface of the unit are stored in the column "reference point". The width, the depth, and the height of the caster are respectively stored in the column "size"

As an image displayed in the assembled furniture display area B2 in the assembled furniture display window W5 is thus successively changed, data (furniture design data) stored in various types of tables stored in the HD are successively updated.

When the "color tone change" button is clicked in the assembled furniture display window W5 (step 72), a color tone change window is displayed (step 91 in FIG. 30) (the color tone change window is not illustrated). In the color tone change window, the finishing color (painting color) (including a pattern) and the kind of wood or the like (including grain) of a unit or a part displayed in the assembled furniture display area B2 can be changed. A portion (a top board, a baseplate, a left side board, or a right side board) of a unit the finishing color or the kind of wood or the like of which is desired to be changed or part (or a portion thereof) is clicked and is designated in the assembled furniture display area B2, the color and the kind of wood which will be changed are then designated (step 92), and an OK button is clicked ("OK" in step 93). The unit or the part having the designated color or wood or the like is displayed in the assembled furniture display area B2, and the furniture design data 25 is changed (step 94).

When the finishing color of the top board of the unit having the unit number "-01" is changed, for example, data in the column "finishing color" related to a portion 1 (a top board) of the unit arrangement table (FIG. 16) is updated to data representing the changed finishing color.

When the kind of wood composing the unit is changed, the thickness of a board composing the unit will be calculated again. The thickness of the board depending on the changed kind of wood is determined again (see FIG. 27).

Figure 51:
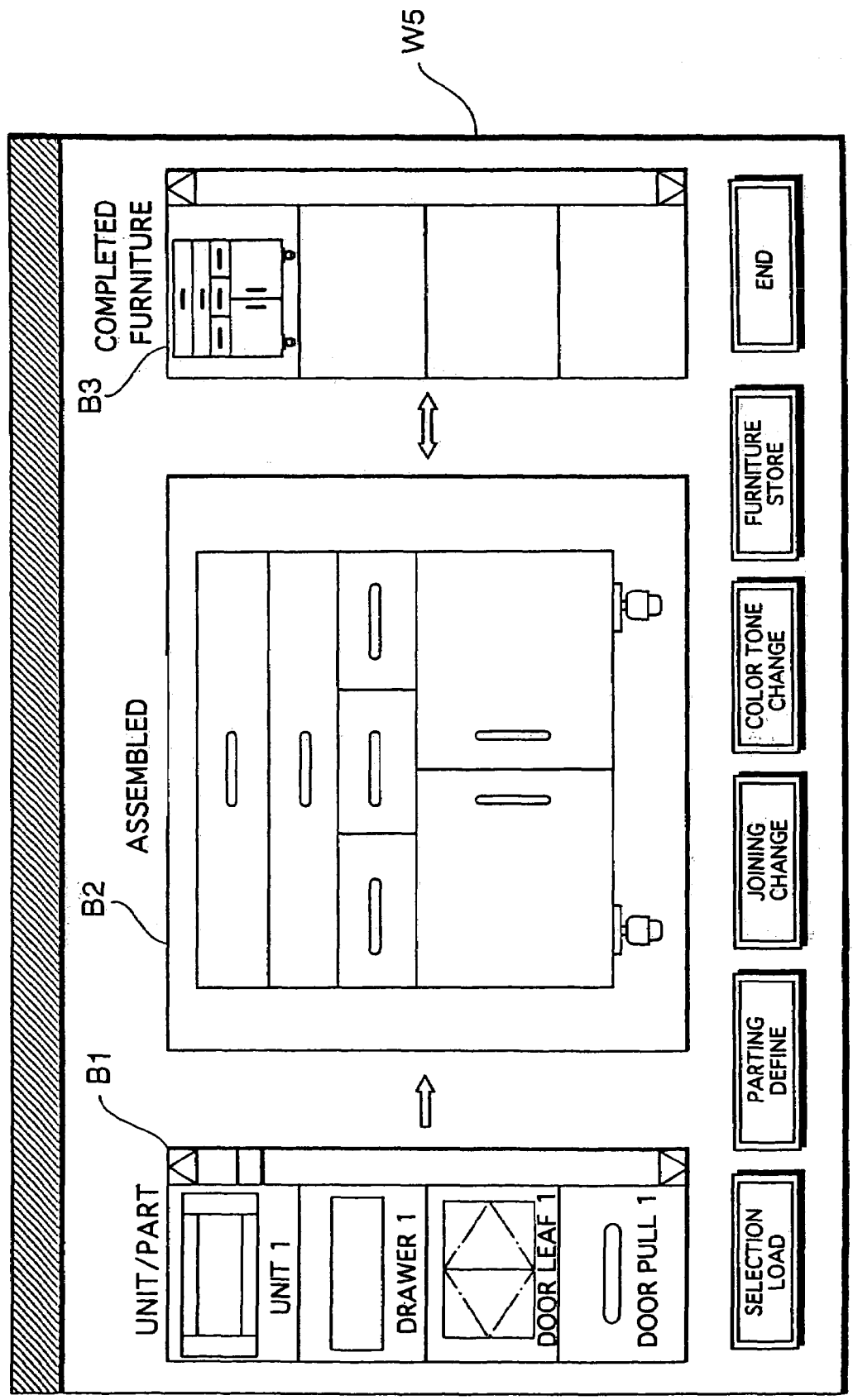
FIG. 51 illustrates an example of display of an assembling main window.

When the "furniture store" button is clocked in the assembled furniture display window W5 (step 73), the furniture displayed in the assembled furniture display area B2 is reduced in size and is displayed in the completed furniture display area B3, as shown in FIG. 51 (step 74).

A number ("1113") is adopted with respect to the furniture displayed in the assembled furniture display area B2 and is stored in the column "furniture number" of the completed furniture table (FIG. 14). The furniture number is also stored in the column "unit number" of the unit arrangement table (FIG. 16), the parting board (cell) information table (FIG. 17), or the like.

In the assembling main window W5, the parting board definition (step 70), the arrangement designation (step 71), the color tone change (step 72), and the furniture storage (step 73) may be performed in any order. For example, after the color of the top board of the unit is changed by the color tone change (step 72), the parting board definition (step 70) can be also performed. Alternatively, after furniture design data is stored by the furniture storage (step 73), the color tone change (step 72) can be also performed.

When the parting board definition, the arrangement designation, or the color tone change is performed after the furniture storage (step 73), completed furniture before and completed furniture after the parting board definition, the arrangement designation, or the color tone change are respectively displayed in the completed furniture display area B3.

When the "end" button is clicked (step 75), the assembling processing is terminated. The main menu window W1 is displayed again on the display screen of the display device 11 (step 31).

The furniture design data is thus stored in various types of tables which are linked to each other, so that the rough design of furniture having a structure or the like desired by a customer is terminated. Thereafter, the rough design will be corrected, if required.

3.4 Drawing Display/Printing Processing

Drawing display/printing processing is for displaying the appearance or the like of completed furniture on the display screen of the display device on the basis of data stored in various types of data tables for the HD in the assembling processing (step 34), or printing to output a design drawing or the like of the completed furniture using the printer 17.

FIGS. 31 to 36 are flow charts showing the procedure for the drawing display/printing processing. Here, a display screen (a window) shown in FIGS. 52 to 59 is referred to.

Figure 52:
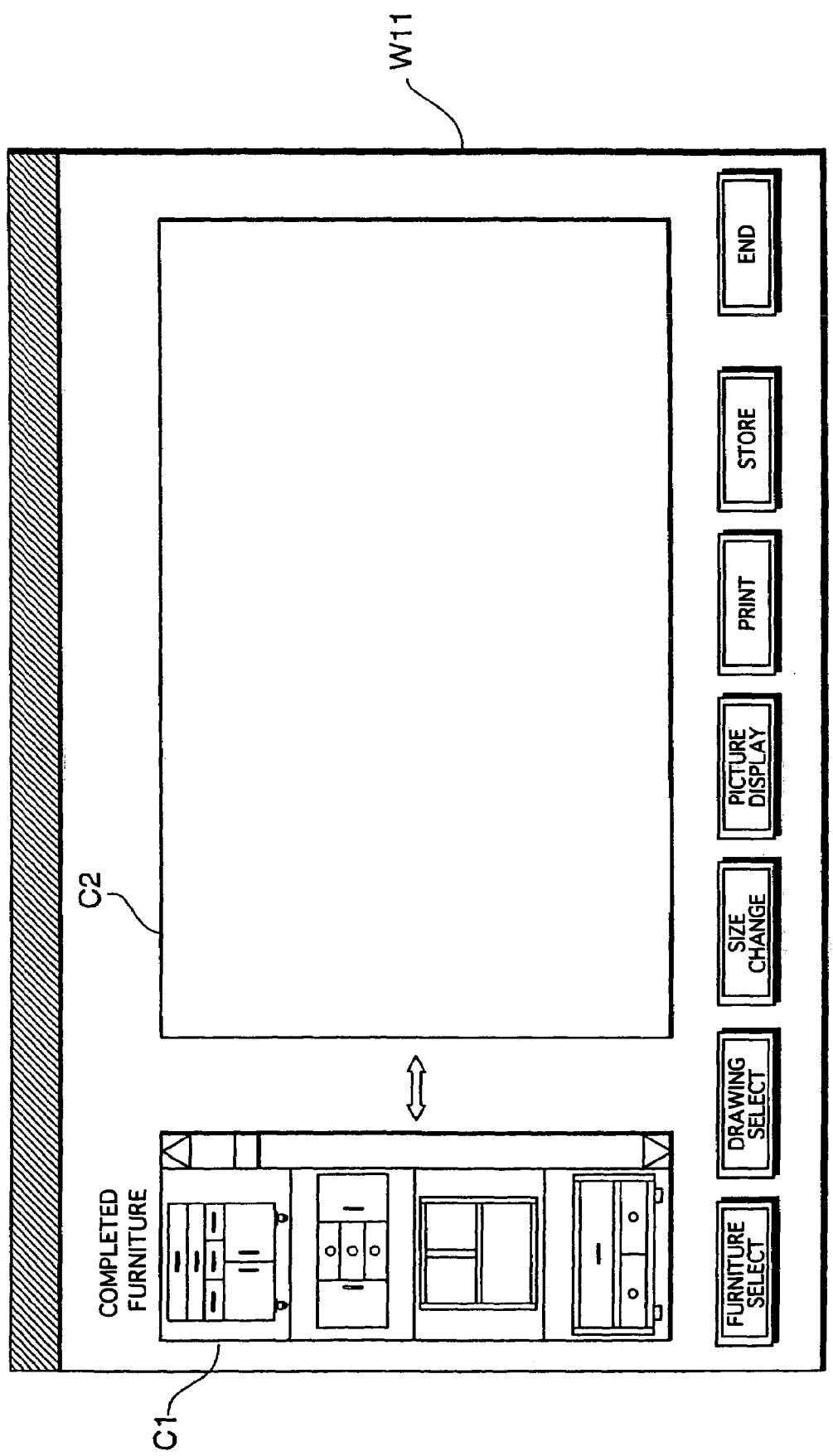
FIG. 52 illustrates an example of display of a completed furniture display window.
Figure 53:
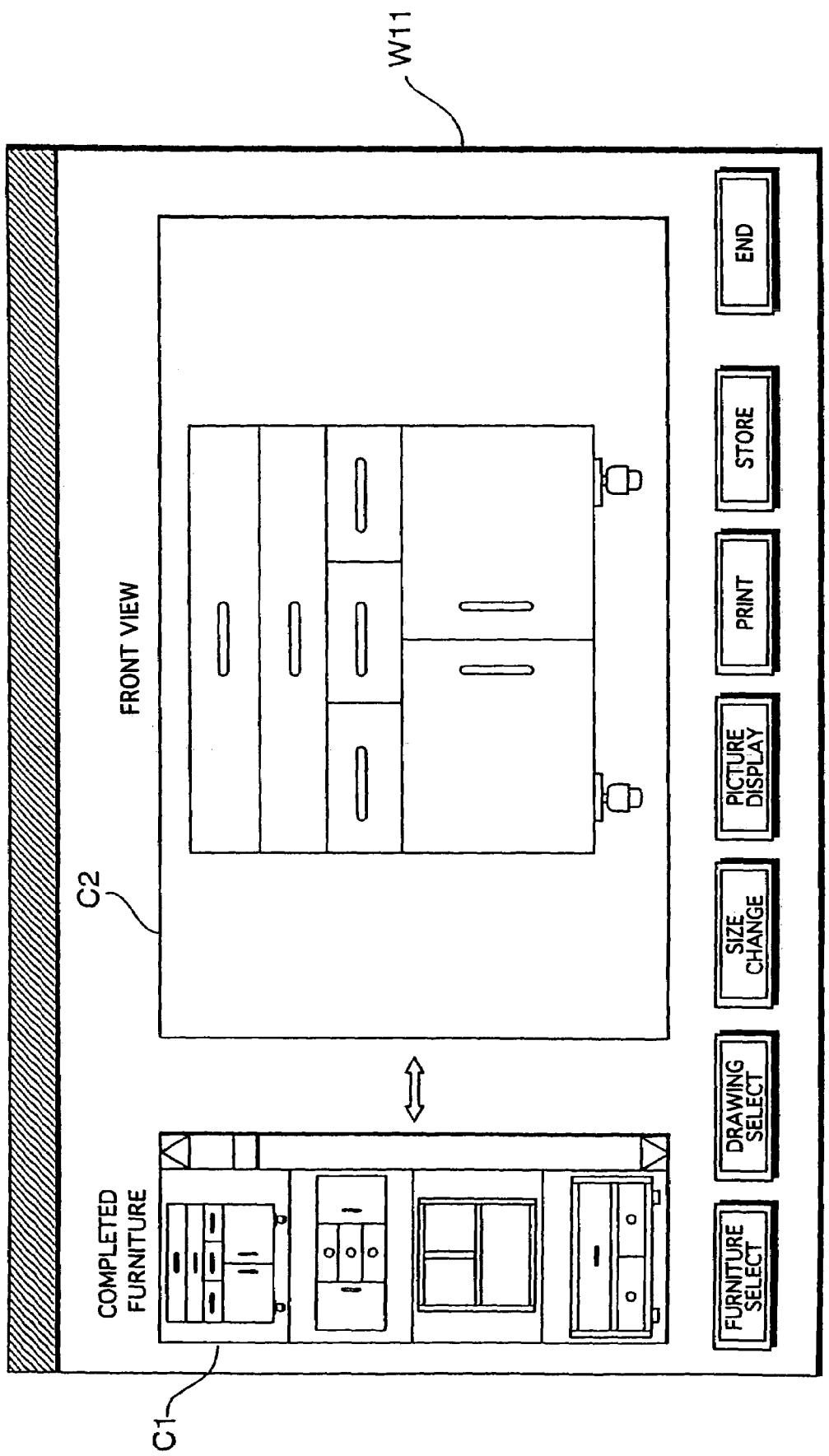
FIG. 53 illustrates an example of display of a completed furniture display window.

When the "drawing display/print" button is clicked in the main menu window W1 (step 35), a completed furniture display window W11 is displayed, as shown in FIG. 52 (step 101).

The completed furniture display window W11 (FIG. 52) includes a completed furniture display area C1 and a completed furniture drawing display area C2. Further, "furniture select", "drawing select", "size change", "picture display", "print", and "end" buttons are provided therein.

An image representing completed furniture assembled by the above-mentioned assembling processing is displayed in the completed furniture display area C1. When there are a plurality of pieces of completed furniture assembled by the assembling processing, furniture design data respectively related to the plurality of pieces of completed furniture are stored in each of the above-mentioned types of data tables. That is, when the furniture design data respectively related to the plurality of pieces of completed furniture are stored in the data table, images respectively representing the plurality of pieces of completed furniture which are represented by the furniture design data are displayed in the completed furniture display area C1. On the other hand, in an initial state, nothing is displayed in the completed furniture drawing display area C2.

The image representing the completed furniture on which a design drawing should be printed is selected by being clicked out of the images respectively representing the completed furniture which are displayed in the completed furniture display area C1 (step 102), and the "furniture select" button is then clicked (step 103). A front view of the selected completed furniture is displayed in the completed furniture drawing display area C2 (step 104, FIG. 53).

Figure 32:
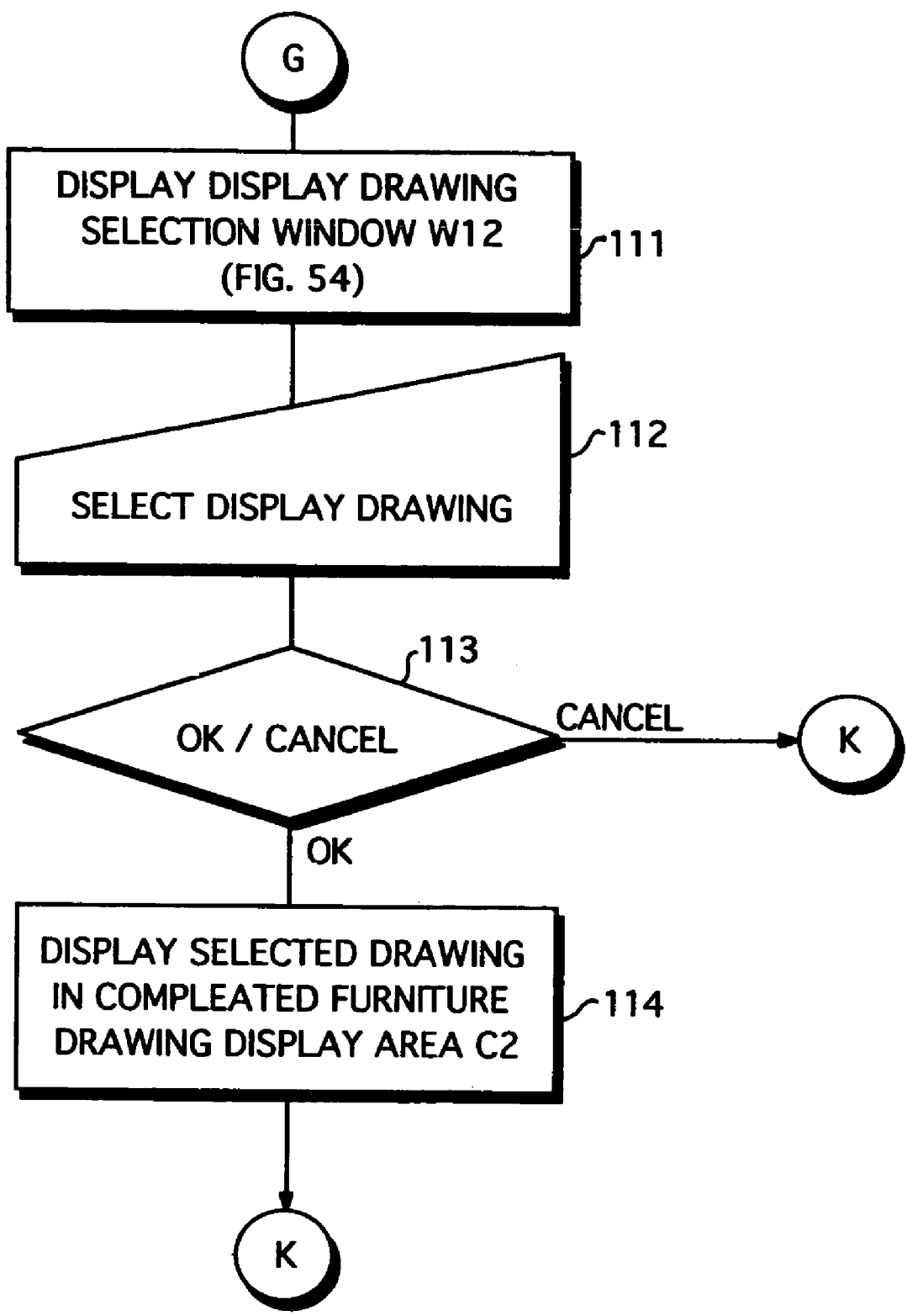
FIG. 32 is a flow chart showing the flow of display drawing selection processing.
Figure 33:
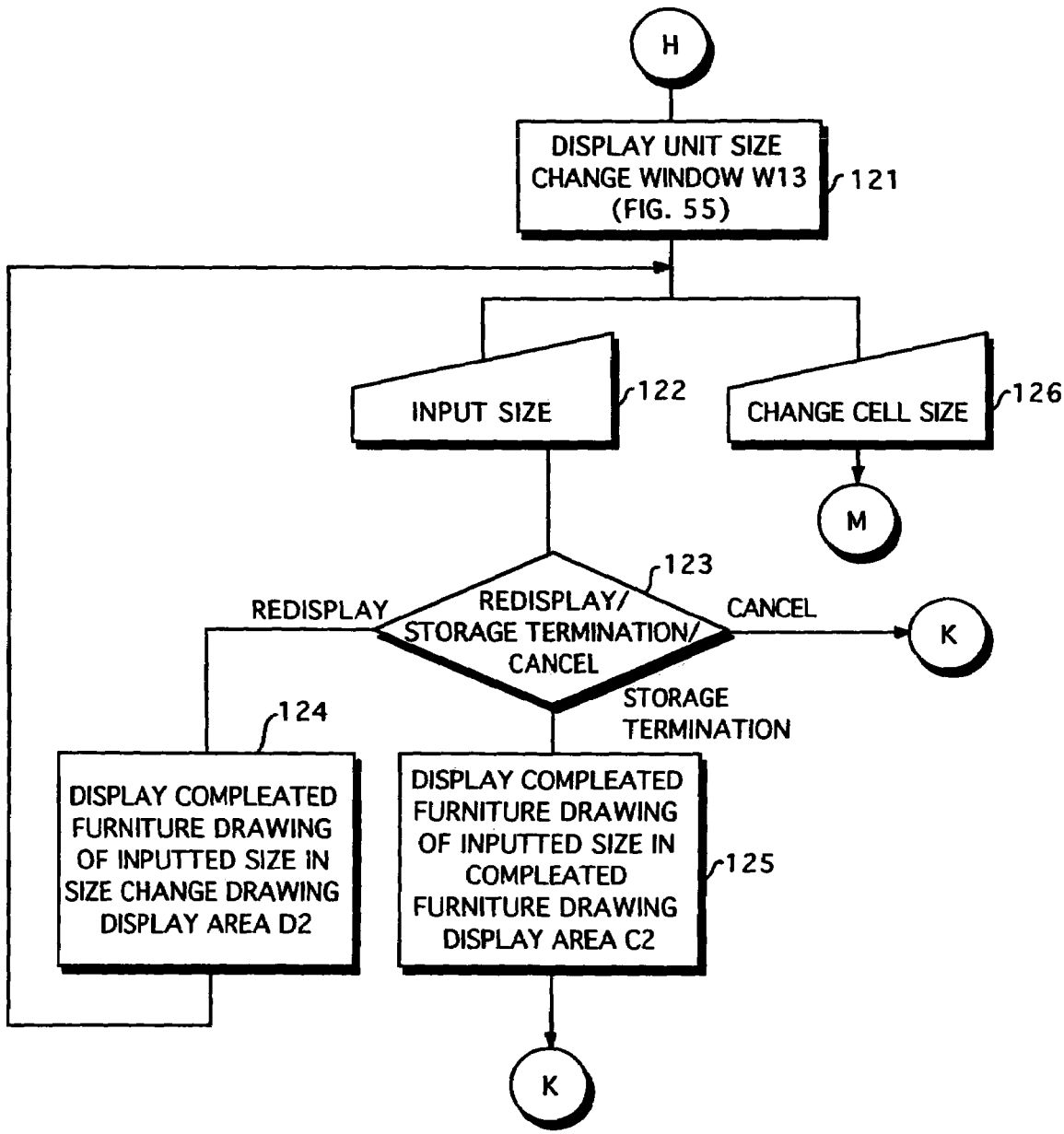
FIG. 33 is a flow chart showing the flow of unit size change processing.
Figure 54:
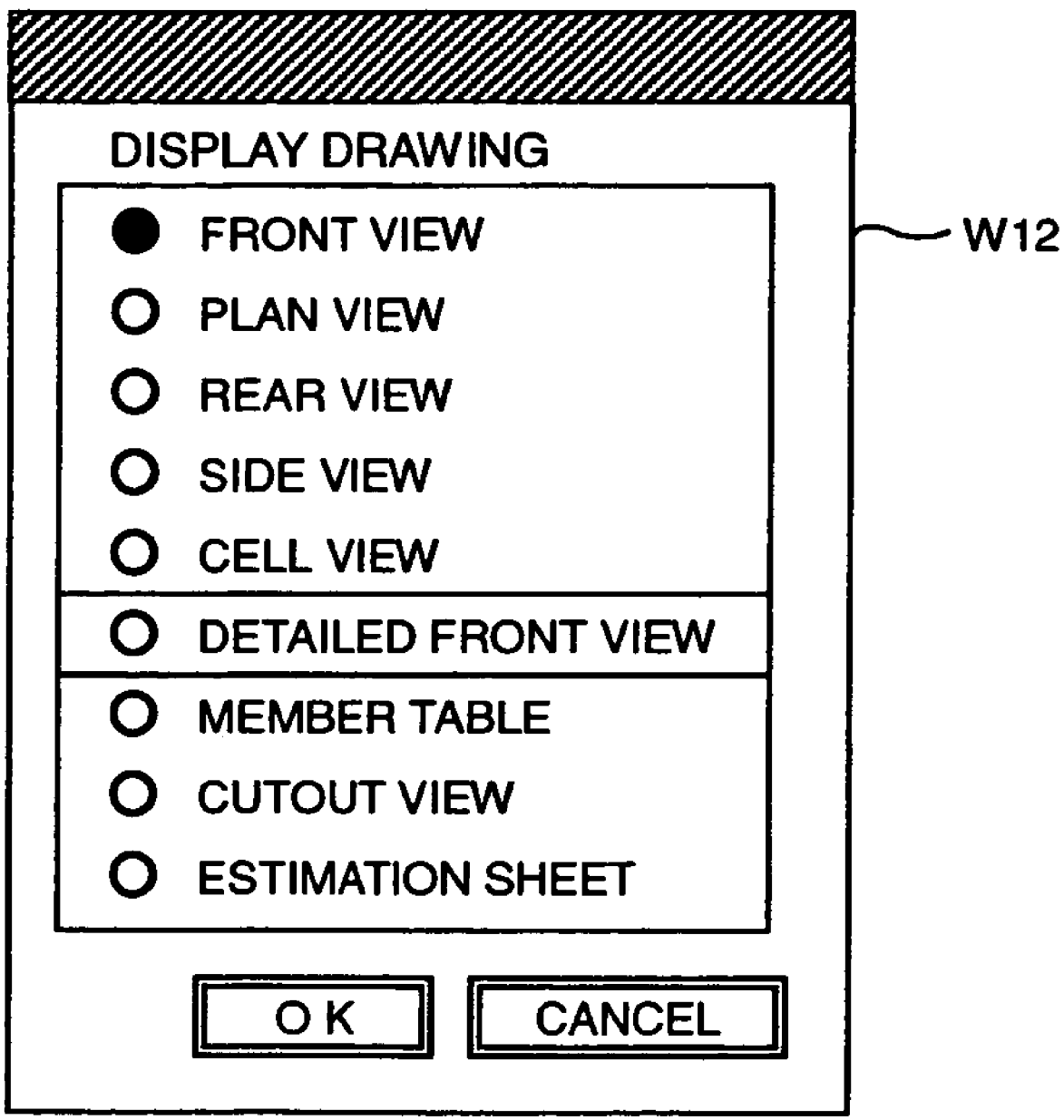
FIG. 54 illustrates an example of display of a display drawing selection window.

When the "drawing select" button is clicked (step 106), a display drawing selection window W12 is displayed, as shown in FIG. 54 (step 111 in FIG. 32).

The display drawing selection window W12 (FIG. 54) is used for choosing which of drawings (any one of "front view", "plan view", "rear view", "side view", "cell view", and "detailed front view"), "member table", "cutout view", and "estimation sheet" should be displayed on the completed furniture display window W11.

With respect to any one of "front view", "plan view", "rear view", "side view", "cell view", and "detailed front view", "member table", "cutout view", and "estimation sheet", a corresponding circular input box is clicked (step 112). The color of the checked circular input box is changed.

When any one of "front view", "plan view", "rear view", "side view", and "cell view" is clicked, and an OK button is clicked (OK in step 113), the clicked drawing is displayed in the completed furniture drawing display area C2 in the completed furniture display window W11 (step 114).

The unit arrangement table (FIG. 16) stores, with respect to a unit included in completed furniture, positional information (a reference point (x, y, z)) related to the lower left front corner of the unit, and stores the size (uW, uD, uH) of the unit. A data table related to parts, for example, the parting (cell) information table (FIG. 17) or the drawer arrangement table (FIG. 19) stores positional information (a reference point) related to each of the parts, and stores data representing the size of the part.

The furniture design support program performs rendering processing for generating three-dimensional drawing data (data representing the coordinates of a vertex, a side, and a surface, and their mutual relation) related to the completed furniture on the basis of data representing "reference point" and data representing "size" which are stored in the above-mentioned data table related to the unit and the parts, to display a two-dimensional image on the display screen of the display device 11. By the rendering processing, calculation is made as to in which form a three-dimensional object is seen in the two-dimensional image (coordinate transformation) on the basis of the three-dimensional drawing data, and a line and a surface of a hidden portion are then removed (hidden line removal and hidden surface removal), so that image data representing the two-dimensional image is generated on the display screen of the display device 11.

When "front view" is selected (step 112), the furniture design support program displays a front view of the completed furniture in the completed furniture drawing display area C2 (step 114). Similarly, when "plan view", "rearview", and "side view" are selected (step 112), the furniture design support program displays a plan view, a rear view, and a right side view of the completed furniture in the completed furniture drawing display area C2. The front view, the plan view, the rear view, and the side view of the completed furniture can be also displayed on the basis of the furniture design data without performing the rendering processing (see FIGS. 11 and 12).

When "cell view" is selected (step 112), the furniture design support program displays in the completed furniture drawing display area C2 a front view of the furniture in a state where parts excluding a parting board, for example, a drawer and a door leaf are removed from the completed furniture.

When "detailed front view" is selected (step 112), the furniture design support program displays in the completed furniture drawing display area C2 an image obtained by shading the front view (or a perspective view) of the completed furniture.

When "member table" is selected, the furniture design support program displays in the completed furniture drawing display area C2 a material used for the completed furniture (the kind of wood used for a unit, the kind of wood used for a part, etc.).

When "cutout view" is selected, the furniture design support program calculates the size of wood required to manufacture a unit, a drawer, etc. constituting the completed furniture, and displays in the completed furniture drawing display area C2 a cutout view for cutting out a top board, a side board, etc. constituting the unit, the drawer, etc. from one board (or a plurality of boards) efficiently (such that the board is not uselessly left).

When "estimation sheet" is selected, the furniture design support program calculates costs required to fabricate the completed furniture on the basis of the kind, the structure, the size, the presence or absence of painting (the finishing color) of wood, the costs of parts, etc. used for the completed furniture, and displays in the completed furniture drawing display area C2 an estimation sheet in which the calculated costs are described.

In order to calculate the costs of the unit and the parting board, data representing unit cost per unit area for each material (kind of wood) stored in the basic information table (FIG. 10) (the illustration of the cost data is omitted in FIG. 10), data representing the size and the material of the unit included in the completed furniture which are stored in the unit arrangement table (FIG. 16), and data representing the size and the material of the parting board which are stored in the parting board arrangement table (FIG. 23) are used. The area of a board used for the unit and the parting board is calculated for each material, and the calculated area of the board made of the material is multiplexed by the unit cost per unit area for the material, so that the costs of the unit and the parting board are calculated.

The basic information table (FIG. 10) also stores data representing the unit cost of each of the parts such as the drawer, the door leaf, the leg, and the door pull (the illustration thereof is omitted in FIG. 10). The quantity of each of the parts used for the completed furniture is multiplexed by the unit cost, so that the cost required for the part is estimated.

In the estimation sheet, necessary costs for the unit, the parting board, and the parts which are calculated in such a manner are shown, and the necessary cost of the whole of the completed furniture (cost which is the sum of the necessary costs of the unit and the parts) is shown.

Figure 55:
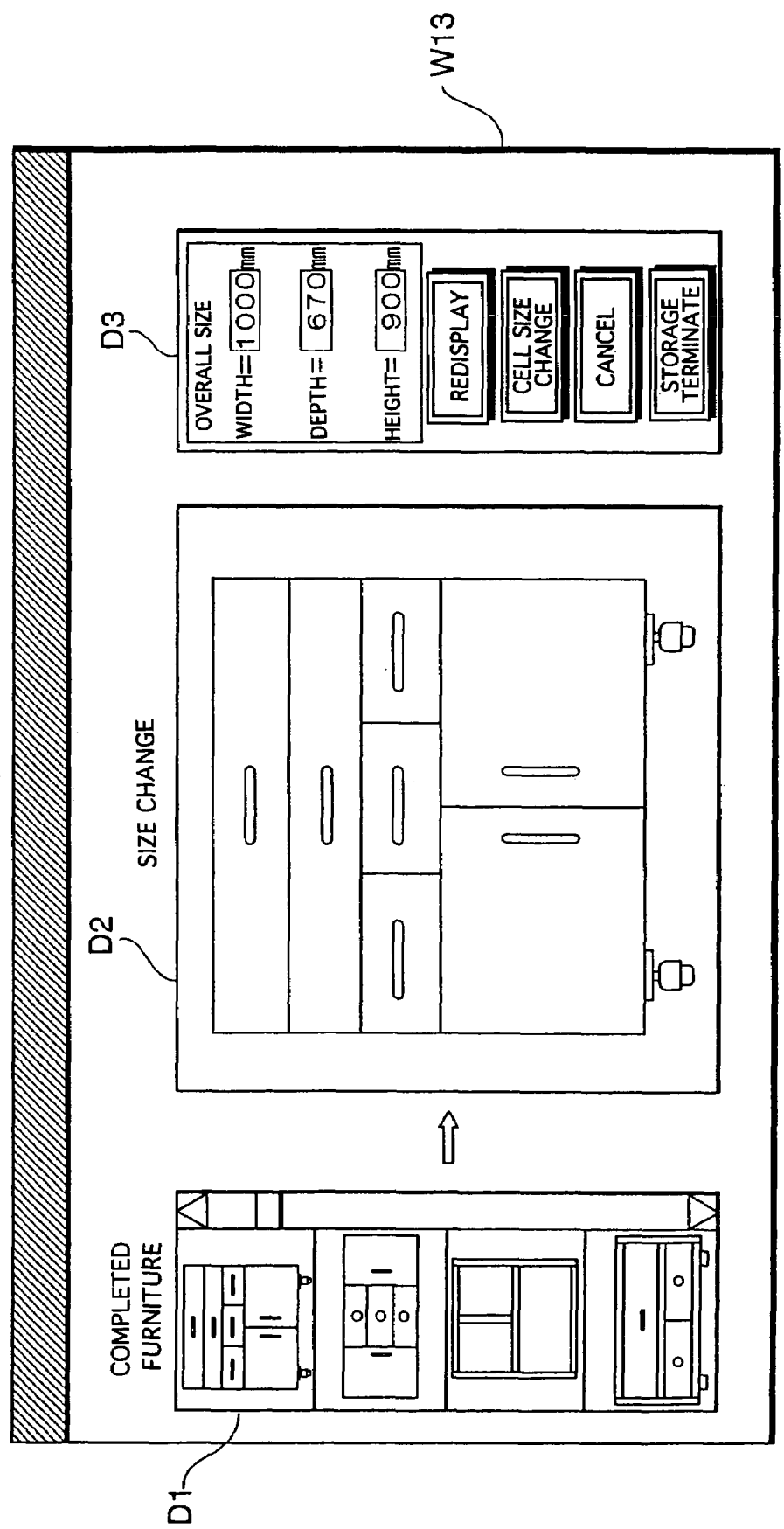
FIG. 55 illustrates an example of display of a size change window.

When the "size change" button is clicked (step 107), a unit size change window W13 is displayed (step 121 in FIG. 33), as shown in FIG. 55. The unit size change window W13 (FIG. 55) is a window for changing the width, the depth, and the height of the whole of completed furniture or the width, the depth, and the height of a unit included in the completed furniture.

The unit size change window W13 includes a completed furniture display area D1, a size change display area D2, and a changed size input area D3.

In the size change display area D2 in the unit size change window W13, a front view of the completed furniture is displayed.

The changed size input area D3 includes a changed size input box. Further, the changed size input area D3 is provided with "redisplay", "cell size change", "cancel", and "storage terminate" buttons.

When the completed furniture includes a plurality of units, the size thereof can be changed for each of the units. An example in which the height of the unit (a portion having a door leaf provided therein) in the lower stage of the completed furniture which is displayed in the size change display area D2 is changed will be described.

When the portion of the unit in the lower stage of the completed furniture is clicked using the mouse 13 in the size change display area D2, the width, the depth, and the height of the unit in the lower stage of the completed furniture are displayed in the changed size input box.

In the changed size input box, the changed size is inputted using the keyboard 12 (step 122).

Figure 56:
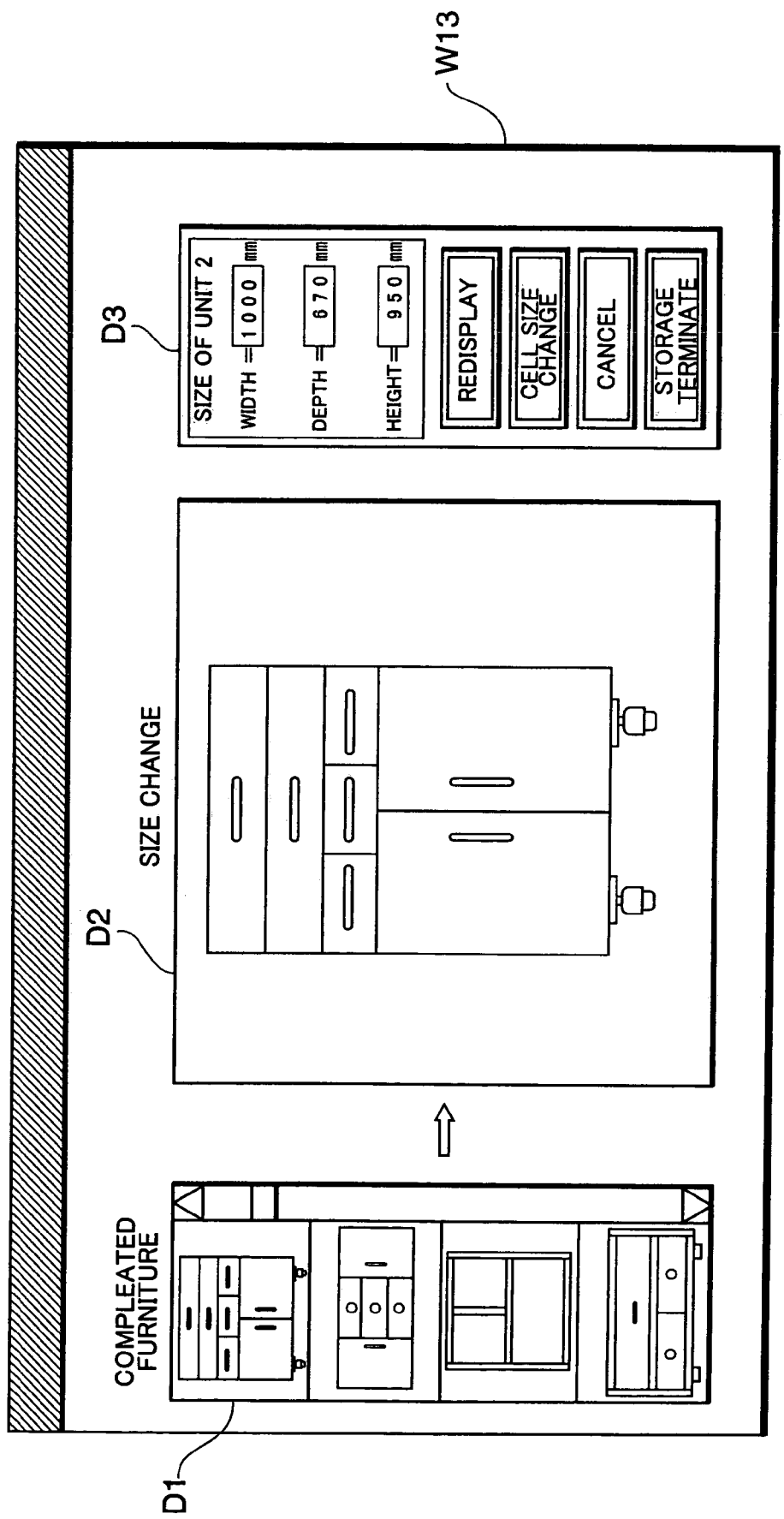
FIG. 56 illustrates an example of display of a size change window.
Figure 57:
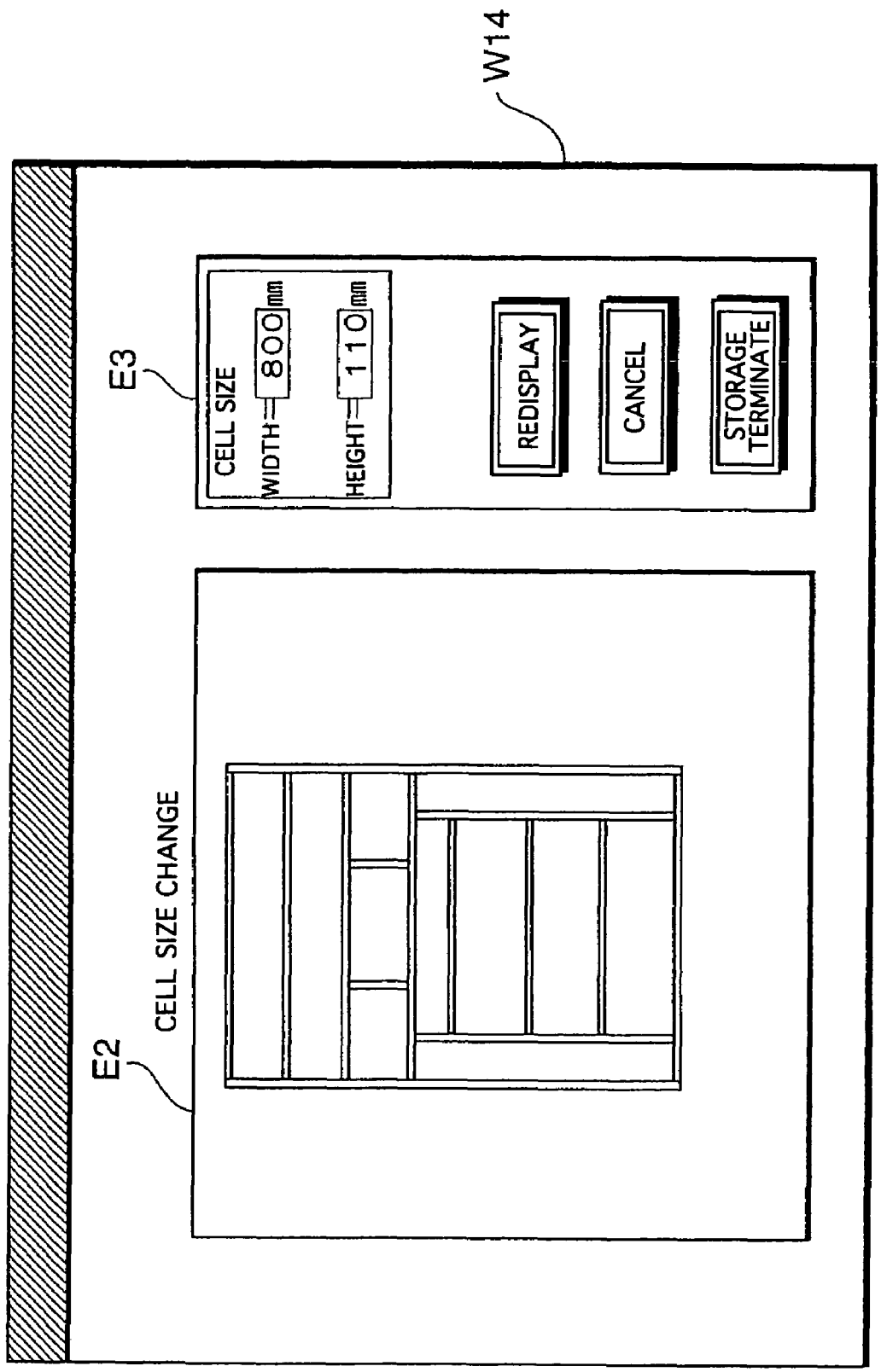
FIG. 57 illustrates an example of display of a cell size change window.

When the "redisplay" button is clicked ("redisplay" in step 123), a front view of the completed furniture whose size has been changed at a ratio corresponding to numeric values inputted into the changed size input box is displayed in the size change display area D2 (step 124, FIG. 56).

When the "storage terminate" button is clicked ("storage termination" in step 123), the completed furniture display window W11 is displayed in place of the size change window W13. The completed furniture whose size has been changed is displayed in the completed furniture drawing display area C2 in the completed furniture display window W11 (step 125, not shown).

When the "cancel" button is clicked ("cancel" in step 123), the completed furniture whose size has not been changed is displayed in the completed furniture drawing display area C2 in the completed furniture display window W11.

When the size of the completed furniture (or the unit) is changed, the sizes or the like of the parting board and the cell are changed as the size of the completed furniture (unit) is changed. In an example in which the size of the furniture shown in FIG. 55 is changed to that of furniture shown in FIG. 56, data in the column "overall size" and the columns "size of portion 3 (left side board)" and "size of portion 4 (right side board)" of the unit arrangement table (FIG. 16) are changed as the size of the completed furniture is changed. Data in the column "size" and the column "reference point" of the parting (cell) information table (FIG. 17) are also changed. Data in the column "reference point" related to the parting board is changed in the parting board arrangement table (FIG. 23). Of course, in the leg arrangement table (FIG. 22), the drawer arrangement table (FIG. 19), the door leaf arrangement table (FIG. 20), and the door pull arrangement table (FIG. 21), the data in the columns "reference point" and "size" are changed so as to correspond to the completed furniture whose size has been changed.

When the size of the completed furniture (or the unit) is changed, the thickness of a board composing the unit may be calculated again. The thickness of the board which corresponds to the changed size of the unit is determined.

Figure 34:
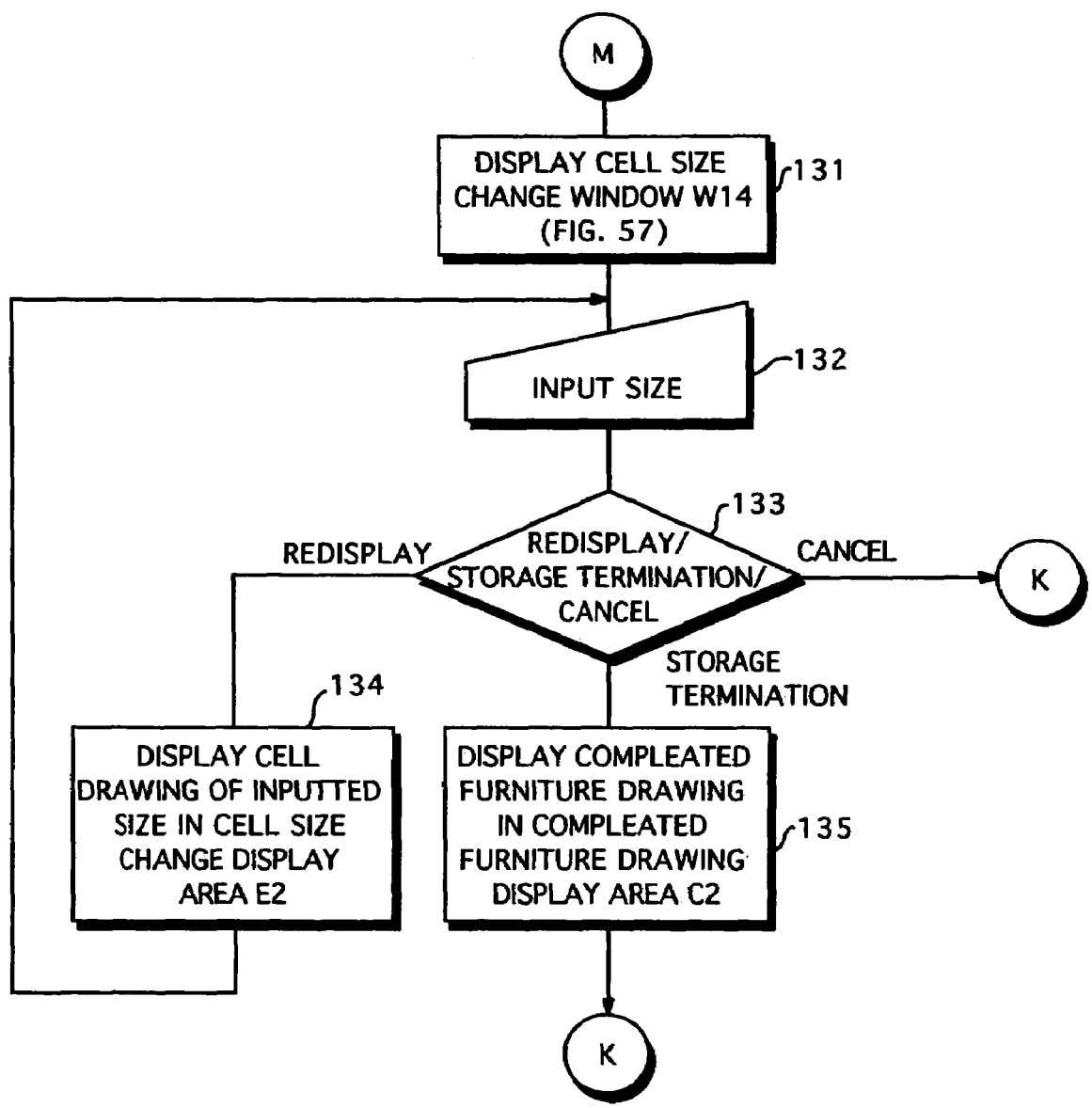
FIG. 34 is a flow chart showing the flow of cell size change processing.

When the "cell size change" button is clicked in the unit size change window W13 (FIGS. 55 and 56) (step 126), a cell size change window W14 (FIG. 57) is displayed on the display screen of the display device 11 (step 131 in FIG. 34). The cell size change window W14 (FIG. 57) includes a cell size change display area E2 and a changed cell size input area E3.

An image representing furniture in a state where only units and parting boards are drawn (excluding drawers, a door leaf, etc.) is displayed in the cell size change display area E2.

When any of the cells is selected by being clicked in the cell size change display area E2, numeric values representing the width and the height of the selected cell are displayed in a numeric value input box in the changed cell size input area E3. The changed width or height of the cell is inputted into the numeric value input box so as to rewrite the numeric values displayed in the numeric value input box (step 132). When a "redisplay" button is clicked ("redisplay" in step 133), the width or the height of the selected cell is changed into the inputted width or height, and is displayed in the cell size change display area E2 (step 134).

When the "storage terminate" button is clicked ("storage termination" in step 133), the completed furniture display window W11 is displayed in place of the cell size change window W14. The completed furniture having the cell whose size has been changed is displayed in the completed furniture drawing display area C2 (step 135).

When the width or the height of the cell is changed, data in the column "reference point" related to the cell the width or the height of which has been changed is updated to a reference point related to the cell whose size has been changed (the three-dimensional coordinates of a point in the lower left front corner) which is displayed in the assembled furniture display area B2, and data in the column "size" is changed into data representing the changed width, depth, and height of the cell. Further, the width or the height of the cell adjacent to the cell the width or the height of which has been changed is also changed. Accordingly, data in the column "reference point" and data in the column "size" which are related to the adjacent cell are also changed into data representing the reference point and the size of the cell whose size has been changed. Further, when the width or the height of the cell is changed, the arrangement position of the parting board or the like is also changed. Accordingly, data in the column "reference point" of the parting board arrangement table (FIG. 23) or the like is also updated to data representing the changed arrangement position of the parting board or the like.

Figure 35:
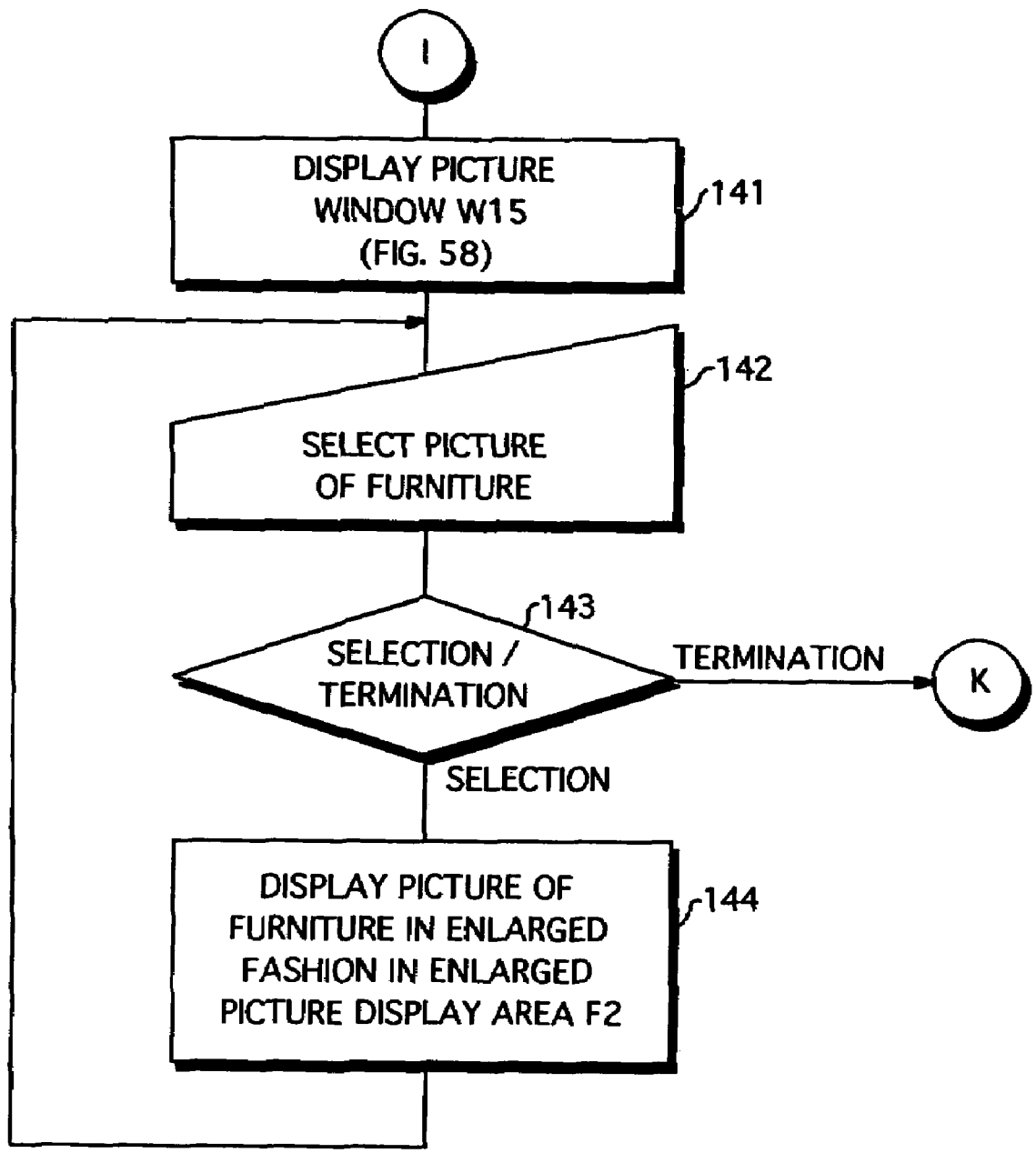
FIG. 35 is a flow chart showing the flow of furniture picture display processing.
Figure 58:
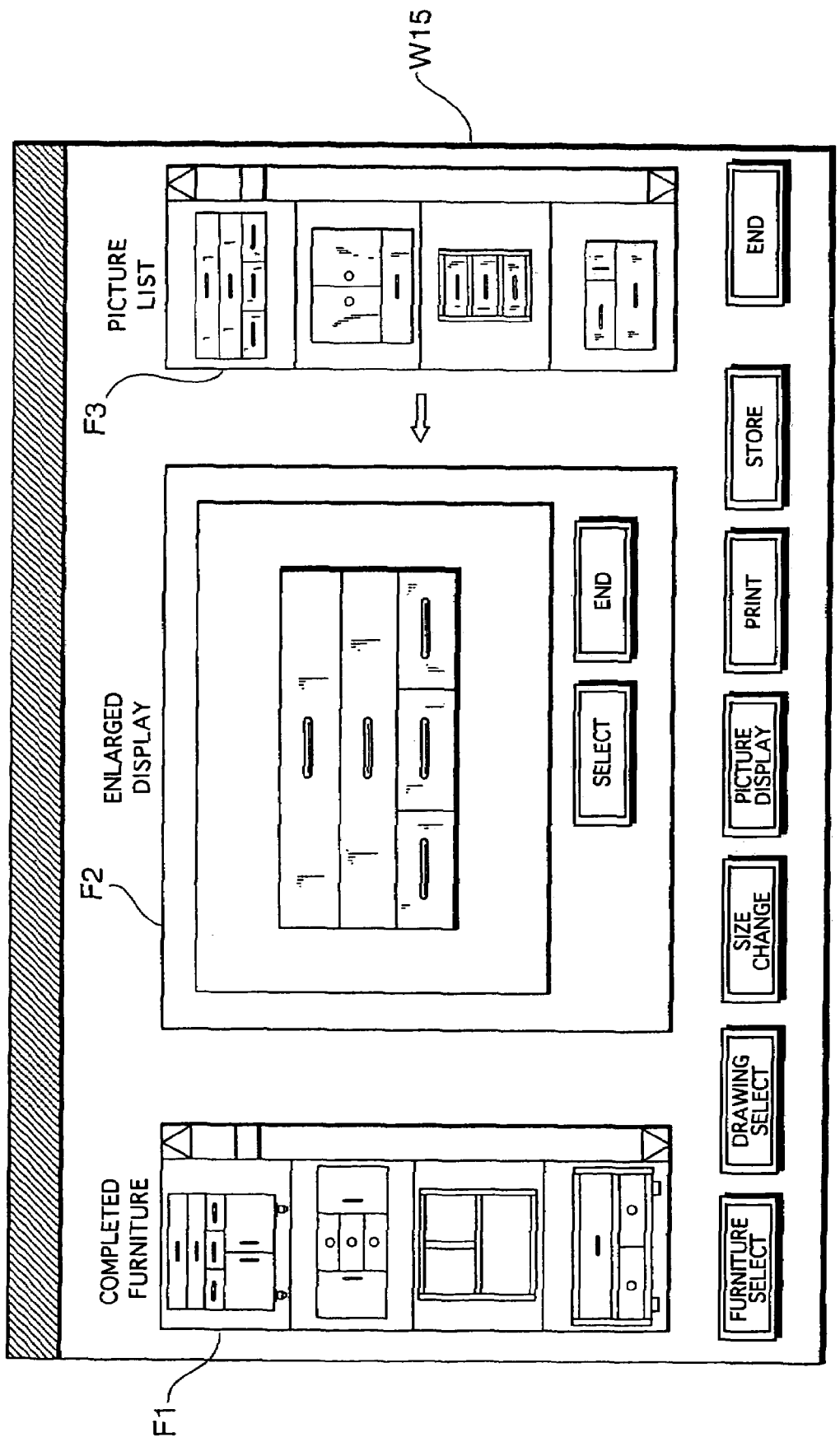
FIG. 58 illustrates an example of display of a picture display window.

When the "picture display" button is clicked in the completed furniture display window W11 (FIG. 52) (step 105), a picture display window W15 is displayed, as shown in FIG. 58 (step 141 in FIG. 35).

The picture display window W15 (FIG. 58) includes a completed furniture display area F1, an enlarged picture display area F2, and a picture display area F3. The enlarged picture display area F2 includes a "select" button and an "end" button. The same area as the completed furniture display area C1 in the completed furniture display window W11 (FIG. 52) is displayed in the completed furniture display area F1.

Picture image data representing the appearance of the actual furniture is previously stored in the HD in the HD unit 16 for the furniture design support system. Picture images respectively representing pieces of furniture which are represented by the picture image data stored in the HD are displayed in the picture display area F3.

Any of the picture images respectively representing the pieces of furniture which are displayed in the picture display area F3 is clicked (step 142), and the "select" button in the enlarged picture display area F2 is then clicked ("selection" in step 143). The selected picture image representing the furniture is displayed in enlarged fashion in the enlarged picture display area F2 (step 144).

When the "end" button in the enlarged picture display area F2 is clicked ("termination" in step 143), the completed furniture display window W11 is displayed in place of the picture display window W14.

Figure 36:
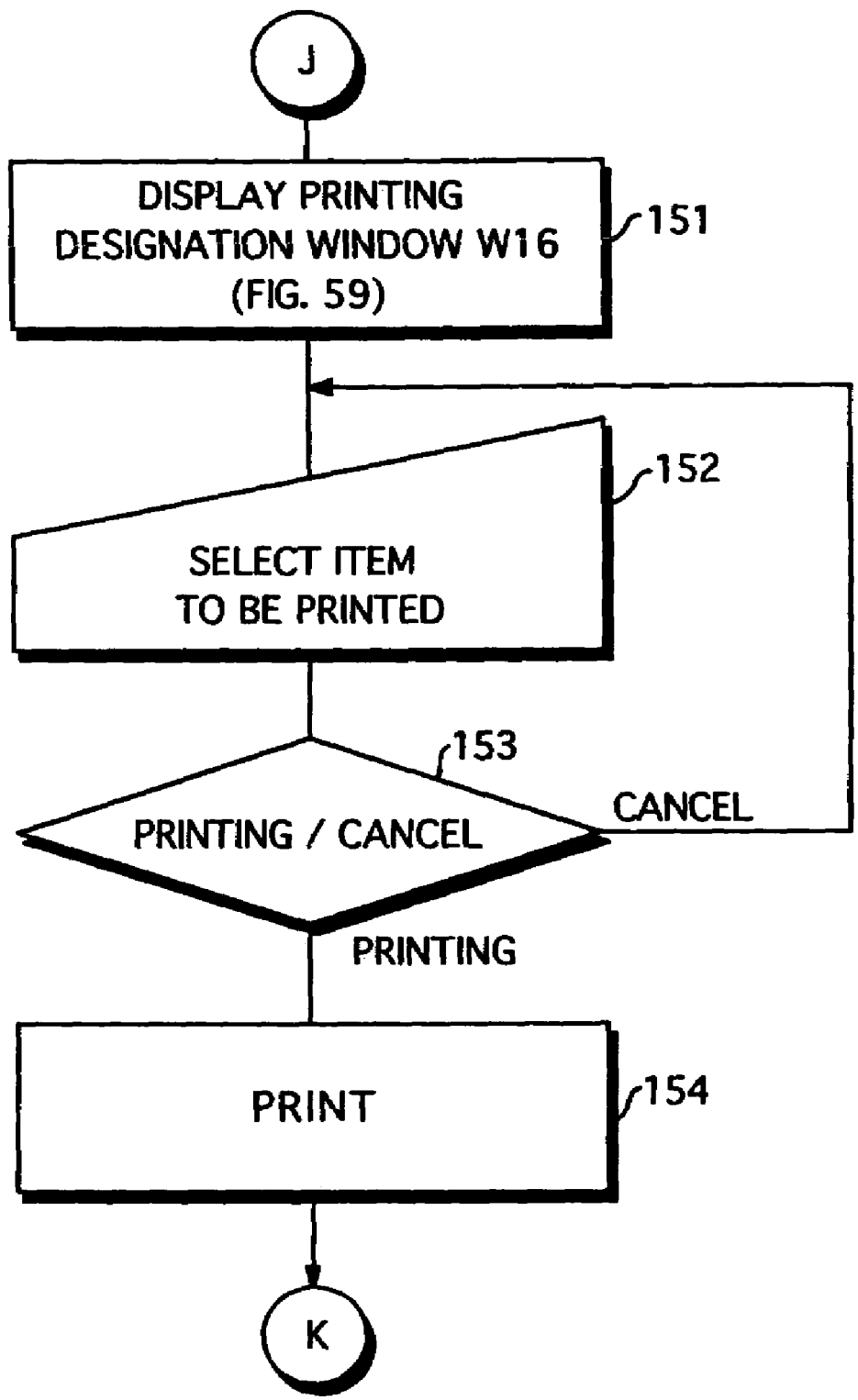
FIG. 36 is a flow chart showing the flow of printing processing.
Figure 59:
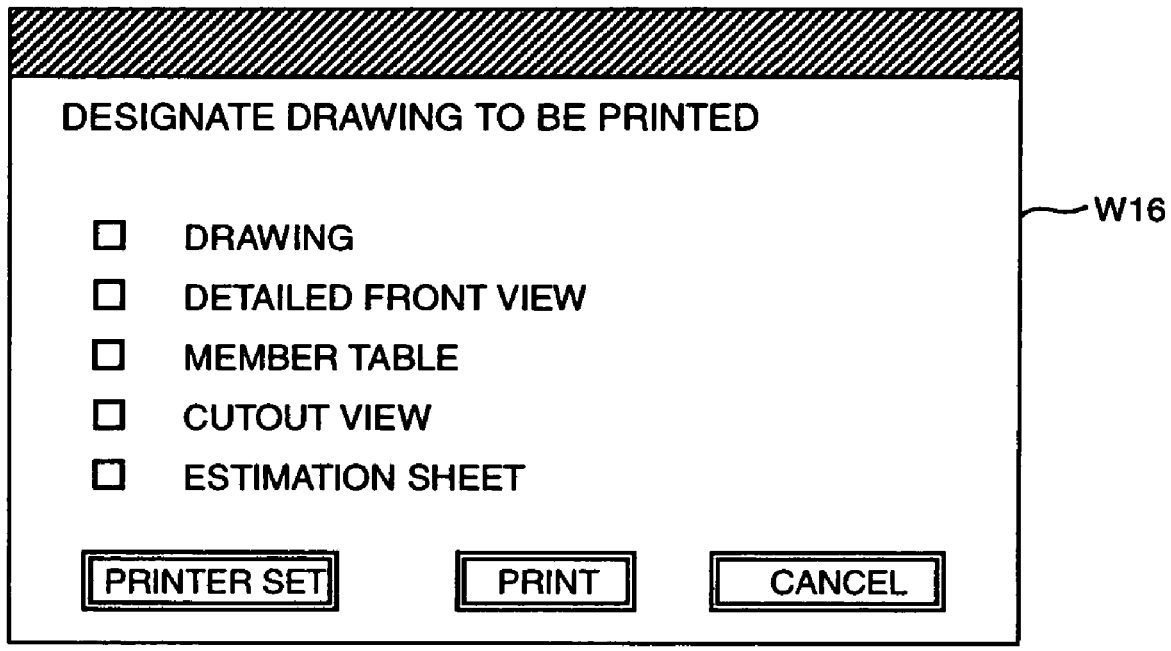
FIG. 59 illustrates an example of display of a printing designation window.

When the "print" button is clicked in the completed furniture display window W11 (FIG. 52) (step 109), a printing designation window W16 is displayed, as shown in FIG. 59 (step 151 in FIG. 36).

In the printing designation window W16 (FIG. 59), one or a plurality of items which will be printed out of five items, i.e., "drawing", "detailed front view", "member table", "cutout view", and "estimation sheet" are selected by being clicked (step 152), and a "print" button is then clicked ("printing" in step 153). Consequently, the designated item (the drawing, etc.) is printed on paper or the like by the printer 17 to be outputted (step 154).

When "drawing" is clicked, and the "print" button is clicked, for example, a design drawing of completed furniture is outputted from the printer 17 (see FIGS. 11 and 12).

A "printer set" button is clicked when a printer which should output the item is set (selected).

When a "cancel" button is clicked ("cancel" in step 153), the program is returned to the selection of the item to be printed (step 152).

When the "end" button is clicked in the completed furniture display window W11 (step 110), the drawing display/printing processing is terminated. The main menu window W1 is displayed in place of the completed furniture display window W11 (step 31).

4 Processing II in Furniture Design Support System (Centered on Window)

A window displayed on the display screen of the display device 11 in the furniture design support system is not limited to those shown in FIGS. 37 to 39, FIGS. 41 to 49, and FIGS. 51 to 59. Further, the flow such as the design of furniture and the change in furniture design data (e.g., size) is not limited to that in the above-mentioned example. FIGS. 60 to 82 illustrate another example of the window displayed on the display screen of the display device 11. The flow charts (FIGS. 25 to 36) described in the above-mentioned processing I in the furniture design support system are suitably referred to, to describe another example of processing in the furniture design support system.

Figure 60:
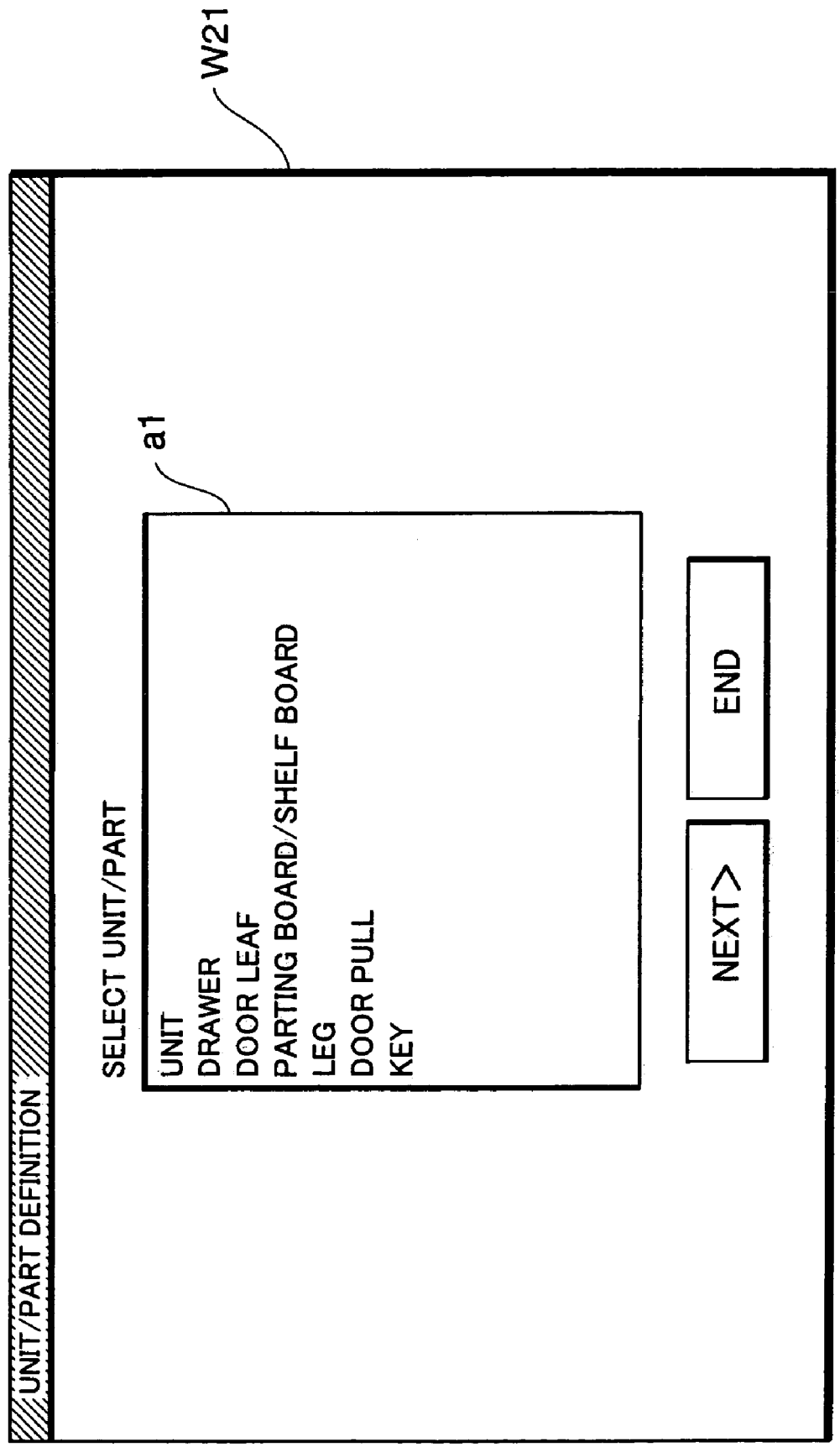
FIG. 60 illustrates another example of display of a unit/part selection window.

FIG. 60 illustrates another example of a unit/part selection window which appears on the display screen when the "unit/part define" button is clicked by an operator or a user in the main menu window W1 (FIG. 37) (corresponding to steps 32 and 33 in FIG. 25, and step 41 in FIG. 26). The unit/part selection window W21 comprises a unit/part display area a1, and comprises "next" and "end" buttons.

Characters of "unit", "drawer", "door leaf", "parting board/shelf board", "leg", "door pull", and "key" are displayed in the unit/part display area a1. Any of character portions is clicked using the mouse 13, so that either the unit or any of the parts (a drawer, a door leaf, a parting board/shelf board, a leg, a drawer, and a key) is selected (corresponding to step 42). With respect to the selected unit or part, the definitions of "size", "material", "material quality", "painting", etc. are given (generation of definition data; registration of data in the unit/part definition table is performed).

Figure 61:
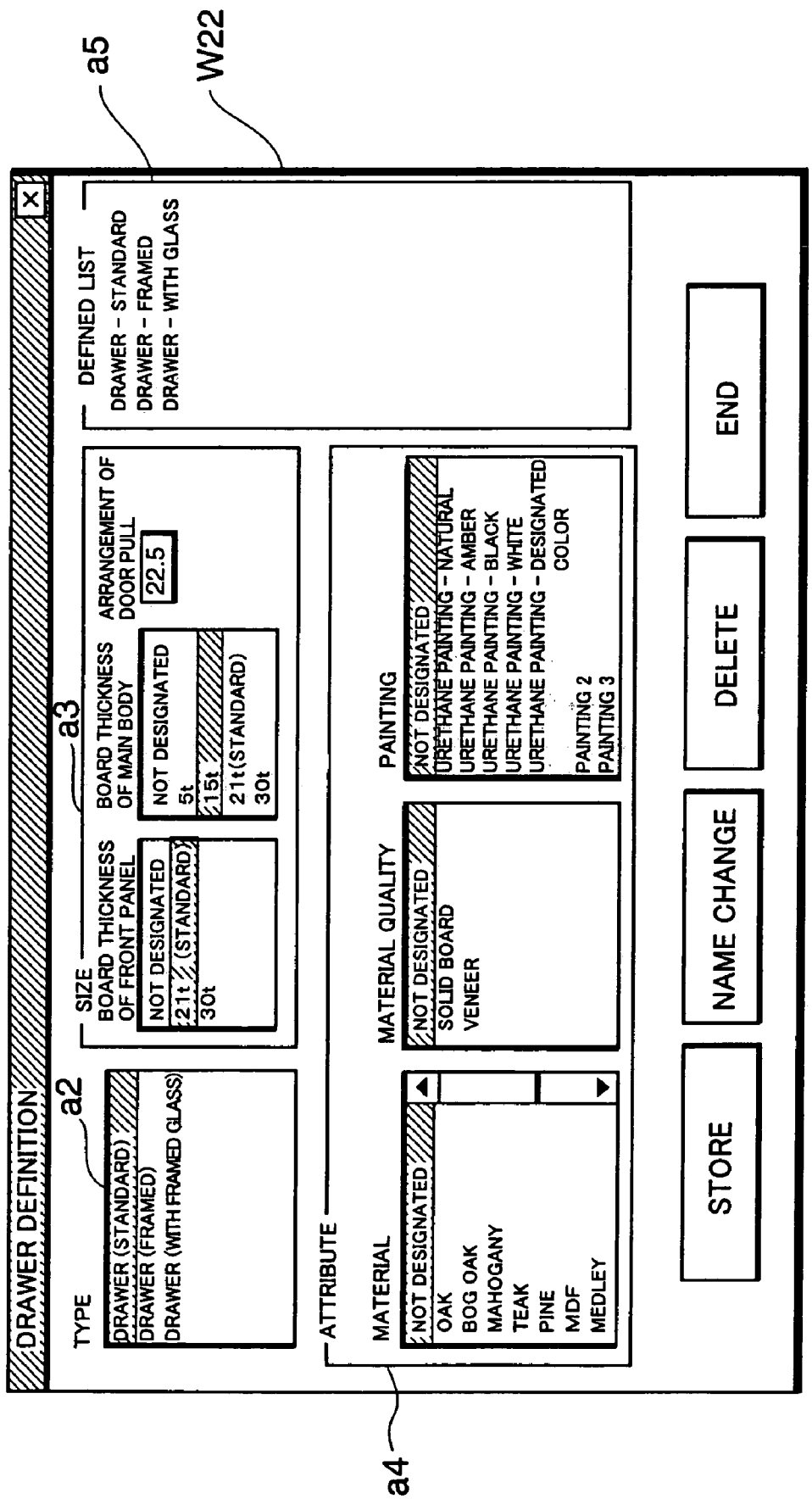
FIG. 61 illustrates an example of display of a drawer definition window.

An example of a window (a drawer definition window W22) which appears on the display screen when "drawer" is clicked, and the "next" button is then clicked ("next" in step 43) is illustrated in FIG. 61.

The drawer definition window W22 includes a type selection area a2, a size definition area a3, an attribute definition area a4, and a defined list display area a5, and comprises "store", "name change", "delete", and "end" buttons.

The types of drawers are displayed by a list in the type selection area a2 on the basis of the data previously stored in the basic information table (FIG. 10). Here, data respectively representing drawers of three types, i.e., a standard type (standard), a framed type (framed), and a type with a frame and having a glass board fitted in the frame (with framed glass) are previously stored in the basic information table (FIG. 10), and screen display is performed in accordance with the data.

With respect to the drawer of the type selected in the type selection area a2 (the color of characters is reversed), the board thickness of a front panel of the drawer, the board thickness of the main body of the drawer (a box portion), and the arrangement position of a door pull attached to the front panel of the drawer are defined in the size definition area a3.

In the attribute definition area a4, a material (oak, bog oak, mahogany, etc.), a material quality (solid board or veneer), and painting (urethane painting, natural color, amber color, etc.) which are used for the front panel of the drawer and the main body of the drawer are defined. The data which are previously stored in the basic information table (FIG. 10) are also used for definition data which can be selected in the size definition area a3 and the attribute definition area a4.

When the "store" button is clicked after the type, the size, and the attribute of the drawer are determined, a new window for inputting a name is displayed with the window overlapped with the drawer definition window W22 (not shown) The inputted name is newly added to the defined list display area a5 (not shown).

The "name change" button is clicked when the name of the drawer displayed in the defined list display area a5 is changed. The "delete" button is clicked when defined data displayed in the defined list display area a5 is deleted (step 54). The "end" button is clicked when the data definition is terminated. When the "end" button is clicked, the definition window W22 disappears from the display screen.

With respect to parts (a door leaf, a parting board/shelf board, a leg, a door pull, and a key) other than the drawer and units, which sizes, attributes, etc. are defined using the definition window W22 in the same manner.

The processing using the above-mentioned definition window W22 does not completely coincide with the flow chart shown in FIG. 26 but is common thereto in that a user of the furniture design support system defines definition data related to the units and the parts within the range of the data in the basic information table previously prepared (stores the definition data in the unit/part definition table).

Figure 62:
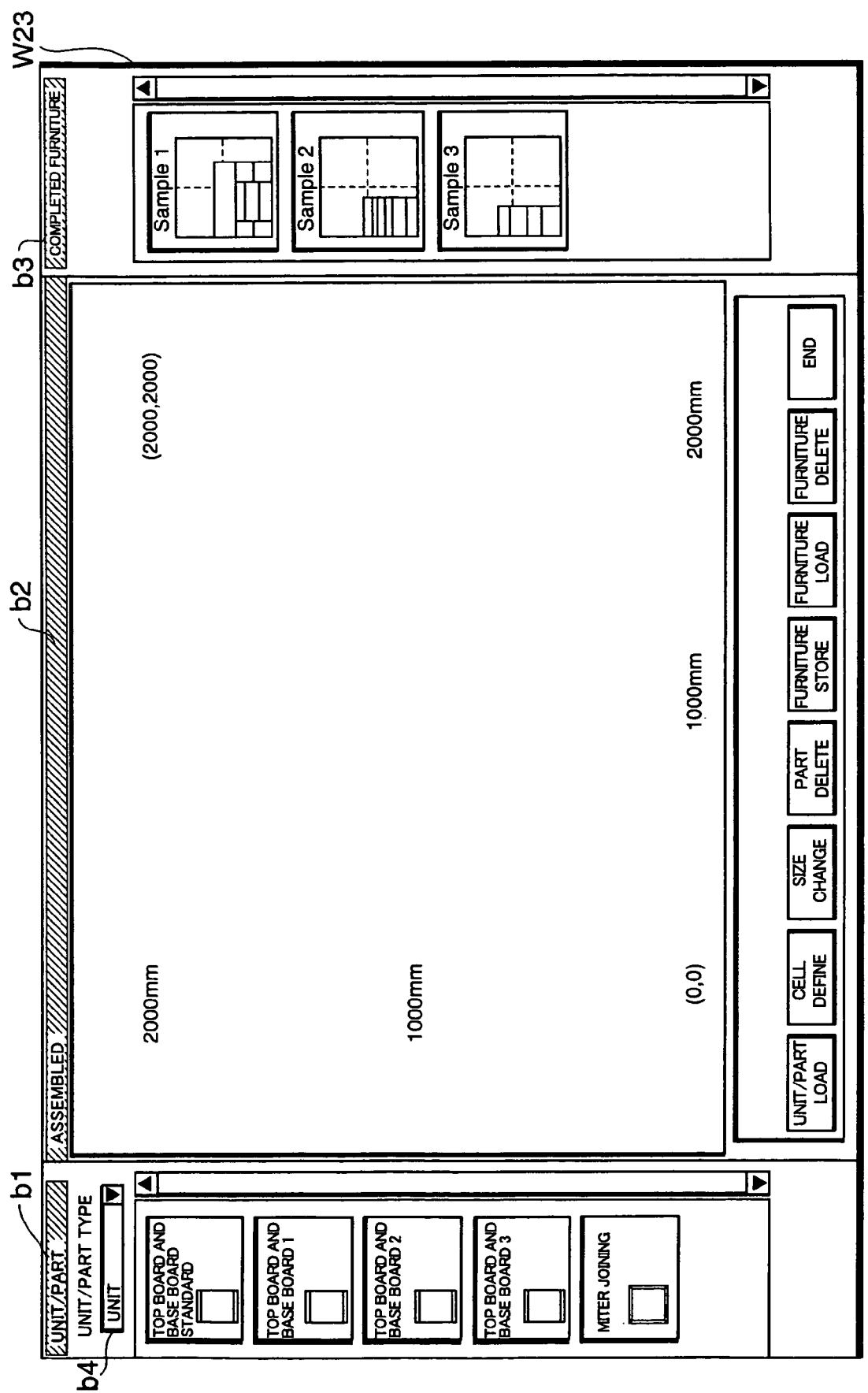
FIG. 62 illustrates another example of display of an assembling main window.

FIG. 62 illustrates another example of the assembling main window displayed when the "assemble" button is clicked (steps 32 and 34 in FIG. 25) by an operator or a user in the main menu window W1 (FIG. 37) (step 61 in FIG. 28).

An assembling main window W23 includes a unit/part display area b1, an assembled furniture display area b2, and a completed furniture display area b3, and comprises "unit/part load", "cell define", "size change", "part delete", "furniture store", "furniture load", "furniture delete" and "end" buttons. The unit/part type display area b1, the assembled furniture display area b2, and the completed furniture display area b3 may be respectively separate windows.

An upper part of the unit/part display area b1 includes a unit/part type display box b4. When a triangular mark portion on the right side of the display box b4 is clicked, the types of units or parts are displayed by a list (see FIG. 68).

When "unit" is displayed in the display box b4, an image representing the outline of the appearance (front) of the unit, together with the name of the unit, is displayed in the unit/part display area b1 (below the display box b4).

A manner of combination of the units and the parts is displayed in the assembled furniture display area b2. Further, a reference point (coordinates) for representing a reference for the width or the height of the furniture (units and parts) is displayed therein.

The name of completed furniture (or a portion thereof) and an image representing the completed furniture are displayed in the completed furniture display area b3.

Figure 63:
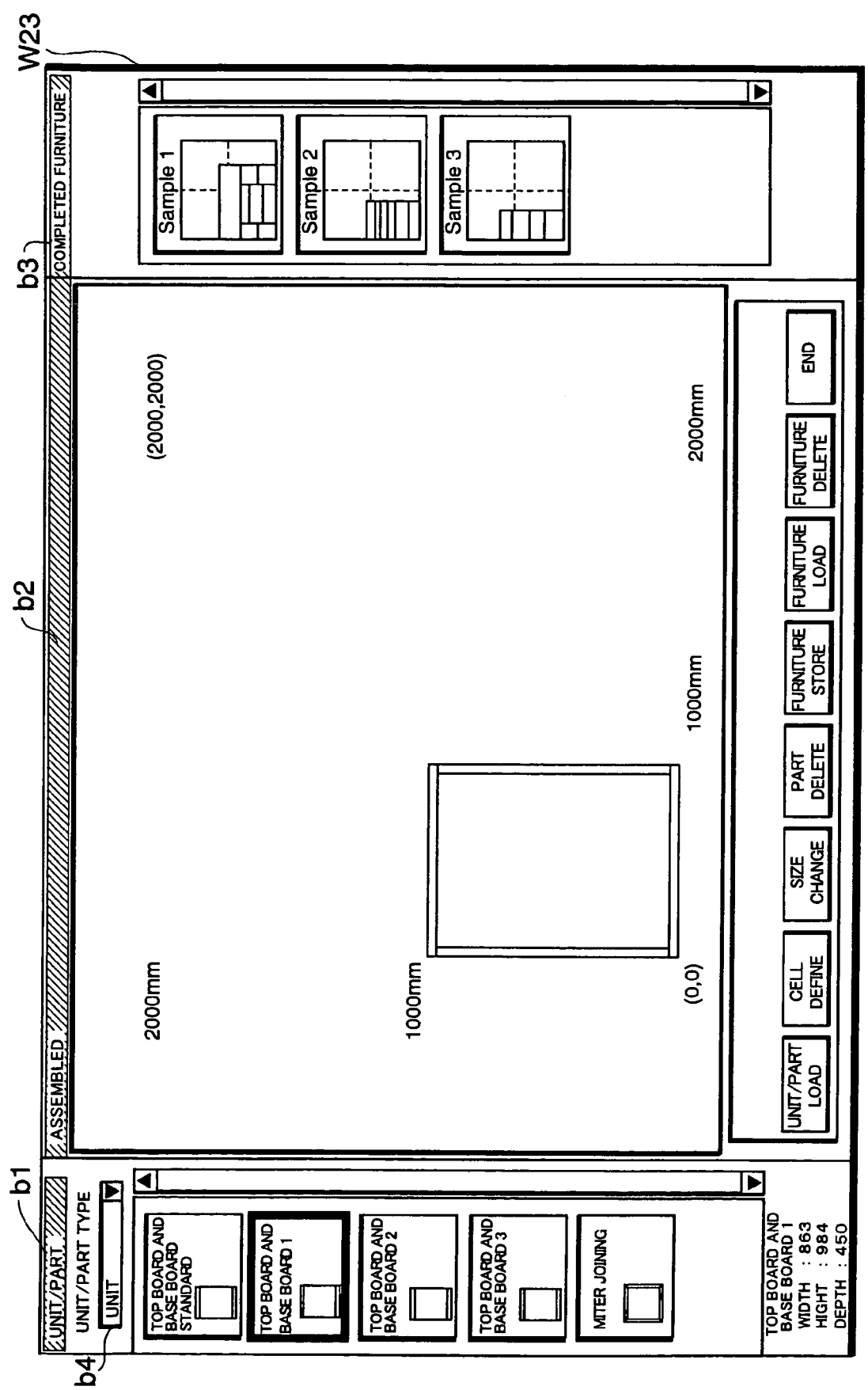
FIG. 63 illustrates another example of display of an assembling main window.

For example, a top board and base board (baseplate) 1 type unit is selected by being clicked in the unit/part display area b1 (step 62 in FIG. 28). Thereafter, when the "unit/part load" button is clicked (step 63), the lower left front vertex of the top board and base board 1 type unit is overlapped with the origin (0, 0), and is displayed in the assembled furniture display area b2), as shown in FIG. 63 (NO in step 64, and step 65 in FIG. 28). The width, the height, and the depth of the top board and base board 1 type unit are indicted by numeric values in a lower part of the unit/part display area b1.

The size of a unit or a cell can be changed within the assembling processing.

Figure 64:
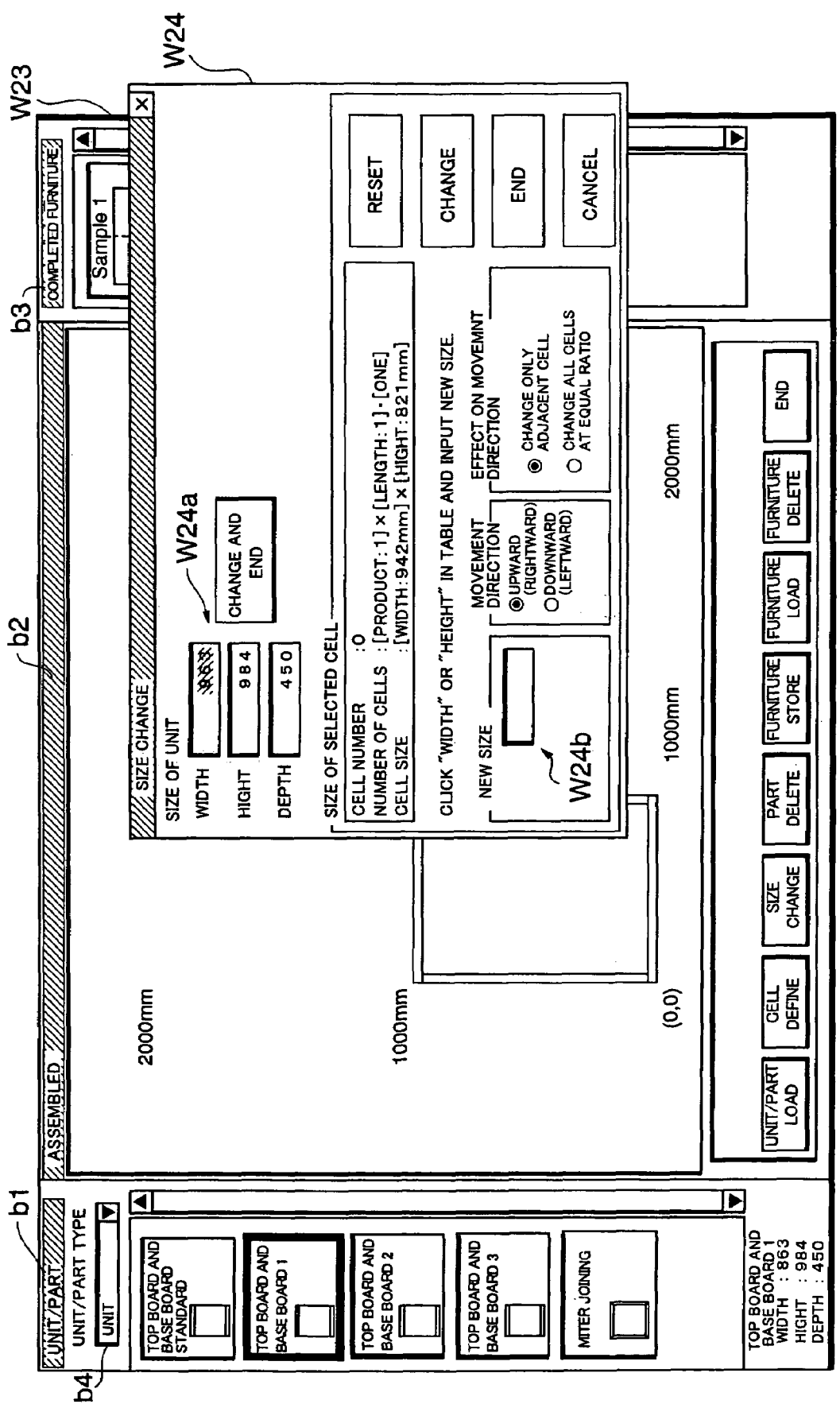
FIG. 64 illustrates an example of display of a size change window.

When the size of the unit or the cell is changed, the "size change" button is clicked. When the "size change" button is clicked, a size change window W24 is displayed with the window overlapped with the assembling main window W23, as shown in FIG. 64.

A field W24a for displaying the width, the height, and the depth of the unit displayed in the assembled furniture display area b2 in the assembling main window W23 and a "change and end" button are provided in an upper part of the size change window W24.

Figure 65:
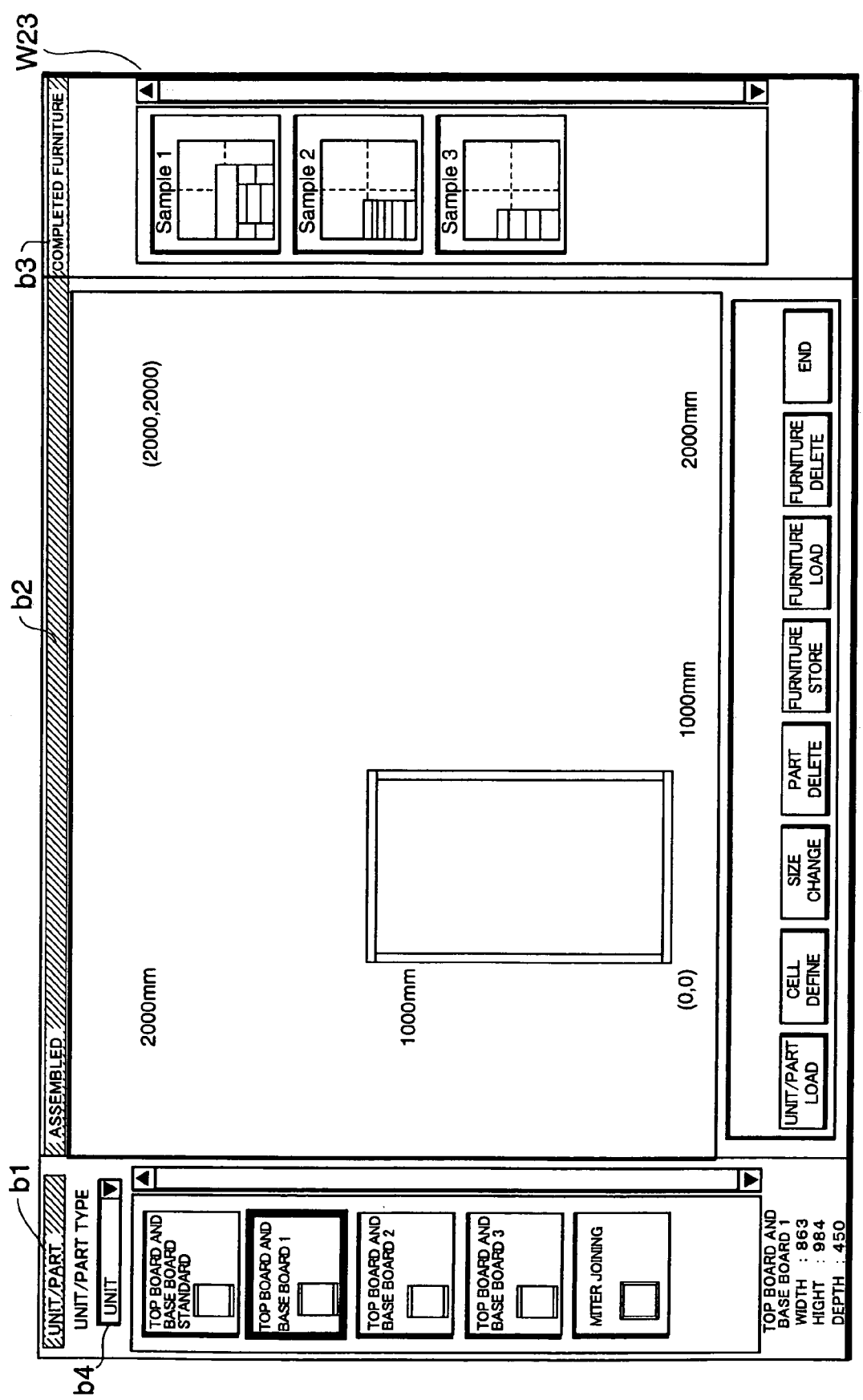
FIG. 65 illustrates another example of display of an assembling main window.

When the size of the unit is changed, numerical values displayed in the field W24a for displaying the width, the height, and the depth are rewritten using the keyboard 12, and the "change and end" button is thereafter clicked (see FIG. 33) Consequently, the unit having the size whose numeric values have been changed is thereafter displayed in the assembled furniture display area b2 in the assembling main window W23, as shown in FIG. 65. The size change window W24 disappears.

When the size of the cell in the unit is changed, the size change window W24 is also used.

A lower part of the size change window W24 (FIG. 64) is provided with a field for displaying the cell number of a cell selected in the assembled furniture display area b2, the number of cells included in the unit, and the size of the selected cell, a field W24b for inputting the changed size (new size), a field for determining the movement direction of the cell whose size is to be changed, and a field for determining the effect on the adjacent cell. Further, "reset", "change", "terminate", and "cancel" buttons are provided therein.

The cell whose size will be changed is selected using the mouse 13 in the assembled furniture display area b2. The width or the height of the new cell is inputted into the field W24b for inputting "new size". In the field for determining "movement direction", it is chosen whether the cell whose size is to be changed is widened (narrowed) upward (rightward) or widened (narrowed) downward (leftward). In the field for determining "effect on movement direction", it is chosen, with respect to the cells other than the cell whose size has been changed, whether only the cell adjacent to the cell whose size is to be changed is affected (only the adjacent cell is changed) or the sizes of all the cells included in the unit are changed at an equal ratio (all the cells are changed at an equal ratio) (see FIG. 34 with respect to the change in the size of the cell).

When the "change" button is clicked, the unit including the cell whose size has been changed is displayed in the assembled furniture display area b2. The "reset" button, the "end" button, and the "cancel" button are respectively clicked in a case where the display screen is returned to the state before the change, a case where the cell size change processing is terminated, and a case where the size change processing is canceled.

In the assembling main window W23, the "cell define" button is clicked when a longitudinal board or a lateral board is provided in the unit displayed in the assembled furniture display area b2.

It goes without saying that the size change window W24 may comprise the function of changing the sizes of parts other than the unit and the cell.

Figure 66:
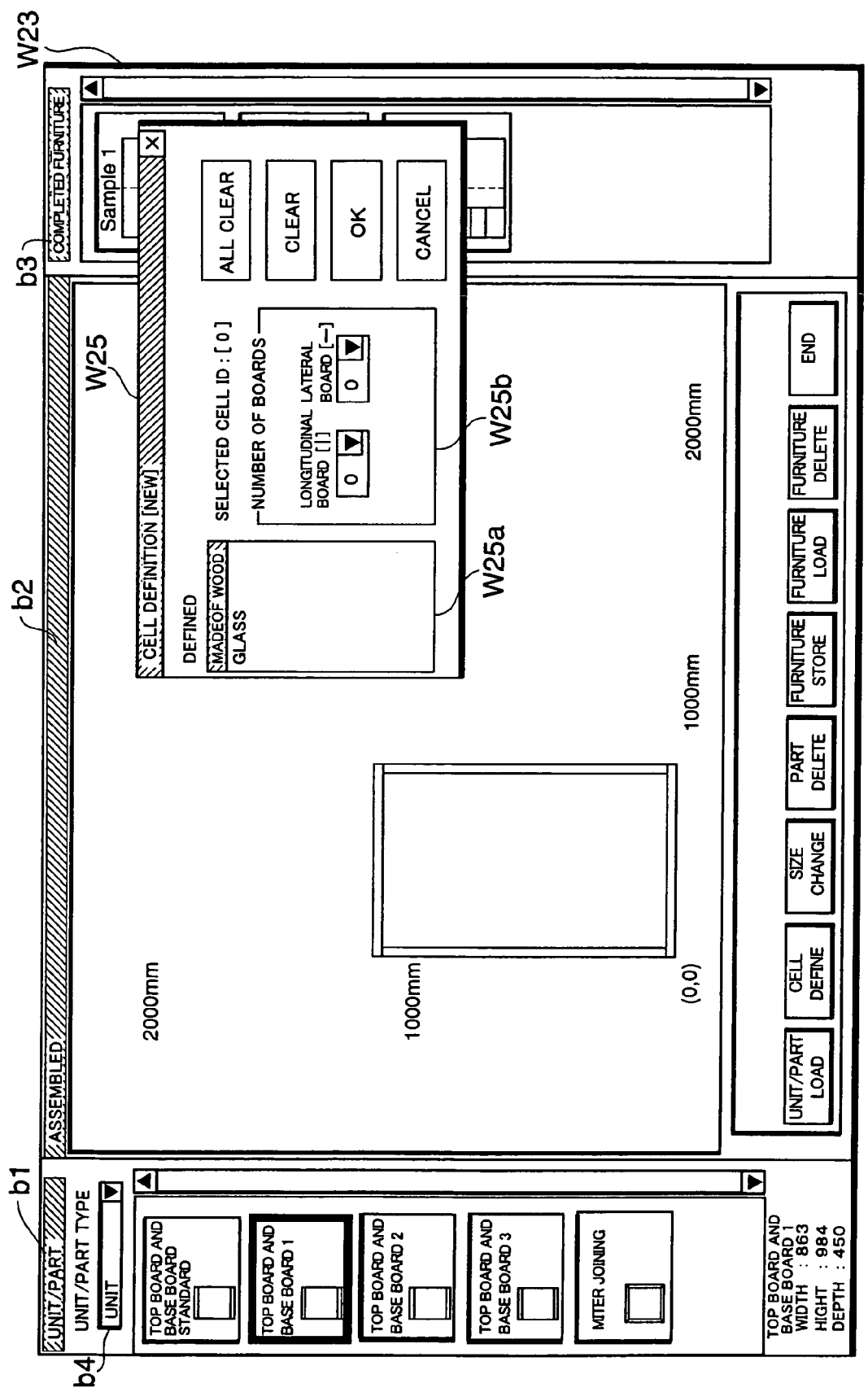
FIG. 66 illustrates an example of display of a cell definition window.

When the "cell define" button is clicked, a cell definition window W25 is displayed with the window overlapped with the assembling main window W23, as shown in FIG. 66.

The cell definition window W25 comprises a field (a defined area) W25a for selecting the kind of parting board (shelf board) (made of wood or glass) used as a longitudinal board or a lateral board and a field W25b for inputting the number of boards, and comprises "all clear", "clear", "OK", and "cancel" buttons.

Figure 67:
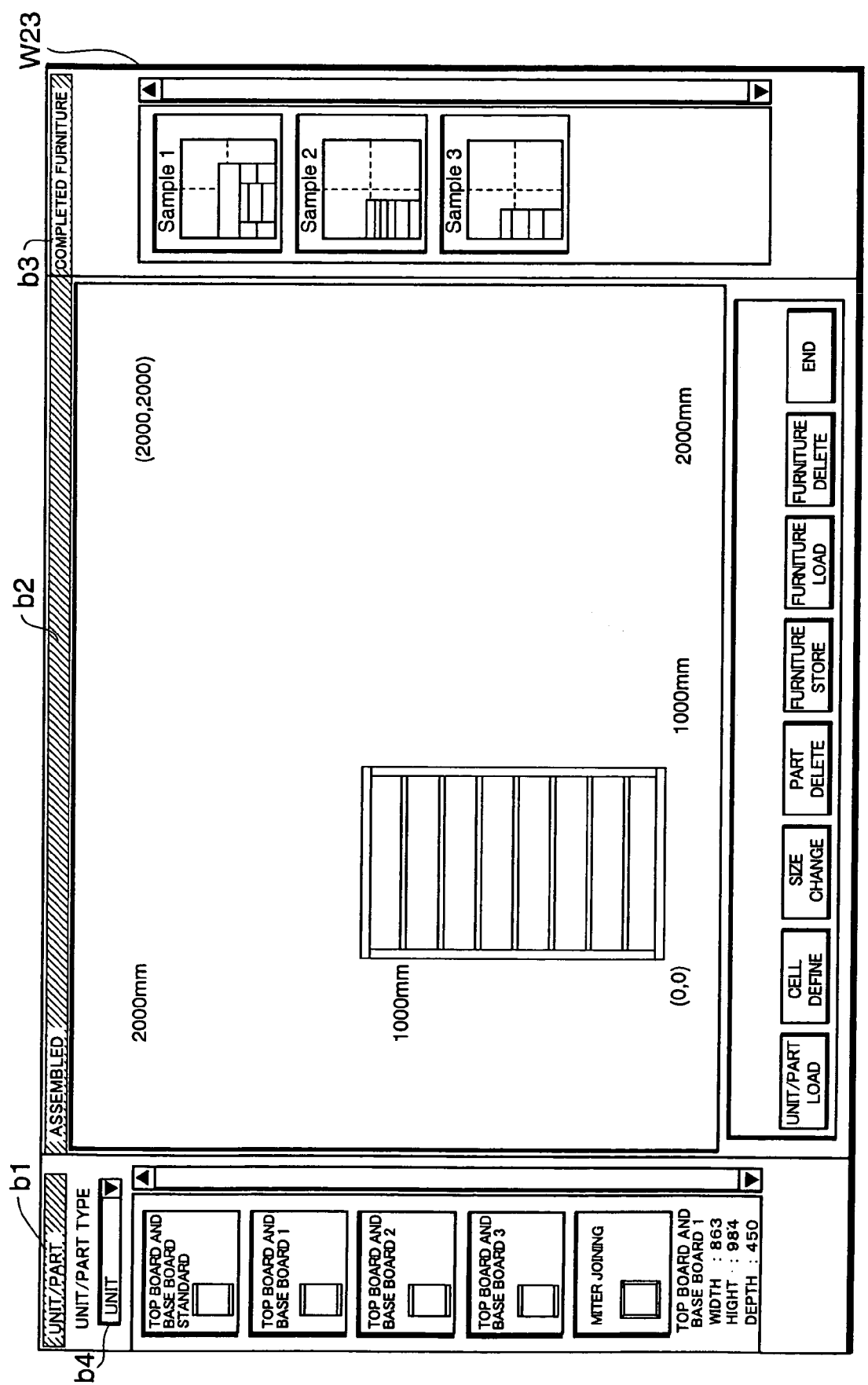
FIG. 67 illustrates another example of display of an assembling main window.

When seven lateral boards made of wood are provided in the unit displayed in the assembled furniture display area b2 shown in FIG. 65, for example, "made of wood" is selected in the defined area W25a, and the number of lateral boards is seven in the field W25b for displaying the number of boards, as shown in FIG. 66. Thereafter, the "OK" button is clicked. Consequently, the unit provided with seven lateral boards is displayed in the assembled furniture display area b2 in the assembling main window W23, as shown in FIG. 67. The unit includes eight cells of an equal size. The cell definition window W25 disappears from the display screen ("cell definition" processing corresponds to "parting definition" processing in the step 70 (FIG. 29) shown in FIG. 28).

The "all clear" button, the "clear" button, and the "cancel" button are respectively clicked in a case where all longitudinal boards or lateral boards which are provided in the unit are erased, a case where when processing for providing longitudinal boards or lateral boards is performed a plurality of times, the longitudinal board or the lateral board which is last provided is erased, and a case where the cell definition processing is canceled.

Figure 68:
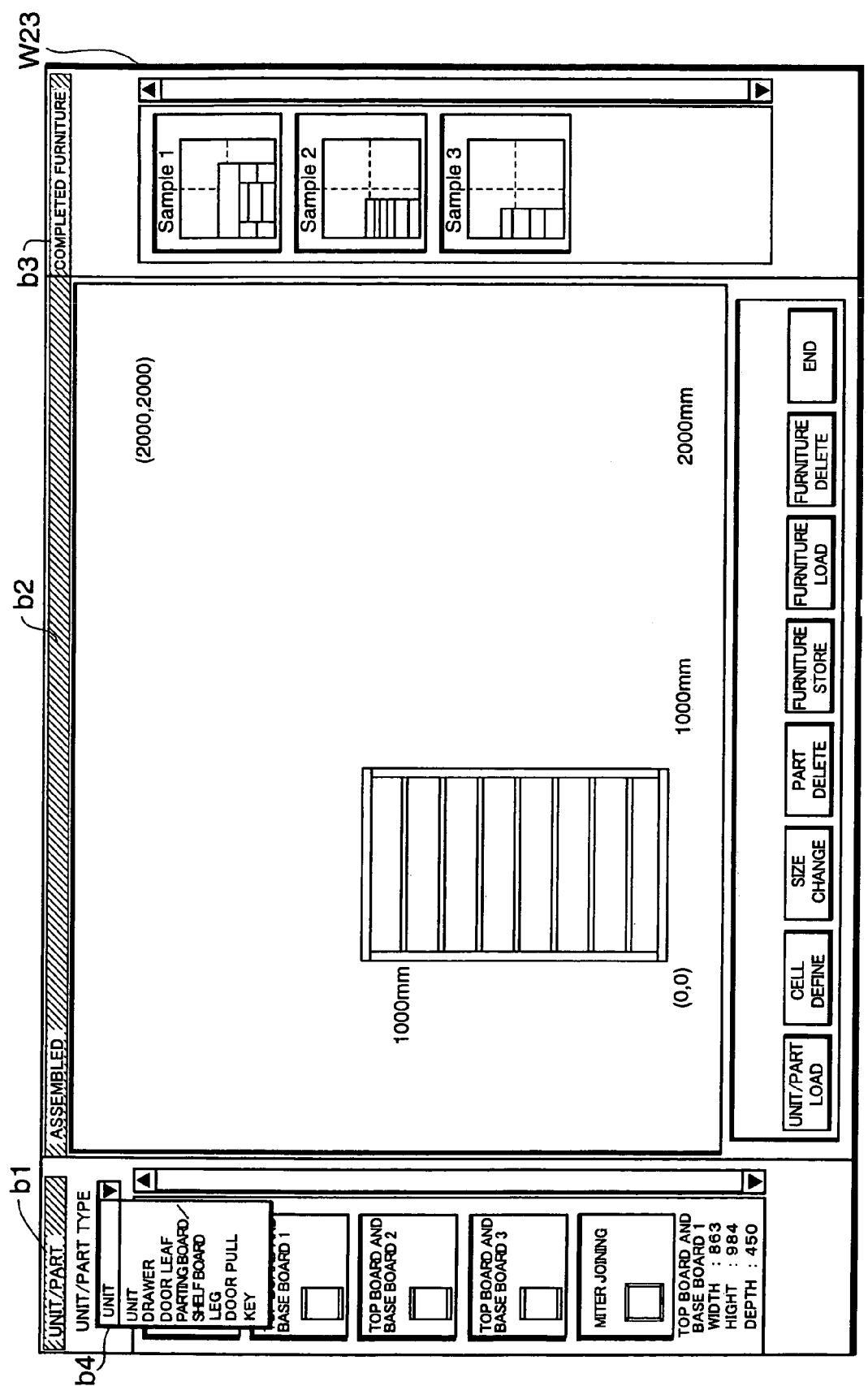
FIG. 68 illustrates another example of display of an assembling main window.

When a part is attached to the unit displayed in the assembled furniture display area b2 in the assembling main window W23, the name of the part which will be attached is first displayed in the display box b4 on the upper side of the unit/part display area b1, as shown in FIG. 68.

Figure 69:
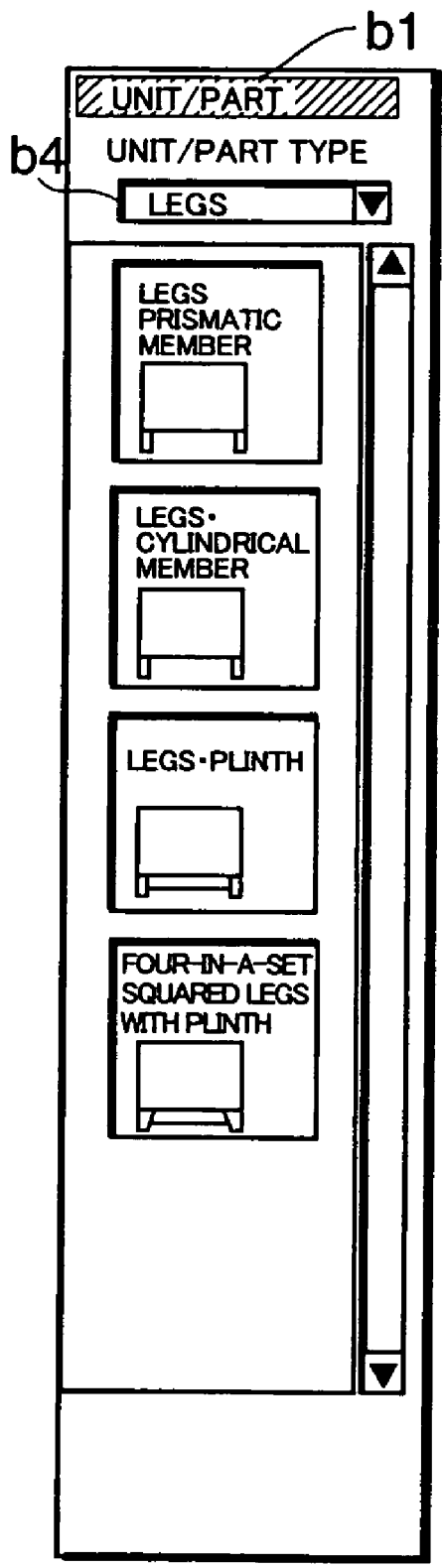
FIG. 69 illustrates a unit/part display area in enlarged fashion.
Figure 70:
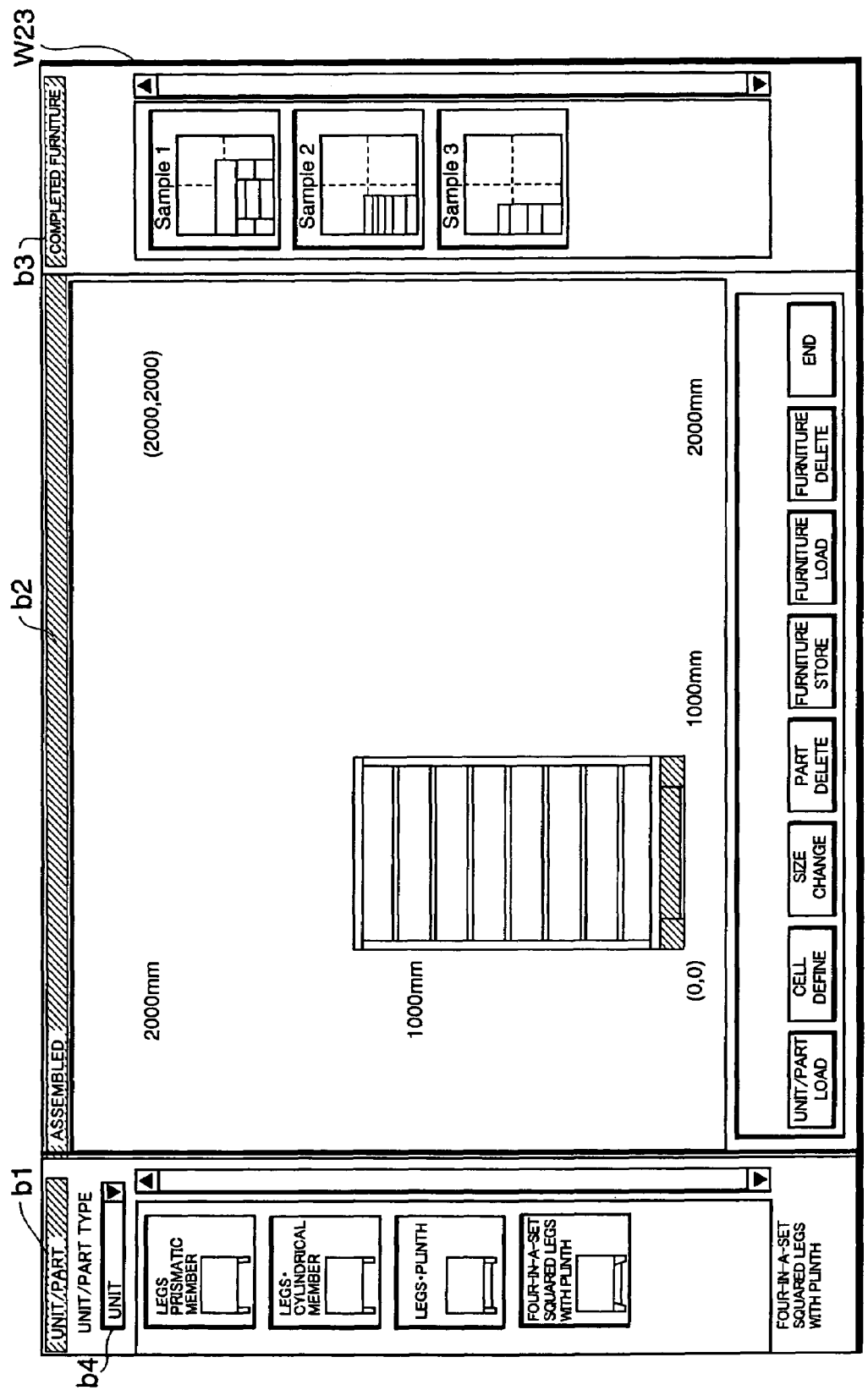
FIG. 70 illustrates another example of display of an assembling main window.
Figure 71:
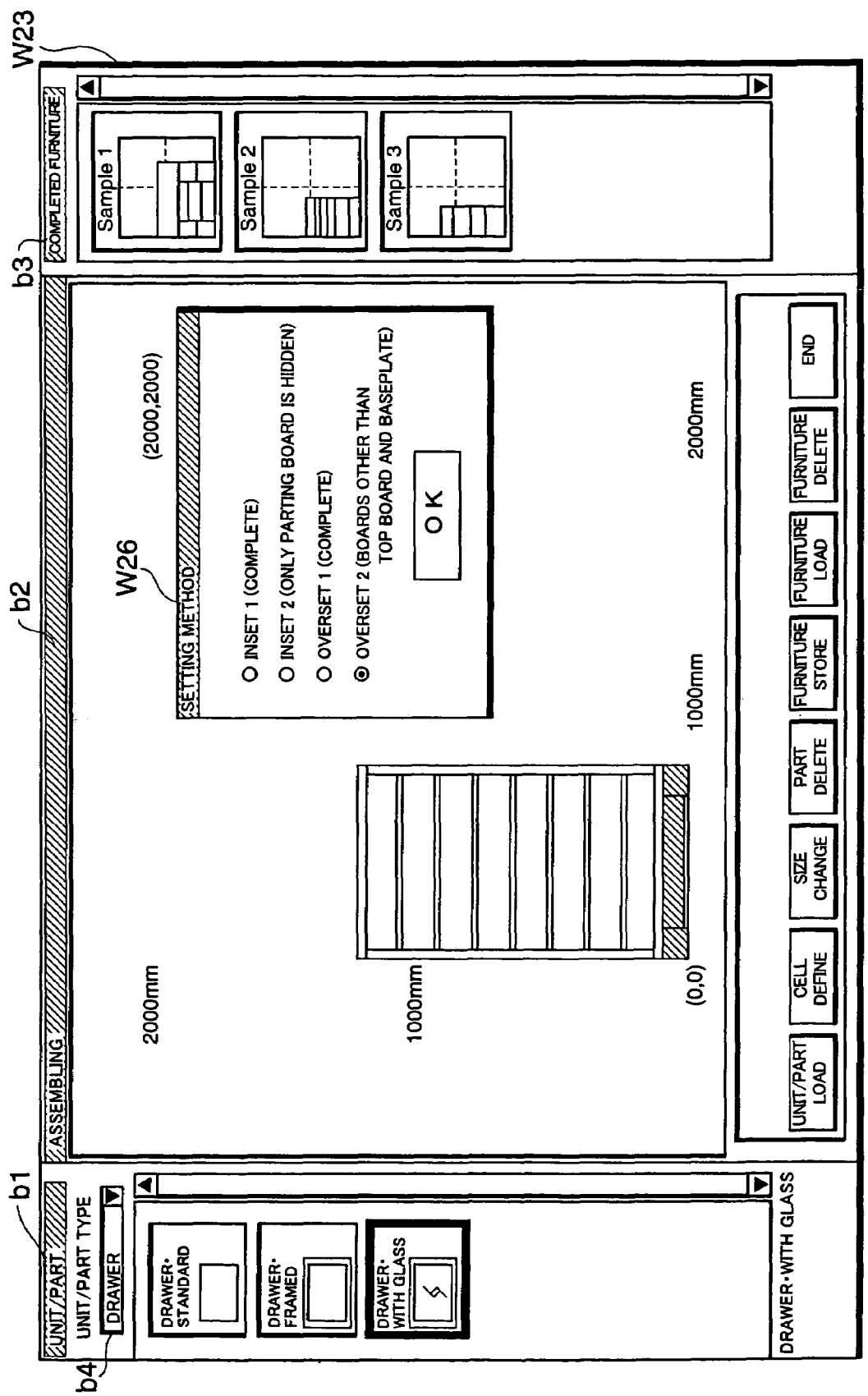
FIG. 71 illustrates an example of display of a drawer setting method selection window.

When "leg" is selected as the part name ("leg" is displayed by characters in the display box b4), for example, a plurality of kinds of legs are displayed in the unit/part display area b1, as shown in FIG. 69 (based on the unit/part definition table (FIG. 18)). FIG. 70 illustrates the assembling main window W23 in a case where "four-in-a-set squared legs with plinth" is selected by being clicked using the mouse 13, and the "unit/part load" button is then clicked. Furniture in which four-in-a-set squared legs with plinth composed of four pillar-shaped legs and a plinth are attached to a bottom surface of a unit is displayed in the assembled furniture display area b2

(the window for designating arrangement (steps 66 to 68 in FIG. 28; FIGS. 47 and 49) is not necessarily displayed).

Furthermore, when a drawer which is one of parts is provided in each of the eight cells included in the unit, all the eight cells are selected using the mouse 13, and "drawer" is then displayed by characters in the display box b4. Images respectively representing a plurality of kind of drawers are displayed in the unit/part display area b1. After the desired kind of drawer is selected using the mouse 13, the "unit/part load" button is clicked. Consequently, a setting method selection window W26 for specifying how the drawer is set is displayed with the window overlapped with the assembling main window W23 (FIG. 71) (which is another example of the arrangement designation window W7 (W8)).

In the setting method selection window W26, any one of four setting methods, i.e., ① "inset 1 (complete)" in which a drawer is accommodated such that a front panel of the drawer is almost flush with a front surface of a parting board provided in a cell, ② "inset 2 (only a parting board is hidden)" in which a drawer is accommodated such that front surfaces of a top board, a baseplate, and side boards are almost flush with a front panel of the drawer, and each of parting boards is not seen by the front panel of the drawer by making the size in the depth direction of the parting board slightly shorter, ③ "overset 1 (complete)" in which a drawer is accommodated such that all a top board, a baseplate, side boards, and each of parting boards are hidden by a front panel of the drawer, and ① "overset 2 (boards other than a top board and a baseplate are hidden)" in which a drawer is accommodated such that side boards other than the top board and the baseplate and each of parting boards are hidden by a front panel of the drawer is selected.

Figure 72:
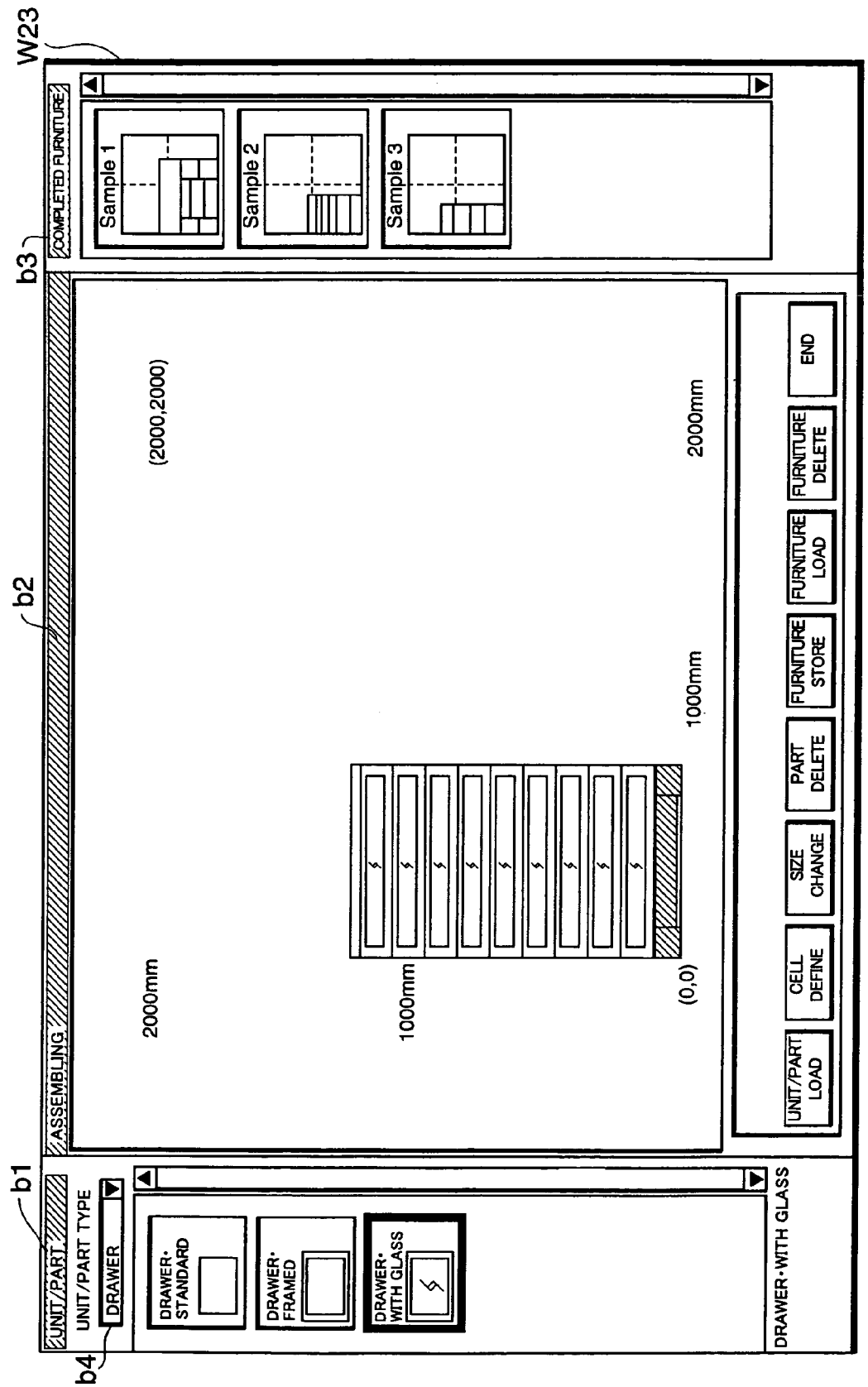
FIG. 72 illustrates another example of display of an assembling main window.

When any one of the setting methods is selected, and an "OK" button is clicked, furniture accommodating drawers by the setting method selected using the setting method selection window W26 is displayed in the assembled furniture display area b2, as shown in FIG. 72 (here, drawers with glass are accommodated by "overset 2") (corresponding to the steps 66 to 68 in FIG. 28). The setting method selection window W26 disappears.

Figure 73:
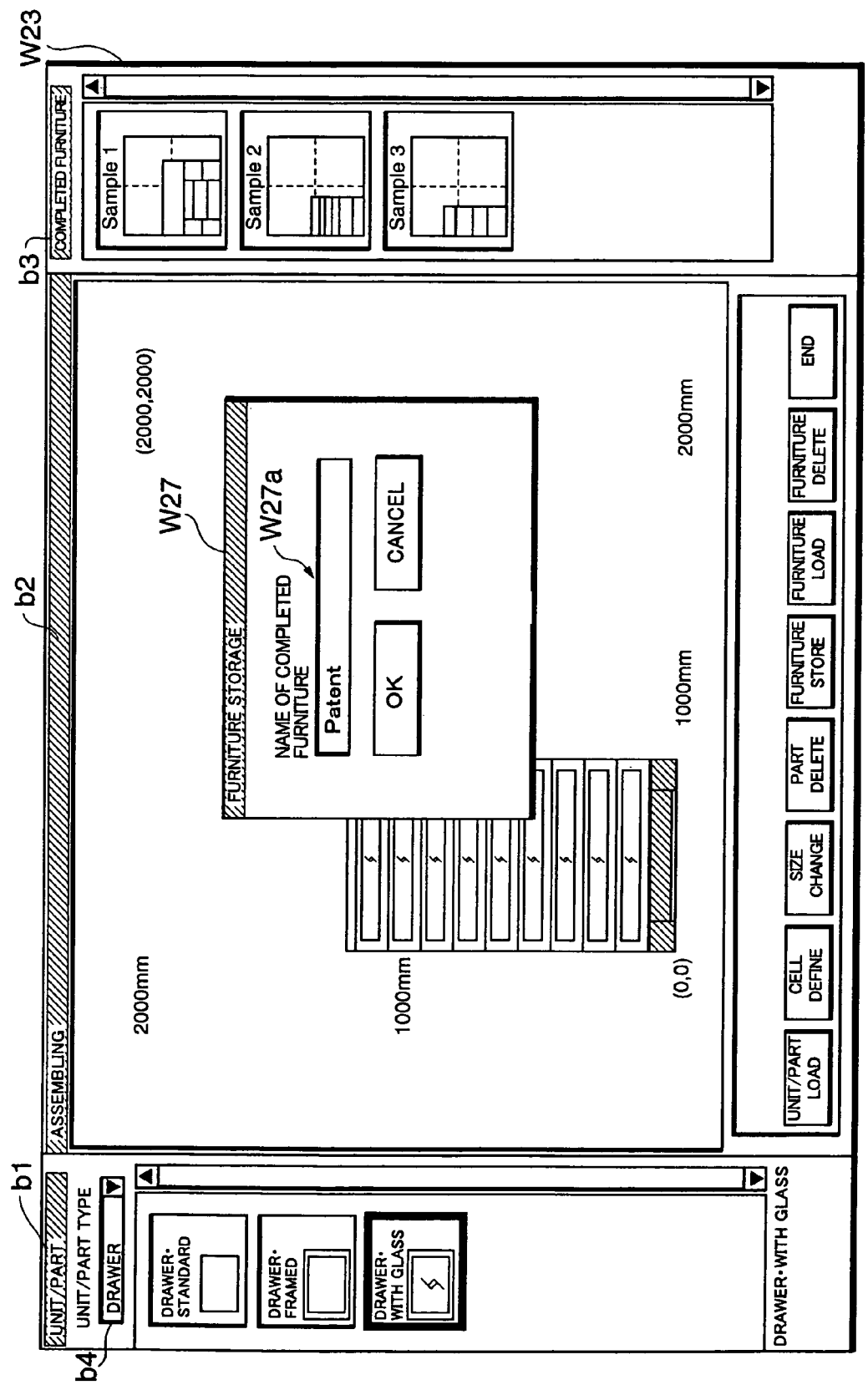
FIG. 73 illustrates an example of display of a furniture storage window.
Figure 74:
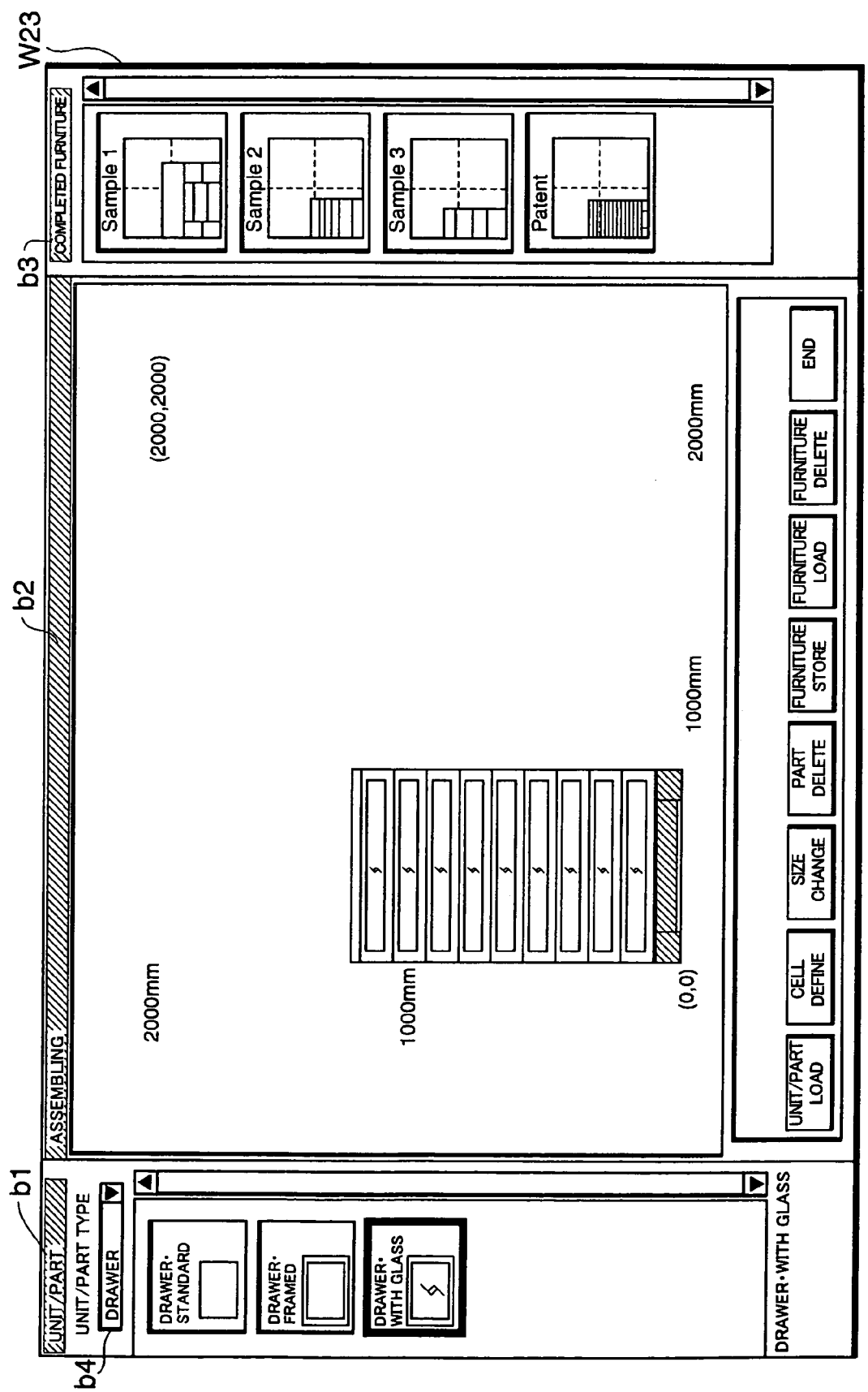
FIG. 74 illustrates another example of display of an assembling main window.

When the "furniture store" button is clicked (step 73), a furniture storage window W27 is displayed (FIG. 73). A name for specifying furniture is inputted into a field W27a for displaying "name of completed furniture" using the keyboard 12, and an "OK" button is clicked. As shown in FIG. 74, an image representing the furniture displayed in the assembled furniture display area b2 is reduced in size and is displayed in the completed furniture display area b3 (step 74). Further, the name inputted using the above-mentioned furniture storage window W27 is displayed on the reduced image.

In the assembling main window W23, the "part delete" button, the "furniture load" button, and the "furniture delete" button are respectively clicked in a case where an assembled (attached) part is deleted (removed) (deleted from the data table), a case where completed furniture displayed in the completed furniture display area b3 is displayed in the assembled furniture display area b2, and a case where completed furniture displayed in the completed furniture display area b3 is deleted (deleted from the data table). When the "end" button is clicked, the assembling main window W23 disappears from the display screen (step 75 in FIG. 28).

Figure 31:
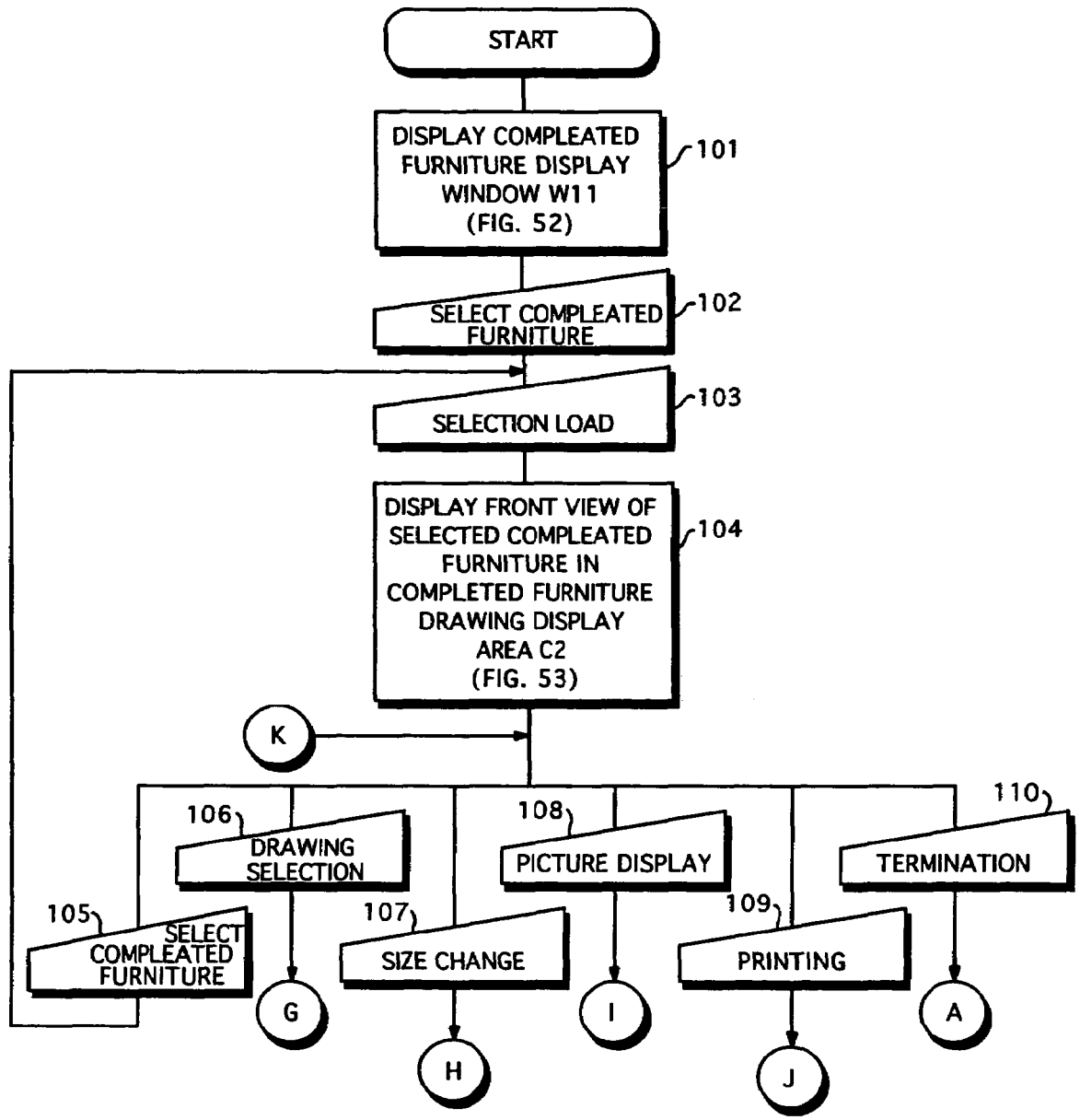
FIG. 31 is a flow chart showing the flow of drawing display/printing processing.
Figure 75:
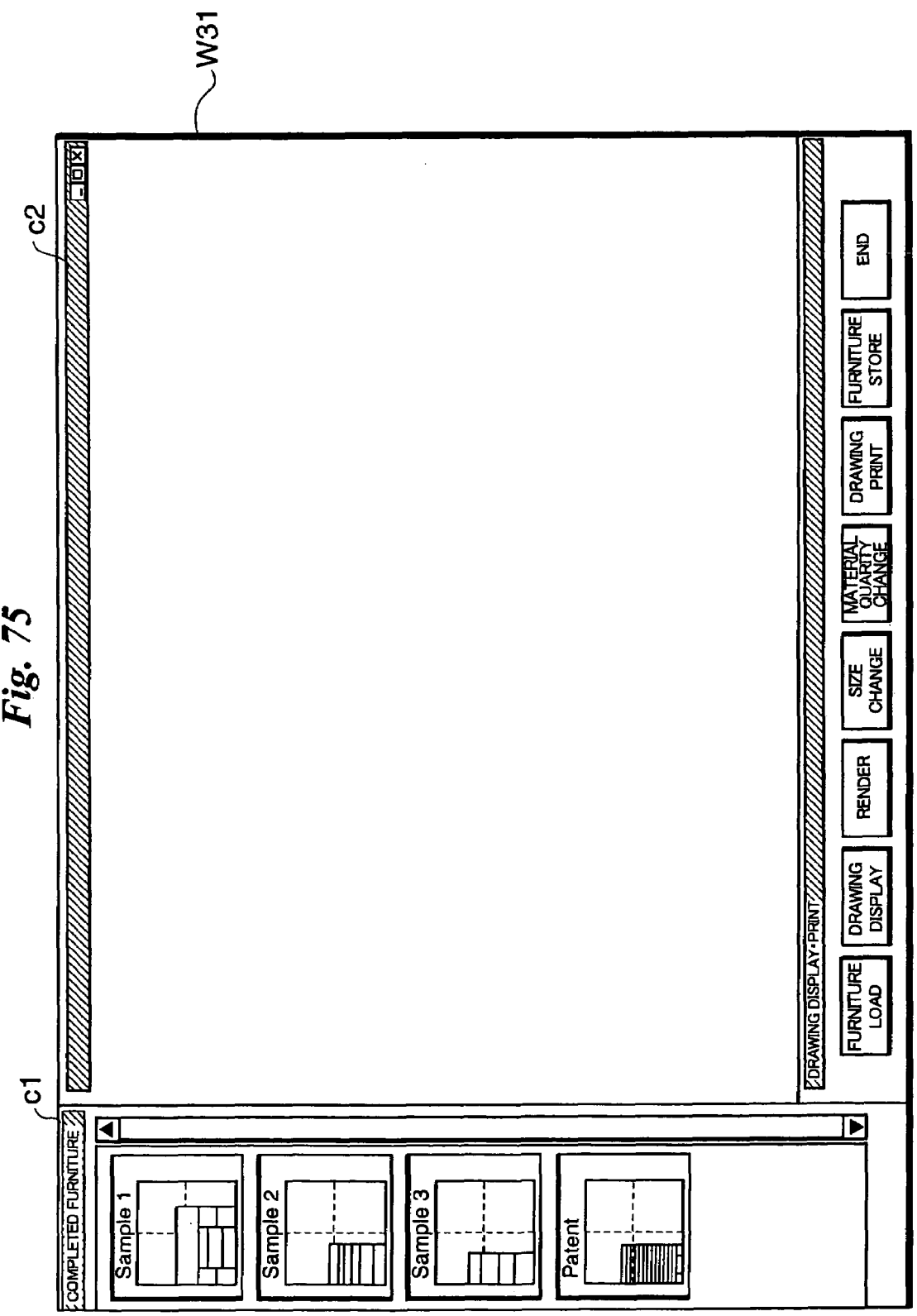
FIG. 75 illustrates another example of display of a completed furniture display window.

FIG. 75 illustrates another example of the completed furniture display window which appears on the display screen when the "drawing display/print" button is clicked by an operator or a user in the main menu window W1 (FIG. 37) (steps 32 and 35 in FIG. 25, and step 101 in FIG. 31). A completed furniture display area c1 is positioned on the left side of the completed furniture display window W31, and a completed furniture drawing display area c2 is positioned on the right side thereof.

"Furniture load", "drawing display", "render", "size change", "material quality change", "drawing print", "furniture store", and "end" buttons are displayed on the lower side of the completed furniture display window W31.

Figure 76:
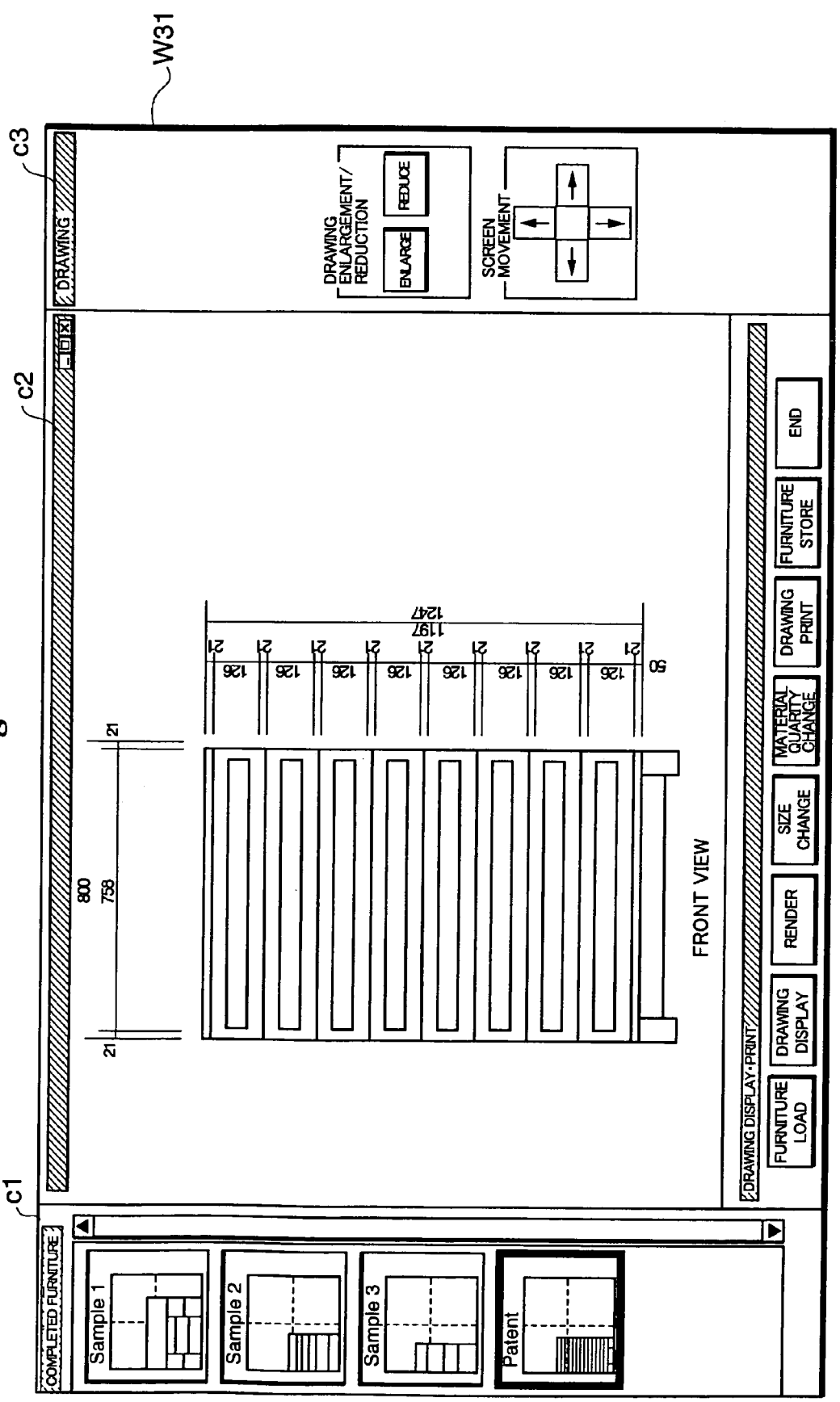
FIG. 76 illustrates another example of display of a completed furniture display window.

When any image of completed furniture is selected using the mouse 13 in the completed furniture display area c1, and the "furniture load" button is then clicked (steps 102 and 103 in FIG. 31), a front view of the selected completed furniture, together with the size thereof, is displayed in the completed furniture drawing display area c2, as shown in FIG. 76 (step 104). A button for enlarging or reducing a drawing displayed in the completed furniture drawing display area c2 and redisplaying the drawing and a cross button for moving the drawing of the furniture displayed in the completed furniture drawing display area c2 in any of upward, downward, rightward and leftward directions and displaying the drawing are newly displayed on the right side of the completed furniture drawing display area c2.

Figure 77:
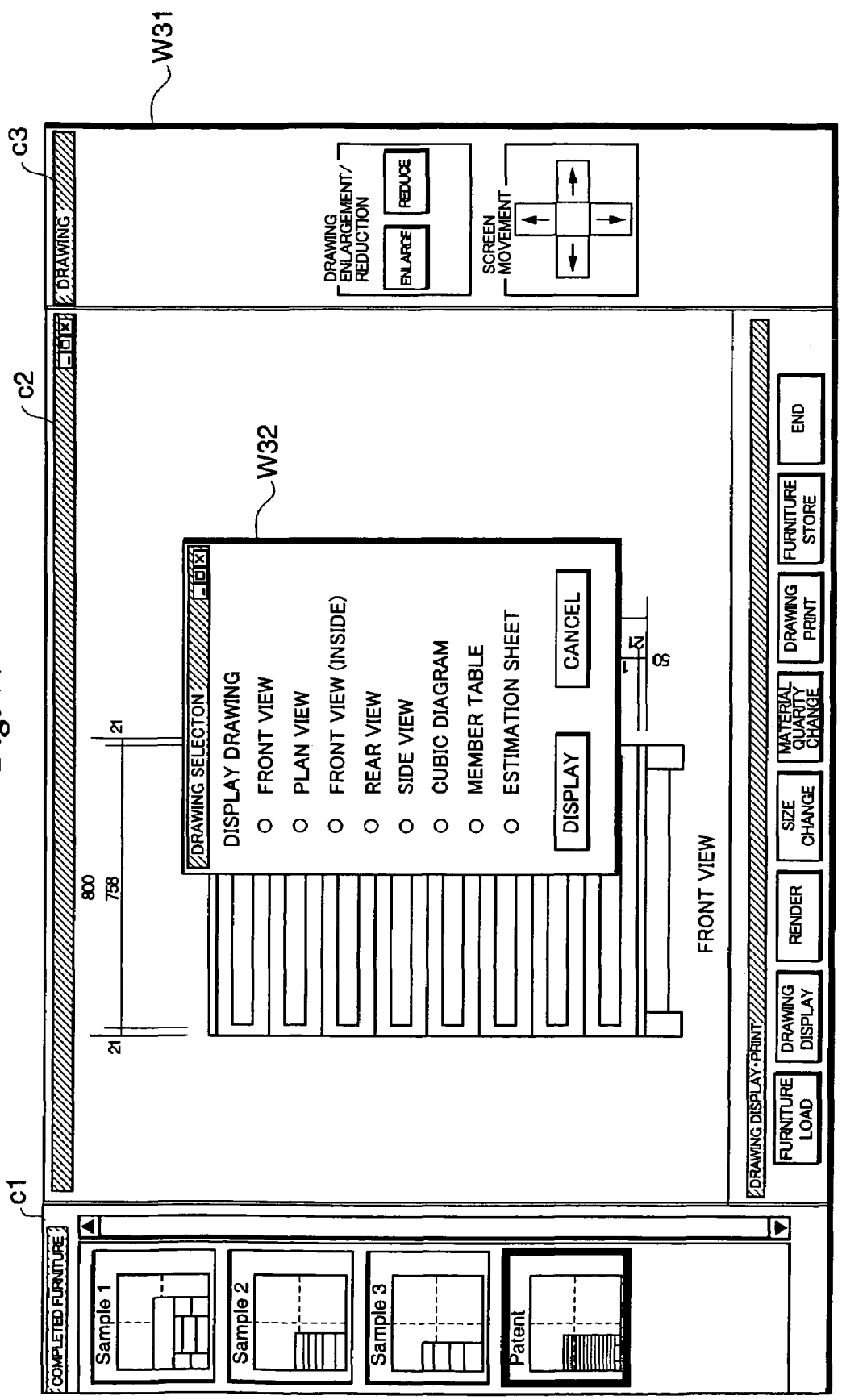
FIG. 77 illustrates an example of display of a drawing selection window.

When the "drawing display" button is clicked (corresponding to the processing (FIG. 32) for "drawing selection" (step 106) shown in FIG. 31), a drawing selection window W32 is displayed with the window overlapped with the completed furniture display window W31, as shown in FIG. 77. In the drawing selection window W32, the variety of drawing (a front view, a plan view, etc), to be displayed in the completed furniture drawing display area c2, for example, is selected.

Figure 78:
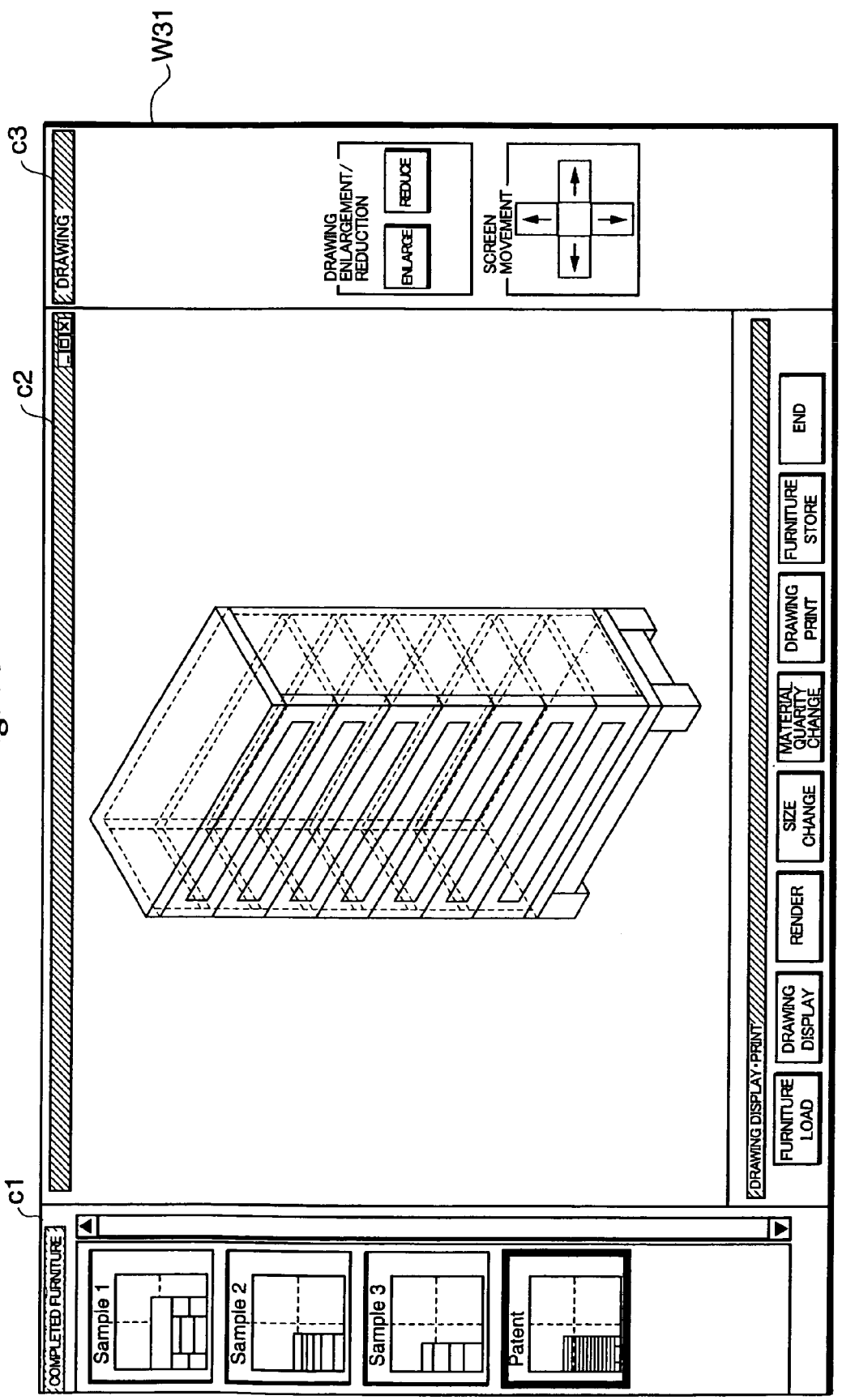
FIG. 78 illustrates an example of display of a completed furniture display window.

When a cubic diagram, for example, is selected (step 112 in FIG. 32), and a "display" button on the lower side of the drawing selection window W32 is clicked, completed furniture is displayed in a three-dimensional manner in the completed furniture drawing display area c2, as shown in FIG. 78 (step 114).

Figure 79:
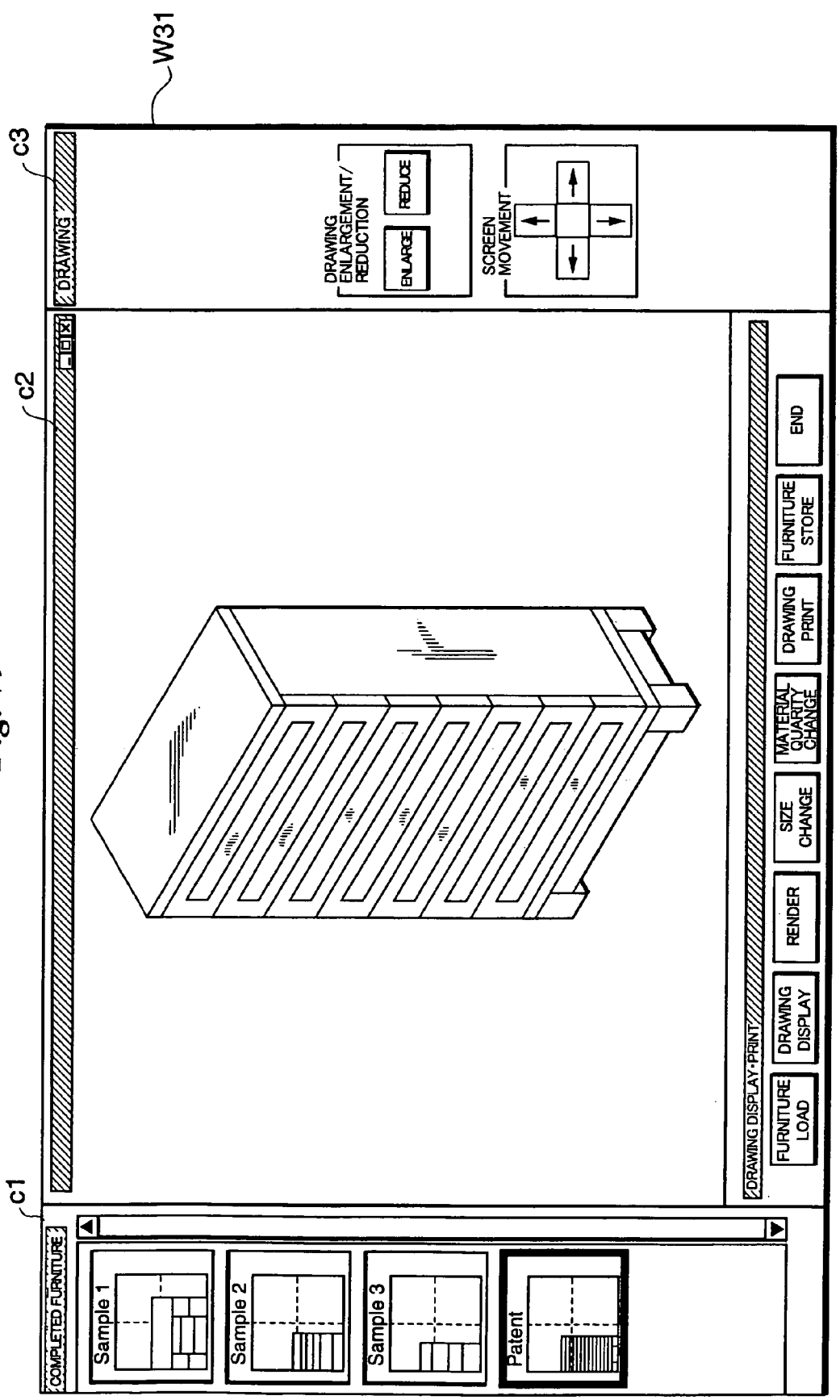
FIG. 79 illustrates an example of display of a completed furniture display window.

When the "render" button on the lower side of the completed furniture display window W31 is clicked, a drawing which has been subjected to rendering processing is displayed in the completed furniture drawing display area c2, as shown in FIG. 79.

For the rendering processing, a CAD (Computer Aided Design) program (software) can be utilized. The CAD program may be located as a part of the furniture design support program, or may be a program separate from the furniture design support program.

The CAD program generates three-dimensional drawing data (data representing the coordinates of a vertex, a side, and a surface and their mutual relation) related to completed furniture on the basis of reference point data and size data which are stored in the data table related to units and parts. Data and an instruction required to generate and output the three-dimensional drawing data related to the completed furniture are handed to the CAD program from the furniture design support program (a 3D modeling instruction, a 3D drawing instruction, and a 3D printing instruction). The CAD program includes a function (a modeling function) required to generate the three-dimensional drawing data, and performs calculation (coordinate transformation) as to in which form a three-dimensional object is seen in a two-dimensional image on the basis of the data delivered from the furniture design support program, to generate three-dimensional drawing data (modeling). Further, the CAD program includes a drawing function for removing a line and a surface of a portion which is hidden (hidden line removal and hidden surface removal), and performing shading processing, ray-tracing processing, or the like, to do drawing on the display screen and a printing function for doing printing. A two-dimensional image expressed in a three-dimensional manner can be displayed on the display screen of the display device 11, or can be outputted from the printer 17.

Figure 80:
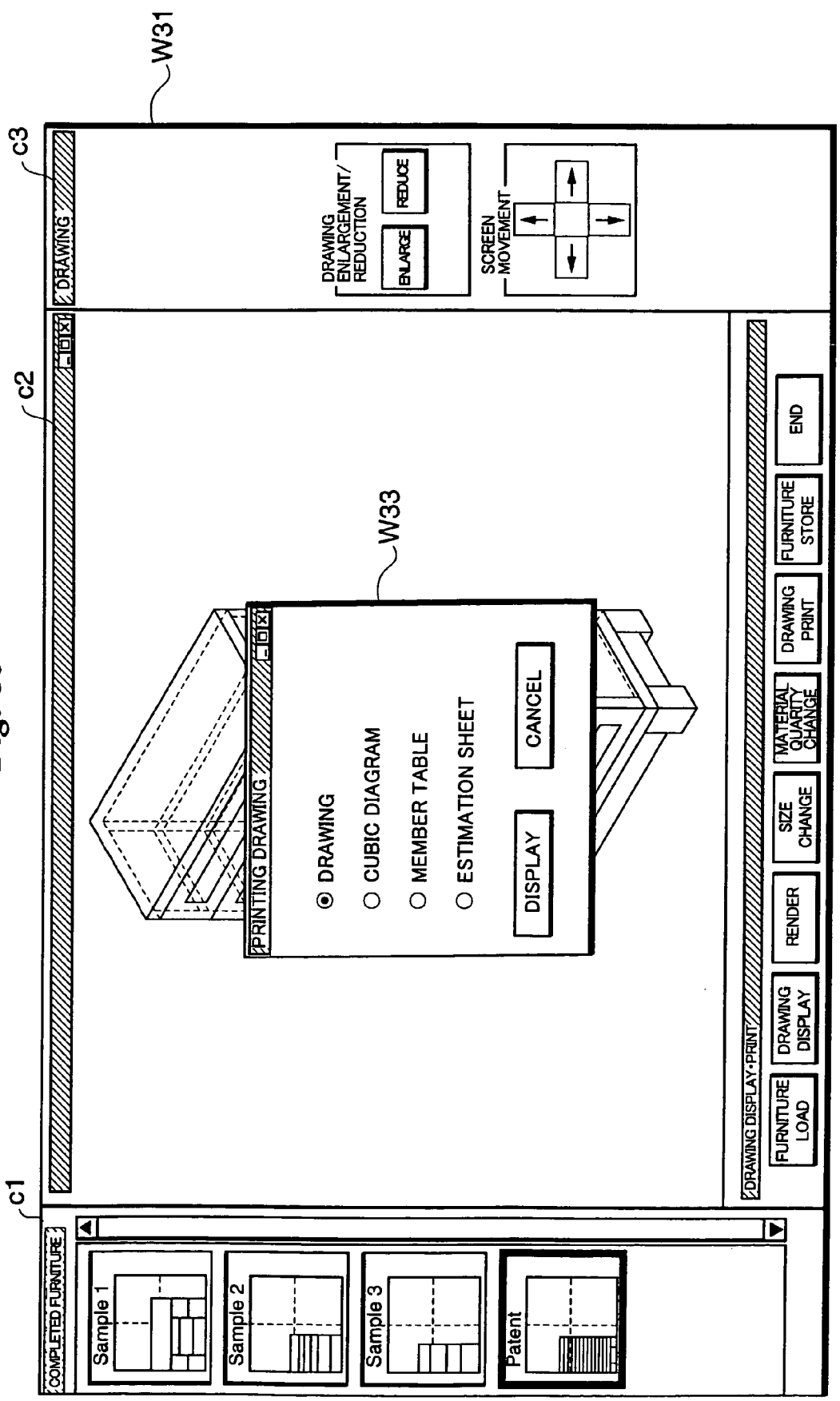
FIG. 80 illustrates an example of display of a printing drawing selection window.

When the "drawing print" button on the lower side of the completed furniture display window W31 is clicked, a printing drawing selection window W33 appears, as shown in FIG. 80 (corresponding to step 109 in FIG. 31, and corresponding to FIG. 36). The printing drawing selection window W33 includes characters "drawing", "elevation view", "member table", and "estimation sheet" and circular input boxes respectively corresponding thereto, and comprises a "display" button and a "cancel" button.

Figure 81:
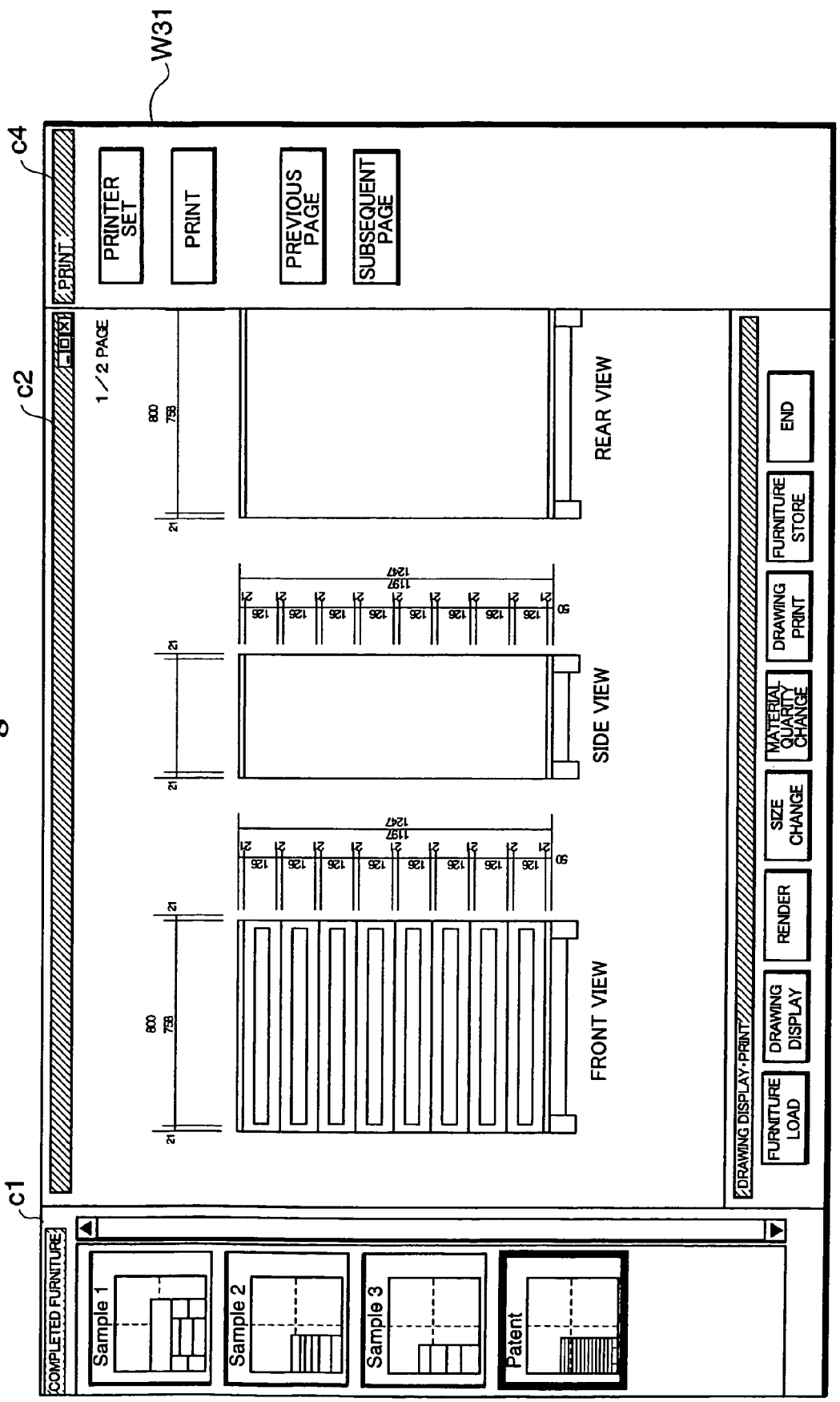
FIG. 81 illustrates an example of display of a completed furniture display window.

When "drawing" is selected in the printing drawing selection window W33, and the "display" button is then clicked, a front view, a side view, a rear view, etc. of completed furniture, together with the size thereof, are displayed in the completed furniture drawing display area c2, as shown in FIG. 81. "Printer set", "print", "previous page", and "subsequent page" buttons appear in an area c4 on the right side of the screen. The "printer set" button, the "print" button, the "previous page" button, and the "subsequent page" button are respectively clicked in a case where the setting of a printer displayed on the display screen (designation of a printer which should output prints in a case where the prints can be outputted to a plurality of printers), a case where printing is done, a case where the previous page is displayed when a drawing displayed on the display screen covers a plurality of pages, and a case where the subsequent page is displayed.

Figure 82:
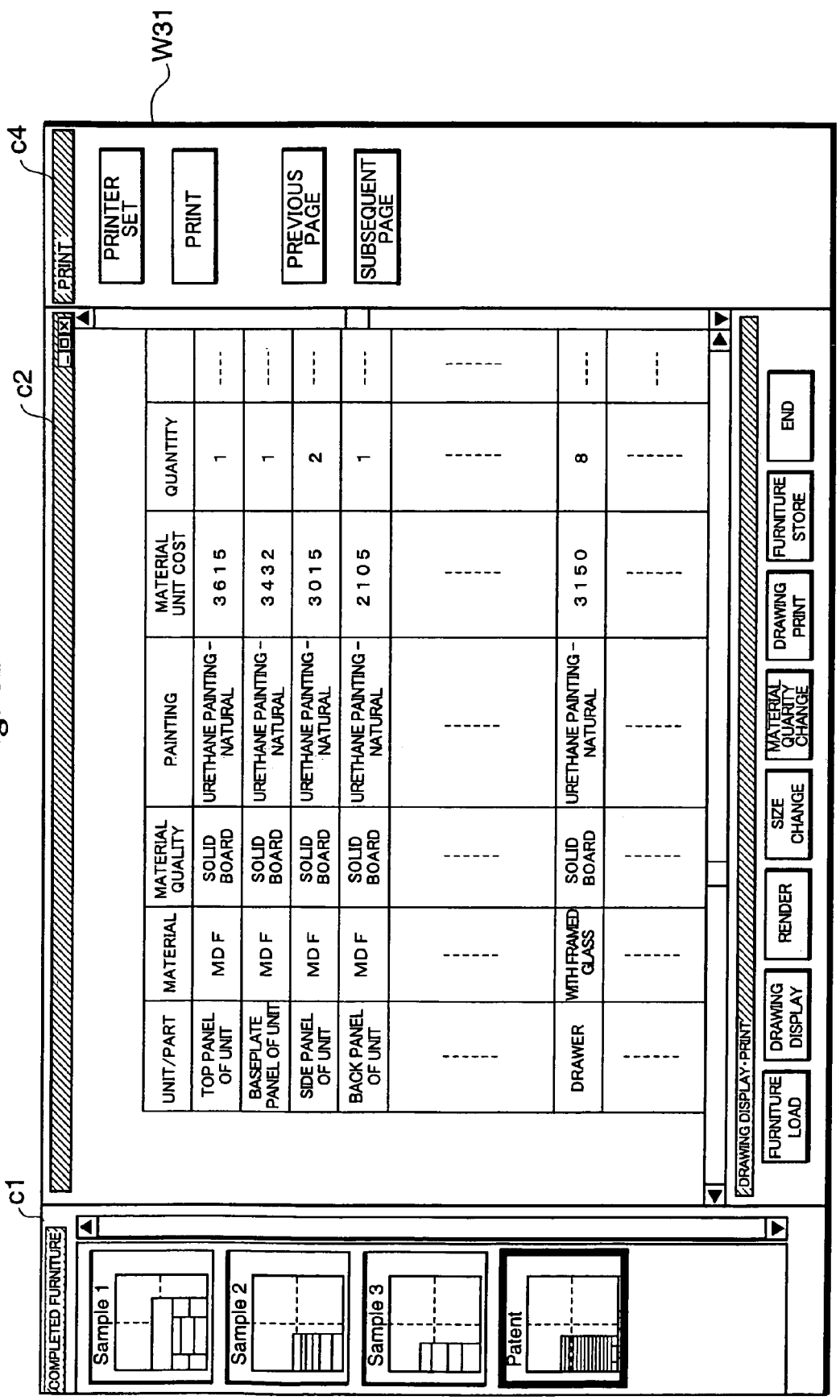
FIG. 82 illustrates an example of display of a completed furniture display window.
Figure 83:
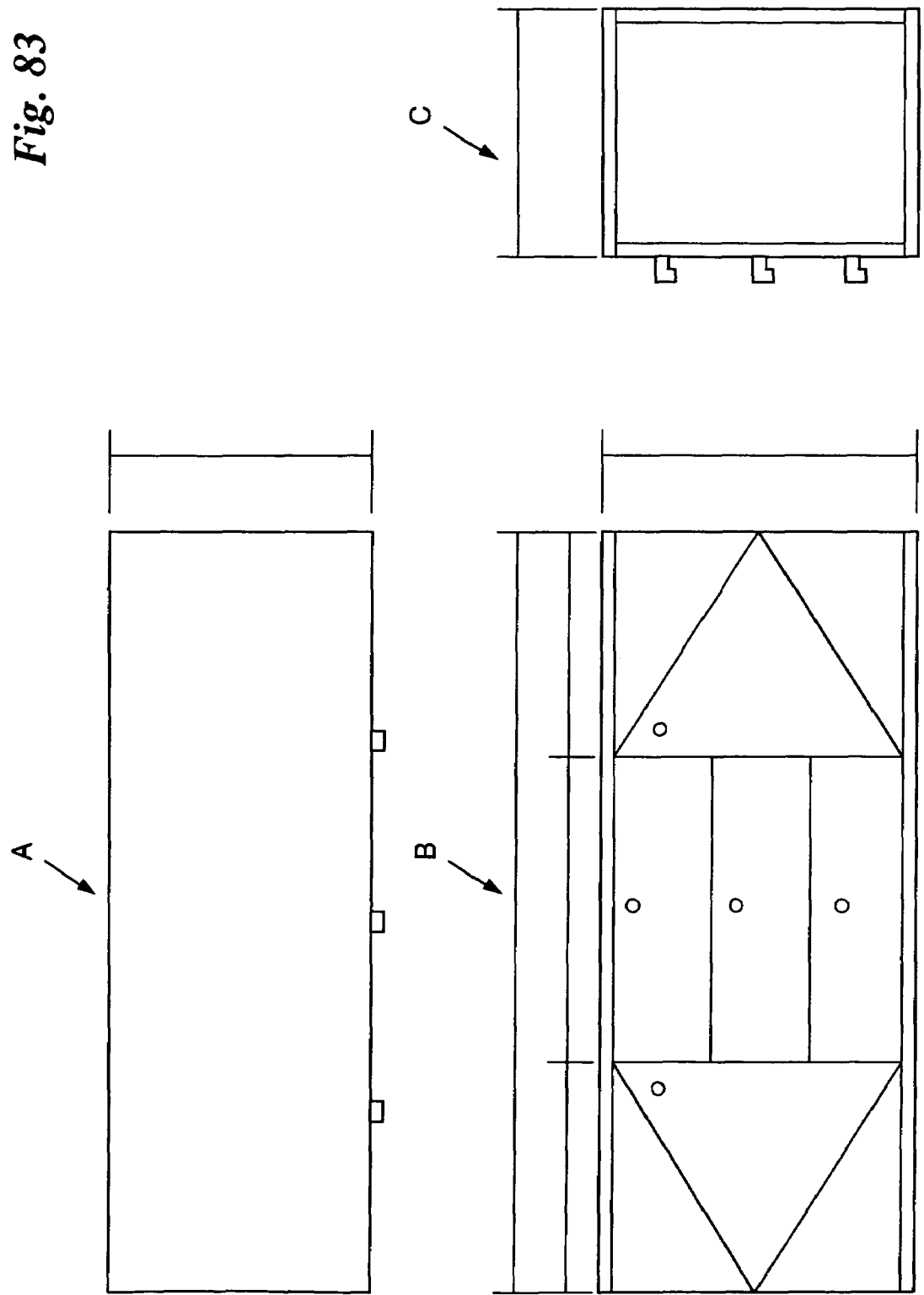
FIG. 83 illustrates a processing drawing of completed furniture.

When "cubic diagram" is selected in the printing drawing selection window W33 (FIG. 80), and the "display" button is clicked, a cubic diagram is displayed in the completed furniture drawing display area c2 (see FIG. 78). When "member table" is selected, and the "display" button is clicked, members (units and parts) used for the completed furniture displayed in the completed furniture drawing display area c2 are displayed by a list (not shown). When "estimation sheet" is selected, and the "display" button is clicked, "name", "material", "material quality", "painting", "size", "material unit cost", "painting unit cost", "quantity", "total amount of money", etc. of each of the units and the parts which are used for the completed furniture displayed in the completed furniture drawing display area c2 are displayed by a list, as shown in FIG. 82. When the "print" button is clicked, any one of the drawing, the elevation view, the member table, and the estimation sheet which are displayed in the completed furniture drawing display area c2 is printed out from the printer 17 (step 154 in FIG. 36).

In the completed furniture display window W31, the "size change" button and the "material quality change" button are respectively clicked in a case where the size of the completed furniture or the size of the cell is changed (corresponding to step 107 in FIG. 31, step 126 in FIG. 33, and FIG. 34) and a case where the material quality (the material) of the unit or the part used for the completed furniture is changed. When data representing the completed furniture the size or the material quality of which has been changed is stored, the "furniture store" button is clicked. When the "end" button is clicked, the completed furniture display window W31 disappears from the display screen.

5 Processing Drawing Production Processing

As described in the foregoing, the front view, the side view, the rear view, etc. of the completed furniture, together with the size thereof, can be displayed on the display screen or printed out on the basis of the furniture design data (data stored in various kinds of tables) 25 produced using the furniture design support system. Each of the units and the parts which constitute the completed furniture is caused to have more detailed data as the furniture design data 25, thereby making it possible to display a drawing for processing the units and the parts which constitute the completed furniture (a processing drawing) or print out the drawing. FIGS. 83 to 91 illustrate examples of processing drawings used for manufacturing furniture. FIGS. 83 to 91 illustrate examples of processing drawings used for manufacturing furniture. FIGS. 83 to 91 illustrate processing drawings for the furniture (completed furniture) shown in FIG. 5.

FIGS. 83A, 83B, and 83C respectively illustrate a plan view of the completed furniture, a front view of the completed furniture, and a right side view of the completed furniture, together with the size (numbers representing the size are omitted. The same is true for the other drawings).

Figure 84:
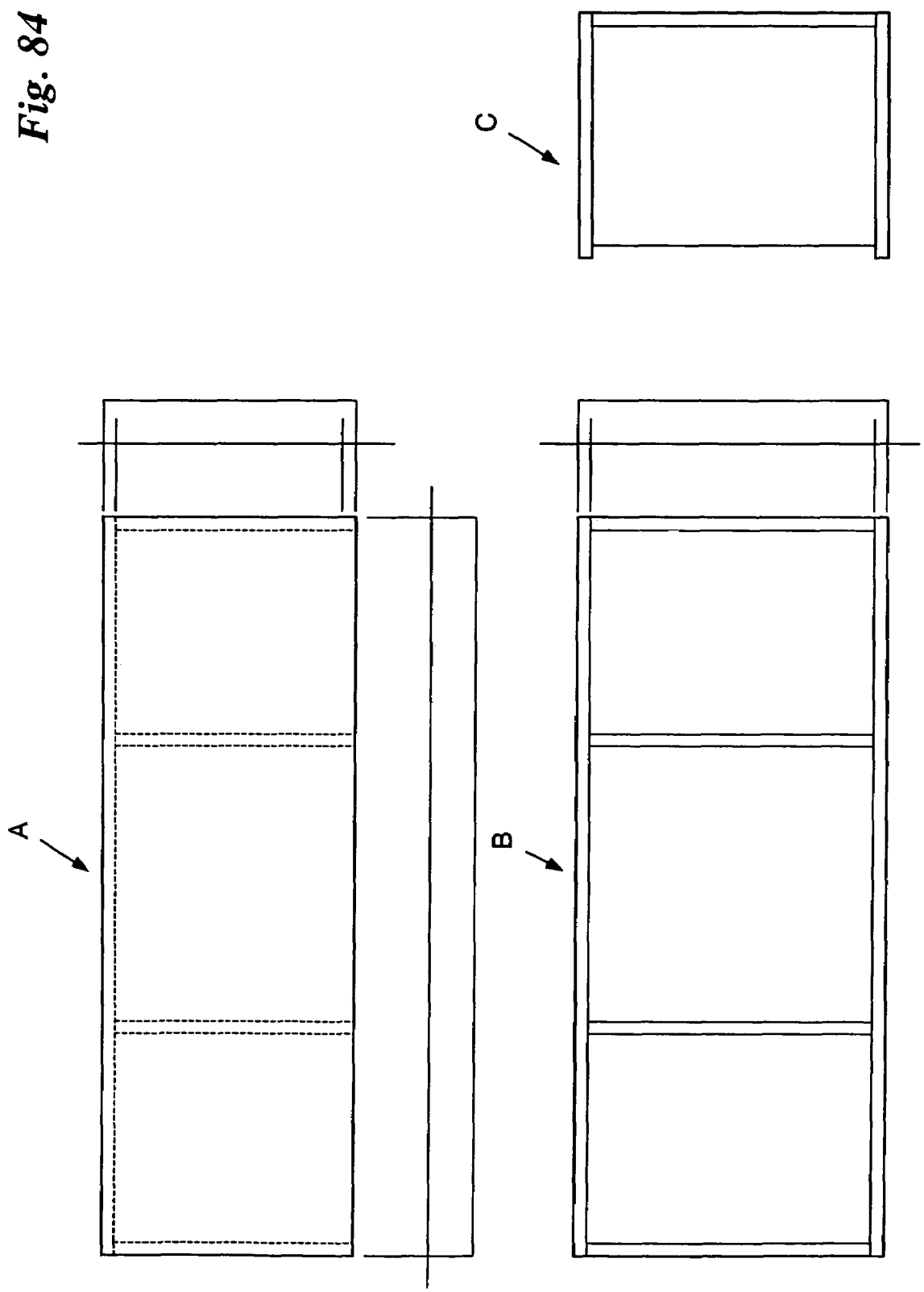
FIG. 84 illustrates a processing drawing of a combination of a unit and a parting board in completed furniture.

FIG. 84 illustrates a unit and a parting board (a shelf board) of the completed furniture, together with the sizes thereof. FIGS. 84A, 84B, and 84C are respectively a plan view, a front view, and a right side view.

FIG. 85 illustrates a processing drawing of a top board. FIG. 85A is a plan view of the top board (a view showing the top board as viewed from the top), FIG. 85B is a front view of the top board, FIG. 85C is a bottom view of the top board (a reverse surface; a view showing the top board as viewed from the cell (the inside of the unit)), and FIG. 85D is a diagram showing a joint portion between the top board and a side board in enlarged fashion. A slit (a black circle) used for joining the side board and a back board is shown on a bottom surface (reverse surface) of the top board. The joint portion between the top board and the side board is illustrated in enlarged fashion in FIG. 85D with respect to a portion indicated by an arrow in FIG. 85C. In FIG. 85D, a portion indicated by a broken line represents a dowel to be inserted into the slit.

FIG. 86 illustrates a processing drawing of a baseplate. FIG. 86A is a plan view of the baseplate (a view showing the baseplate as viewed from the cell (the inside of the unit)), FIG. 86B is a front view of the baseplate, FIG. 86C is a bottom view of the baseplate (a view showing the baseplate as viewed from the bottom), and FIG. 86D is an enlarged view of a joint portion between the baseplate and a side board.

FIG. 87 illustrates a processing drawing of a back board. FIG. 87A is a plan view of the back board, FIG. 87B is a front view of the back board, 87C is a bottom view of the back board, and FIG. 87D is a right side view of the back board. FIG. 87E and FIG. 87F respectively illustrate a slit formed in the back board as viewed from the front and the side.

FIG. 88 illustrates a processing drawing of side boards. FIGS. 88A to 88E and FIG. 88F to 88J respectively illustrate a processing drawing of the left side board and a processing drawing of the right side board. FIG. 88A(88I) is a front view of the side board, FIG. 88B(88G) is a right side view of the side board, FIG. 88C(88H) is a plan view of the side board, FIG. 88D(88F) is a rear view of the side board, and FIG. 88E(88J) is a bottom view of the side board. FIG. 88B(88G) and FIG. 88D(88F) illustrate a hinge to be attached to the side board (and a slit for attaching the hinge).

Figure 89:
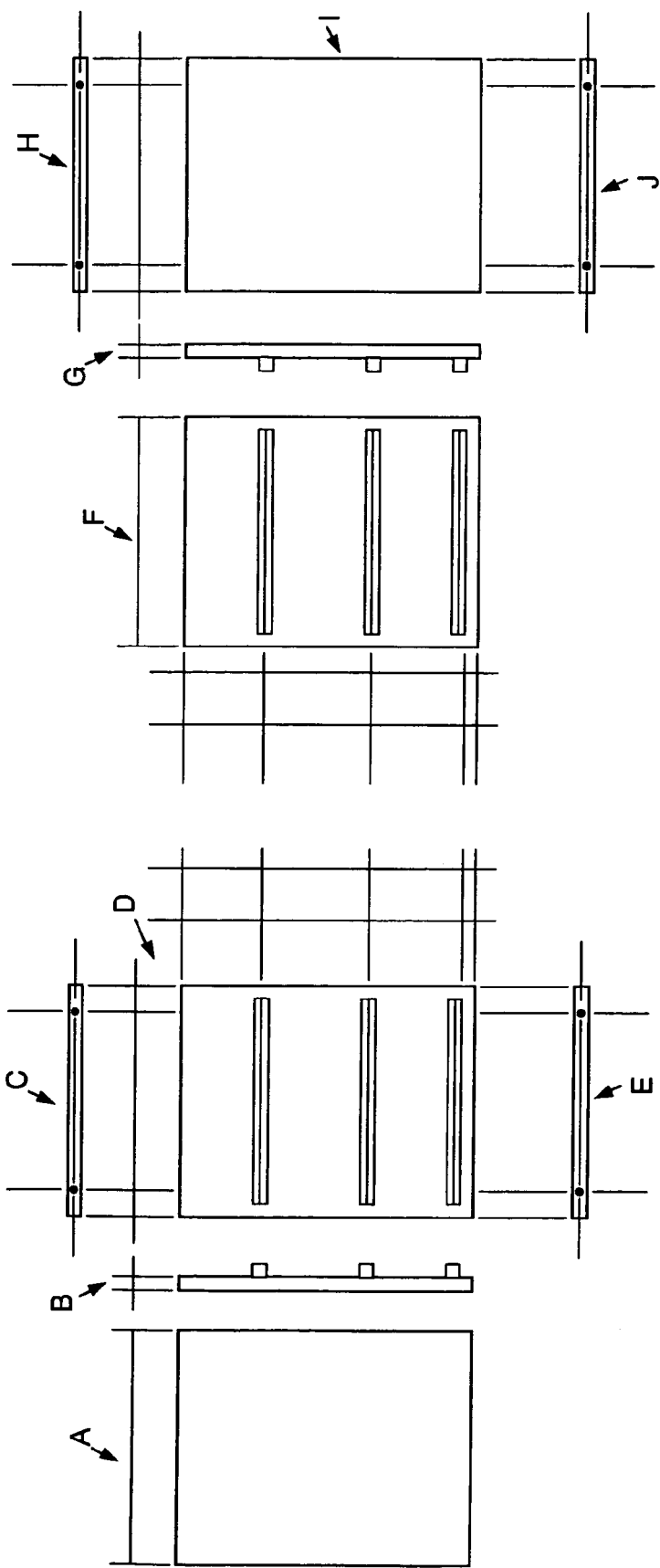
FIG. 89 illustrates a processing drawing of a parting board.

FIG. 89 illustrates a processing drawing of parting boards arranged between a door leaf and a drawer and accommodated inside the unit (cell). FIGS. 89A to 89E and FIGS. 89F to 89J respectively illustrate a processing drawing of the left parting board and a processing drawing of the right parting board. FIG. 89A(89I) is a front view of the parting board, FIG. 89B(89G) is a right side view of the drawer, FIG. 89C (89H) is a plan view of the drawer, FIG. 89D(89F) is a rear view of the drawer, and FIG. 89E(89J) is a bottom view of the drawer. FIG. 89D(89F) illustrates a rail used when the drawer is accommodated inside the unit.

Figure 90:
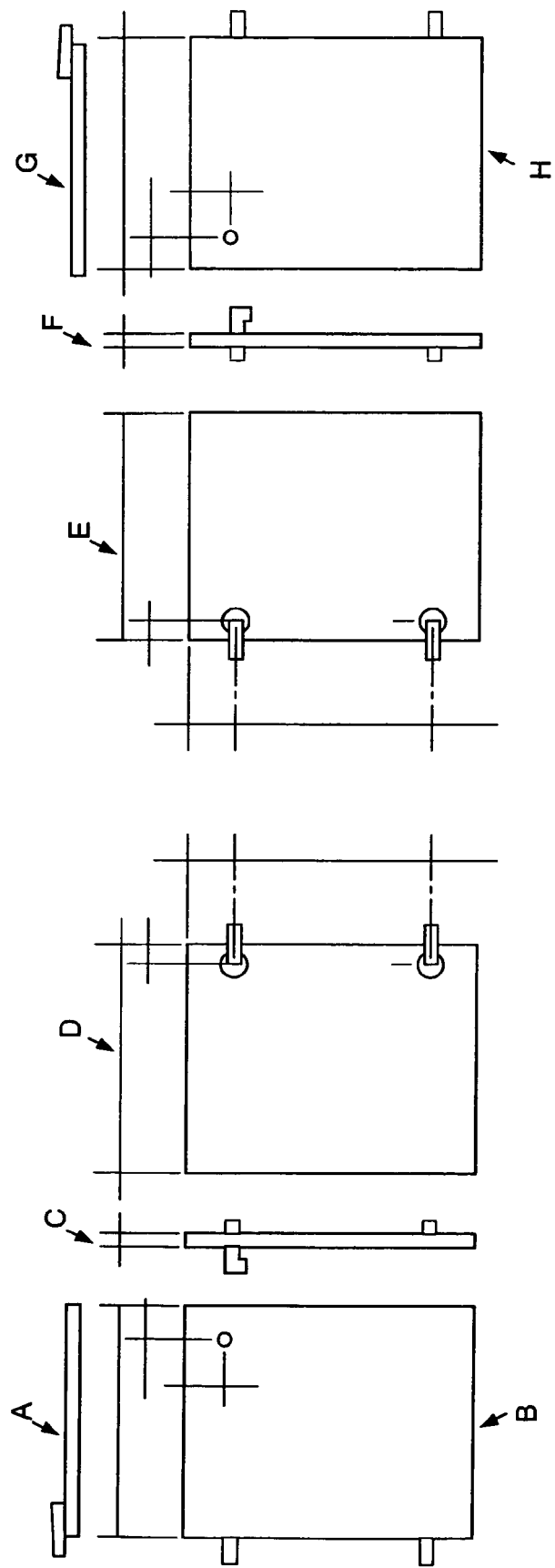
FIG. 90 illustrates a processing drawing of a door leaf.

FIG. 90 illustrates a processing drawing of door leaves. FIGS. 90A to 90D and FIG. 90E to 90H respectively illustrate a processing drawing of the left door leaf and a processing drawing of the right door leaf. FIG. 90A(90G) is a plan view of the door leaf, FIG. 90B(90H) is a front view of the door leaf, FIG. 90C is a right side view of the door leaf, FIG. 90F is a left side view of the door leaf, and FIG. 90D(90E) is a rear view of the door leaf. FIG. 90D(90E) and FIG. 90B(90H) illustrate a hinge for attaching the door leaf to the unit. A handle attached to the door leaf is illustrated in FIGS. 90A (90G), 90B(90H), and 90C(90F).

Figure 91:
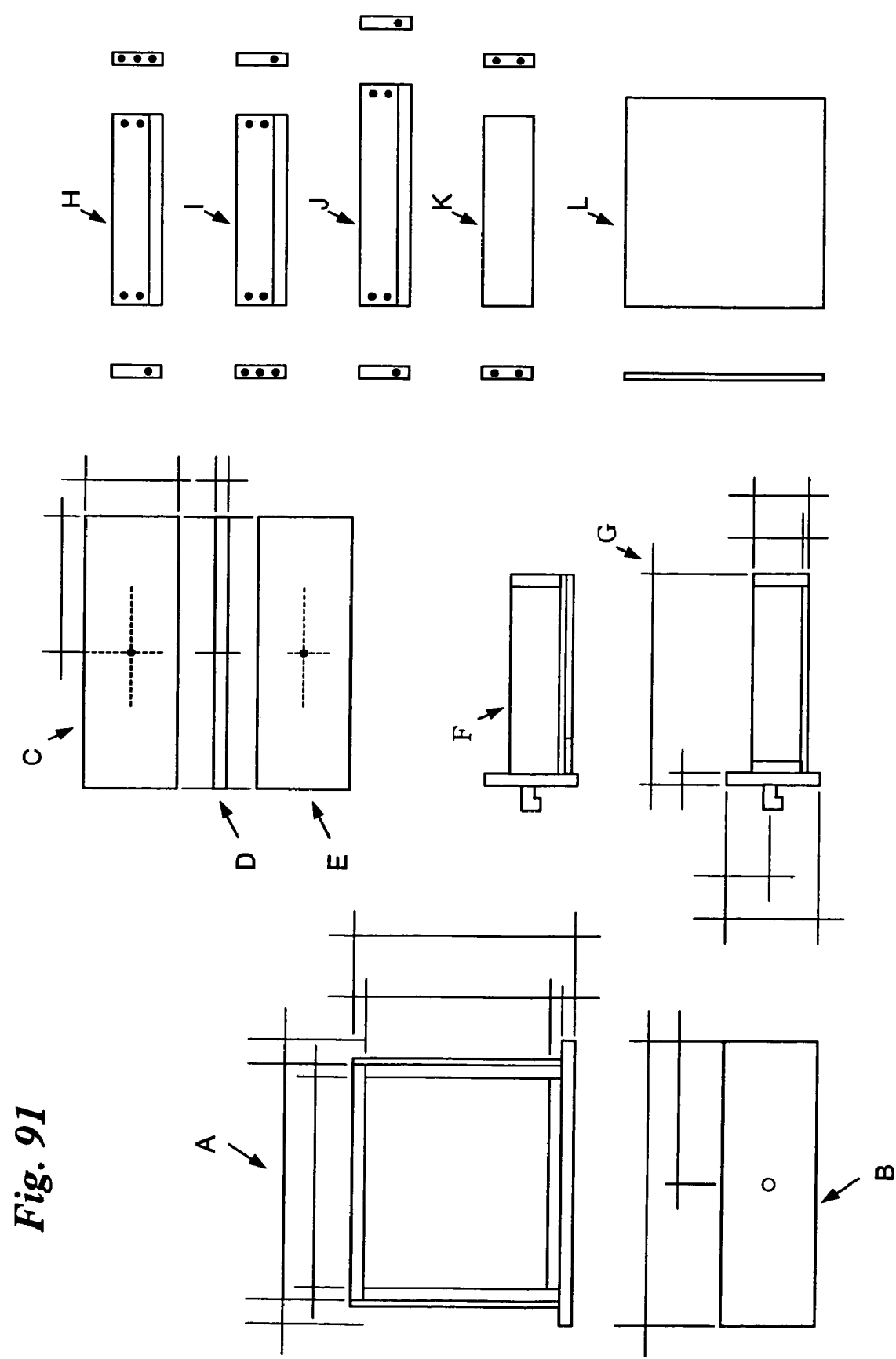
FIG. 91 illustrates a processing drawing of a drawer.

FIG. 91 illustrates a processing drawing of a drawer. FIG. 91A is a plan view of the assembled drawer. FIG. 91B is a front view of a front panel to be attached to a front surface of the drawer. FIG. 91F is a right side view of the drawer. FIG. 91G is a cross-sectional view showing the drawer in a portion excluding the front panel as viewed from the right side.

FIGS. 91C to 91E and FIGS. 91H to 91L are respectively processing drawings showing members (elements) constituting the drawer. FIG. 91C is a front view of the front panel, FIG. 91D is a plan view of the front panel, and FIG. 91E is a rear view of the front panel. FIG. 91C and FIG. 91E illustrate a slit for a handle to be attached to the front panel of the drawer. FIG. 91H, FIG. 91I, FIG. 91J, FIG. 91K, and FIG. 91L respectively illustrate a left side board which is an element constituting a box portion of the drawer, a right side board of the box portion of the drawer, a back board of the box portion of the drawer, a front panel of the box portion of the drawer, and a baseplate of the box portion of the drawer.

In the processing drawing production processing, data for each of the members (elements) constituting each of the units and the parts which constitute the completed furniture (data representing a size, a punching position, a hinge attachment position, etc.). A table storing data for producing a processing drawing may be newly provided in the HD, to previously store in the basic information table (FIG. 10) data which should be stored in the data table for producing the processing drawing, if required.

A program for the processing drawing production processing may be positioned as a part of the function of the above-mentioned furniture design support program, or may be a program different (separate) from the furniture design support program. When the program for the processing drawing production processing is a program different (separate) from the furniture design support program, the program for the processing drawing production processing is for performing processing for producing the processing drawing in accordance with furniture design data produced using the furniture design support program and data in the table storing the data for producing the processing drawing. The produced processing drawing is displayed on the display screen, or is printed out.

The processing drawing produced by the processing drawing production processing is mainly utilized, when completed furniture designed using the furniture design support system is actually produced in a furniture manufacturing workshop (a furniture manufacturing factory) or the like, by a manufacturing person (a processing person) of the furniture.

Data used for producing the processing drawing (data representing the size of a unit, the sizes of members (elements; a top board, a baseplate, a side board, a back board, etc.) constituting the unit, the position where a slit for each of the elements is formed, the position where a hinge is attached, the size of a part (a drawer), the sizes of elements (a front panel attached to a front surface of a box portion, and a front panel, side boards, a baseplate, and a back board of the box portion) constituting the drawer, the position of a slit for the drawer, the position of a slit for a door leaf, etc.) are coded data. Therefore, the elements constituting the unit and the elements constituting the part can be also produced under the control of a computer by causing a CAM (Computer Aided Manufacturing) device (a numeric value control machine tool) for processing completed furniture (or the units and the parts constituting the completed furniture) to read the data for producing the processing drawing.

Since the furniture is constituted by units and parts, and each of the units and the parts is constituted by elements, the sizes of the units, the parts, and the elements are determined depending on the size of the furniture. The number of joint members used for assembling the elements and the joint positions (e.g., the number of slits and the positions thereof, and the position where a hinge is attached) may be changed depending on the sizes of the units, the parts, and the elements. For example, the relationship between the size of the standard element and the number of joint members and the position where each of the joint members is arranged is previously determined in the data table. The furniture design support program (or the program for the processing drawing production processing) may be caused to make such judgment that the number of slits is increased if the size of the element exceeds a threshold value (a set value), while being reduced if it is smaller than the threshold value.

6 Manufacturing Process Drawing Production Processing

As described in the foregoing, the furniture design data provided by the furniture design support system include data required to display on the display screen an image representing the appearance (a rendering drawing) of the completed furniture, for example, the respective structures (types) of the units and the parts which are included in the completed furniture, the respective sizes of the units and the parts, and the positional relationship among the units and the parts and print the design drawing. That is, the furniture design data previously shows how the units and the parts are combined to constitute the furniture. A manufacturing process drawing of the completed furniture can be produced, as follows, by preparing still another data (data table).

Figure 92:
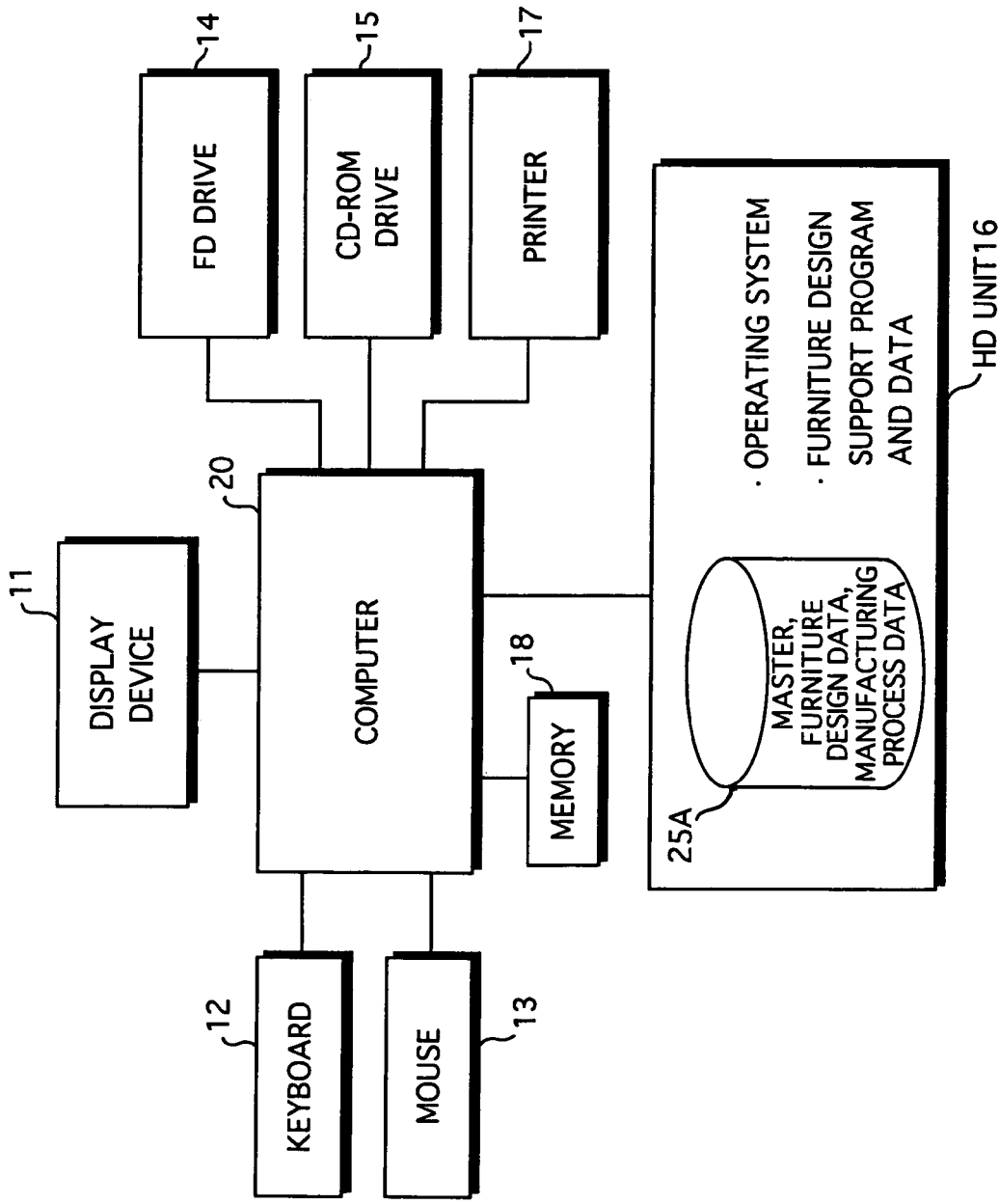
FIG. 92 is a block diagram showing another example of the electrical configuration of a furniture design support system.

FIG. 92 illustrates the electrical configuration of a furniture design support system (a computer system) comprising manufacturing process data used for producing a manufacturing process drawing. The furniture design support system differs from the furniture design support system shown in FIG. 9 in that manufacturing process data is stored in the HD unit 16 (HD) (indicated by reference character 25A). The other hardware configuration and programs and data which are stored in the HD are the same as those shown in FIG. 9 and hence, the overlapped description is avoided.

Figure 93:
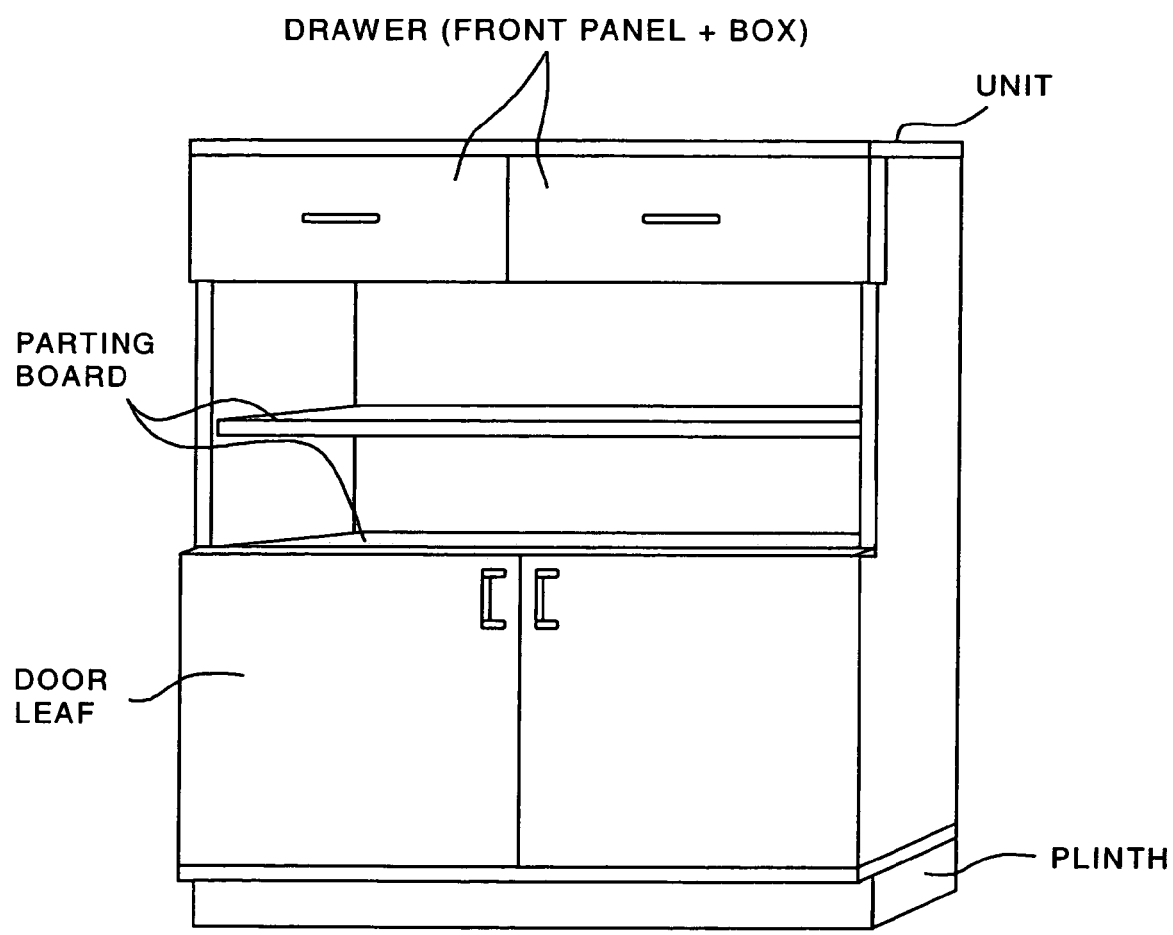
FIG. 93 is a perspective view showing an example of completed furniture.
Figure 94:
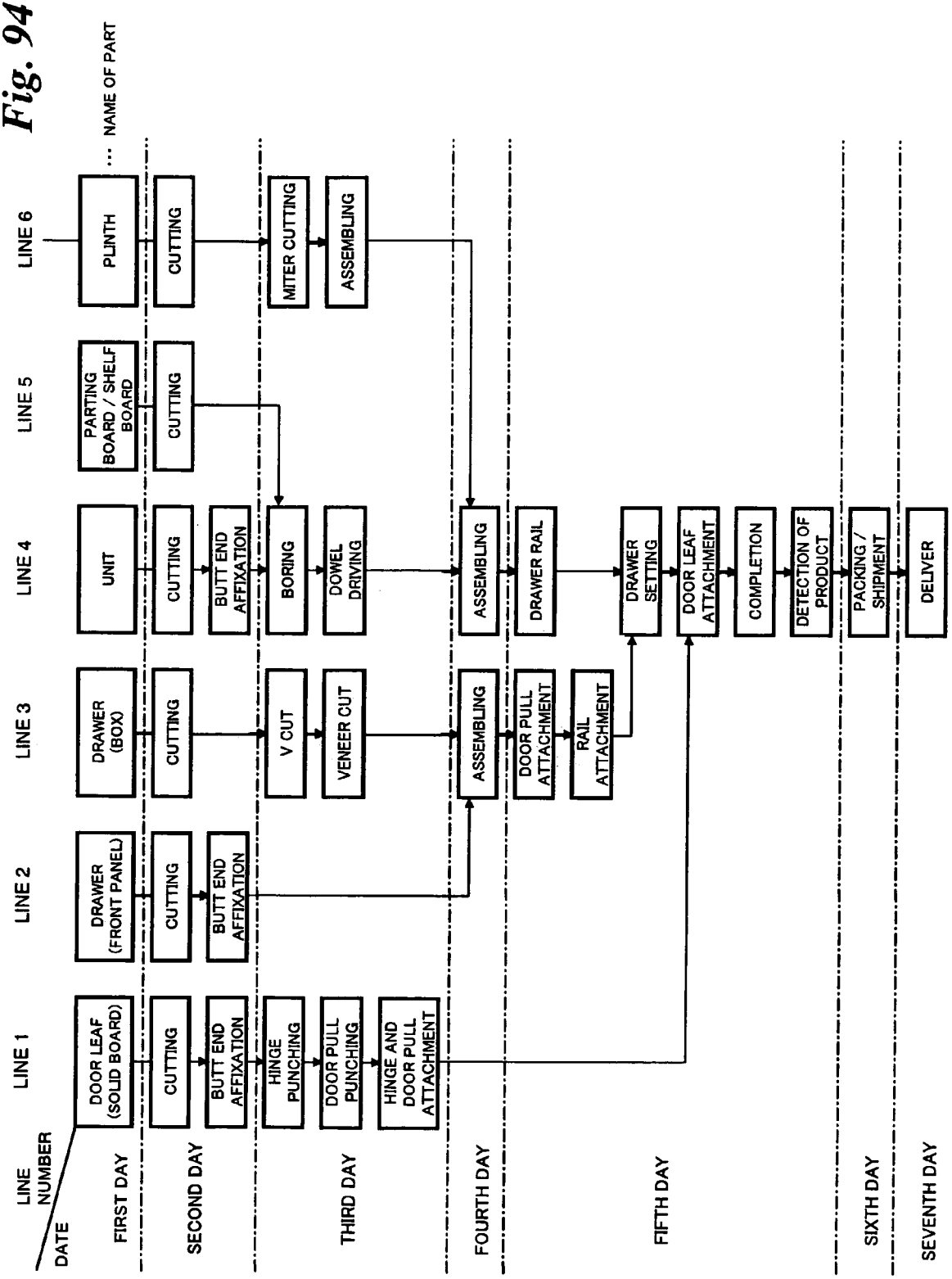
FIG. 94 illustrates an example of a manufacturing process drawing.

FIG. 93 is a perspective view showing an example of completed furniture (a cabinet with drawers). FIG. 94 illustrates an example of a manufacturing process drawing of the completed furniture (the cabinet with drawers) shown in FIG. 93.

The manufacturing process drawing shown in FIG. 94 is used for manufacturing work of furniture in a furniture manufacturing workshop, a furniture manufacturing factory, or the like. Units and parts are processed in the furniture manufacturing workshop or the like in accordance with the flow of manufacturing processes shown in the manufacturing process drawing, to manufacture the furniture.

In the manufacturing process drawing, a processing line is shown for each of the parts and the units which must be processed. The parts and the units which are included in the furniture are respectively processed for the processing lines.

Finally, the parts and the units which have been respectively processed in the processing lines are combined (assembled or attached), to complete the furniture. The furniture (the cabinet with drawers) shown in FIG. 93 comprises a door leaf, drawers, a unit (of a top board and base board covering type), parting boards (shelf boards), and a plinth. They are a unit and parts which must be processed in the cabinet with drawers. With respect to the drawer, the processing line is divided into those for a front panel and a box.

Work processes previously determined for each of the units and the parts are arranged in the processing line. In the manufacturing process drawing of FIG. 94, "door leaf (solid board)" is paid attention to. There are five work processes, i.e., cutting, butt end affixation, hinge punching, door pull punching, and hinge and door pull attachment. With respect to each of the units and the parts which constitute the furniture (completed furniture), such work processes are previously determined.

Furthermore, the work processes previously determined with respect to each of the units and the parts have data respectively related to the respective dates and the order or processes. When "door leaf (solid board)" constituting the cabinet with drawers is paid attention to, the first work process for processing on the second day is determined as "cutting".

FIG. 95 illustrates an example of a manufacturing process information table storing data related to the work processes for each of the units and the parts which constitute the furniture and the respective dates and the order of processes, for example, which are determined. For the manufacturing process data, the data stored in the manufacturing process information table are used.

The manufacturing process information table stores data respectively related to process division, units/parts, a line number, the order of processes, the contents of work, a coupling line, and the contents of work at a destination of coupling, as shown in FIG. 95.

"Process division" stores a division determined depending on the complexity of the completed furniture and the type of the unit included in the completed furniture, for example. "Process division" is indicated by a time period required from the time when the manufacture is started until a product is finally delivered, for example, "seven days" or "thirty days". For example, "process division" is previously set for each of the units or the parts which are used for the furniture.

The names of the units or the parts, which must be processed, out of the units or the parts which are included in the furniture are stored in the column "unit/part". A processing line ("line number") is allocated to each of the units or the parts (or may be previously allocated). For example, a processing line having a line number 1 is allocated to "door leaf (solid board)" in a case where "process division" is "seven days".

"Order of processes" represents the dates for the work processes (contents of work) of the unit or the part which are defined in the subsequent item "work contents" and the order or processes on the date. For example, "cutting" and "butt end affixation" respectively represent the first process on the second day and the second process on the second day.

When the completed furniture is finally assembled, or the front panel and the box portion of the drawer are assembled if the part is the drawer, the unit or the part (a portion thereof) must be moved into the other processing line. "Coupling line" stores the line number of the processing line at a designation of movement in such a case. "Coupling destination work contents" represents the contents of work in the line at a destination of movement. It is data also called timing of line coupling.

Figure 96:
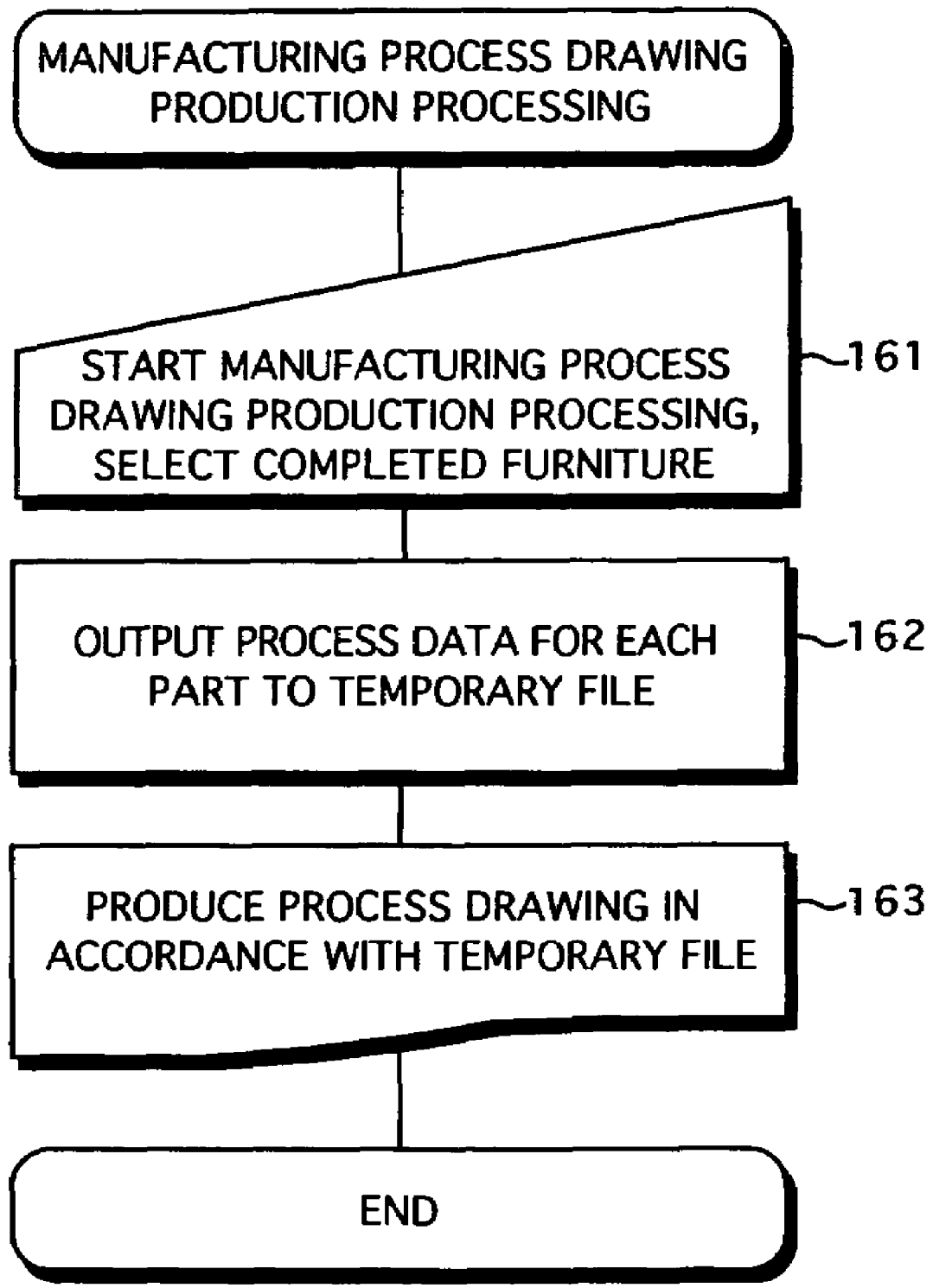
FIG. 96 is a flow chart showing the flow of manufacturing process drawing production processing.

FIG. 96 is a flow chart showing the flow of manufacturing process drawing production processing. FIG. 97 illustrates the contents of a temporary file produced in the manufacturing process drawing production processing shown in FIG. 96.

The manufacturing process drawing production processing can be also positioned as a part of the function of the above-mentioned furniture design support program, or can be also positioned as the function of a separate program which operates utilizing furniture design data produced by the furniture design support system. In this case, a program for the manufacturing process drawing production processing is previously stored (installed) in the HD in the HD unit 16.

First, start processing (e.g., execution of the manufacturing process drawing production output processing program) and selection of the furniture (completed furniture) whose manufacturing process drawing should be produced are performed (step 161).

In the manufacturing process information table and the furniture design data, data related to the selected completed furniture is accessed.

The manufacturing process information table (FIG. 95) previously stores, with respect to each of the parts and the units, which must be processed, included in the completed furniture designed using the furniture design support system, data respectively representing work processes (including the order (the date and the order of processes)), a processing line, a coupling line, the contents of coupling work, etc. Data for specifying the work processes related to each of the parts and the units which are included in the selected furniture are successively read out of the manufacturing process information table, to produce a temporary file as shown in FIG. 97 (step 162).

In the temporary file, the name of furniture, parts (units), a line number, work processes (including termination of work and a destination of coupling), and the order of processes are indicated by codes. Data stored in the temporary file are manufacturing process data related to the selected furniture. The manufacturing process drawing as shown in FIG. 85 is produced on the basis of the temporary file (step 163). The produced manufacturing process drawing is displayed on the display screen, or is printed out.

As for the manufacturing process drawing shown in FIG. 94, the manufacturing process drawing can be used as a schedule in a case where a cabinet with drawers (including a door leaf (solid board), a door pull (front panel), a drawer (box), a unit, a parting board/shelf board, and a plinth) has been manufactured and even delivered in seven days (the first day is used for confirming the progress of work).

In a manufacturing process drawing to be produced, work processes (contents of work) are arranged such that the same work processes included in work processing of different units and parts (e.g., "cutting") are carried out on the same date (e.g., on the second day). The furniture is manufactured (the units and the parts are processed) on the basis of such a manufacturing process drawing, thereby making it possible to efficiently manufacture the completed furniture in a furniture manufacturing factory or the like.

7 Instruction Manual Production Processing

Figure 98:
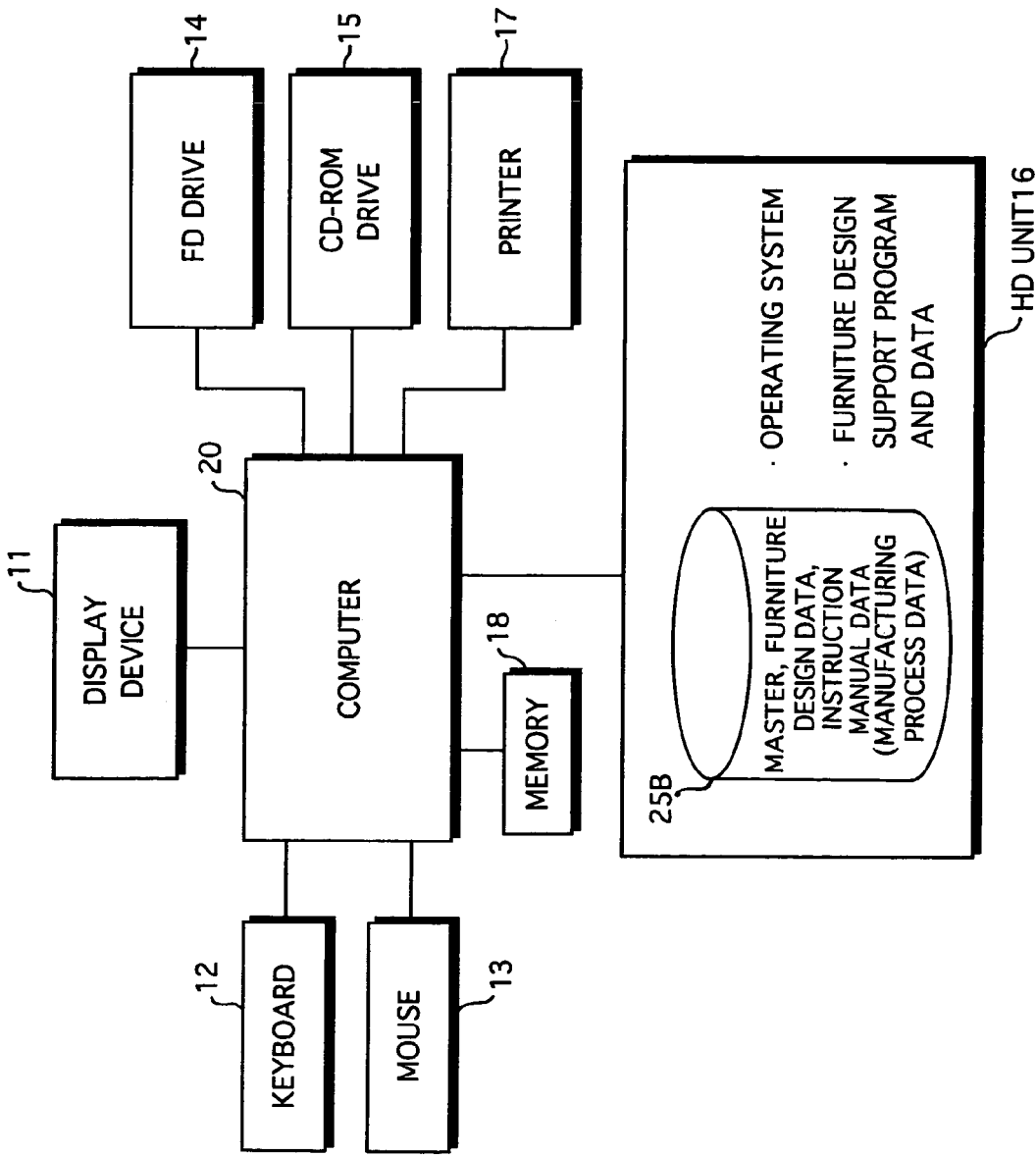
FIG. 98 is a block diagram showing still another example of the electrical configuration of a furniture design support system.
Figure 104:
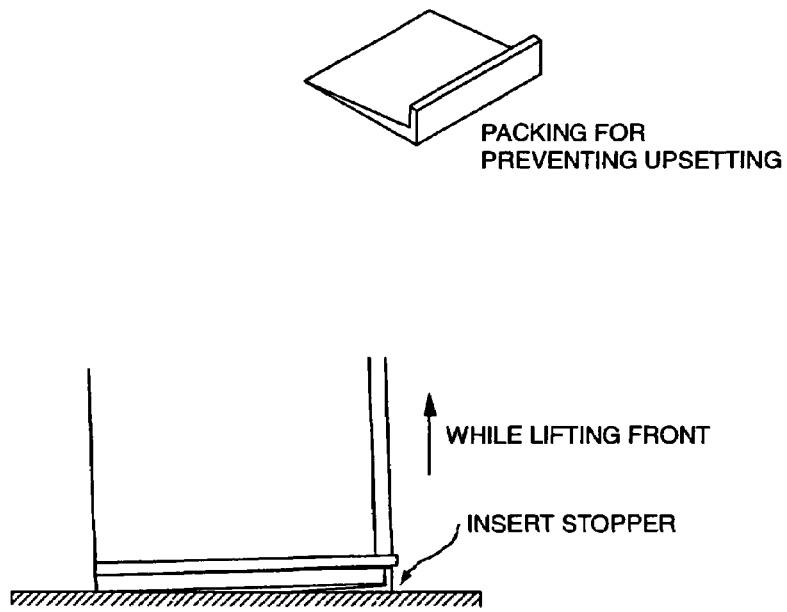
FIG. 104 illustrates an example of an instruction manual.

FIG. 98 illustrates the electrical configuration of a furniture design support system (a computer system) comprising instruction manual data used for producing an instruction manual. The furniture design support system differs from the furniture design support system shown in FIG. 9 in that instruction manual data is added to the HD unit 16 (HD) (indicated by reference character 25B). The other hardware configuration and programs and data which are stored in the HD are the same as those shown in FIG. 9. It goes without saying that the above-mentioned manufacturing process data can be further stored in the HD. In this case, the computer system can perform both the above-mentioned manufacturing process drawing production processing and instruction manual production processing, next described.

The furniture design data provided by the furniture design support system includes data representing the structure (kind), the position (arrangement), the size, and the material of each of units and parts included in furniture (completed furniture), the name of the furniture, etc., as described above. In the instruction manual production processing, data stored in an instruction manual table, a text data table, and an image data table, described below, and the above-mentioned furniture design data are used, to produce an instruction manual for the furniture. The instruction manual production processing is basically processing for inserting (incorporating), on the basis of data representing the basic structure (model) of the instruction manual stored in the instruction manual table, text data stored in the text data table, furniture design data, and image data stored in the image data table into the position of a predetermined blank field of the model, to produce the instruction manual. FIGS. 99 to 104 illustrate examples of the instruction manual produced by the furniture design support system. FIG. 99 (the cover of the instruction manual) shows how the text data stored in the test data table, the furniture design data, and the image data stored in the image data table are inserted (incorporated) into the position of the blank field in the basic structure of the instruction manual. A portion denoted by each of reference characters 170a to 170m (a portion enclosed by a one-dot and dash line) is a portion represented by the inserted data (the inserted portion (the one-dot and dash line) is omitted in FIGS. 100 to 104).

FIG. 105, FIG. 106, and FIG. 107 respectively illustrate an example of the instruction manual table, an example of the text data table, and an example of the image data table. Data respectively stored in the tables are used, to produce instruction manual data representing an instruction manual.

The instruction manual table (FIG. 105) stores data respectively related to an output item, output conditions, parts, a format 1, a format 2, the type of output data, and the contents of explanation.

"Output item" stores any of items in the instruction manual (display, cautions, before-use cautions, and a using method). "Output" is herein used in the sense that the furniture design data or the data stored in the text data table or the image data table is used (inserted or incorporated) for the instruction manual (for the instruction manual data) to be produced.

"Output conditions" stores the presence or absence of conditions (no conditions or conditions) for judging whether or not the text (text data) stored in the text data table, described later, is unconditionally outputted (included in the instruction manual) or is outputted depending on the furniture or the unit.

"Part" stores the name of a part whose instruction manual is required. "Furniture name" stores the name of completed furniture whose instruction manual is to be produced.

"Format 1" and "format 2" respectively store data for defining page eject, the number of lines, etc., and data for defining a font, a font size, a display scale, etc.

"Output data type" indicates which of text data, image data, and output data (rendering data) related to an application program (another software, for example, CAD software) is to be outputted (included in the instruction manual).

"Explanation content code" stores a code representing the contents of explanation. By "explanation content code", the text data table (FIG. 106) and the image data table (FIG. 107), described later, are linked to the instruction manual table (FIG. 105).

The text data table (FIG. 106) stores a code and instruction manual text data corresponding to the code. The image data table (FIG. 107) stores a code and instruction manual image data corresponding to the code.

Figure 108:
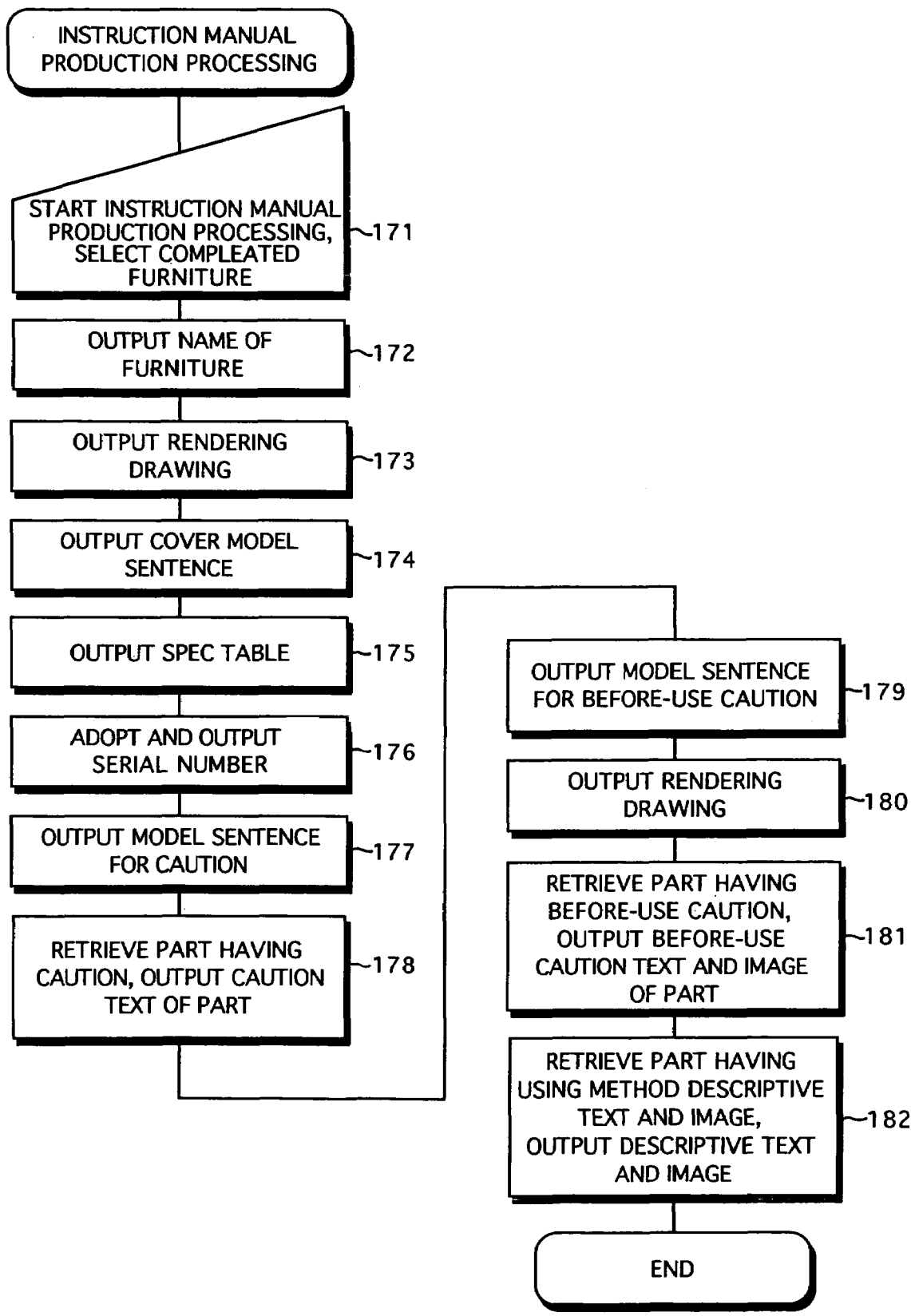
FIG. 108 is a flow chart showing the flow of instruction manual production processing.
Figure 109:
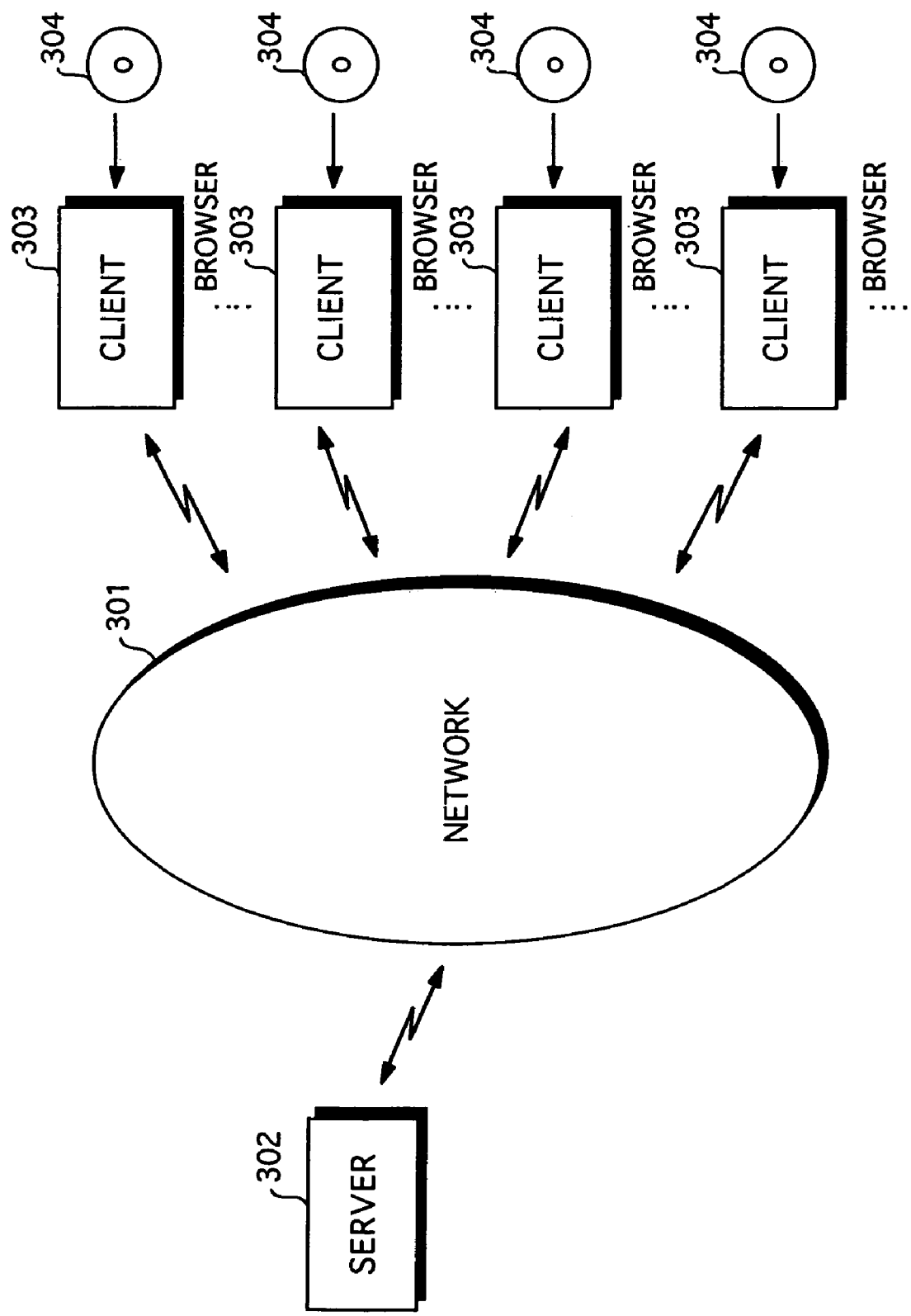
FIG. 109 is a block diagram showing the overall configuration of a furniture design support system utilizing a network.

FIG. 108 is a flow chart showing the flow of instruction manual production processing. The instruction manual production processing can be positioned as a part of the function of the above-mentioned furniture design support program, or can be also positioned as a separate program which is operated utilizing the furniture design data produced by the furniture design support system. In this case, a program for the instruction manual production processing is previously stored (installed) in the HD unit 16 (HD).

First, start processing of the instruction manual production processing (e.g., execution of the program for instruction manual production processing) and selection of furniture whose instruction manual is to be produced are performed (step 171).

In the instruction manual production processing, an instruction manual to be produced, starting at the first page (cover). First, the cover (the first page) is produced.

Referring to FIG. 99, the name of furniture is outputted (inserted or incorporated) (step 172). The name of the furniture is inserted into a portion indicated by reference character 170a. The font, the font size, etc. of characters to be used conform to the data stored in the instruction manual table (FIG. 105).

A rendering drawing of completed furniture is then outputted (step 173). The furniture design data is used to display the rendering drawing in portions denoted by reference character 170b and reference character 170c.

A cover model sentence is outputted (step 174). Text data representing the cover model sentence is read out and is outputted in accordance with the column "explanation content code" of the instruction manual table (FIG. 105) from the text data table (FIG. 106) to a potion denoted by reference character 170d.

A spec table is outputted (step 175). The furniture design data is used to respectively display the name of a product (the name of furniture), a country of production, a size, etc. in portions denoted by reference characters 170e to 170l (it goes without saying that all data for producing the spec table are previously stored in the furniture design data).

A serial number is adopted and is outputted to a portion denoted by reference character 170m (step 176). The serial number is a serial number assigned for each furniture.

By the foregoing processing, data representing the cover (the first page) of the instruction manual for a space-saving closet is completed.

In the same manner, data respectively representing a caution page (FIGS. 100 and 101), a before-use caution page (FIG. 102), and a using method explanation page (FIGS. 103 and 104) are produced.

As for the caution page, a model sentence is outputted (step 177), and cautions concerning parts included in the furniture whose instruction manual is to be produced are outputted (step 178). The program for instruction manual production processing is for performing retrieval on the basis of the furniture design data as to whether or not the part whose cautions should be outputted is included in the furniture whose instruction manual is to be produced, to read out and output cautions concerning the part from the text data table (FIG. 106) when the part is included in the furniture. When the furniture includes two or more identical parts whose cautions should be outputted, the cautions concerning only one of the parts are outputted (the identical cautions are not outputted).

As for the before-use caution page (FIG. 102), a model sentence is outputted (step 179), and a rendering drawing is outputted (step 180). In the outputted rendering drawing, the name of a main part, together with a leader line, is displayed (data related to the name of the part displayed in the rendering drawing is also previously included in the furniture design data or the instruction manual data).

A program for the instruction manual production processing is for performing retrieval as to whether or not the part whose before-use cautions should be outputted is included in the furniture whose instruction manual is to be produced, to read out and output the before-use cautions concerning the part from the text data table (FIG. 106) and to read out and output the image data from the image data table (FIG. 107) when the part is included in the furniture (step 181).

As for the using method explanation page (FIGS. 103 and 104), retrieval is performed as to whether or not the part whose descriptive text or descriptive image should be outputted is included in the furniture, to read out and output data representing the descriptive text for a using method concerning the part from the text data table (FIG. 106) and to read out and output the image data from the image data table (FIG. 107) when the part is included in the furniture (step 182). When the furniture includes two or more identical parts whose descriptive text or descriptive image should be outputted, the descriptive text or descriptive image concerning one of the parts is outputted.

An instruction manual for furniture (completed furniture) is thus produced in accordance with instruction manual data. In accordance with the type of part included in the furniture, for example, text data and image data which are adapted to the type of the part are read out (outputted). Accordingly, as for each type of furniture, an instruction manual for the furniture can be produced. The produced instruction manual is displayed on the display screen or is printed out.

8 Furniture Design Support System Utilizing Network

In the above-mentioned furniture design support system, a furniture design support program installed in the computer system and various types of tables are used, for an operator or a customer to select units and parts and enter the sizes, for example, to assemble completed furniture (to produce data representing the completed furniture). Data respectively related to a plurality of kinds (types) of completed furniture of a basic type may be prepared, for the customer to change data related to the completed furniture of a basic type. Another computer connected through a network can be caused to produce a rendering drawing of the completed furniture.

FIG. 108 illustrates the overall configuration of a furniture design support system utilizing a network.

The furniture design support system comprises a server computer 302 and a plurality of client computers 303 which are connected to one another through a network 301. In the present embodiment, the server computer 302 shall be under the management of a provider of the furniture design support system. The client computer 303 shall be under the management of a user utilizing programs and data which are provided by the provider of the furniture design support system.

The server computer 302 and the client computer 303 are respectively computer systems (personal computers, work stations, etc.) each including a storage device storing programs, data, etc. and a transmitter-receiver for transmitting and receiving the programs, the data, etc. through the network 301, an input device for inputting the data or the like, and a display device for displaying the data, etc. The network 301 includes both a public line (the Internet, etc.) and a leased line which are provided between the computer systems. Facilities and devices (a CATV facility, a broadcasting satellite, a communication satellite, etc.) used in the lines are also included in the network 301. The storage device in each of the server computer 302 and the client computer 303 stores a communication program used for transmitting and receiving data or the like. When the network 301 is the Internet, a browser can be used as the communication program provided in the client computer 303.

Figure 110:
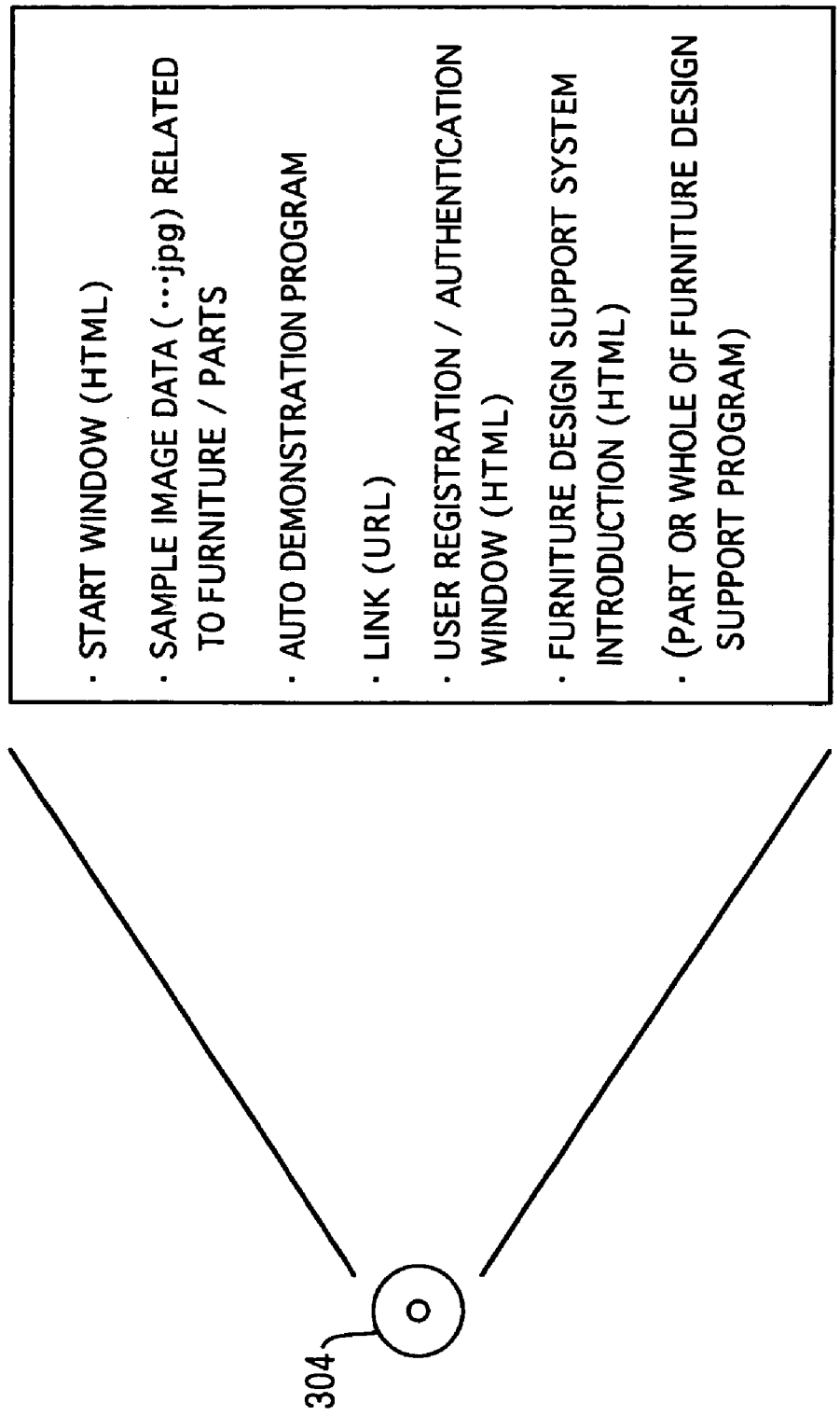
FIG. 110 illustrates the contents of a CD-ROM.

The client computer 303 comprises a CD-ROM 304 previously distributed from the provider of the furniture design support system. The contents of the programs and the data which are recorded on the CD-ROM 304 are shown in FIG. 110.

The programs and the data which are recorded on the CD-ROM 304 are basically executed in cooperation with the browser previously prepared in the client computer 303. On the CD-ROM 304, a start window (HTML data; HyperText Markup Language), sample image data (jpg data, etc.) related to furniture and parts, an auto demonstration program, link data (URL; Uniform Resource Locator), a new user registration/authentication window (HTML data), and a furniture design support system introduction window (HTML data) are recorded.

A part or the whole of the above-mentioned furniture design support program may be recoded on the CD-ROM 304. In this case, the furniture design support program recorded on the CD-ROM 304 is installed in the client computer 303, so that the client computer 303 operates as the furniture design support system (FIGS. 8, 92, and 98) in a stand-alone manner. When a part of the furniture design support program is recorded, the client computer 303 executes only a part of the function of the above-mentioned furniture design support system (restriction of the function).

Figure 111:
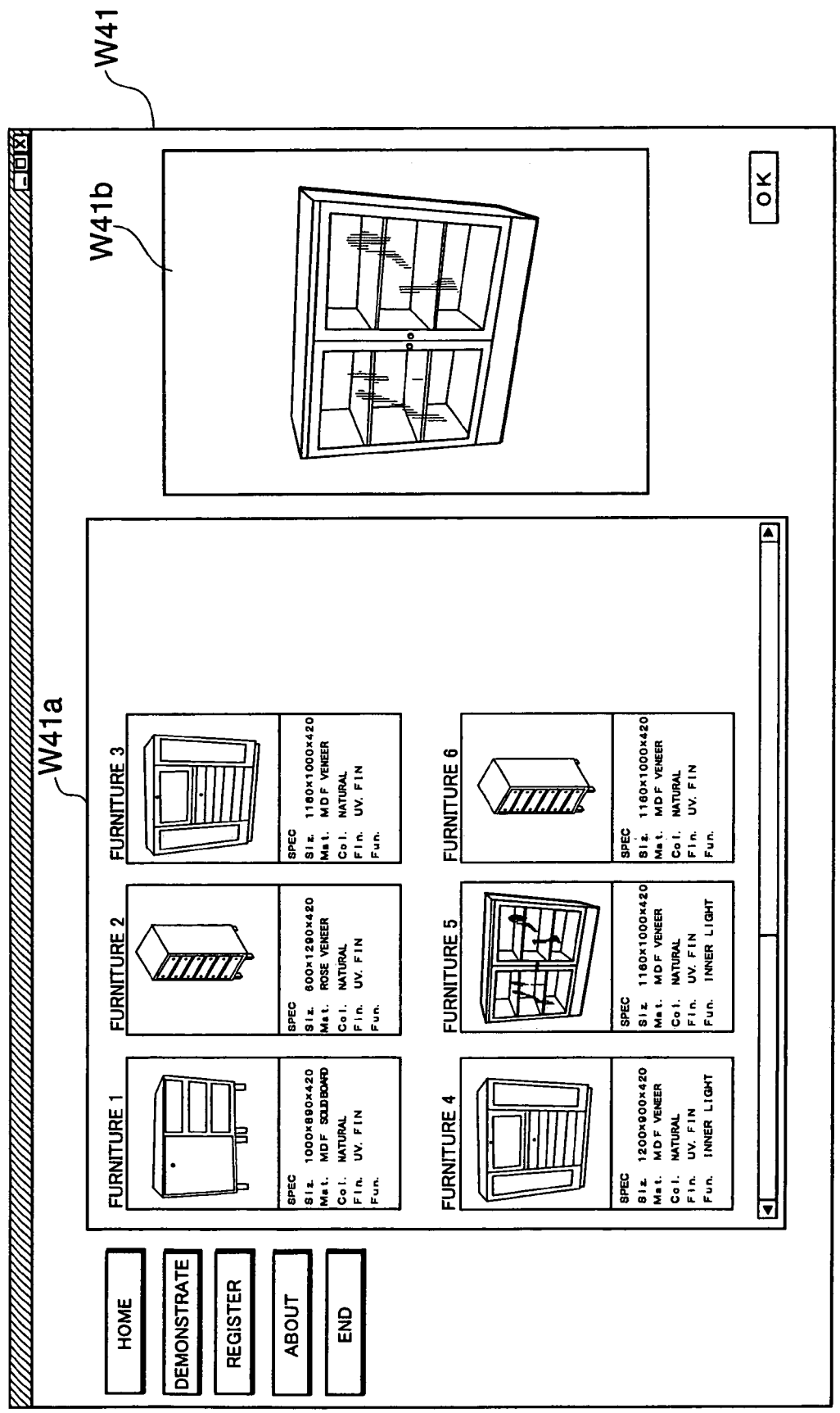
FIG. 111 illustrates an example of display of a start window.

An example of a window (a start window) displayed on the display screen when the start window data (HTML data) recorded on the CD-ROM 304 is read in the client computer 303 in which the browser is started is illustrated in FIG. 111.

The start window W41 includes an image display area. An area 41a in which sample images respectively related to a plurality of pieces of completed furniture are displayed is included on the left side of the image display area. An area W41b in which the sample image related to the completed furniture selected in the left area W41a is displayed in enlarged fashion is included on the right side of the image display area. The sample image related to the completed furniture displayed in the area W41a and the area 41b is based on the image data recorded on the CD-ROM 304. Further, the following buttons are included on the left side of the start window W41.

"Home" button: clicked when a page in which information related to the provider of the furniture design support system is registered is displayed on the display screen. The URL is described therein.

"Demonstrate" button: clicked when it is demonstrated how the completed furniture represented by the sample image is subjected to size change, color change, or the like. When the "demonstrate" button is clicked, the auto demonstration program recorded on the CD-ROM 304 is executed.

Figure 112:
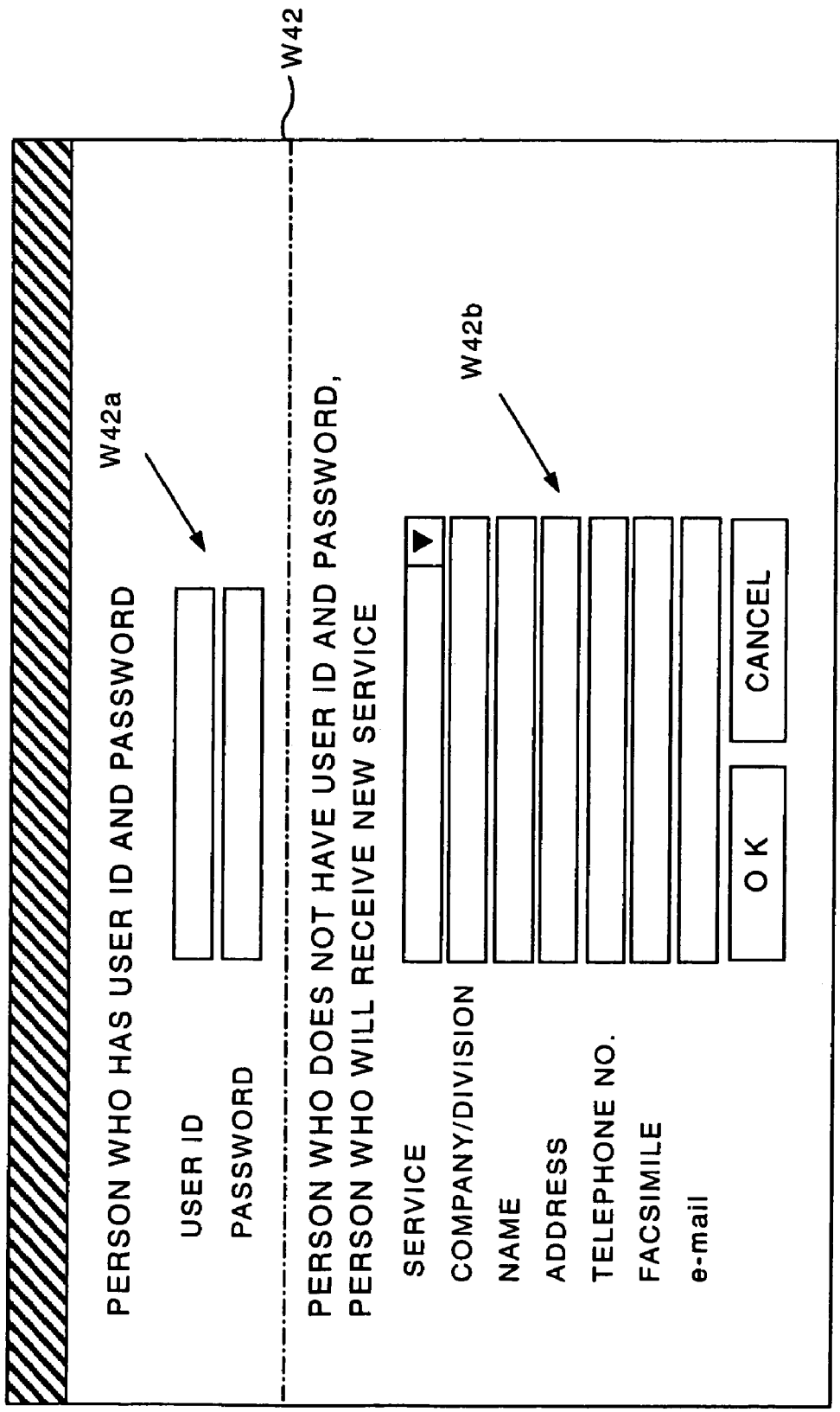
FIG. 112 illustrates an example of display of a user registration/authentication window.

"Register" button: clicked when user registration/authentication is performed. FIG. 112 illustrates an example of a user registration/authentication window W42. When the "register" button is clicked, the user registration/authentication window W42 appears on the display screen.

The user registration/authentication window W42 includes an area W42a in which a user ID and a password are entered, and an area W42b in which selection of a service, a company/division, a name, an address, a telephone number, a facsimile number, and an e-mail address are entered. A person who performs user registration (new registration) enters data into the area 42*b*. The entered data are transmitted to the server computer 302 through the network 301. The server computer 302 issues (produces) a user ID and a password for specifying a user who has transmitted the data, and notifies the user of the user ID and the password. Thereafter, the user enters the user ID and the password of which the user is notified into the area W42*a* when the client computer 303 is connected to the server computer 302.

"About" button: clicked when the introduction of the function of the furniture design support system is displayed on the display screen. The introduction of the function of the furniture design support system is displayed on the display screen by characters (a sentence) and an image on the basis of instruction data recorded on the CD-ROM 304.

"End" button: clicked when the start window is erased from the display screen.

Figure 113:
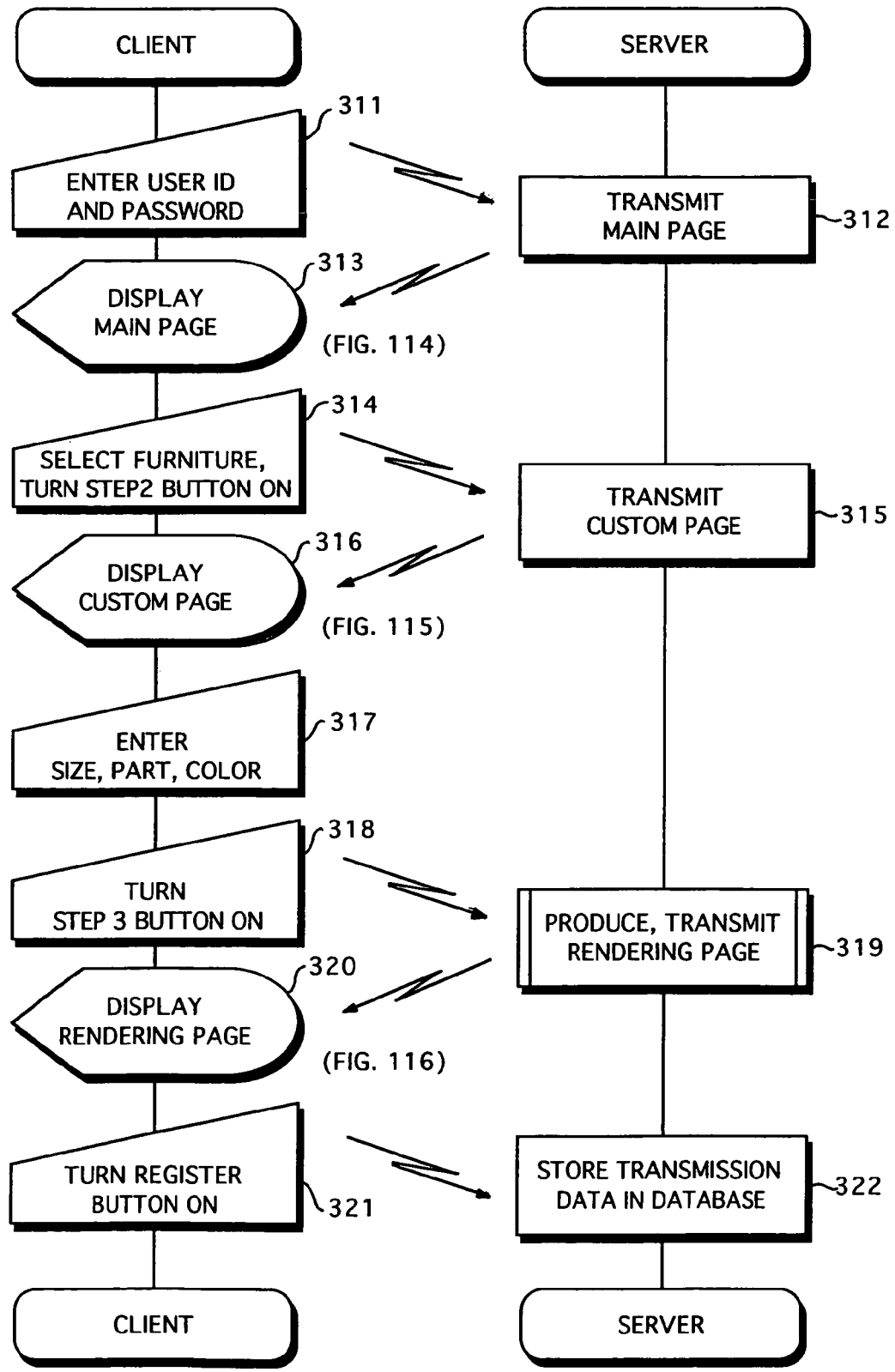
FIG. 113 is a flow chart showing the flow of processing of each of a server computer and a client computer.

The user of the client computer 303 can change the size and the color, for example, of the completed furniture represented by the sample image by utilizing the server computer 302. FIG. 113 is a flow chart showing an example of the flow of processing of the server computer 302 and processing of the client computer 303 in the furniture design support system utilizing the network 301.

The user of the client computer 303 starts the CD-ROM 304, to display the user registration/authentication window W42 on the display screen and enter the user ID and the password (step 311). The user ID and the password are transmitted to the server computer 302 from the client computer 303.

Figure 114:
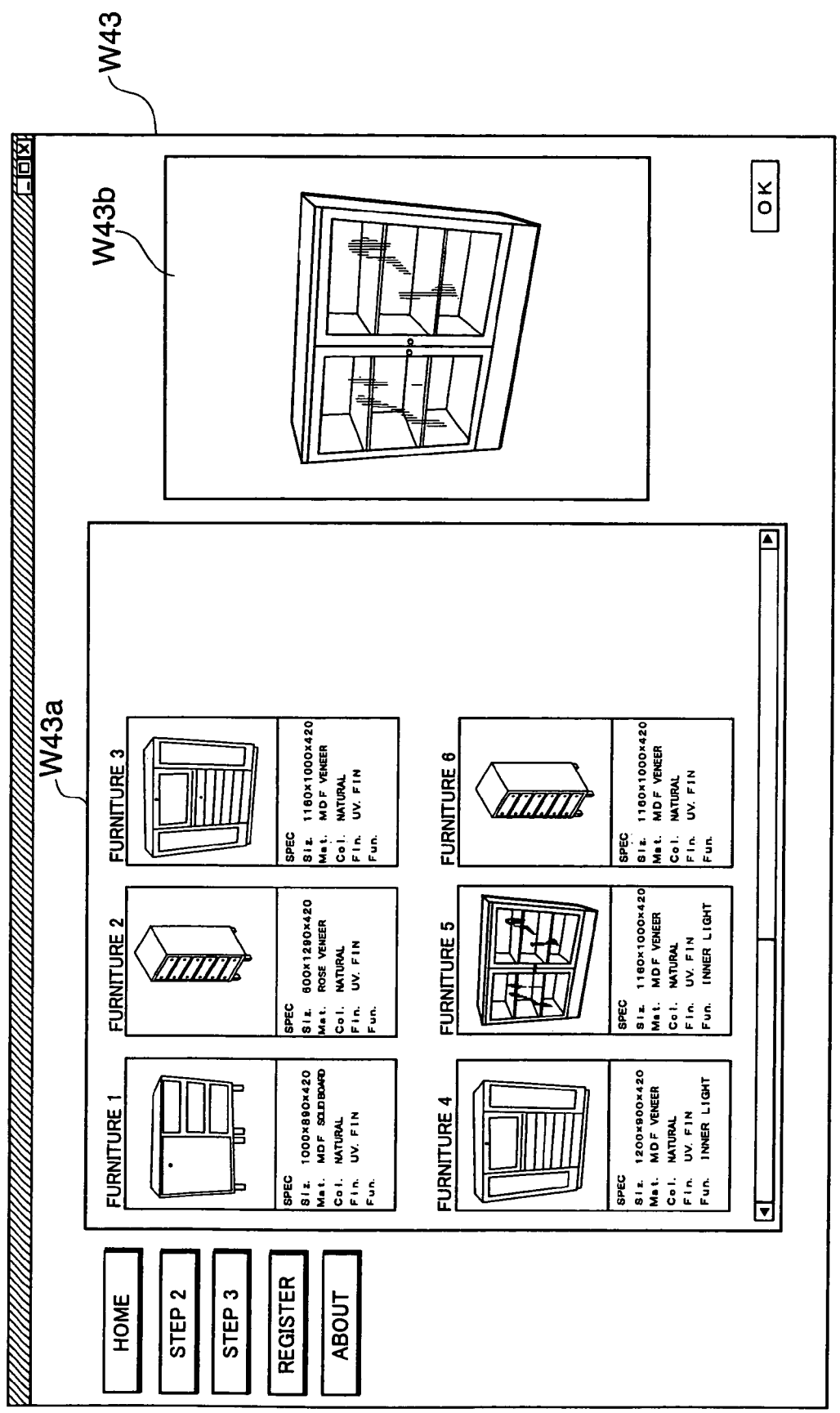
FIG. 114 illustrates an example of display of a main page.

The server computer 302 authenticates the user on the basis of the user ID and the password which have been received. When the authentication has succeeded, data representing a main page is transmitted to the client computer 303 (step 312). A main page W43 is displayed on the display screen of the client computer 303 (step 313, FIG. 114).

The main page W43 is basically the same as the above-mentioned start window W41 (FIG. 111). The number of sample images displayed in the area W43*a* may be larger than the number of sample images displayed on the basis of the CD-ROM 304.

The main page W41 displayed on the client computer 303 may be produced in the server computer 302 on the basis of a transmission request (entry of the user ID and the password) from the client computer 303, or may be previously produced and held in the server computer 302. The main page W41 can be represented by HTML data (an HTML file) (displayed on the display screen of the client computer 303). In any case, the server computer 302 temporarily stores, when it is accessed from the client computer 303, the HTML data for displaying the main page W41 in a transmission buffer in a memory. The HTML data stored in the transmission buffer is downloaded by the client computer 303. In the client computer 303, the window (the main page W41) based on the downloaded HTML data is displayed. The same is true for the other page, described later.

A "home" button, a "step 2" button, a "step 3" button, a "register" button, and an "about" button are included on the left side of the main page W43. The "home" button, the "register" button, and the "about" button are the same as those in the start window W41.

The "step 2" button is clicked when the sample image (completed furniture) is subjected to size change, part change, or color change. The "step 3" button is clicked when a rendering drawing is to be displayed.

Figure 115:
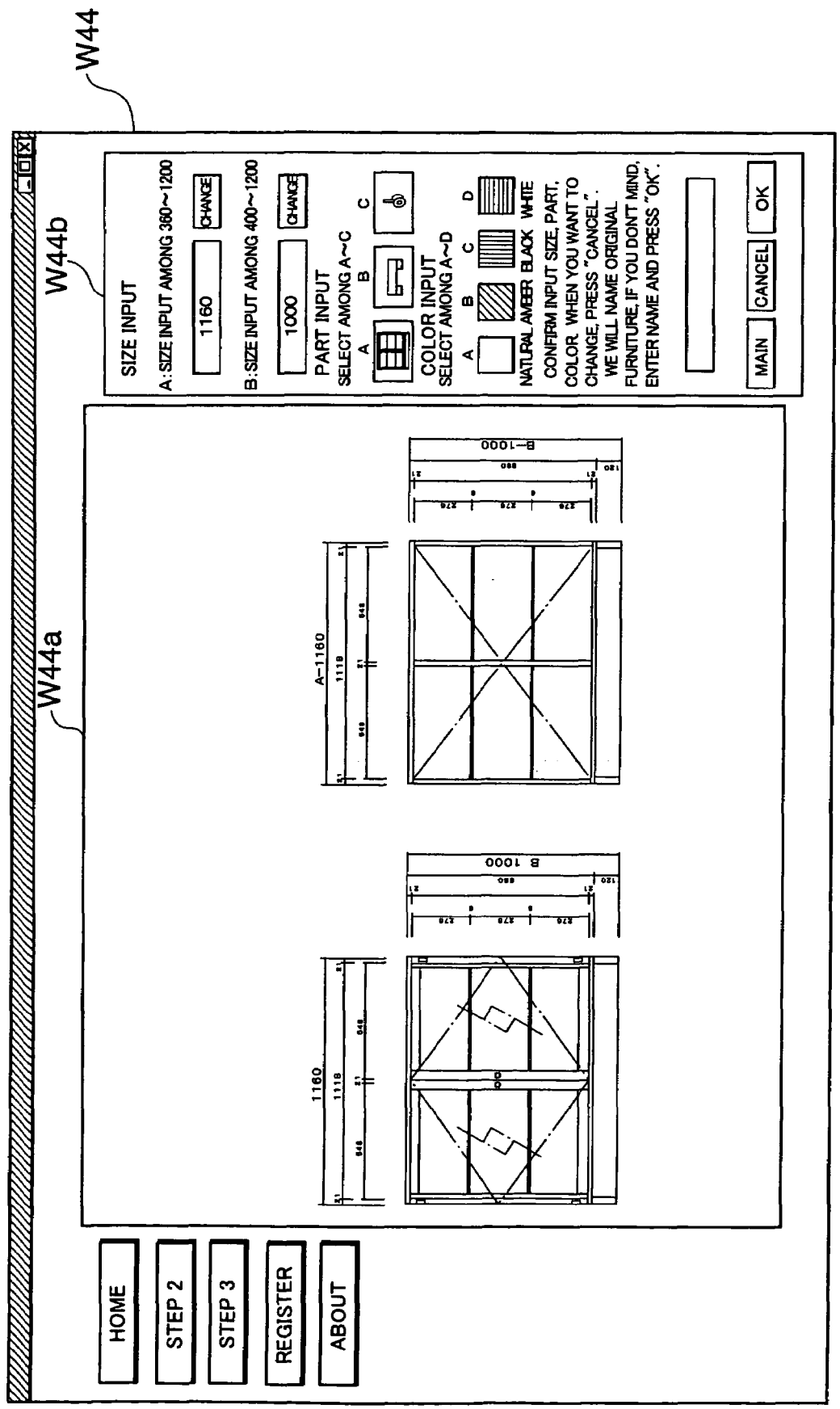
FIG. 115 illustrates an example of display of a custom page.

When any one of the sample images (images representing completed furniture) is selected in the main page W43, an image representing the selected completed furniture is displayed in enlarged fashion in an area W43*b*. When the "step 2" button is clicked herein, a custom page concerning the selected completed furniture is transmitted to the client computer 303 from the server computer 302 (steps 315 and 316, FIG. 115).

A custom page W44 (FIG. 115) includes an area W44*a* for displaying a drawing representing the structure and the size of selected completed furniture and an area W44*b* for inputting the size, parts, the color of selected furniture, and inputting the name of the furniture.

The user can change the size, the parts, and the color of the selected completed furniture using the custom page W44 (step 317).

When the "step 3" button is clicked (step 318), data representing the changed values (the size, the parts, and the color) (hereinafter referred to as change data) are transmitted to the server computer 302 from the client computer 303. In the server computer 302 which has received the change data, processing for producing a rendering page to be transmitted to the client computer 303 is performed (step 319).

Figure 117:
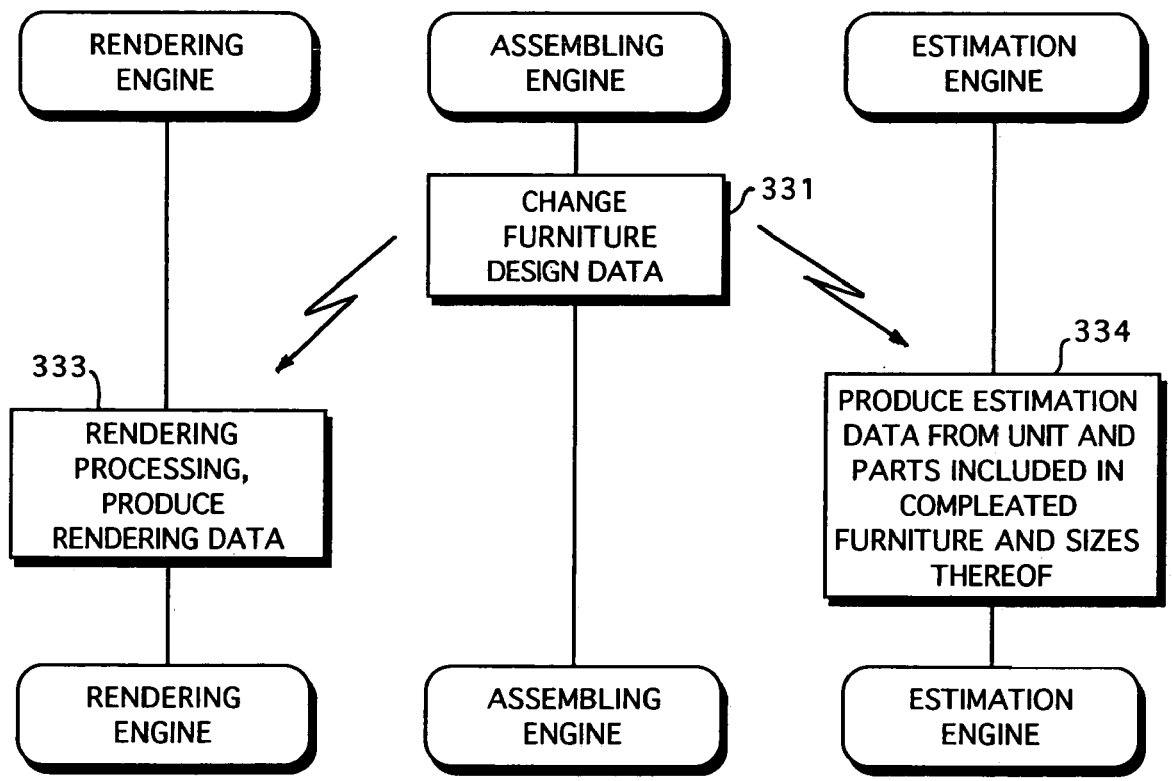
FIG. 117 is a flow chart showing the flow of processing for producing a rendering page.

FIG. 117 is a flow chart showing the flow of processing for producing the rendering page in the server computer 302.

The server computer 302 comprises furniture design data related to a sample image (the same data as the above-mentioned furniture design data 25), and further comprises a rendering engine (a program), an assembling engine (a program), and an estimation engine (a program). The assembling engine is used on the basis of the change data, so that the furniture (furniture design data) is changed (step 331).

Rendering processing is subsequently performed by the rendering engine on the basis of the furniture design data which has been changed (step 333). Data representing a rendering drawing is produced.

Furthermore, the cost of the furniture (completed furniture) is calculated from parts included in the furniture and the sizes of the parts by the estimation engine on the basis of the furniture design data which has been changed (step 334).

The server computer 302 produces data representing a rendering page including the furniture design data obtained by the assembling engine, the data representing the rendering drawing obtained by the rendering engine, and data representing the cost of the furniture obtained by the estimation engine, and transmits the data to the client computer 303 (step 320).

Figure 116:
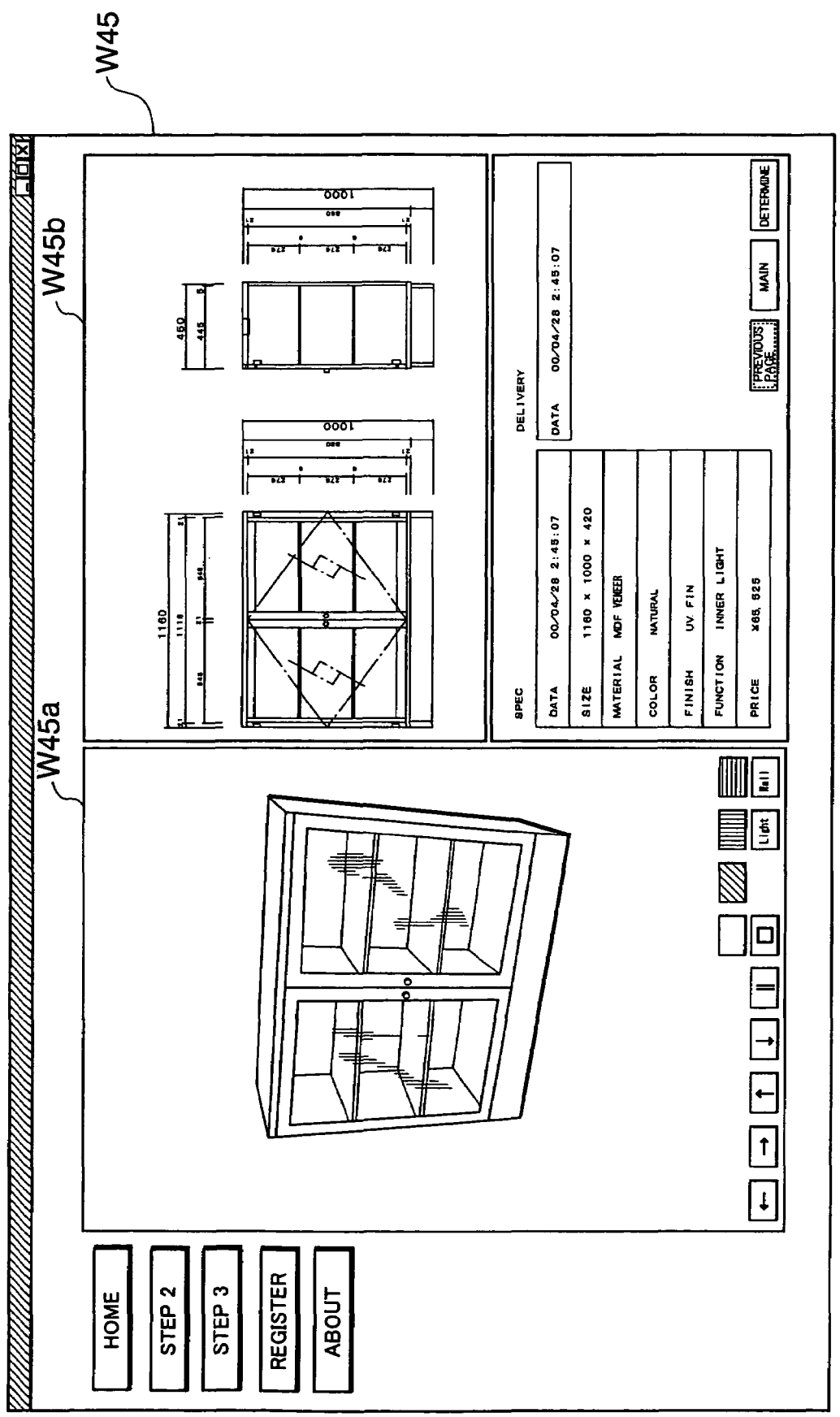
FIG. 116 illustrates an example of display of a rendering page.

A rendering page W45 (FIG. 116) includes an area W45*a* where a rendering drawing of the furniture on which the size, the parts, and the color which have been changed using the above-mentioned custom page W42 are reflected is displayed. A drawing (a design drawing) representing the changed size and structure of the furniture and a spec table (a date, a size, a material, a color, painting, equipment, cost) are respectively displayed at the upper right of the area W45*a* and the lower right of the area W45*a*.

The rendering page W45 includes a "determine" button. When the "determine" button is clicked, the change data (the furniture design data after the change) is stored in a database in the server computer 302 (steps 321 and 322). Furniture design data related to furniture having the changed size, parts, and color is transmitted toward a furniture manufacturing workshop or the like from the server computer 302 (may be delivered by a drawing or the like). The furniture having the changed size, parts, and color is manufactured in the furniture manufacturing workshop.

The furniture design data related to the completed furniture having a basic structure (and an image representing the completed furniture) are thus previously prepared, thereby making it possible to relatively easily design furniture having a liked structure, color, etc. only by changing a portion thereof. Liked furniture can be designed and ordered with ease. Further, the production of an image and a drawing representing the furniture, including the rendering processing, is performed on the side of the server computer 302. Accordingly, the processing load on the client computer 303 is light.

In the furniture design support system utilizing the above-mentioned network, the furniture design data related to the completed furniture is previously prepared, and the size data or the like in the furniture design data is changed, thereby producing the furniture design data related to the furniture of a size, etc. liked by the user. Of course, a system so adapted that the furniture design data related to the completed furniture previously prepared can be changed may be realized as a stand-alone computer system. Conversely, the above-mentioned stand-alone furniture design support system (a system for producing furniture design data according to the selection of units) may be also established utilizing the network. Further, the user may be caused to produce the furniture design data by previously preparing furniture design data in a state where units and basic parts are combined and further combining parts liked by the user with the furniture design data (or replacing the parts).

The invention claimed is:

1. An article processing drawing production system comprising:
  first storage means storing data representing minimum constituent elements composing a plurality of types of constituent members, data related to the constituent member represented by a combination of the minimum constituent elements, data related to an article represented by a combination of the constituent members, and size data related to each of said minimum constituent elements;
  processing drawing production means for producing, on the basis of the data representing the minimum constituent elements comprising the plurality of types of constituent members, the data related to the constituent member represented by the combination of the minimum constituent elements, the data related to the article represented by the combination of the constituent members, and the size data related to each of said minimum constituent elements, processing drawings having a drawing and the size of the minimum constituent element, a drawing and the size of the constituent member, and a drawing and the size of the article separately drawn thereon, and outputting the processing drawings as a set;
  second storage means storing data representing joint portions among the minimum constituent elements for assembling the constituent members and assembling the article; and
  means for changing at least one of the positions and the number of joint portions among said minimum constituent elements on the basis of the size data related to the minimum constituent element.

2. The article processing drawing production system according to claim 1, wherein said first storage means further stores data representing a punching position and a hinge attachment position of said minimum constituent elements and said plurality of types of constituent members.

3. The article processing drawing production system according to claim 1, wherein said first storage means comprises a table storing data for producing a processing drawing.

4. The article processing drawing production system according to claim 1, wherein a number of said minimum constituent elements and a number of said plurality of types of constituent members are determined based on a size of said minimum constituent elements, a size of said plurality of types of constituent members and a size of said article.

5. The article processing drawing production system according to claim 1, further comprising:
  means for changing a number of said minimum constituent elements and a number of said plurality of types of constituent members based on a size of said minimum constituent elements, a size of said plurality of types of constituent members and a size of said article.

6. A medium having a program recorded thereon for controlling a computer comprising storage means storing data representing minimum constituent elements composing a plurality of types of constituent members, data related to the constituent member represented by a combination of the minimum constituent elements, data related to an article represented by a combination of the constituent members, and size data related to each of said minimum constituent elements; second storage means storms data representing joint portions among the minimum constituent elements for assembling the constituent members and assembling the article; and means for changing at least one of the positions and the number of joint portions among said minimum constituent elements on the basis of the size data related to the minimum constituent element, the program controlling the computer so as to;
  produce, on the basis of the data representing the minimum constituent elements comprising the plurality of types of constituent members, the data related to the constituent member represented by the combination of the minimum constituent elements, the data related to the article represented by the combination of the constituent members, and the size data related to each of said minimum constituent elements, processing drawings respectively having a drawing and the size of the minimum constituent element a drawing and the size of the constituent member, and a drawing and the size of the article separately drawn thereon and outputting the processing drawings as a set.

7. An article processing drawing production system comprising:
  a first storage unit that stores data representing minimum constituent elements composing a plurality of types of constituent members, data related to the constituent member represented by a combination of the minimum constituent elements, data related to an article represented by a combination of the constituent members, and size data related to each of said minimum constituent elements; and
  a processing drawing production unit that produces, on the basis of the data representing the minimum constituent elements comprising the plurality of types of constituent members, the data related to the constituent member represented by the combination of the minimum constituent elements, the data related to the article represented by the combination of the constituent members, and the size data related to each of said minimum constituent elements, processing drawings having a drawing and the size of the minimum constituent element, a drawing and the size of the constituent member, and a drawing and the size of the article separately drawn thereon, and outputting the processing drawings as a set;
  a second storage unit that stores data representing joint portions among the minimum constituent elements for assembling the constituent members and assembling the article; and
  a joint changing unit that changes at least one of the positions and the number of joint portions among said minimum constituent elements on the basis of the size data related to the minimum constituent element.

* * * * *